US008819156B2

(12) United States Patent  (10) Patent No.: US 8,819,156 B2
Miner et al.  (45) Date of Patent: *Aug. 26, 2014

(54) SYSTEMS AND METHODS FOR MESSAGE COLLECTION

(76) Inventors: James Robert Miner, Ashburn, VA (US); Jason Paul Oettinger, Sarasota, FL (US)

(*) Notice: Subject to any disclaimer, the term of this patent is extended or adjusted under 35 U.S.C. 154(b) by 70 days.

This patent is subject to a terminal disclaimer.

(21) Appl. No.: 13/415,724

(22) Filed: Mar. 8, 2012

(65) Prior Publication Data

US 2012/0233273 A1  Sep. 13, 2012

Related U.S. Application Data

(63) Continuation-in-part of application No. 13/189,476, filed on Jul. 22, 2011.

(60) Provisional application No. 61/558,982, filed on Nov. 11, 2011, provisional application No. 61/451,630, filed on Mar. 11, 2011.

(51) Int. Cl.
*G06F 15/16* (2006.01)

(52) U.S. Cl.
USPC ........................................................ 709/206

(58) Field of Classification Search
None
See application file for complete search history.

(56) References Cited

U.S. PATENT DOCUMENTS

| | | |
|---|---|---|
| 3,967,073 A | 6/1976 | Anderson |
| 4,499,553 A | 2/1985 | Dickinson |
| 5,369,784 A | 11/1994 | Nelson |
| 5,796,394 A | 8/1998 | Wicks |
| 5,802,314 A | 9/1998 | Tullis |
| 5,948,058 A | 9/1999 | Kudoh |
| 6,029,164 A | 2/2000 | Birrell |
| 6,049,799 A * | 4/2000 | Mangat et al. ............... 1/1 |
| 6,104,789 A | 8/2000 | Lund |
| 6,111,755 A | 8/2000 | Park |
| 6,301,608 B1 | 10/2001 | Rochkind |
| RE37,456 E | 11/2001 | Brisson |
| 6,424,908 B2 | 7/2002 | Urban |
| 6,438,215 B1 | 8/2002 | Skladman |
| 6,460,087 B1 | 10/2002 | Saito |
| 6,584,181 B1 | 6/2003 | Aktas |
| 6,736,272 B2 | 5/2004 | Pratt |

(Continued)

OTHER PUBLICATIONS

Reserved Characters in Unix, Purdue Engineering Computer Network, Aug. 22, 2007, pp. 1-2.*

(Continued)

*Primary Examiner* — Ario Etienne
*Assistant Examiner* — Clayton R Williams

(57) ABSTRACT

The invention provides systems and methods for processing communication content from a user device. The method performed by a computer and comprising inputting an electronic communication that includes communication content and a routing character string. The communication content constituted by data generated as a result of, and representative of, characters keyed into the user device by the user. Maintaining a bin collection including bins. Performing processing on the communication content including identifying the user and a bin collection of the user based on the routing character string; and processing the communication content including (1) mapping first data to a command; and (2) mapping second data to a bin label. The command dictates particular action to be performed, and the bin label identifies an identified bin upon which to perform the action; and performing the action on the identified bin.

17 Claims, 59 Drawing Sheets

(56) References Cited

U.S. PATENT DOCUMENTS

| | | |
|---|---|---|
| 6,760,727 B1 | 7/2004 | Schroeder |
| 6,999,993 B1 | 2/2006 | Shah |
| 7,051,277 B2 | 5/2006 | Kephart |
| 7,076,241 B1 | 7/2006 | Zondervan |
| 7,177,909 B2 | 2/2007 | Stark |
| 7,370,004 B1 | 5/2008 | Patel |
| 7,373,141 B2 | 5/2008 | Kwon |
| 7,433,923 B2 | 10/2008 | Adkins |
| 7,437,413 B2 | 10/2008 | Okuyama |
| 7,444,328 B2 | 10/2008 | Starbuck |
| 7,469,280 B2 | 12/2008 | Simpson |
| 7,533,152 B2 | 5/2009 | Stark |
| 7,609,669 B2 | 10/2009 | Sweeney |
| 7,688,955 B2 | 3/2010 | Kim |
| 7,765,208 B2 | 7/2010 | Starbuck |
| 7,783,023 B2 | 8/2010 | Balk |
| 7,809,352 B2 | 10/2010 | Jiang |
| 7,836,061 B1 | 11/2010 | Zorky |
| 7,890,576 B2 | 2/2011 | Button |
| 7,895,246 B2 | 2/2011 | Bauman |
| 7,941,491 B2 | 5/2011 | Sood |
| 7,941,557 B2 | 5/2011 | Zhu |
| 7,945,634 B1 | 5/2011 | Huda |
| 7,945,783 B2 | 5/2011 | Kent |
| 7,958,192 B2 | 6/2011 | Harik |
| 7,984,104 B1 | 7/2011 | Stark |
| 8,001,192 B1 | 8/2011 | Papineau |
| 8,006,180 B2 | 8/2011 | Tunning |
| 8,015,245 B2 | 9/2011 | Milic-Frayling |
| 8,065,373 B2 | 11/2011 | Bryan |
| 8,165,609 B2 | 4/2012 | Fang |
| 8,190,159 B2 | 5/2012 | Kobayashi |
| 8,234,627 B2 | 7/2012 | Floyd |
| 8,315,604 B2 | 11/2012 | Tysowski |
| 8,326,936 B2 | 12/2012 | Marino |
| 8,339,954 B2 | 12/2012 | Dahod |
| 8,402,102 B2 | 3/2013 | Gleeson |
| 8,447,967 B1 | 5/2013 | Janacek |
| 8,488,751 B2 | 7/2013 | Skakkebaek |
| 8,510,390 B2 | 8/2013 | Kamat |
| 8,515,894 B2 | 8/2013 | Yu |
| 8,533,611 B2 | 9/2013 | Katis |
| 2002/0091709 A1 | 7/2002 | Jung |
| 2002/0116641 A1 | 8/2002 | Mastrianni |
| 2002/0199014 A1 | 12/2002 | Yang |
| 2003/0028603 A1 | 2/2003 | Aktas |
| 2003/0084109 A1 | 5/2003 | Balluff |
| 2004/0029598 A1 | 2/2004 | Guggisberg |
| 2005/0021652 A1 | 1/2005 | McCormack |
| 2005/0027779 A1 | 2/2005 | Schinner |
| 2005/0050146 A1 | 3/2005 | Jani |
| 2005/0289016 A1 | 12/2005 | Horstmann |
| 2006/0029197 A1 | 2/2006 | Pham |
| 2007/0239738 A1 | 10/2007 | Harman |
| 2008/0034056 A1 | 2/2008 | Renger |
| 2008/0075244 A1 | 3/2008 | Hale |
| 2008/0082429 A1 | 4/2008 | Stein |
| 2008/0232585 A1 | 9/2008 | Zahari |
| 2008/0242362 A1 | 10/2008 | Duarte |
| 2008/0291899 A1 | 11/2008 | Gromoll |
| 2008/0299999 A1 | 12/2008 | Lockhart |
| 2008/0301137 A1 | 12/2008 | Bauman |
| 2009/0029680 A1* | 1/2009 | Fang ......................... 455/412.2 |
| 2009/0063627 A1 | 3/2009 | Nowacek |
| 2009/0063646 A1 | 3/2009 | Mitnick |
| 2009/0106695 A1 | 4/2009 | Perry |
| 2010/0030578 A1 | 2/2010 | Siddique |
| 2010/0064007 A1 | 3/2010 | Randall |
| 2010/0100815 A1 | 4/2010 | Hutchinson |
| 2011/0010548 A1 | 1/2011 | Stewart |
| 2011/0119296 A1 | 5/2011 | Park |
| 2011/0137966 A1 | 6/2011 | Srinivasan |
| 2012/0233267 A1 | 9/2012 | Miner |
| 2013/0275528 A1 | 10/2013 | Miner |

OTHER PUBLICATIONS

Purdy, Kevin, Free Alternatives to Replace Jott's Functions, lifehacker, Aug. 22, 2008 (5 pages).

Elgan, Mike, New reQall offers location-based reminders, Computer World, Mar. 25, 2009 (3 pages).

Evans, Meryl, reQall Helps You Remember Stuff, Anywhere, GIGAOM, Apr. 3, 2009 (4 pages).

Sinkov, Andrew, Evernote + Twitter = Instant Memories, Evernote News, Apr. 14, 2009 ((3 pages).

Capture Tasks Handsfree Using Your iPhone, Life Tips Blog, Mar. 12, 2010 (2 pages).

Sinkov, Andrew, Emailing Into Evernote Just Got Better, Mar. 16, 2010 (2 pages).

www.archive-com.com >> springpad.com (Springpad postings), Items dated Mar. 2010 to Nov. 2012 (9 pages).

Gold, Ryan, Slider Calc—Mortgage Calculator (iTunes Preview), Jul. 22, 2010 (1 page).

Jake, How Do You Capture Ideas on the Go?, AppsLab, Aug. 31, 2010 (3 pages).

Katin, SpringPad Post—Save Anything to Springpad Using Email, Apr. 5, 2011 with Jan. 2012 Comments (12 pages).

Freedman, David, Evernote: 2011 Company of the Year, INC Magazine (NY, NY) Dec. 2011 Issue (10 pages).

* cited by examiner

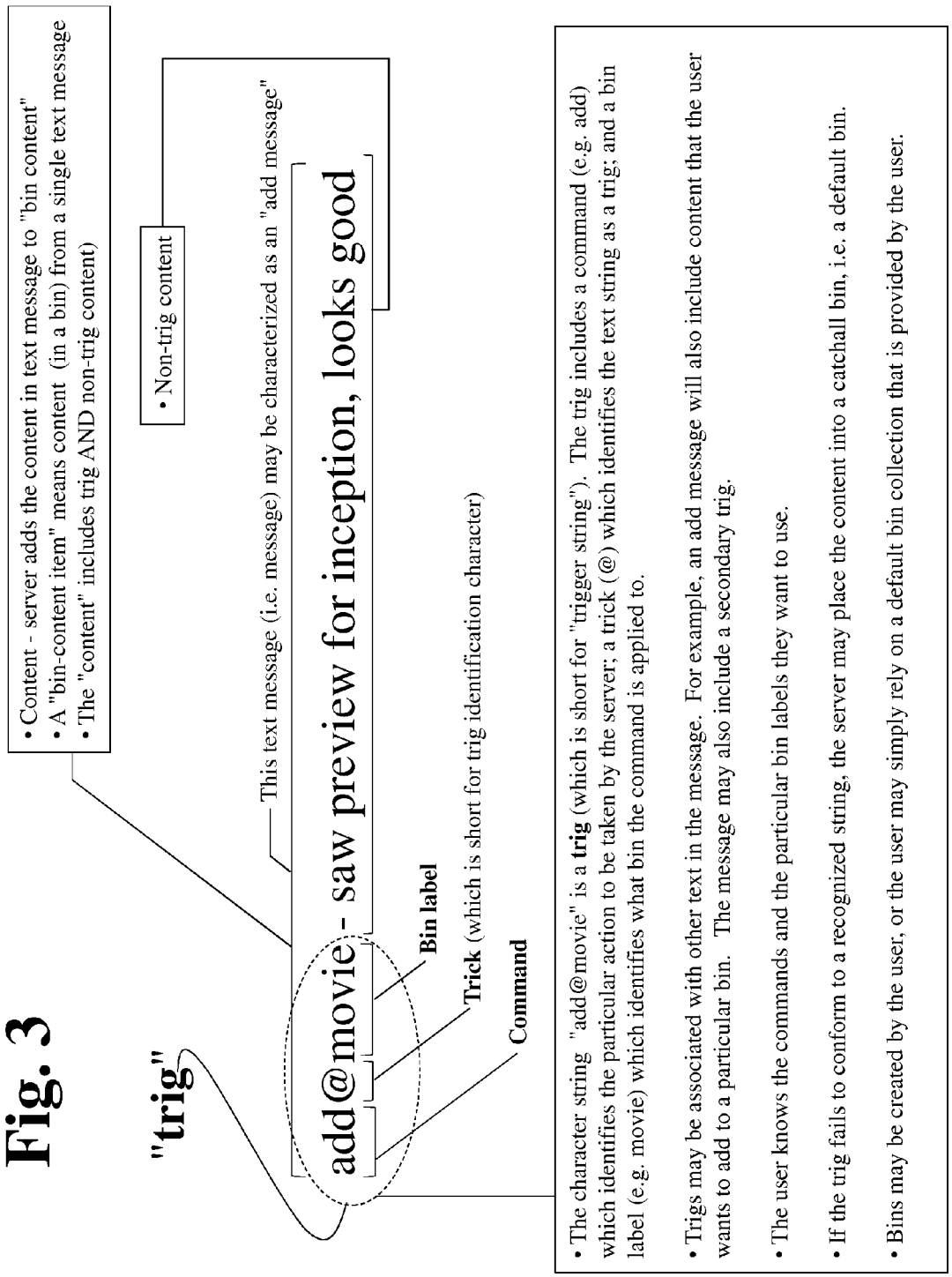

| TYPES OF MESSAGES (illustrative) | EXAMPLE MESSAGE (see Fig. 2 also) | DESCRIPTION (particular names may be varied in different embodiments) |
|---|---|---|
| Add message (from user) | add@movie - saw preview for inception tonight, looks good | A text message (i.e. message) sent from the user to the server that contains a trig (see Fig. 3), as well as content. An add message is identified by the command "add" in the trig. The trig identifies the particular content bin (i.e. bin) in which the content is to be placed by the server. If no command is in the message, then by default, the message may be handled as an add message. Also, any message sent to server without a trig (or in some manner sort of protocol) may be handled as an add message, i.e. content message, in one embodiment, and may be placed in a catchall message bin. |
| Send message (from user) | send@movie | A message sent from the user to the server that tells the server to push content from a particular bin. A send message is identified by the command "send" in the trig. The server responds to a request message with a report message. |
| Report message (from server) | Report of @movie: saw preview for inception, looks good // @movie – need to watch "kings speech" | A message (in response to a send message) sent from the server to the user that contains content from a particular bin. The report message might alternatively be in the form of an e-mail, phone call, or upload to on-line document such as a GOOGLE DOC document, for example. |
| Clear bin message | clearbin@movie | A message sent from the user to the server that tells the server to delete (i.e. clear out) all content in the particular bin in the user's bin collection. A clear message is identified by the command "clear" in the trig. In one embodiment, a send message received from the user will automatically result in clearing the particular bin. |
| New bin message (from user) | newbin@people | A message sent from the user to the server that tells the server to set up a new bin in the user's bin collection. A new bin message is identified by the command "set" in the trig. |
| Delete bin message (from user) | deletebin@shoppinglist | A message sent from the user to the server that tells the server to delete a particular bin currently in the user's bin collection. A delete bin message is identified by the command "deletebin" in the trig. |

Fig. 4

| SECONDARY TYPES OF MESSAGES / TEXT (Illustrative) | EXAMPLE MESSAGE | DESCRIPTION |
|---|---|---|
| Bin list request (from user) | @binlist | User wants a list of all their bins in their bin collection |
| Server control message (from server) | (see Fig. 19) | A message sent from the server to the user for a particular purpose. Such a message may or may not contain a trig |
| User control message (from user) | (see Fig. 19) | A message sent from the user to the server in response to a server control message |
| Secondary trig (included in message from user, along with Fig. 4 trig) | window@2/1/11to2/15/11 | A secondary trig may be included with one of the trigs shown in Fig. 4. For example, a secondary trig of "window@2/1/11to2/15/11" along with the trig "send@movie" tells the server that it should send all messages (e.g. texts) that are in the movie bin from the particular time period. This may be helpful in the situation where the user remembers, for example, that early last month she "at'd" a movie that she wanted to see, but can't remember the movie or when she sent the text to the At-It server |

Fig. 5

| SELECT PROCESSING ASPECTS | DESCRIPTION |
|---|---|
| User device 100 | Smart phone or any other device that provides functionality to process messages and perform processing of the invention |
| At-it server 200 | Processing system (computer system) that performs At-It processing |
| Trig (Trigger string) | A sequence of characters in a message created by the user. Each trig tells the server action to take in response to the message. A trig may be in the form of an add (content) string, send (request) string, clear bin string, new bin string or a delete bin string, for example. (see Fig. 4) |
| User account | An account designated to a particular user that contains, in particular, attributes of the user, trigger strings that are used by the user to manipulate content, and a bin collection (i.e. a bin set) with bins. Alternatively, trigs may be kept (at least in part) in a separate database, for use in conjunction with a user's particular bin collection. |
| Bin collection | A collection of bins associated with the user account |
| Bin | A "bin" may be constituted by a "bin label" and content (data collected from the user that is associated with that bin label). A bin may be constituted by other attributes and in particular processing attributes. A bin is maintained on a computer readable medium and may be in the form of a record, a folder, a file, tag arrangement, relational database, or some other methodology to associate content with the bin label, and with the user account, and provide the processing as described herein. Accordingly, the bin collection (bins) might be considered part of the account or might be considered associated with the account. |

See Fig. 24 - user may effect changes in a web session

1010 Portion of account list in At-It server 200

1020 user record

| Account # | Phone # (text message) | Personal information | Bin Collection # |
|---|---|---|---|
| 111-111-001 | 222-333-4441 | [address, contact info, etc.] | 111-111 |
| 111-112-002 | 222-333-4442 | [address, contact info, etc.] | 111-112 |
| 111-113-003 | 222-333-4443 | [address, contact info, etc.] | 111-113 |
| 111-114-004 | 222-333-4444 | [address, contact info, etc.] | 111-114 |
| 111-115-005 | 222-333-4445 | [address, contact info, etc.] | 111-115 |

Account is associated with (or contains) the bin collection of user

1030 Bin collection data structure

See related text in Fig. 2

1032 Processing particulars

BIN COLLECTION 111-115

| Bin name | Content in Bin | Processing attributes |
|---|---|---|
| movie | @movie -- saw preview for inception tonight, looks good (2/15/11 10:35pm) // @movie -- need to watch "kings speech" (2/17/11 6:32pm) // | [processing particulars] |
| song | add @song -- use somebody, download from itunes | [processing particulars] |
| people | need to friend AKT and SM - @people | [processing particulars] |
| quotes | add @quotes "I'm just a hungry kid" -- cute. | [processing particulars] |
| lifethoughts | add @l: persistence carries the day | [processing particulars] |
| catchall | No content. | [processing particulars] |

Bin list

User has used known fuzzy logic settings and/or default settings and avoided the need to text the lengthy "lifethoughts" bin name

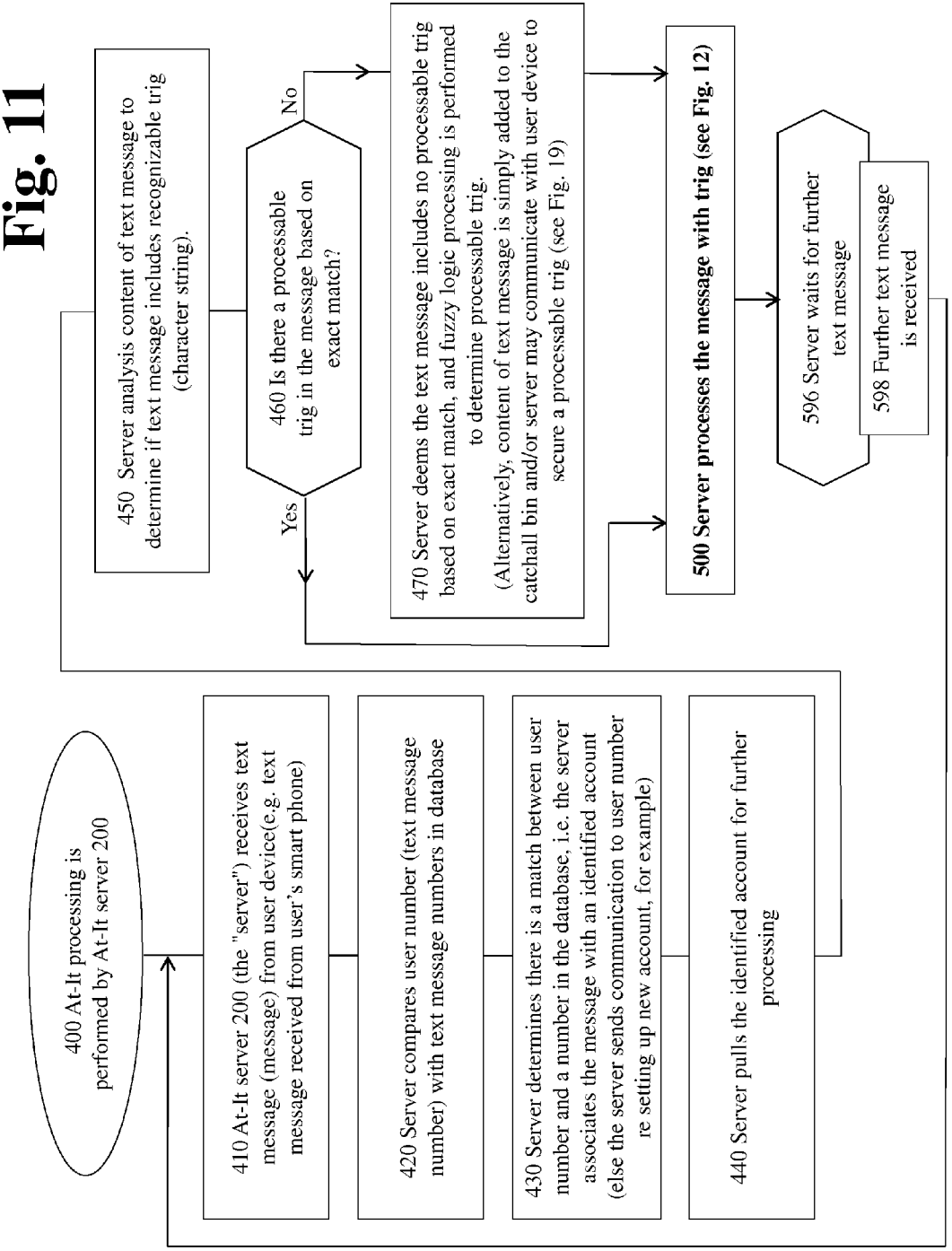

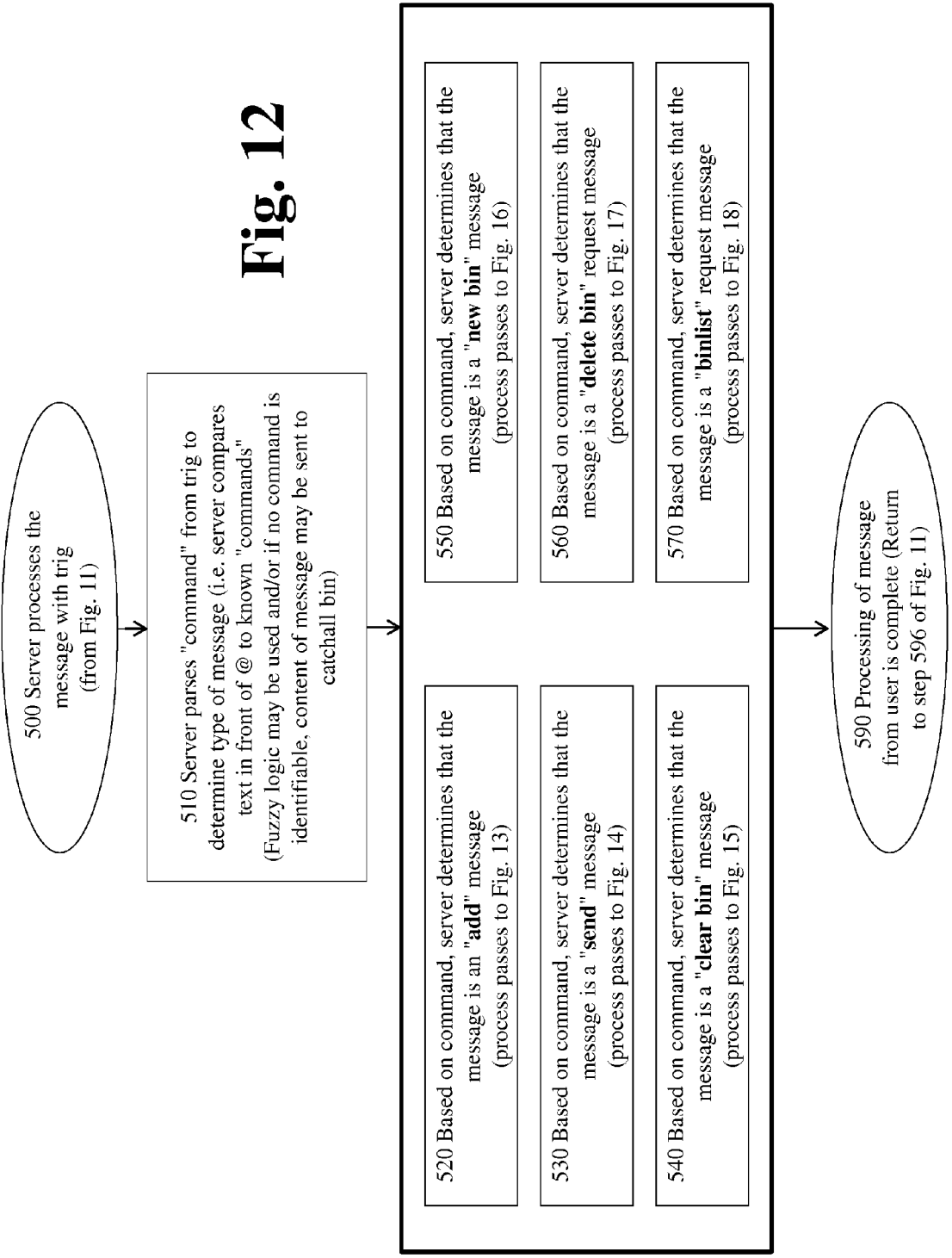

Fig. 14

530 Server (bin processing portion 220) processes "send message" (from Fig. 12)

532 Parse out "bin label" from trig (e.g. "movie" is parsed out from send@movie). This is the bin that the content will be pulled from to respond to the user's send message 533 Determine if there are any secondary trigs that control the time window that the content is pulled from (or other secondary trigs)

534 Pull the content from the particular bin and write to a "send file"

535 Determine if there are any secondary trigs to modify the send message (e.g. dictating to send to third persons or via particular channel), and proceed based on such further secondary trigs 536 Based on, for example, the user's bin setting re channel to send the content, the user's contact information (text number, e-mail address, on-line document, cell number, land number), and any third party information - the server outputs the pulled content to the user (and to third party if selected) in a "report message"

537 The content in the particular bin remains unchanged (or alternatively, the user preference may dictate to clear the bin, i.e. delete all content in the bin, or alternatively, delete just the content that was sent based on the secondary trig)

538 Processing returns to Fig. 12 (step 590)

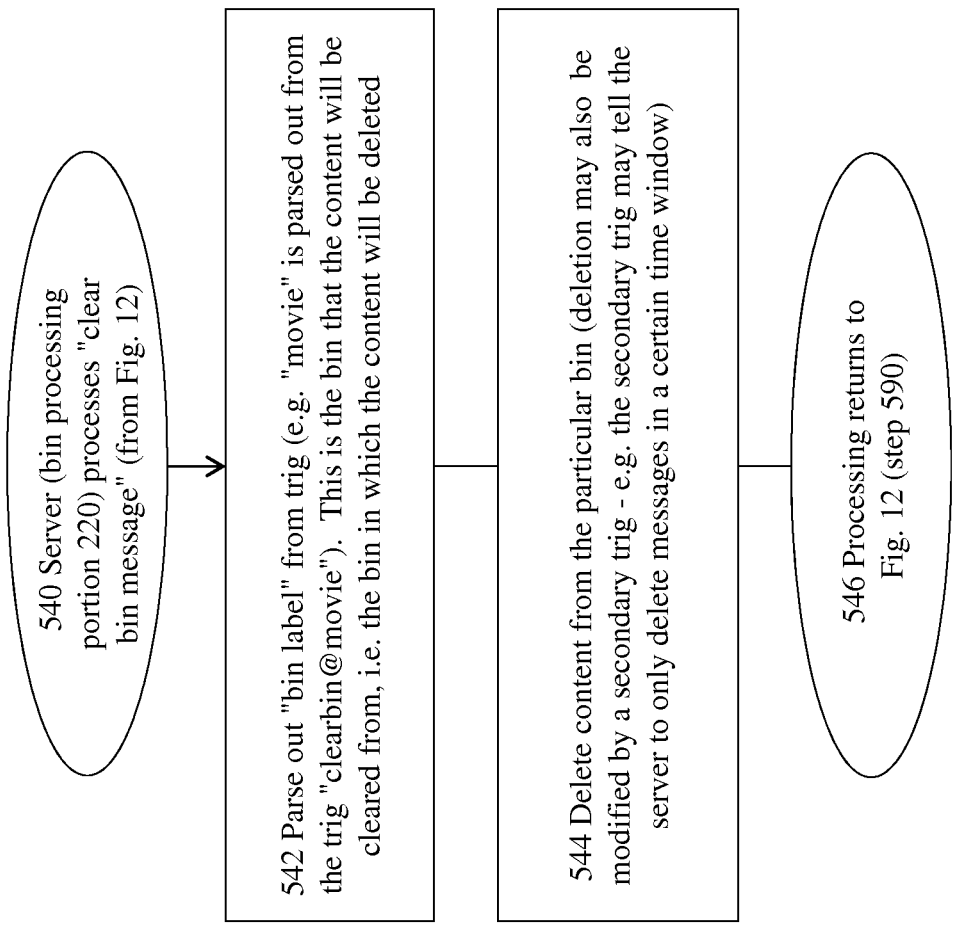

Your At-It Information

Name - Afirst Alast     CHANGE

Home address - 2000 Astreet, Atown, VA , USA     CHANGE

Text message # - 111-111-1234     CHANGE

Cell #- 111-111-1234     CHANGE

Alternate phone # (not for text message) – 111-111-7777     CHANGE

E-mail address – AAlast@aserver.com     CHANGE ← User clicks to change information

Fig. 24

| Saying | Meaning of saying |
|---|---|
| That's a good thought. I'm going to "at" that | User is going to add the particular thought to a bin in their bin collection. |
| That's so cute what he said, can you send that to your quotes bin? | A request for a user to add content to a particular bin |
| Do you have a bin for movies? | A query regarding whether the user has set up a particular bin for movies |
| I forgot my bins, need to get a bin list | User sends server binlist request (@binlist) to receive their list of bins |
| Oooo, I'm going to at that !!! | User is going to send content to the At-It server |
| At-ing is a fun way to save thoughts from life | Comment regarding the At-It system |

Fig. 27

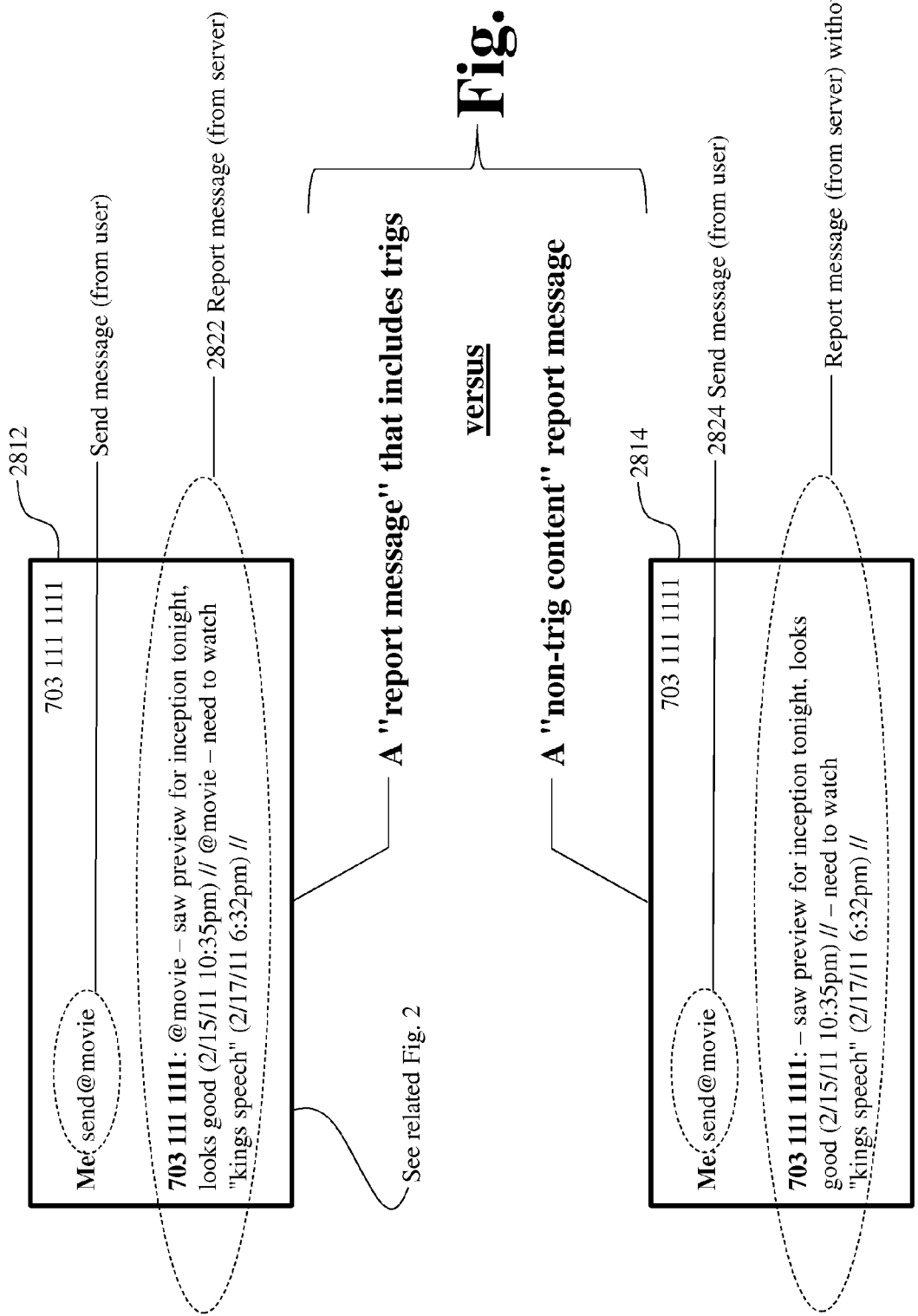

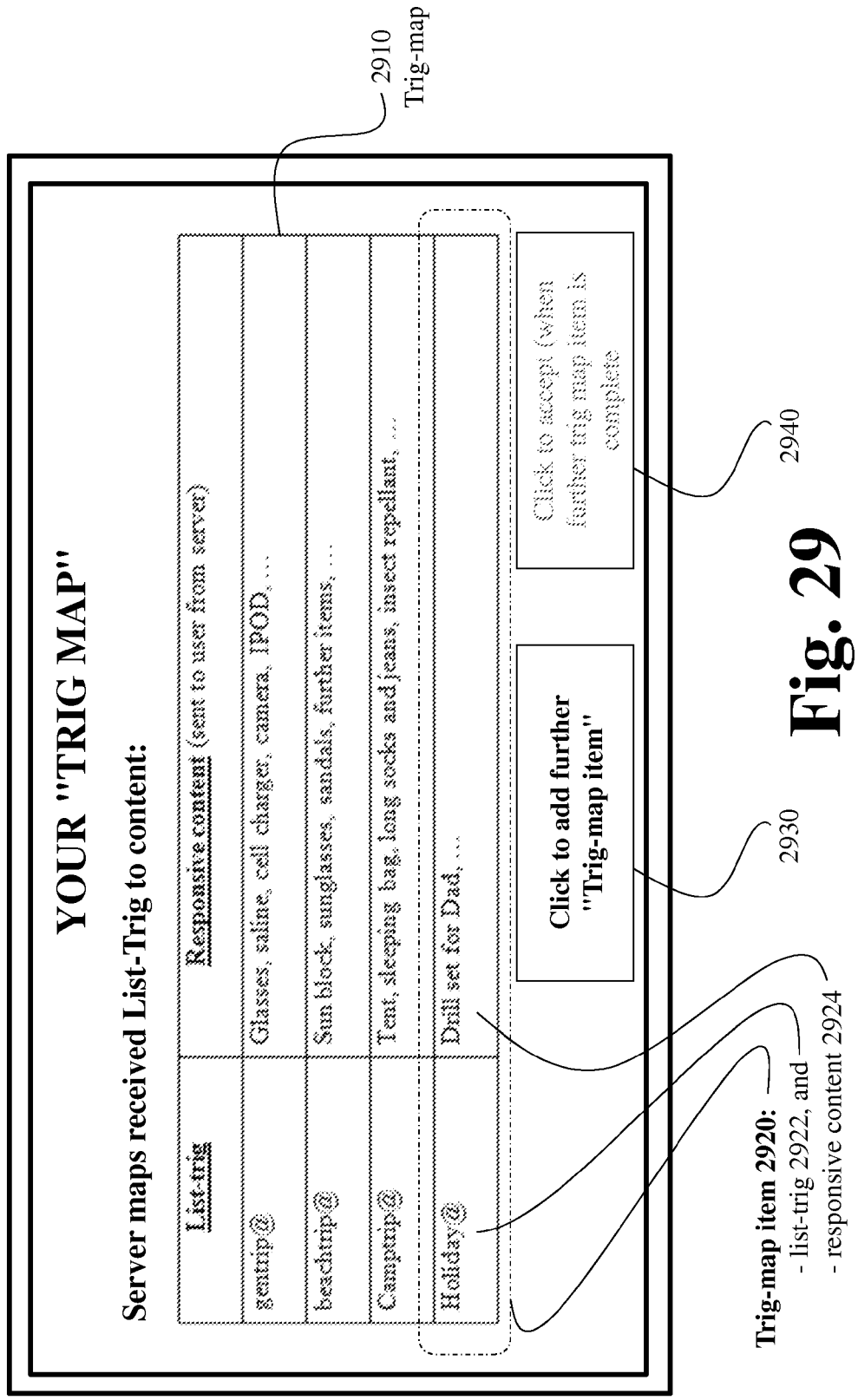

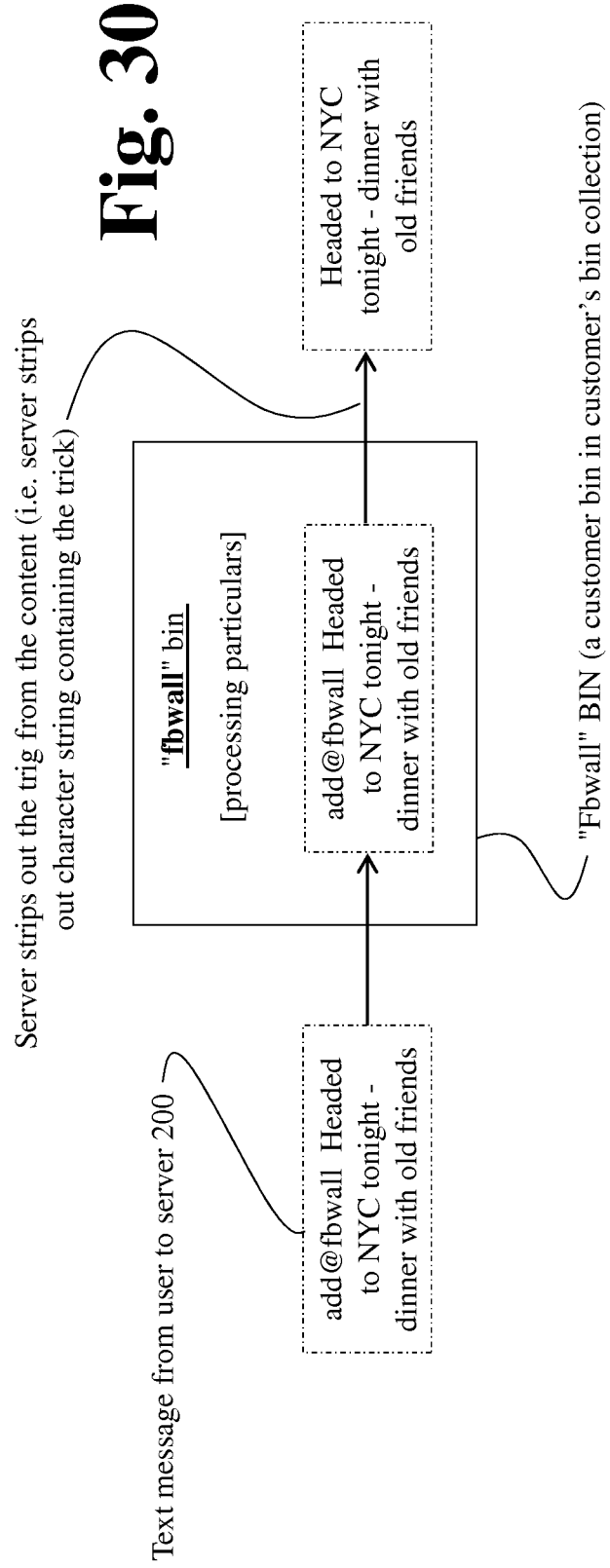

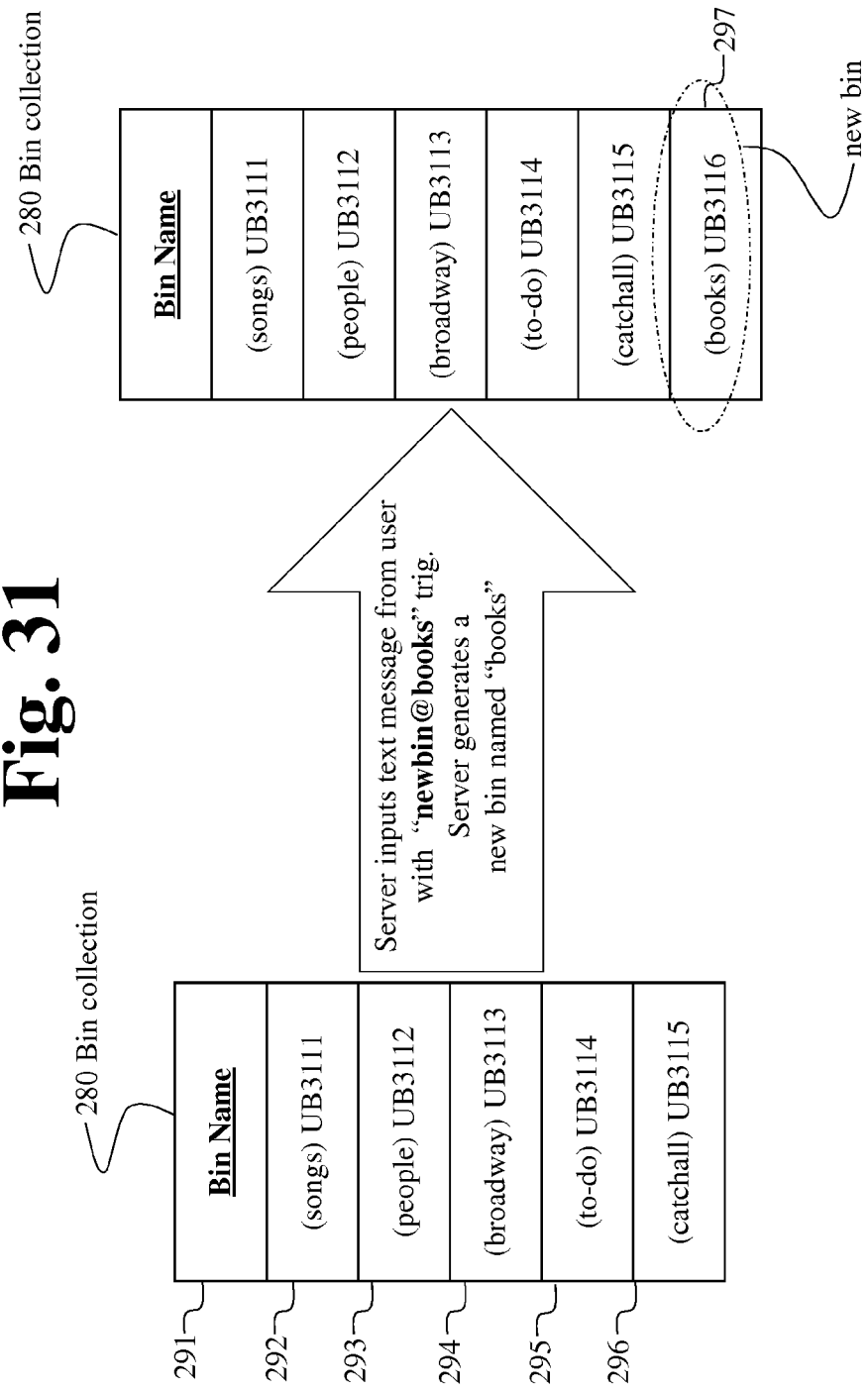

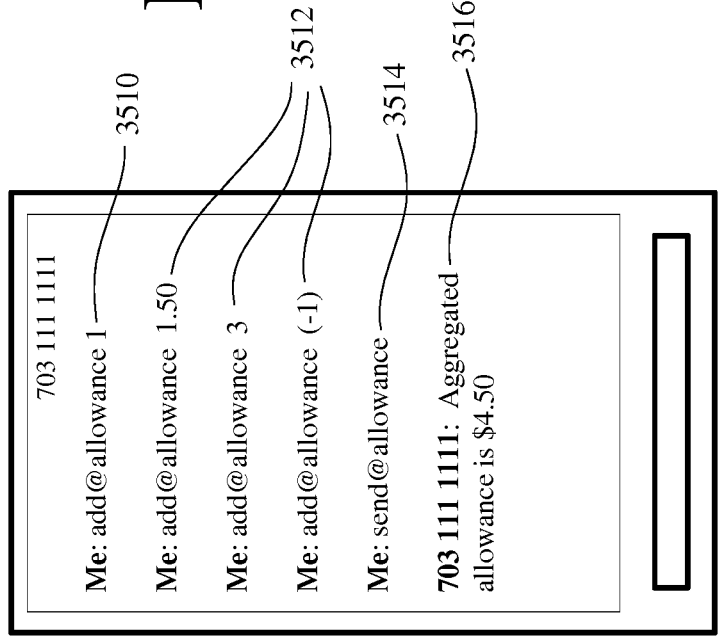

SELECT FEATURES OF AT-IT PROCESSING

1. General processing of text messages including add message, send message, report message, clear bin message, new bin message, and delete bin message
2. Access to bin collection using web page and mobile application
3. Use of secondary trigs
4. Processing of text messages collectively
5. Manipulation of trigs (in report message) by server
6. Multiple users accessing bin collection
7. Trig map functionality
8. Posting to social network
9. Bin collection with sub-bins and grouped bins
10. Manipulation of bins in groups
11. Fuzzy logic related processing
12. Server interfacing with user via telephone call
13. Gaming features
14. Allowance adder
15. Pace at which content is added to bin
16. Ranking complexity of use of At-It system
17. Reminder functionality using text messaging
18. Max content bin
19. Year anniversary
20. Diddate
21. Natural language
22. Rules and alerts
23. Bin modify
24. Percolation processing
25. Customized text map
26. Customized command map
27. Group send
28. Capture assist
29. Control texting
30. Destination processing
31. Differential processing
32. Counting bin
33. Contact-stow
34. Redaction
35. Auto-populate
36. Bin-environment
37. Auto module
38. Metrics module
39. Search module
40. Append processing
41. Bin organization processing

Fig. 36

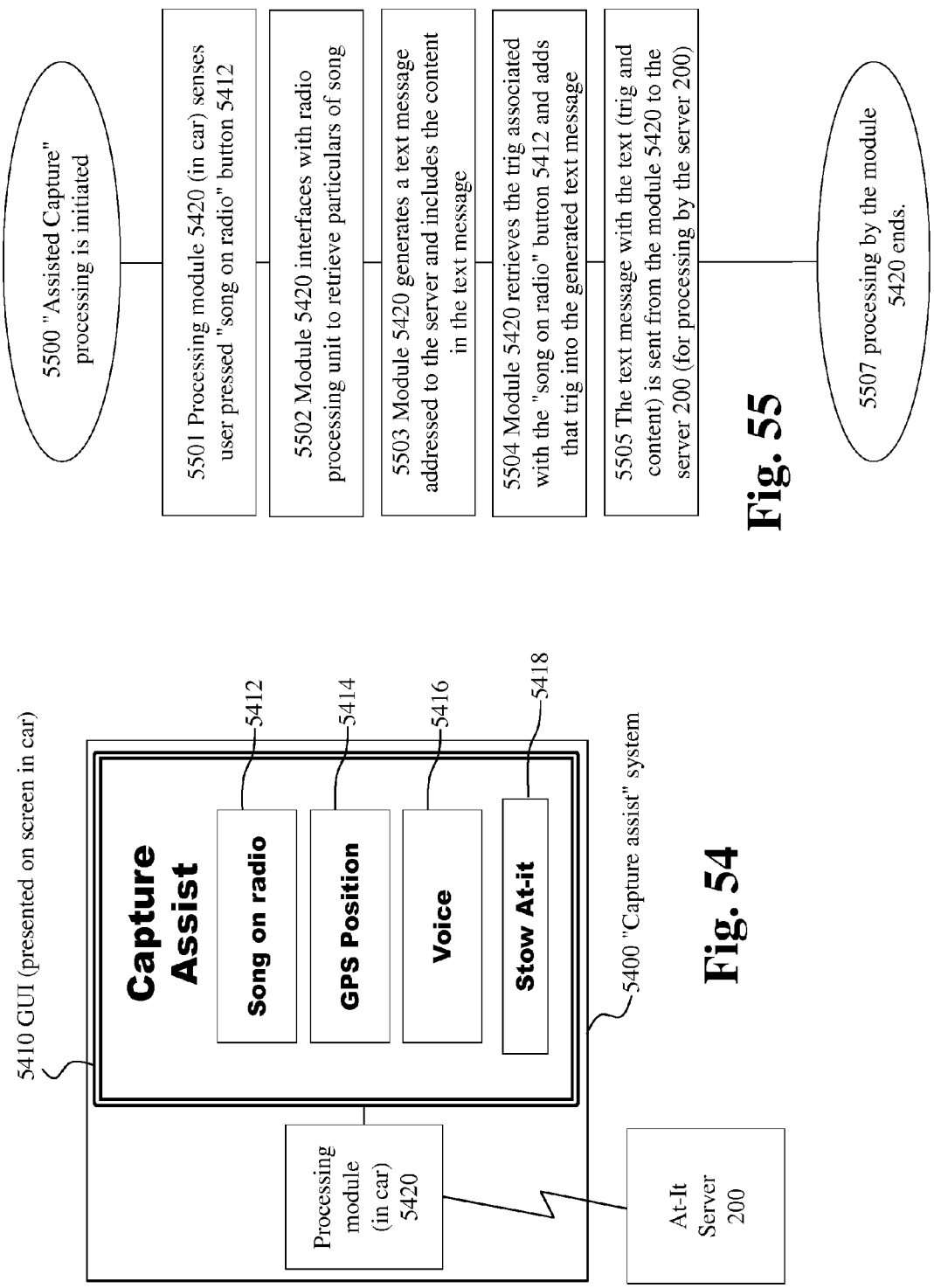

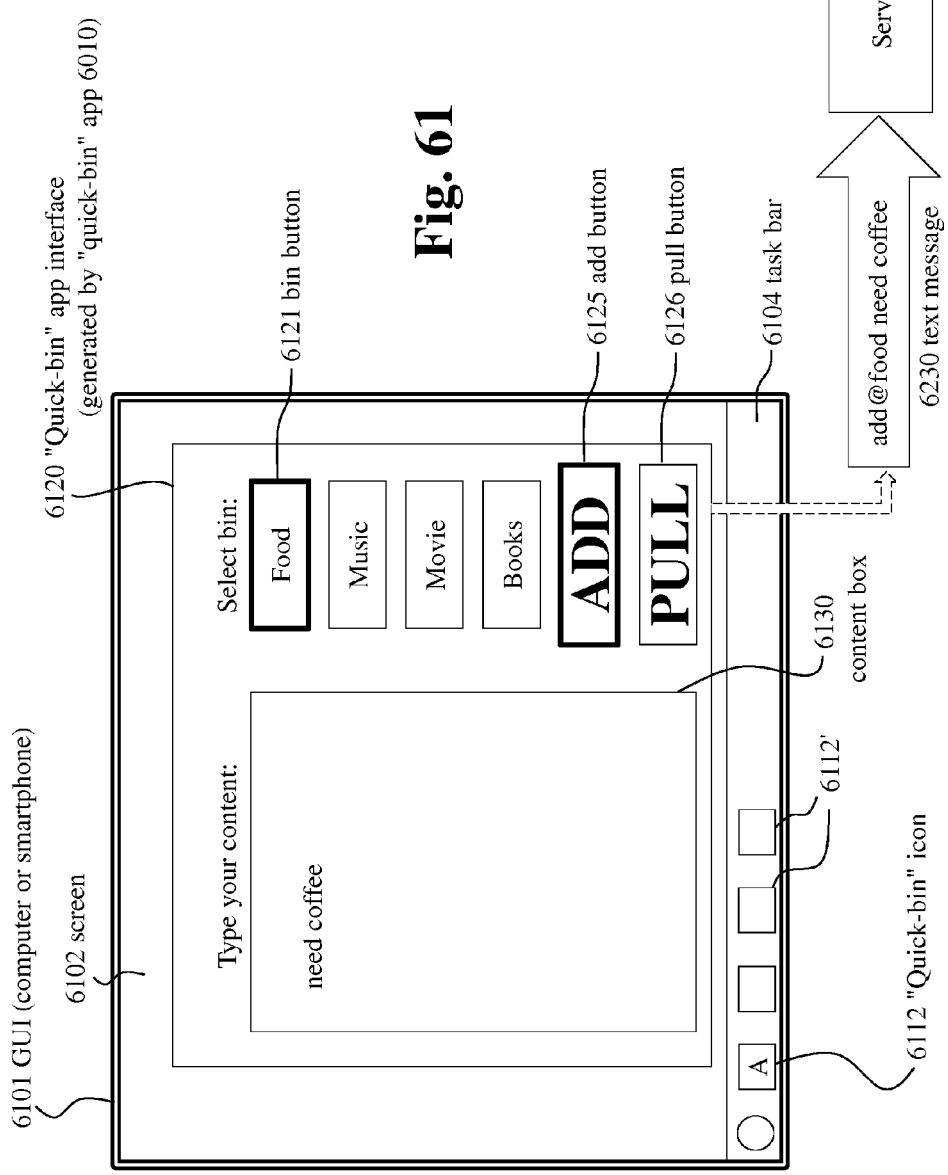

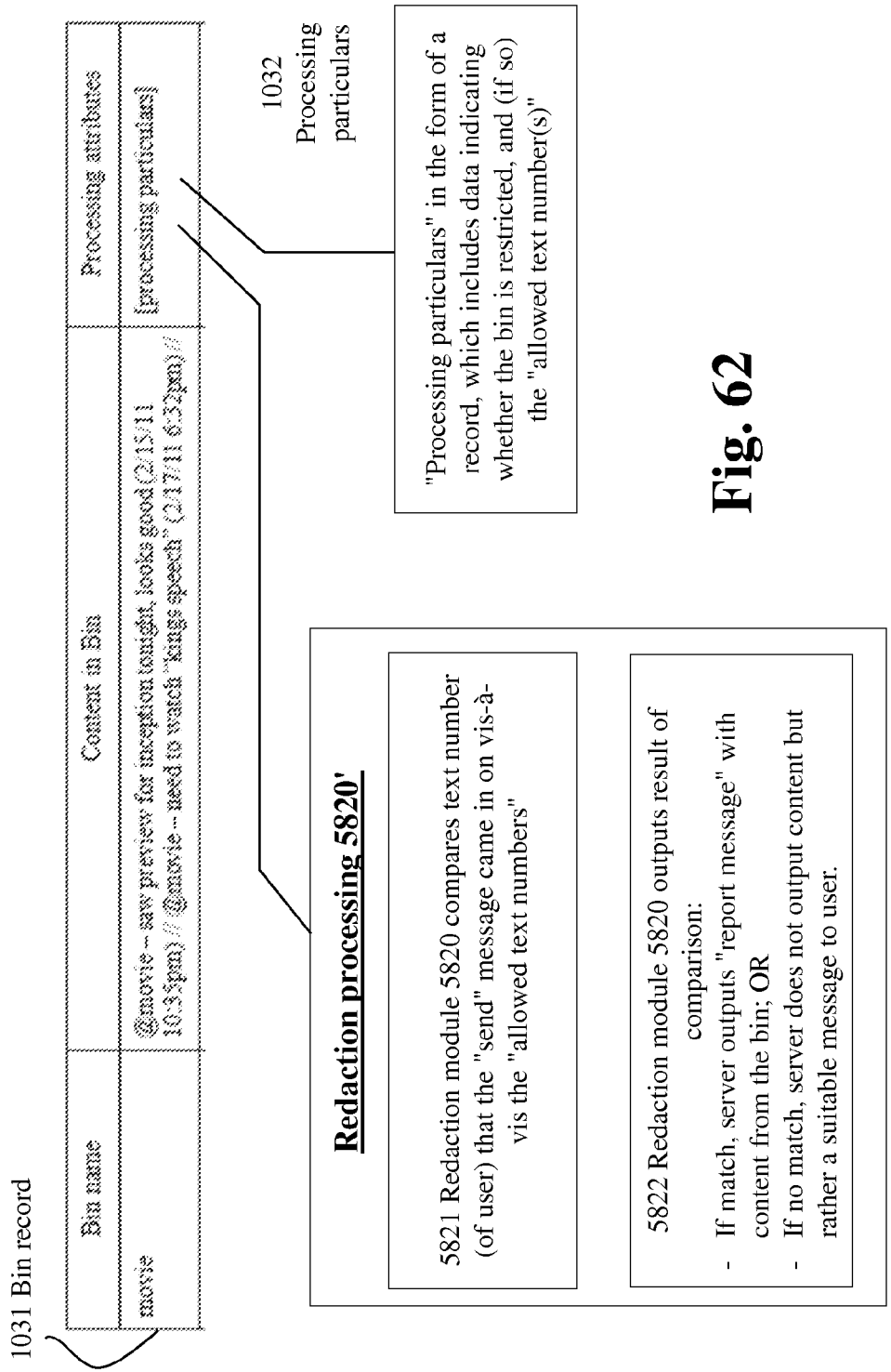

SYSTEMS AND METHODS FOR MESSAGE COLLECTION

RELATED APPLICATIONS

This application is a Continuation-in-Part of U.S. patent application Ser. No. 13/189,476 filed Jul. 22, 2011, the content of which is incorporated herein by reference in its entirety.

This application claims priority to U.S. Provisional Patent Application 61/451,630 filed Mar. 11, 2011, the content of which is incorporated herein by reference in its entirety.

This application claims priority to U.S. Provisional Patent Application 61/558,982 filed Nov. 11, 2011, the content of which is incorporated herein by reference in its entirety.

BACKGROUND OF THE INVENTION

Text messaging is widely used by people to communicate in a quick and effective way. However, text messaging, as well as various other communications provided by current known technology, have shortfalls in the benefits such technology provides to users.

BRIEF SUMMARY OF THE INVENTION

The invention provides systems and methods for processing communication content from a user device. The method performed by a computer and comprising inputting an electronic communication that includes communication content and a routing character string. The communication content constituted by data generated as a result of, and representative of, characters keyed into the user device by the user. Maintaining a bin collection including bins. Performing processing on the communication content including identifying the user and a bin collection of the user based on the routing character string; and processing the communication content including (1) mapping first data to a command; and (2) mapping second data to a bin label. The command dictates particular action to be performed, and the bin label identifies an identified bin upon which to perform the action; and performing the action on the identified bin.

BRIEF DESCRIPTION OF THE DRAWINGS

The present invention can be more fully understood by reading the following detailed description together with the accompanying drawings, in which like reference indicators are used to designate like elements, and in which:

FIG. 3 is a diagram showing a text message with trig and content in accordance with one embodiment of the invention.

FIG. 4 is a table showing various types of messages with respective trigs in accordance with one embodiment of the invention.

FIG. 5 is a table showing various further types of messages in accordance with one embodiment of the invention.

FIG. 8 is a table showing select processing aspects of the At-It system 10 in accordance with one embodiment of the invention.

FIG. 10 is a diagram that shows further details of user accounts and a bin collection in accordance with one embodiment of the invention.

FIG. 11 is a high level flow chart showing further aspects of the At-It processing in accordance with one embodiment of the invention.

FIG. 12 is a flow chart showing the server processes the message with trig (step 500 of FIG. 11) in further detail in accordance with one embodiment of the invention.

FIG. 14 is a flow chart showing the server (the bin processing portion 210) processes "send message" (step 530 of FIG. 12) in accordance with one embodiment of the invention.

FIG. 15 is a flow chart showing the server (the bin processing portion 210) processes "clear bin message" (step 540 of FIG. 12) in accordance with one embodiment of the invention.

FIG. 24 is an illustrative GUI showing functionality related to changing the user's personal information in accordance with one embodiment of the invention.

FIG. 27 is a table setting forth sayings related to the invention in accordance with one embodiment of the invention.

FIG. 28 is a diagram showing the report message of FIG. 2 with trigs vis-à-vis a report message without trigs, in accordance with one embodiment of the invention.

FIG. 29 is a user interface showing aspects of a trig map 2910 in accordance with one embodiment of the invention.

FIG. 30 is a diagram showing the output of content from a user's bin to a social network in accordance with one embodiment of the invention.

FIG. 31 is a diagram showing aspects of creation of a new bin and file structure in accordance with one embodiment of the invention.

FIG. 35 is a GUI illustrating an allowance adder, in accordance with one embodiment of the invention.

FIG. 36 is a table showing select features of the At-It processing as described herein in accordance with one embodiment of the invention.

FIG. 54 is a block diagram showing "capture assist" processing in accordance with one embodiment of the invention FIG. 55 is a flowchart showing GUI related processing in accordance with one embodiment of the invention.

FIG. 61 is a GUI showing aspects of quick-bin app processing, in accordance with one embodiment of the invention.

FIG. 62 is a diagram showing a bin record of the bin collection data structure 1030, in accordance with one embodiment of the invention.

DETAILED DESCRIPTION OF THE INVENTION

Figure 1:
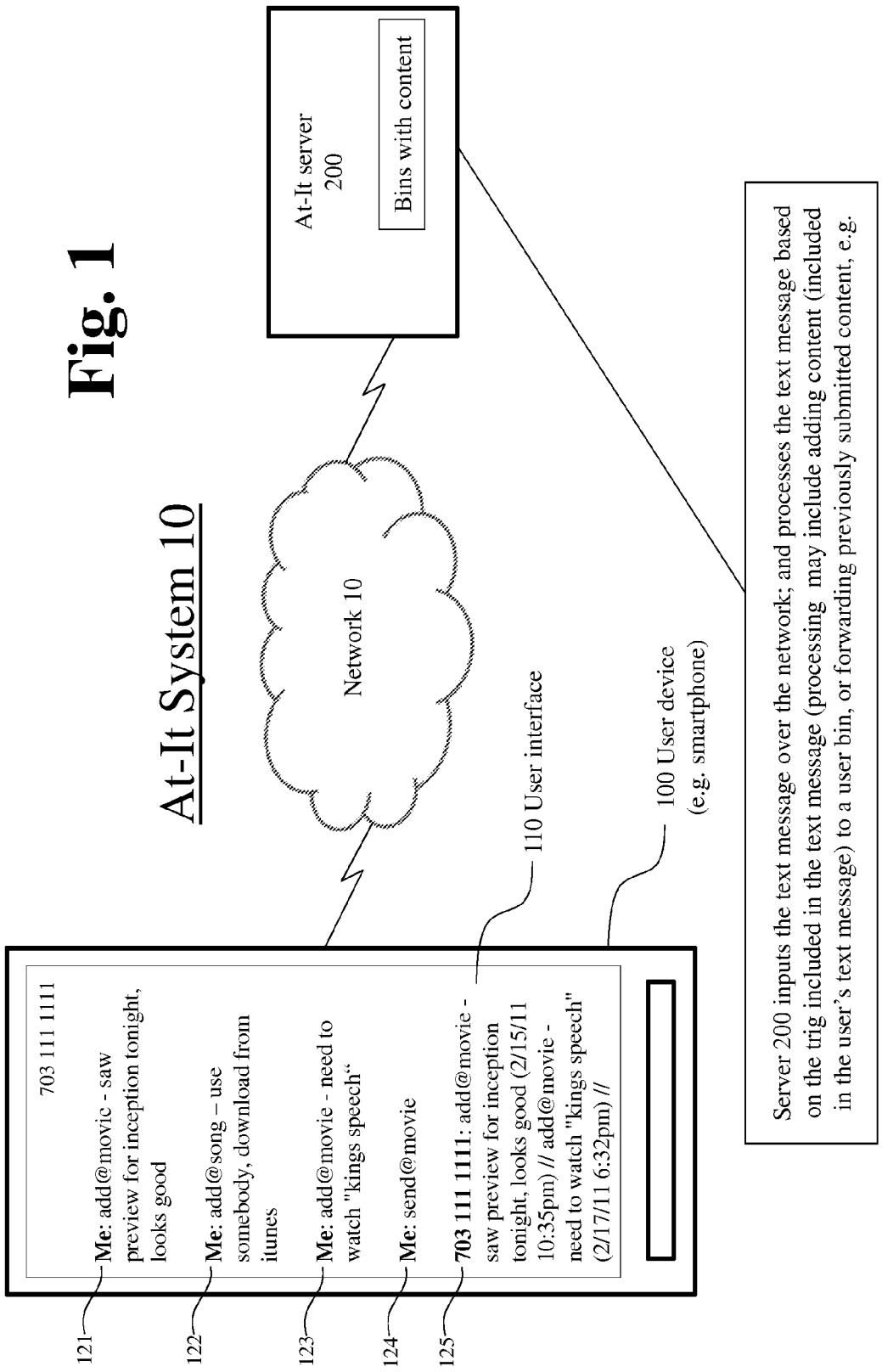
FIG. 1 is a block diagram of an At-It system in accordance with one embodiment of the invention.

Hereinafter, aspects of the "At-It" systems and methods in accordance with various embodiments of the invention will be described.

As used herein, any term in the singular may be interpreted to be in the plural unless otherwise specified, and alternatively, any term in the plural may be interpreted to be in the singular unless otherwise specified.

As set forth herein, the systems and methods of the invention provide what is herein characterized as an "At-It" system. The system might alternatively be characterized as a "Texstow" system—in that the system stows text and performs various other related processing, as described herein.

The At-It system includes, in particular, an At-It server. The At-It server may be in the form of a specialized server, i.e. a tangibly embodied specialized computer processing system. In accordance with one embodiment of the invention, the At-It system maintains a respective bin collection for each user. The bin collection for each user includes a plurality of bins to which the user can add content by sending messages to the At-It server, such as by sending text messages to the At-It server. By using particular strings of characters, i.e. "trigs" as characterized herein, the user controls the placement of content of the sent text message into a particular bin. The user may then retrieve aggregated, i.e. collected, content from a particular bin at a desired time. The user may vary the bins in the bin collection. Other channels of communication, such as phone and e-mail, may also be leveraged by the features of the invention. Various other features are provided. The At-It system might be characterized as a tool to assist the user in documenting and then recalling items of information, in conjunction with performing other processing.

The invention is focused on quick and informal communications—which the user can craft and send in seconds, in order to capture thoughts, before such thoughts slip away and are forgotten.

Accordingly, the invention relates, in particular, to leveraging "text messaging" technology to capture pieces of information in a fun, efficient, rewarding and easy way. The invention allows the aggregation of messages of similar content into a bin created for that type of content. For example, the invention might be used in a situation where a child says a cute phrase that a user wishes to capture (e.g. a five-year old saying "why is everything so blue"); the name of a song that the user wants to remember (to search and download from ITUNES at a later and more convenient time); or a title from a movie preview that looks good (and the user wants to order via NETFLIX or PAY PER VIEW when the user gets a chance on the weekend). In each situation, the user would add content to a particular bin, so as to remember the information at some later time. A clever saying of a five year old, at a busy child's birthday party, may well be forgotten in minutes, unless somehow captured. The invention addresses such situation, and many others.

Illustratively, another situation might be that a user has rented the movie IRON MAN 2 and one of the previews on the DVD is for the movie "INCEPTION." Thinking INCEPTION looks like a good movie to see, the user pulls out her smartphone, and keys in the text "add@movie—saw preview for inception tonight, looks good" in a text message. The user addresses the text message to the text number for the "At-It server". That is, the At-It server has a unique number, or other sequence of characters, to which text messages may be sent.

The At-It server maintains an "At-It account" for the particular user, as well as for other users. The At-It account of the user includes the user's phone number, i.e. the user's text number" and a bin collection of the user. The user's account also includes various other particulars of the user needed to perform At-It related processing.

At some later time, e.g. on movie night a couple weeks later, the user wants the At-It system to remind her of all the movies she has "At-ed" (pronounced "ated"). The user sends a predetermined text message to the At-It server—such as "send@movie". The At-It server (in response) aggregates all the add@movie text messages (that the server has previously received from the user and put into the "movie bin"), and "sends" the aggregated text messages back to the user as a text message. The user is thus provided aggregated content that the user can utilize in a beneficial manner. In this example, the user can use the aggregated content, accumulated over time, to remember movies of interest to her.

The character strings "add@movie" and "send@movie" are herein referred to as "trigs". The composition of a trig depends on the particular command, as well as the particular bin the command acts upon. As noted above, an "add" message for the user's movie bin might be in the form of "add@movie"—for movies to remember. Other "add" messages might include "add@cute" for a bin for cute sayings of kids; "add@songs" for a bin for songs; and so forth. Each "add message" (sent from the user to the At-It server) includes the trig as well as the desired content the user wants to remember. Other types of text messages to the At-It server may only include a trig. For example a "send message" from the user to the server only includes a trig.

Based on the content of a trig in each "add" message, the At-It server adds the content in the text message to a particular bin in the user's bin collection. In accordance with one embodiment of the invention, the particular placement of the trig (by the user) in an add message does not matter. Thus, regardless of whether the user puts the trig, before the content, after the content, or in the middle, the server will still identify the trig based on the @ in the trig. The bins may be logically named to reflect the content intended for each bin. The user may be provided the ability to rename bins (or add bins)—to make the bin names more logical for them, and easier to remember. The At-It server thus aggregates, over time, all the text messages that the user has designated to a particular bin. The user may then retrieve that aggregated content by sending a "send message" to the At-It server. As noted above, "send@movie" is an example of a send message.

Accordingly, the trigs are of a predetermined format. The predetermined format allows the user to craft a text message with trig so as to generate the desired processing. The predetermined format allows the At-It system to be programmed to perform the desired processing in response to receiving a particular text message with trig from the user. As noted above, the particular content of a trig will vary based on the command desired by the user and the particular bin that the command is to be applied to, i.e. in performing the desired processing.

In more specific explanation, a trig of the invention includes a command, a trick, and a bin label. The invention, as characterized herein, utilizes the "@" key for the "trick". The "@" key is a primary key on some smartphones, and thus easily accessible by the user. Based thereon, some of the terminology set forth herein evolved. However, it is appreciated that another character on a phone (or other user device) might be used equally as well for the trick, and other corresponding terminology similarly coined. The invention may include various other related features. For example, suitable character strings, i.e. other trigs, may be sent to the At-It server to delete "ated" items or create new bins, for example. The invention is particularly focused at text messages. However, the processing concepts discussed herein might well be addressed to other communications, such as phone and e-mail messaging communications. For example, the user may send a text (with trig) to the At-It server telling the At-It server to send content from a particular bin to the user via text message, e-mail, on-line document and/or phone, for example. In addition, or alternatively, the text message with trig might tell the At-It system to send particular content from a bin to a third person (such as a friend of the user). The user and third persons may be sent the content via different or the same communication channels, based on user preference. Processing might include converting content in the bin, i.e. the data stored in the bin, to a text message, e-mail, and/or audio, such as a WAV (Waveform Audio File Format) file. Communications may be exchanged between the At-It server and the user regarding the status of the user's at-its, e.g. how many at-its have been collected, as well as other parameters or metrics of the processing. As described below, content may be added to bins via communication channels other than text message, such as telephone call and e-mail, for example. Various further aspects of the At-It invention are described below.

FIG. 1 is a block diagram of an At-It system 10 in accordance with one embodiment of the invention. The At-It system 10 includes an At-It server 200 in the form of a tangibly embodied computer processing system. As described herein, the At-It server 200 performs various processing in practice of the invention, and in particular maintains bin collections associated with respective users. Such maintenance of bin collections may include adding content to a specified bin, pulling content from a specified bin, deleting content from a specified bin, adding bins, and deleting bins, for example. Various other features are described herein.

The At-It system 10 also includes various user devices 100. In accordance with one embodiment of the invention, the user device 100 is a smartphone or some other device that is provided with messaging and communication capability, and in particular, text messaging capability. It is appreciated that the number of user devices 100 in the At-It system 10 may reach the thousands or millions. Relatedly, it is appreciated that there may be multiple At-It servers 200 in the At-It system 10. Such plurality of servers might work collectively or independently relative to each other. The At-It server 200 communicates with the various user devices 100 over a suitable network 10. For example, the network 10 may be in the form of the Internet.

In accordance with embodiments described herein, the At-It system 10 is interpreted as including user devices 100. It is appreciated that the At-It system 10 may utilize known user devices, and known network architecture, with novelty of the invention residing in the server 200 and the manner in which the user uses his or her user device. However, in accordance with some embodiments of the invention, the user device itself may be provided with novel features. As used herein, the terms "his" and "hers" has been used interchangeably.

As shown in FIG. 1, the At-It server 200 inputs a text message (received from the user over the network) and processes the text message based on the trig included in the text message. More specifically, the user creates a text message addressed to the at-it server 200, includes the desired trig (with command, trick and bin label), and sends such text message to the At-It server. Responsive processing by the server 200 may include adding content (included in the user's text message) to a bin of the user, (2) forwarding previously submitted content (from a particular bin) to the user, (3) adding a new bin to the user's bin collection, and/or (4) taking other action, for example.

As shown in FIG. 1, the user interface 110 of the user device 100 reflects three add messages (121, 122, 123) sent by the user. Such add messages result in content being added to a bin in the user's bin collection, and specifically, in this example, to the user's movie bin (resulting from text messages 121 and 123) and to the user's song bin (resulting from text message 122). The text message 124 constitutes a send message. In this example, the send message 124 requests the server to send content that is disposed in the user's movie bin. In response, the server 200 sends the user the text message 125. The text message 125 may be characterized as a "report message", and includes the content that was previously sent to the server in the text messages, i.e. the "add" messages, 121 and 123. Further details are described below. The processing as illustrated in FIG. 1 illustratively constitutes what is herein characterized as "standard trig processing" using a "standard trig".

Figure 2:
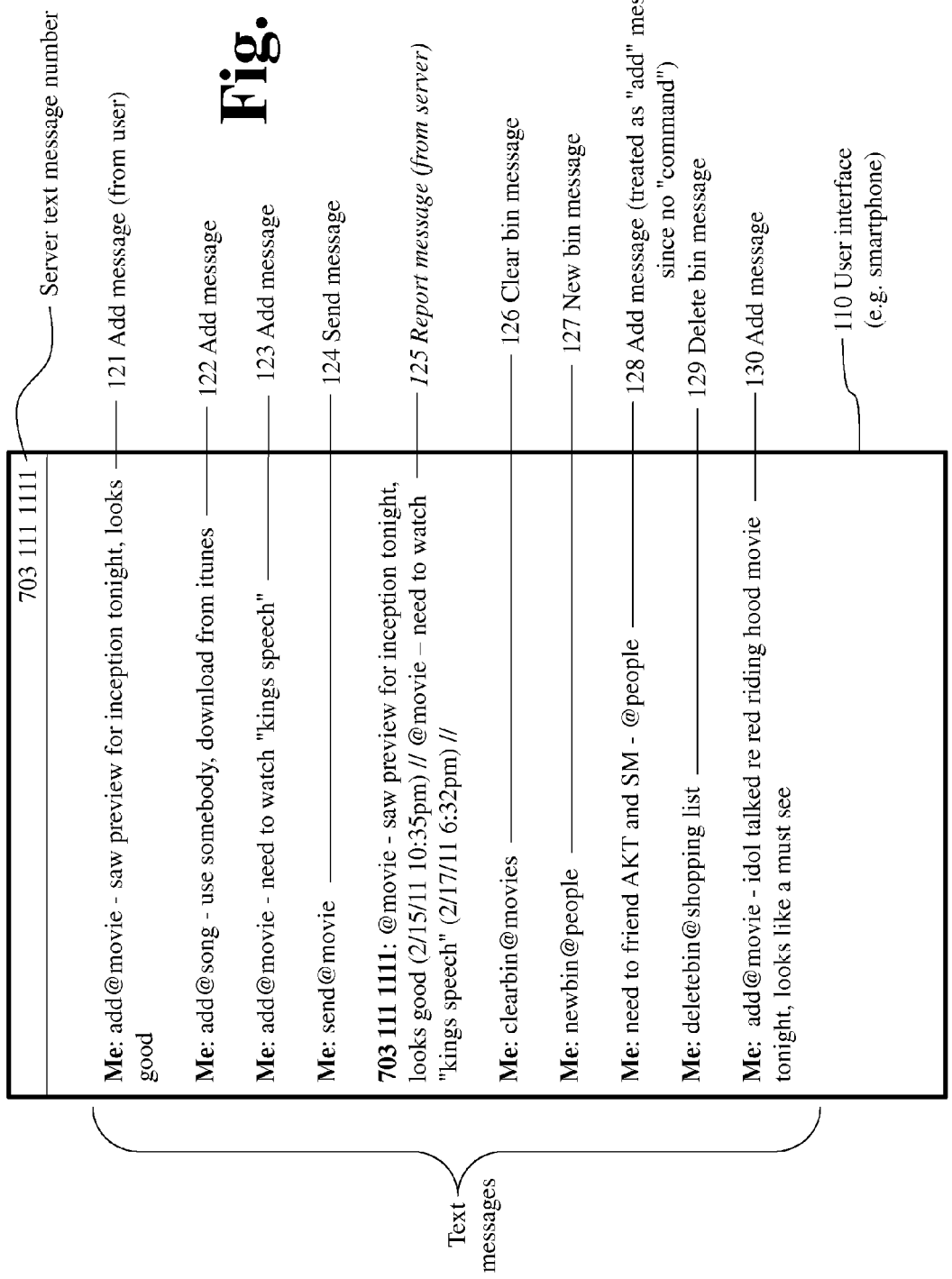
FIG. 2 is an illustrative user interface showing a sequence of text messages, i.e. messages, in accordance with one embodiment of the invention.

FIG. 2 is an illustrative user interface 110 showing a sequence of text messages, i.e. messages, in accordance with one embodiment of the invention. The text messages 121-125 are described above with reference to FIG. 1. In this example, all of the text messages shown in the user interface 110 of FIG. 2 are generated by the user, except for the report message 125. The report message 125 is generated and sent by the server 200, in response to the user's send message 124.

FIG. 2 shows various further messages in addition to those described above with reference to FIG. 1. The clearbin text message 126 instructs the server 200 to clear, i.e. delete the content in the specified bin, in this case the movies bin. The newbin text message 127 instructs the server 200 to create a new bin in the user's bin collection, in this case create a new bin "people". The text message 128 does not include a complete trig. In accordance with one embodiment of the invention, the message 128 may be treated as an add message and placed in a catchall bin. In other embodiments, fuzzy logic may be employed so as to place the message 128 in the user's people bin. Various further details of fuzzy logic are described below.

FIG. 2 also shows the text message 129. The message 129 is a delete bin message. That is, the message 129 does not merely delete the contents of the bin (as does text message 126). Rather, the message 129 deletes the entire bin, such as in the situation where the user no longer needs the bin. Lastly, FIG. 2 shows the add message 130. Various further details of the various types of text message and related processing are described below.

FIG. 3 is a diagram showing a text message in accordance with one embodiment of the invention. The text message of FIG. 3 may be characterized as an "add message". In the message of FIG. 3, the character string "add@movie" is a trig (which is short for trigger string). The trig includes a command (e.g. add) which identifies the particular action to be taken by the At-It server; a trick (the character @) which identifies the character string as a trig; and a bin label (e.g. movie) which identifies what bin the command is applied to. In this example illustrating an "add message," the "bin label" tells the server what bin the content of the text message will be placed. Accordingly, as reflected in this example of FIG. 3, trigs may be associated with other text in the message, i.e. non-trig content as shown in FIG. 3. In particular, an add message will include non-trig content that the user wants to remember. Non-trig content is characterized as any character string in a text message that does not include a trick, i.e. that does not include an @. In the add message of FIG. 3, the content the user wishes to remember is "—saw preview for inception tonight, looks good". As characterized herein, a "bin-content item" means content (in a bin) from a single text message.

As described herein, the particular placement of the trig in an add message does not matter in accordance with some embodiments of the invention. In accordance with other embodiments, certain placement of the trig will trigger certain processing. In accordance with some embodiments of the invention, the trig should be separated from the non-trig content by spaces.

In more complex uses, the text message sent from the user to the At-It server may also include a secondary trig. A secondary trig might be characterized as modifying the main trig. For example, a secondary trig might tell the At-It server to only pull content (in the bin) from a particular time window, such as between July 1 and July 11. Indeed, any number of trigs might be utilized so as to command the server to perform desired processing, assuming the server is programmed to act on such commands.

In practice of the invention, the user knows the commands that are available, as well as knows the bins in the user's bin collection. Accordingly, in a text message from the user to the At-It server, the user recalls (from memory and/or with reference to notes or other materials) the desired command and the desired bin, and crafts a trig to include such (e.g. add@movie). If a trig received from a user fails to conform to a recognized character string, the server may place the content into a catchall bin, i.e. a default bin. Alternatively, as described herein, the At-It server may apply fuzzy logic to ascertain which bin was intended by the user and/or the command the user intended. In response to a suitable request by the user, the server 200 may be provided to generate and output relevant information to the user, such as a listing of bins, listing of commands, metrics relating to bin content, date information, or other information. For example, the user may have forgotten his bins, and may send the server 200 a request for the server to send him a listing of all bins in his bin collection.

Bins may be created by the user, or the user may simply rely on a default bin collection that is provided by the server 200. That is, when the user first signs on to the At-It service as described herein, the At-It server 200 may provide a very basic bin collection and list of commands, i.e. for the user to get familiar with the system. The user may then start to modify the bin collection as he or she desire. Indeed, a bin collection may have a large number of bins depending on the user's needs, desire to remember and/or desire to keep track of information. In accordance with one embodiment of the invention, more advanced processing of the invention may indeed involve sub-bins, and corresponding associated commands, or other groupings of bins. In accordance with embodiments of the invention, a particular trig in a text message may result in action vis-à-vis multiple bins. For example, in a more complex use, the add message "send@movie, people" may result in the server sending content (to the user) from both the movie bin and the people bin. Such content may be sent in some predetermined manner as desired.

With further reference to the use of fuzzy logic, it is appreciated that various default processing may be used by the At-It server 200. Indeed, the user might come to rely on such default processing (as described herein) as such may increase the efficiency he or she can work at. Accordingly, one type of default processing is the fuzzy logic processing noted above. Further aspects of "fuzzy logic" type processing are described below with reference to FIG. 25 and FIG. 32. For example, the At-It server 200 may be provided to know (and the user may or may not know) that a trig in a text message to the server "ad@m see social network" will be interpreted as "add@movie see social network" by the At-It server 200. Accordingly, such text constitutes a quick way for the user to place content into her or his movie bin, without having to type out the full bin name, for example. Based on fuzzy logic processing, the server 200 maps the "ad" in the user's trig to the command "add". Based on fuzzy logic processing, the server also maps the bin label "m" to the bin "movie". Accordingly, in this example, fuzzy logic is used for both the command and the bin label.

Also, by providing users with the capability to create his or her own bins, he or she can evolve a bin collection that is very intuitive to them, and highly conducive to the use of fuzzy logic, for the particular user. For example, by design of the user, all of the user's bins might have different first letters in the name—such that the user would never have to type/text the full name. Rather, the user would rely on fuzzy logic of the At-It server 200 and only type (in a trig) the first letter of a bin name.

Accordingly, the invention highly leverages existing text messaging (and other communication technologies) in conjunction with the user's adeptness and memory, which might be assisted by reference materials, i.e. a cheat sheet of sorts to remind the user of bins and trigs, for example. The invention provides a highly useful, efficient, and fun way to retain information from everyday life, for example.

As described further below, the user may modify her or his bin collections and the names of her or his bins. In particular, as described below with reference to FIG. 31 in accordance with one embodiment of the invention, the server may retain an identity of a bin that is static. That static identity may be mapped to a corresponding bin name, which is presented to the user (and by which the user knows the bin). Further details are described below.

FIG. 4 is a table showing various types of messages with respective trigs in accordance with one embodiment of the invention. The trigs in the messages of FIG. 4 might be characterized as "primary trigs" in that no other trig is needed (in the particular text message) for the server to process the text message.

FIG. 4 shows an "add message" (from user): add@movie—saw preview for inception tonight, looks good.

Such message may be in the form of a text message (i.e. message) sent from the user to the server that contains a trig (see FIG. 3), as well as content. An add message is identified by the command "add" in the trig. The trig identifies the particular content bin (i.e. bin) in which the content is to be placed by the server. If no command is in the message, then by default, the message may be handled as an add message. Also, any message sent to server without a trick (or in some manner out of protocol) may be handled as an add message, i.e. content message, in one embodiment, and may be placed in a catchall message bin.

FIG. 4 shows a send message (from user): send@movie. Such message may be in the form of a message sent from the user to the server that tells the server to pull content from a particular bin. A send message is identified by the command "send" in the trig. The server responds to a request message with a report message.

FIG. 4 shows a report message (from server): Report of @movie: saw preview for inception, looks good//@movie—need to watch "kings speech". Such message may be in the form of a text message (in response to a send message) sent from the server to the user that contains content from a particular bin. The report message might alternatively be in the form of an e-mail, phone call, or upload to on-line document such as a GOOGLE DOC document, for example.

FIG. 4 shows a clear bin message: clearbin@movie. Such message may be in the form of a message sent from the user to the server that tells the server to delete (i.e. clear out) all content in the particular bin in the user's bin collection. A clear message is identified by the command "clear" in the trig. In one embodiment, a send message received from the user will automatically result in clearing the particular bin.

FIG. 4 shows a new bin message (from the user): newbin@people. Such message may be in the form of a message sent from the user to the server that tells the server to set up a new bin in the user's bin collection. A "new bin message" is identified by the command "set" in the trig.

FIG. 4 shows a delete bin message (from user): deletebin@shoppinglist. Such message may be in the form of a message sent from the user to the server that tells the server to delete a particular bin currently in the user's bin collection. A delete bin message is identified by the command "deletebin" in the trig.

FIG. 5 is a table showing various further types of messages in accordance with one embodiment of the invention.

FIG. 5 shows a bin list request (from user): @binlist. A user may send this message to the server 200 if the user wants a list of all her bins in her bin collection. That is, a "bin list request" message from the user to the server will result in a text message back from the At-It server 200 with a list of the user's bins. Thus, if the user forgot her bins, she could send the server a bin list request, such that the server would then send back a list of the user's bins, to remind her.

FIG. 5 shows a server control message (from server). Further details are described below with reference to FIG. 19. This type message is sent from the server to the user for a particular purpose. Such a message may or may not contain a trig FIG. 5 shows a user control message (from user). This type message is sent from the user to the server in response to a server control message, in accordance with one embodiment of the invention.

FIG. 5 shows a secondary trig (included in message from user, along with FIG. 4 trig): window@2/1/11to2/15/11. A secondary trig may be included with one of the trigs shown in FIG. 4. For example, a secondary trig of "window@2/1/11to2/15/11" along with the trig "send@movie" tells the server that it should send all messages (e.g. texts) that are in the movie bin from the particular time period. This may be helpful in the situation where the user remembers, for example, that early last month she "ated" a movie that she wanted to see, but can't remember the movie or when she sent the text to the At-It server.

Figure 6:
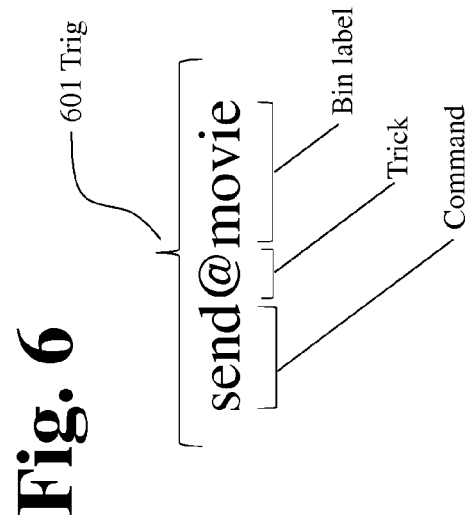
FIG. 6 is a diagram parsing out a send message (with send trig) in accordance with one embodiment of the invention.

FIG. 6 is a diagram parsing out a send message (with send trig) in accordance with one embodiment of the invention. The message of FIG. 6 tells the At-It server 200 to send all content that is currently in the user's "movie" bin. The trig 601 of FIG. 6 includes a command, a trick, and a bin label as shown. The trig 601 constitutes the entirety of the text message sent from the user, i.e. the user device, to the server 200—to request the server to send the requested content to the user.

Figure 7:
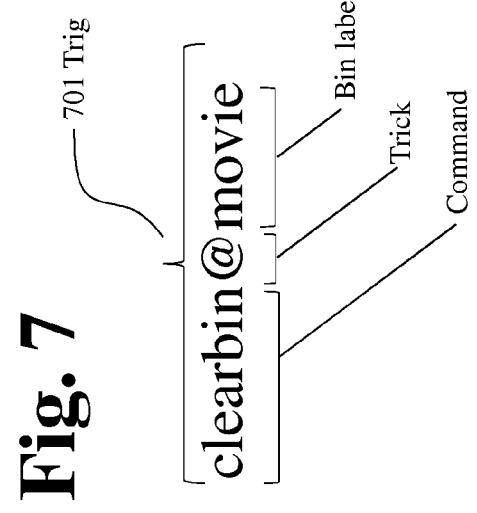
FIG. 7 is a diagram parsing out a clearbin message (with clearbin trig) in accordance with one embodiment of the invention.

FIG. 7 is a diagram parsing out a clearbin message (with clearbin trig) in accordance with one embodiment of the invention. The message of FIG. 6 tells the At-It server 200 to clear out, i.e. delete, all content that is currently in the user's movie bin. The trig 701 of FIG. 7 includes a command, a trick, and a bin label as shown. The trig 701 constitutes the entirety of the text message sent from the user, i.e. the user device, to the server 200- to request the server to delete the content from the specified bin, i.e. from the "movie" bin.

FIG. 8 is a table showing select processing aspects of the At-It system 10 in accordance with embodiments of the invention.

A user device 100 as described herein may be in the form of a smartphone, computer, personal digital assistant (PDA), APPLE iPOD TOUCH or any other device that provides functionality to process messages and perform processing of the invention.

An At-it server 200 as described herein may be in the form of a processing system (, i.e. a computer system) that performs At-It processing as described herein.

A "trig" (trigger string) as described herein may be in the form of a sequence of characters in a message created by the user. Each trig tells the server action to take in response to the message.

A trig may be in the form of an add (content) string, send (request) string, clear bin string, new bin string or a delete bin string, for example.

A "user account" as described herein may be in the form of an account designated to a particular user that contains, in particular, attributes of the user, trigger strings (trigs) that are used by the user to manipulate content, and a bin collection (i.e. a bin set) with bins. Alternatively, trigs may be kept (at least in part) in a separate database, for use in conjunction with one or more a user's particular bin collection. Further aspects of embodiments are described below with reference to FIG. 10. As otherwise described herein, many trigs may be universal, i.e. used by all users. On the other hand, other trigs may be unique to particular users. Various aspects of trig manipulation are described below.

A "bin collection" as described herein may be constituted by a collection of bins associated with the user account.

A "bin" as described herein may be constituted by a "bin label" and content (data collected from the user that is associated with that bin label). A bin may be constituted by other attributes and in particular processing attributes. A bin is maintained on a computer readable medium and may be in the form of a record, a folder, a file, tag arrangement, relational database, or some other methodology to associate content with the bin label, and with the user account, and provide the processing as described herein. Accordingly, the bin collection (bins) of a particular user might be considered part of the account of the user or might be considered associated with the account of the user. For example, the bin collection of a user, including the bins disposed in the bin collection, might be mapped to the user account in some suitable manner.

Figure 9:
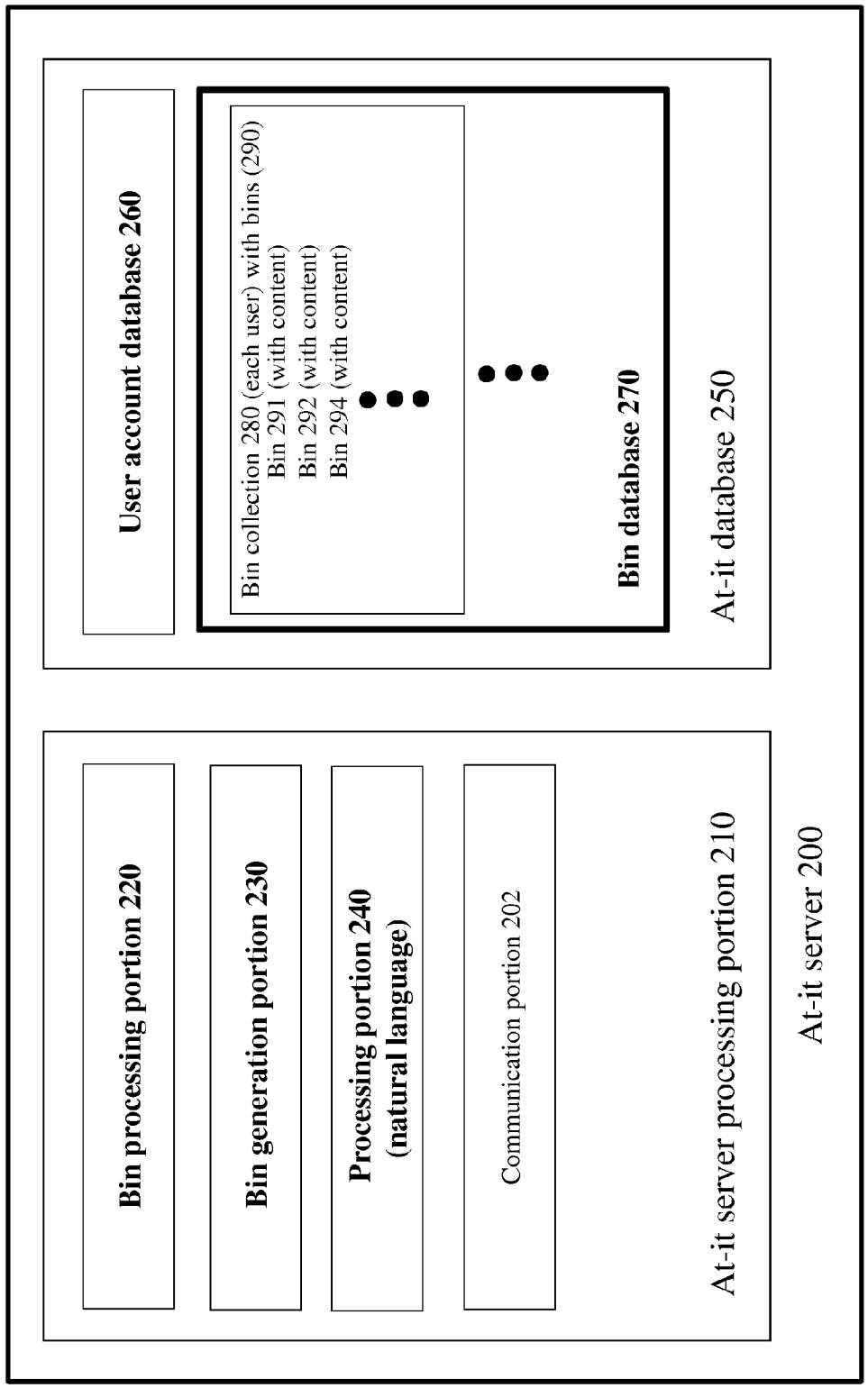
FIG. 9 is a block diagram showing in further detail the At-It server 200 in accordance with one embodiment of the invention.

FIG. 9 is a block diagram showing in further detail the At-It server 200 in accordance with one embodiment of the invention. As shown, the At-It server 200 includes an At-It server processing portion 210 and an At-It database 250. The At-It server processing portion 210, a processor, performs various processing as described herein. The At-It database 250 contains the various data used by, input by, and generated by, for example, the At-It server 200.

The At-It server processing portion 210 contains specialized processing portions that perform particular types of processing. The specialized processing portions include the communication portion 202, the bin processing portion 220 and the bin generation portion 230.

The communication portion 202 performs the input and output of text message, e-mail, and phone, upload to third party database, and other communications, for example. The communication portion 202 may also handle converting data as needed. For example, in accordance with one embodiment of the invention, data from an input text message may be converted to another format for storage in the bin collection of the user, i.e. for storage in the bin database 270. The communication portion 202 may also handle converting data in the bin database 270 to a particular format for output of data via a particular communication channel. Accordingly, the communication portion 202 may handle the needed conversion of data to effect the various processing as described herein, involving various communication channels.

The bin processing portion 220 performs various processing associated with maintenance and other operations of the bins in a bin collection of a user, for example, in accordance with one embodiment of the invention. The bin generation portion 230 performs processing associated with generation of a bin, i.e. at the request of a user. In accordance with one embodiment of the invention, the bin generation portion 230 may include template bin collections that a user may choose from. Thus, a template bin collection for a college student might include different bins vis-à-vis a template bin collection for a high school student. The user might choose the preferred template bin collection and then modify her bin collection to her liking The At-It database 250 includes a user account database 260 and a bin database 270. In accordance with this embodiment of the invention, the user account database 260 contains various details of a user's account. Each user account is mapped, or otherwise associated, with a bin collection 280 (or bin collections) in the At-It database 250, as described herein.

FIG. 10 is a diagram that shows further details of user accounts and a bin collection in accordance with one embodiment of the invention.

FIG. 10 shows a portion of an account list 1010 showing accounts of a plurality of users. The vertical series of dots as shown in FIG. 10, and used elsewhere herein, reflect that only a portion of the particular item is shown.

The account list 1010 includes a user record for each respective user. Illustratively, FIG. 10 shows the user record 1020. The user record 1020 includes an account number, the user's phone number (or other number the user uses for text messaging), personal information (such as address information, other contact information (e.g. e-mail, landline phone numbers)), and a bin collection number. In accordance with this embodiment of the invention, the bin collection number (111-115) maps into a bin collection data structure 1030. Accordingly, the bin collection data structure 1030 is associated with the user record 1020—such that the bin collection data structure 1030 may be retrieved to perform processing of a text message from the user 111-115-005. The user record 1020 and the bin collection data structure 1030, as well as other data structures utilized in the invention, may utilize relational database processing and other known database processing methodologies and techniques.

The bin collection data structure 1030 includes the bin names of the user's bins, as well as content in each respective bin. Further, each bin may be associated with processing particulars 1032, as shown in FIG. 10. The processing particulars 1032 for each bin control various processing attributes of the particular bin including: the destination that the server sends report messages; the channel that report message are sent, the position of trigs in bin-content items in a report message; whether trigs are included in a report message; whether any third persons are sent report messages or other types of messages; how many bin-content items should be retained in a particular bin at one time; whether there is rollover of bin-content item in some time period, i.e. after 3 months a bin-content item is deleted; whether there is any delay in sending a report message; password or other information required to access the bin collection and/or respective bins in the bin collection; any particular manner in which bin-content item should be aggregated; and web page related user preferences, for example. Various other operating parameters may be included in the processing particulars 1032, as needed or desired, to perform the processing as described herein.

It is appreciated that the processing particulars 1032 of different bins in a user's bin collection may be the same or may be different. A user may be provided control over some processing particulars 1032, e.g. in the form of user preference, while other processing particulars 1032 are dictated to the user. The user may be provided the ability to change certain processing particulars 1032 bin by bin, or in some global manner, for example. For example, the user may be provided with the functionality to select a plurality of bins and vary the processing particulars of those selected bins in some collective manner. For example, the user might change the default communication channel that report messages are sent out on, or the communication channel that is used to output bin content of a user to other persons. The output of a user's bin to other users might be effected by the user texting some predetermined trig to the server, for example. Various further details of the processing particulars 1032, in accordance with embodiments of the invention, are described below.

In accordance with one embodiment of the invention, the user may rate bin-content items in some manner, as described further below. For example, the user might send a text message "add@movie1 avatar"—based on which the server would create a BCI with the content "avatar". Such BCI may then be presented first in a report message as opposed to a BCI that was created by the server based on the trig "add@movie3", for example. The rating, in accordance with one embodiment of the invention, dictates particular processing to be performed by the server. For example, a suitable send message might dictate that the server should only pull content possessing higher than a particular rating, and send such in a report message to the user.

It is appreciated that the user's account number may indeed be the same as the user's phone/text number. However, such may not be desirable in that a user might have multiple text numbers associated with the same bin collection or account, or may want to change her number at some point in time.

In accordance with one embodiment of the invention, a bin collection may indeed be associated with multiple user's devices, i.e. such that a husband and wife might populate bins in the same bin collection. The trigs used by both users might be the same or might be different. That is, the At-It server 200 would know which user the text message was coming from (based on the user's phone/text number) and analyze the included trig based on that user's trig list and bin collection, i.e. the server would analyze the commands and bin labels that are associated with that user.

FIG. 11 is a high level flow chart showing further aspects of the At-It processing in accordance with one embodiment of the invention. As shown, the processing of FIG. 11 starts in step 400 and passes to step 410. In step 410, the server 200 receives a text message from a user device having a text message number. For example, the server receives a text message received from a user's smartphone. Then, the process passes to step 420. In step 420, the server compares the user number, that the message was texted in from, with text message numbers in the database of the server 200. The process then passes to step 430.

In step 430, the server determines that there is a match between the user number and a number in the database. That is, based on the user's text message number, the server associates the message from the user with an identified account of the user. In a situation where the server 200 cannot identify the number from which the text message originated, the server may send a communication back to the user. For example, the server may send a communication to such user regarding setting up a new account, i.e. since the user is not currently registered based on the number from which the user texted, and thus the server cannot associate the incoming communication with a bin/bin collection of the user.

After step 430 of FIG. 11, the process passes to step 440. In step 440, the server pulls the identified account for further processing. Then, in step 450, the server analysis the content of the text message to determine if the text message includes a recognizable trig, i.e. a recognizable character string. Then, the process passes to step 460. In step 460, the server determines whether there is a processable trig in the message based on an exact match.

More specifically, in step 460, the server compares the trig received in the text message vis-à-vis commands and bin labels that are associated with such user (as stored in the At-It database 250). More specially, the server parses out the command (in the text message received from the user) and determines whether such command matches a command stored in the database, and which is associated with the particular user. In parallel, the server parses out the bin label from the text message and determines if such bin label matches a bin stored in the database, and which is associated with the particular user. Relatedly, different users may commonly possess different bins and may possess different commands. In accordance with one embodiment of the invention, it is likely that difference in bins will be more substantial than difference in commands. In particular, commands may be substantially more standardized within the At-It system, than bin names i.e., more standardized amongst all users.

In step 460, the server determines if there is an exact match for both the command, in the trig, as well as the bin label in the trig. If yes in step 460, then the process passes to step 500. In step 500, the server processes the message with trig. Further details of the processing of step 500 are shown in FIG. 12 and described below.

On the other hand, if no in step 460, i.e., there is not a processable trig in the message based on an exact match, then the processing passes to step 470. In step 470, the server deems that the text message includes no processable trig based on an exact match. As a result, fuzzy logic processing is performed to determine if a processable trig may be ascertained. Alternatively, the content of the text message is simply added to the catchall bin in the user's bin collection. In conjunction with such addition to the user's catchall bin, the server may communicate such disposition to the user device. Alternatively, the server may communicate with the user device to secure a processable trig. Further details regarding such further communications are described with reference to FIG. 19 below.

After step 470 of FIG. 11, the process passes to step 500. As noted above, in step 500, the server processes the message with trig. Further details of the processing of step 500 are described below with reference to FIG. 12. After step 500 of FIG. 11, the process passes to step 596. In step 596, the server waits for a further text message. Then, as reflected in step 598, at some point in time, the server receives a further text message and processing returns to step 410. Thereafter, processing is performed as described above.

FIG. 12 is a flow chart showing the server processes the message with trig (step 500 of FIG. 11) in further detail in accordance with one embodiment of the invention. As shown, the processing of FIG. 12 starts in step 500 and passes to step 510. In step 510, the server parses the "command" from the trig to determine the type of message. In other words, the server compares the text in front of the @ (in the trig) to known commands the server associates with the user in the database 270. Fuzzy logic may be utilized to determine the command. If no command is identifiable, content of the message may simply be sent to the "catchall" bin in the user's bin collection. It is appreciated that multiple parsing of the user's text message, as described in step 510 of FIG. 12 and step 460 of FIG. 11 for example, may be combined in some manner as desired, so as to perform more efficient processing.

The processing of the server after step 510 of FIG. 12 depends on the particular "command" identified from the trig. That is, steps 520, 530, 540, 550, 560, and 570 are performed in the alternative, depending on the particular command identified in the trig from the user device.

As reflected in step 520, based upon the command in the trig, the server 200 determines that the message is an "add" message. Accordingly processing passes to FIG. 13 as described below. As reflected in step 530, based upon the command in the trig, the server 200 determines that the message is a "send" message. Accordingly processing passes to FIG. 14 as described below. As reflected in step 540, based upon the command in the trig, the server 200 determines that the message is a "clear bin" message. Accordingly processing passes to FIG. 15 as described below. As reflected in step 550, based upon the command in the trig, the server 200 determines that the message is a "new bin" message. Accordingly processing passes to FIG. 16 as described below. As reflected in step 560, based upon the command in the trig, the server 200 determines that the message is a "delete bin" message. Accordingly processing passes to FIG. 17 as described below. As reflected in step 570, based upon the command in the trig, the server 200 determines that the message is a "bin list" message. Accordingly processing passes to FIG. 18 as described below.

As shown in FIG. 12, after any of steps 520, 530, 540, 550, 560, or 570, the processing passes to step 590. In step 590, processing of the message from the user is complete. As a result, processing returns to step 596 of FIG. 11.

Figure 13:
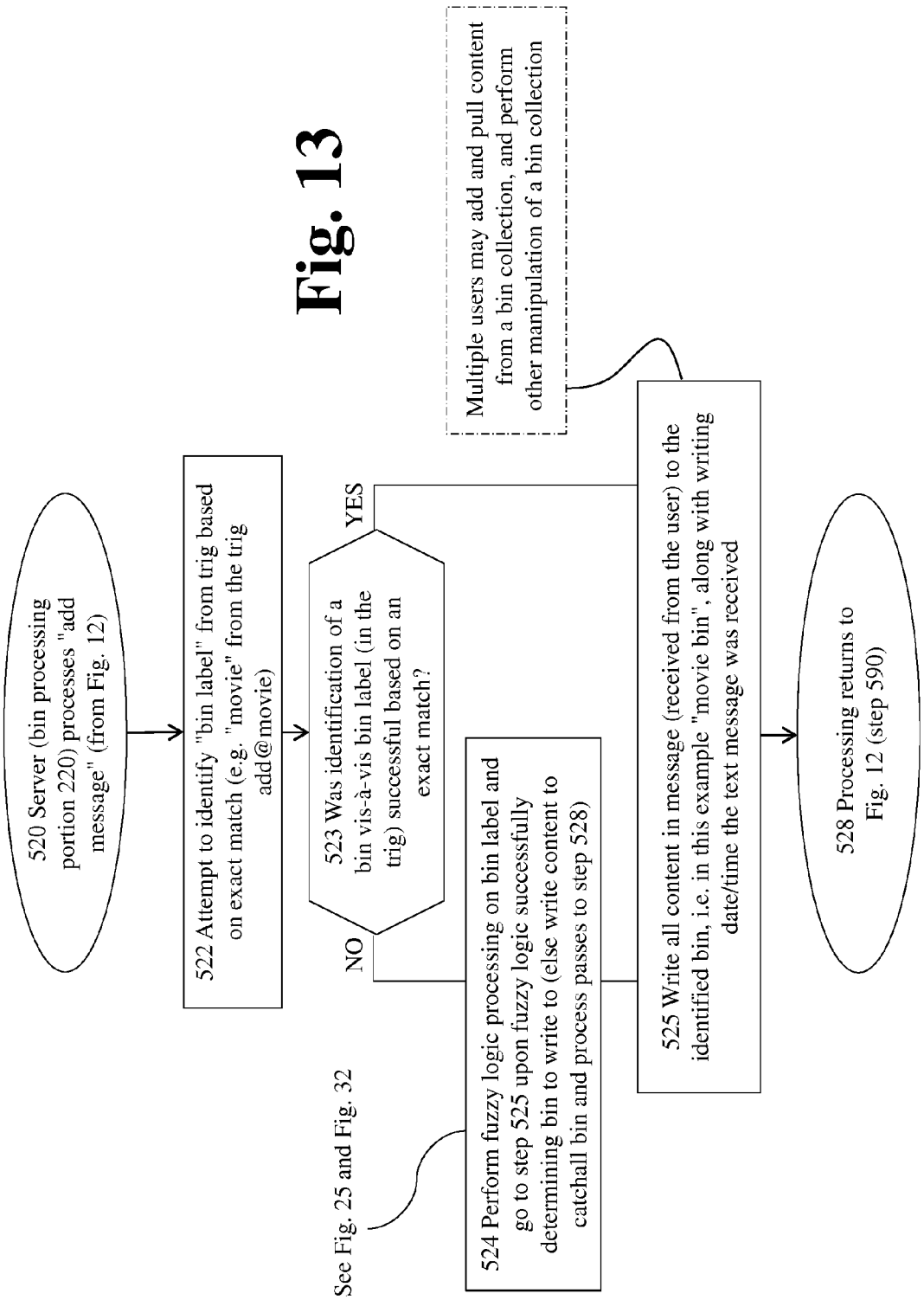
FIG. 13 is a flow chart showing the server (i.e. the bin processing portion 210) processes "add message" (step 520 of FIG. 12) in accordance with one embodiment of the invention.

FIG. 13 is a flow chart showing in further detail the server (i.e. the bin processing portion 210) processes "add message" (step 520 of FIG. 12) in accordance with one embodiment of the invention. As shown, the process starts in step 520 and passes to step 522. In step 522, the server attempts to identify a bin label from the trig based on an exact match. For example, from the trig "add@movie", the server attempts to find a bin named "movie" in the bin collection of the user. Then, the process passes to step 523. In step 523, the server determines whether identification of a bin in the user's bin collection vis-à-vis the bin label in the trig (from the user) was successful based on an exact match. If yes, then the process passes directly to step 525.

On the other hand, if no in step 523, then the process passes to step 524. In step 524, the server performs fuzzy logic processing on the "bin label" that was included in the trig. The processing passes to step 525 upon the fuzzy logic successfully determining a bin to which the content will be written. If fuzzy logic is unsuccessful in step 524, then the server may write the content in the text message to a catchall bin in the user's bin collection. The process then passes to step 528.

In step 525 of FIG. 13, the server writes all the content in the message, which was received from the user, to the identified bin. In this example, the content is written to the user's movie bin. In conjunction with writing the content to the particular bin in the user's bin collection, the server may write (or otherwise associate) date, time and/or other information with the "bin-content item" (in the bin) resulting from the user's text message.

After step 525, the processing passes to step 528. In step 528, the processing returns to FIG. 12 in step 590.

As reflected in FIG. 13, multiple users may respectively add content to a bin in the user's bin collection. Also, multiple users may respectively pull content from a particular bin in the user's bin collection. Various other manipulation of content in a bin collection may be respectively performed by a single user or other users. Such respective access to a particular bin collection by multiple users are described further below.

FIG. 14 is a flow chart showing in further detail the server (the bin processing portion 210) processes "send message" (step 530 of FIG. 12) in accordance with one embodiment of the invention. As shown in FIG. 14, the process starts in step 530 and passes to step 532. In step 532, the server parses out the bin label from the trig in the user's text message. For example, the bin label "movie" is parsed out from the trig "send@movie". After step 532, the process passes to step 533. In step 533, the server determines if (in the text message) there is a secondary trig to control a "time window" that the content of the particular bin is pulled from in satisfying the user request. It is appreciated that there may be other types of secondary trigs that otherwise control the particular content that is pulled from the specified user's bin collection. After step 533, the process passes to step 534.

In step 534, the server performs the processing to pull the desired content from the particular bin. In accordance with one embodiment of the invention, the server writes that content to a "send file." Then, step 535, the server determines if there are secondary trigs to modify the send message. For example, a secondary trig might dictate that the content should be sent to third persons and/or sent via a particular communication channel The server proceeds with outputting the content based on any such further secondary trigs. After step 535, the process passes to step 536.

In step 536, based on the user's bin settings, processing particulars and/or other parameters, the server 200 outputs the content to the user and/or third person in a report message. For example, the user's bin settings may dictate the user's contact information to which the content is sent (text number, e-mail address, on-line document, cell number, land number, for example), and any third party information. Such third party information may dictate the particular third-party to which the content should be sent given the particular situation, as well as the particular communication channel that should be utilized. A user's bin settings may be represented in the processing particulars 1032 of FIG. 10, in accordance with one embodiment of the invention.

After step 536 of FIG. 14, the process passes to step 537. Step 537 reflects that the content in the particular bin, from which the content was pulled, remains unchanged. Alternatively, user preference may dictate to clear the bin, i.e., to delete all content in the bin. Further alternatively, the server may simply delete the content that was sent in the report message. For example, if a secondary trig dictated a particular time window to limit the content that was sent in the report message, then only that content might be deleted from the particular bin.

After step 537, the process passes to step 538. In step 538, the processing returns to FIG. 12 and step 590.

FIG. 15 is a flow chart showing in further detail the server (the bin processing portion 210) processes "clear bin message" (step 540 of FIG. 12) in accordance with one embodiment of the invention. As shown, the process of FIG. 15 starts in step 540 and passes to step 542. In step 542, the server parses out the bin label from the trig. For example, the server parses out the bin label "movie" from the trig "clearbin@movie". Such parsed out bin label dictates the particular bin that content will be cleared from, i.e., the bin in which the content will be deleted. After step 542, the process passes to step 544. In step 544, the server proceeds with the deletion processing. Specifically, the server deletes the content, including each BCI, from the particular bin. It is appreciated that a secondary trig from the user may be utilized to control deletion of content in the user's bin. For example, a secondary trig, included with the delete message from the user, may dictate that only content in a particular time window is to be deleted. Further secondary trigs may be utilized to control other aspects of deletion, as desired. After step 544, the process passes to step 546. In step 546, the processing returns to FIG. 12 and step 590.

Figure 16:
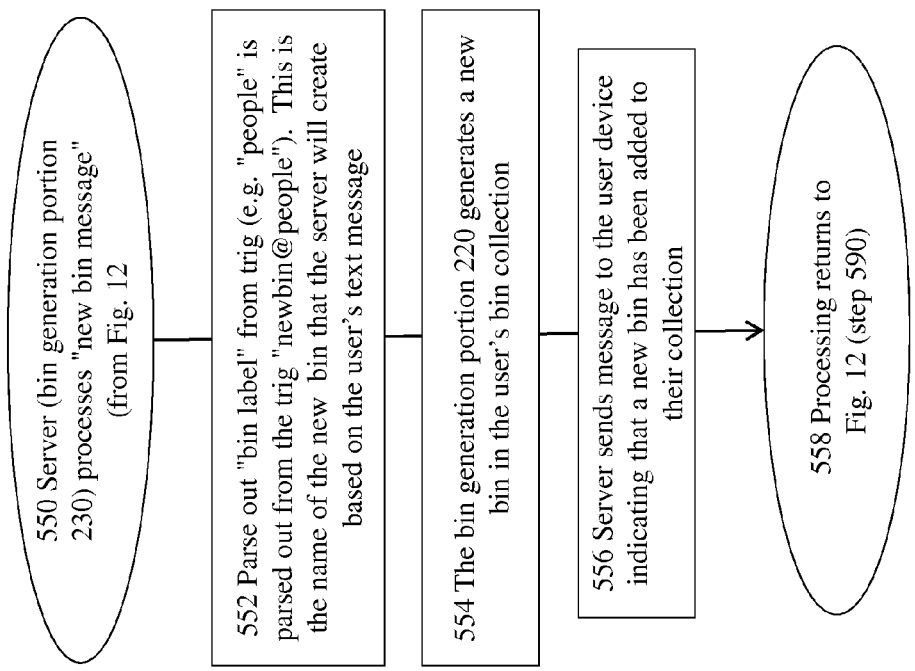
FIG. 16 is a flow chart showing the server (the bin generation portion 230) processes "add message" (step 550 of FIG. 12) in accordance with one embodiment of the invention.

FIG. 16 is a flow chart showing in further detail the server (the bin generation portion 230) processes "new bin message" (step 550 of FIG. 12) in accordance with one embodiment of the invention. The processing the FIG. 16 starts in step 550 and passes to step 552. In step 552, the server parses out the bin label from the trig. For example, the bin label "people" is parsed out from the trig "newbin@people". Such is the name of the new bin that the server will create based on the user's text message. After step 552, the processes passes to step 554.

In step 54, the server, and in particular the bin processing portion 220 generates a new bin in the user's bin collection. After step 554, the process passes to step 556. In step 556, the server sends a message to the user indicating that the new bin has been added to the user's bin collection. Then, the process passes to step 558. In step 558, processing returns to FIG. 12 and step 590.

Figure 17:
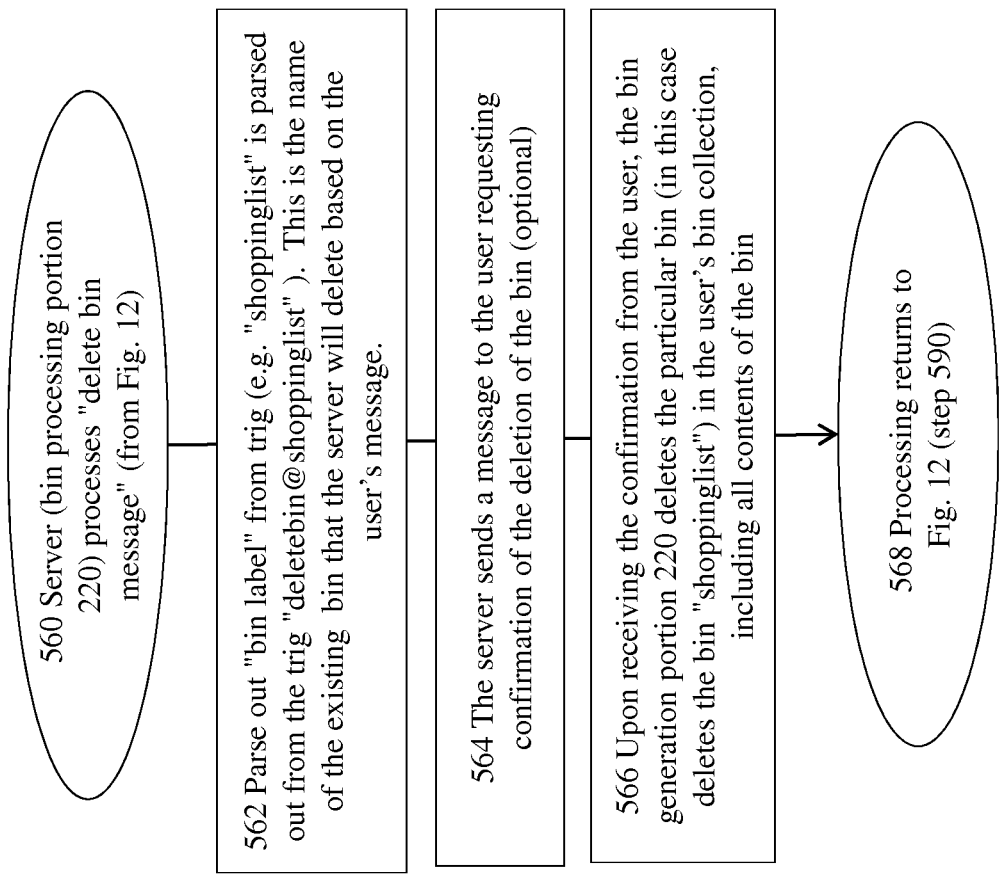
FIG. 17 is a flow chart showing the server (the bin processing portion 210) processes "delete bin message" (step 560 of FIG. 12) in accordance with one embodiment of the invention.

FIG. 17 is a flow chart showing in further detail the server (the bin processing portion 210) processes "delete bin message" (step 560 of FIG. 12) in accordance with one embodiment of the invention. As shown, the process starts in step 560 and passes to step 562. In step 562, the server parses out the bin label from the trig. For example, "shoppinglist" is parsed out from the trig "deletebin@shoppinglist". This is the name of the existing bin that the server will delete based on the user's message. Accordingly, it is appreciated that the processing of FIG. 17 deletes the bin itself as well as all content in that bin. In contrast, the processing of FIG. 15, as described above, merely deletes content in the particular specified bin, and does not delete the bin itself. After step 562 of FIG. 17, the process passes to step 564. In step 564, the server sends a text message to the user device requesting confirmation of the deletion of the bin. It is appreciated that such confirmation text message (to the user) may be optional. However, given the potential adverse consequences of inadvertent deletion of a bin, confirmation of such deletion may be preferable.

After step 564, the process passes to step 566. In step 566, upon receiving the confirmation from the user, deletion of the bin is initiated. Specifically, in accordance with one embodiment of the invention, the bin processing portion 220 deletes the specified bin in the user's bin collection. In accordance with one embodiment of the invention, all content in such deleted bin is also deleted. However, it is appreciated that content in a deleted bin might be preserved some manner. Also, functionality may be provided to retrieve a deleted bin including content in that bin. For example, a user may be provided the ability to retrieve a deleted bin with content for a particular time period, e.g. within 24 hours. After step 566 of FIG. 17, the process passes to step 568. In step 568, processing returns to FIG. 12 and step 590.

Figure 18:
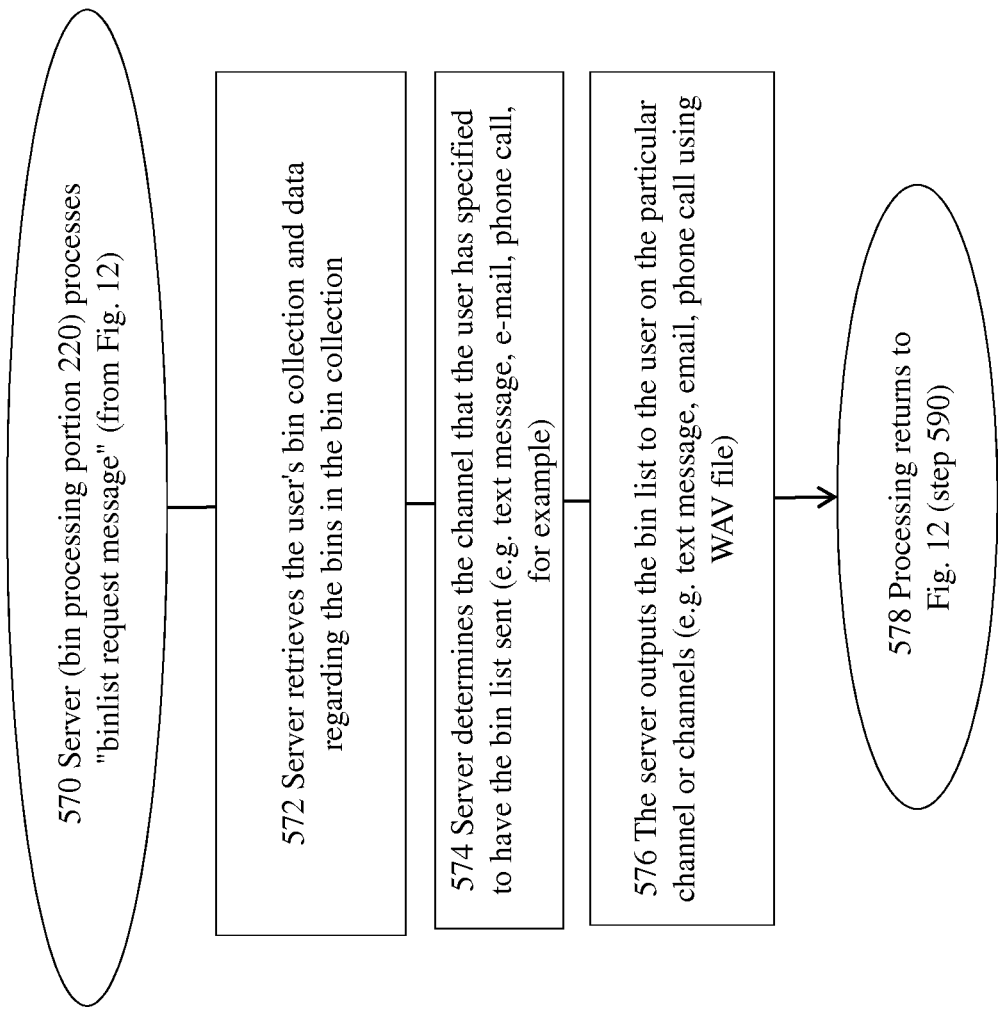
FIG. 18 is a flow chart showing the server (the bin processing portion 210) processes "add message" (step 570 of FIG. 12) in accordance with one embodiment of the invention.

FIG. 18 is a flow chart showing in further detail the server (the bin processing portion 210) processes "bin list request" (step 570 of FIG. 12) in accordance with one embodiment of the invention. Accordingly, the processing of FIG. 18 may be desired in the situation that the user forgets the name of the bins in her bin collection. In such situation, the user may request a list of her bins, i.e. a bin list. As shown, the processing of FIG. 18 starts in step 570 and passes to step 572. In step 572, the server retrieves the user's bin collection and data regarding the bins in the bin collection. Then, in step 574, the server determines the particular channel the user has specified to have the bin list sent. For example, user preference may dictate that the bin list for the user is sent via text message, e-mail, phone call, or other communication channel, for example. In accordance with one embodiment of the invention, a user might request that the bin list be sent to the user via e-mail, i.e. with the intent of upon receiving the e-mail from the server 200, the user might copy and paste the bin list into her OUTLOOK contacts, and specifically into her At-It contact, i.e. her contact in OUTLOOK for At-It, for example. After step 574, the processing passes to step 576.

In step 576, the server proceeds and outputs the bin list to the user on the particular channel or channels (e.g. text message, email, phone call) as requested based on user preference. Output from or input to the server 200 via phone call may use Waveform Audio File Format (WAV) in accordance with embodiments of the invention. After step 576, the processing of FIG. 18 passes to step 578. In step 578, the processing returns to FIG. 12 (step 590). Further processing is thereafter performed as described above.

Figure 19:
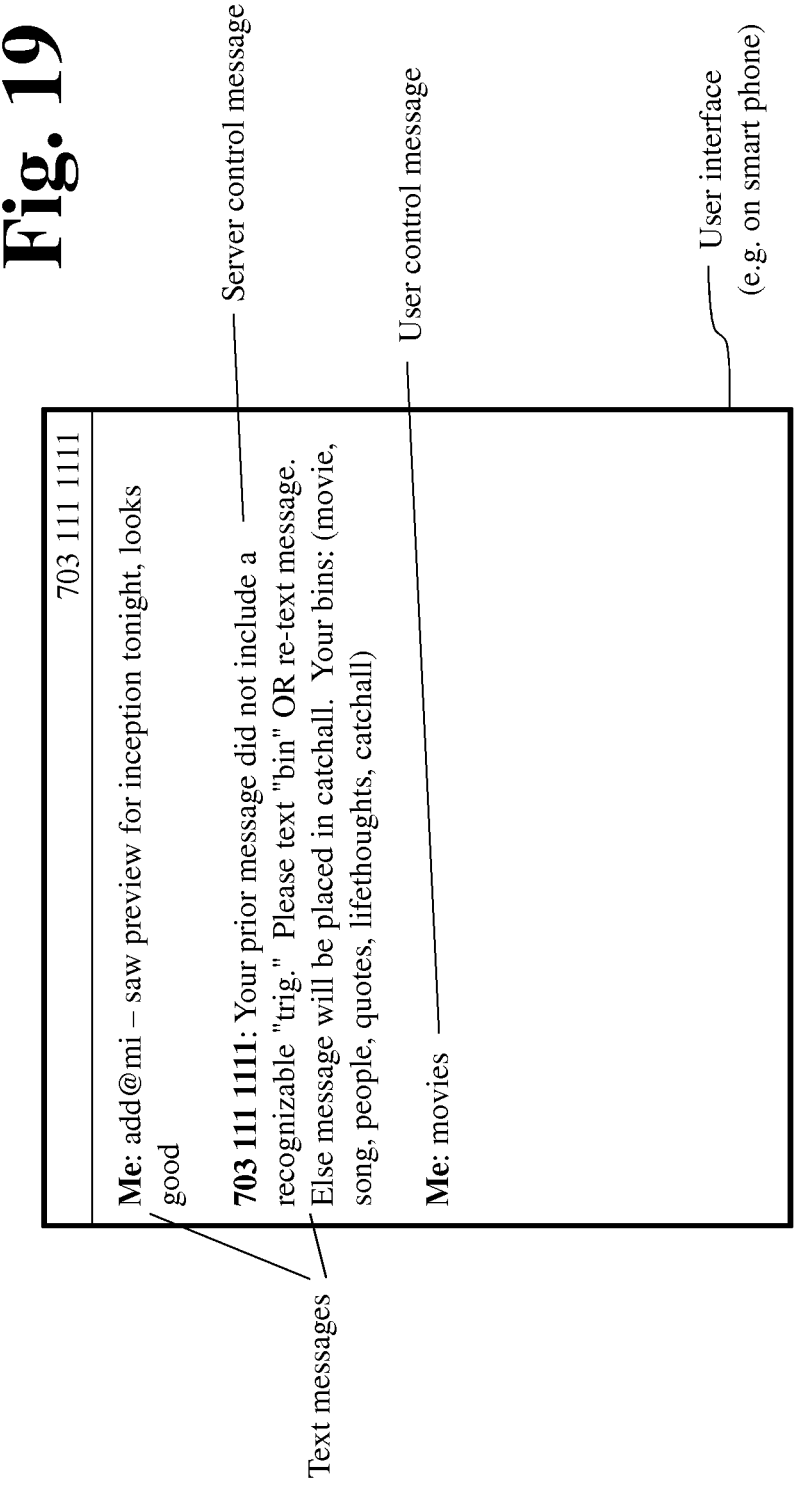
FIG. 19 is a user interface showing aspects of control messages in accordance with one embodiment of the invention.

A report message may also be generated by the server and sent to the user. For example, upon the user sending the server the trig "send@movie&book-report" the server may be programmed to respond to such trig with a report message that includes metrics from both the user's "movie" bin and the user's "book" bin. Such metrics might include the number of BCIs in each bin, time and date that BCIs were added, the amount of data storage consumed by BCI or bin, the date and time that report messages were generated for each bin, relationship information between the two respective bins such as comparing the complexity of the user's manipulation of each bin, and other information, FIG. 19 is a user interface, as displayed on a smartphone for example, showing aspects of control messages in accordance with one embodiment of the invention. As described above in reference to FIG. 5, the messages used in processing by the At-It server 200 may include a server control message (sent from the server) and a user control message (sent from the user). Such messages may not include a trig.

In accordance with one embodiment of the invention, a server control message may be sent when established protocol of messages is not satisfied. For example, if the user sends the server a message "add@mi", and given the bins listed in FIG. 19, then neither fuzzy logic nor default settings may be able to identify what the user intended and/or interpret what action should be taken upon the message. In such situation, the At-It server 200 might simply add the message to the user's catchall bin. Alternatively, the At-It server 200 attempts to reach out to the user to clarify the user's intent, i.e. the At-It server 200 reaches out in the form of a control message. The user may then respond with a user control message, which addresses the question posed by the server control message. In the example of FIG. 19, the user responded with the text message "movie", i.e. indicating that was the bin he intended In accordance with one embodiment of the invention, if no response is heard (in response to a server control message), then the message might be sent to the catchall bin after some time period, e.g. 5 minutes. Also, in one embodiment, a user can opt not to get corrective messages, i.e. not to get a server control message, and have the message go directly to the "catchall" bin. Various other default processing may be performed, as desired.

Figure 20:
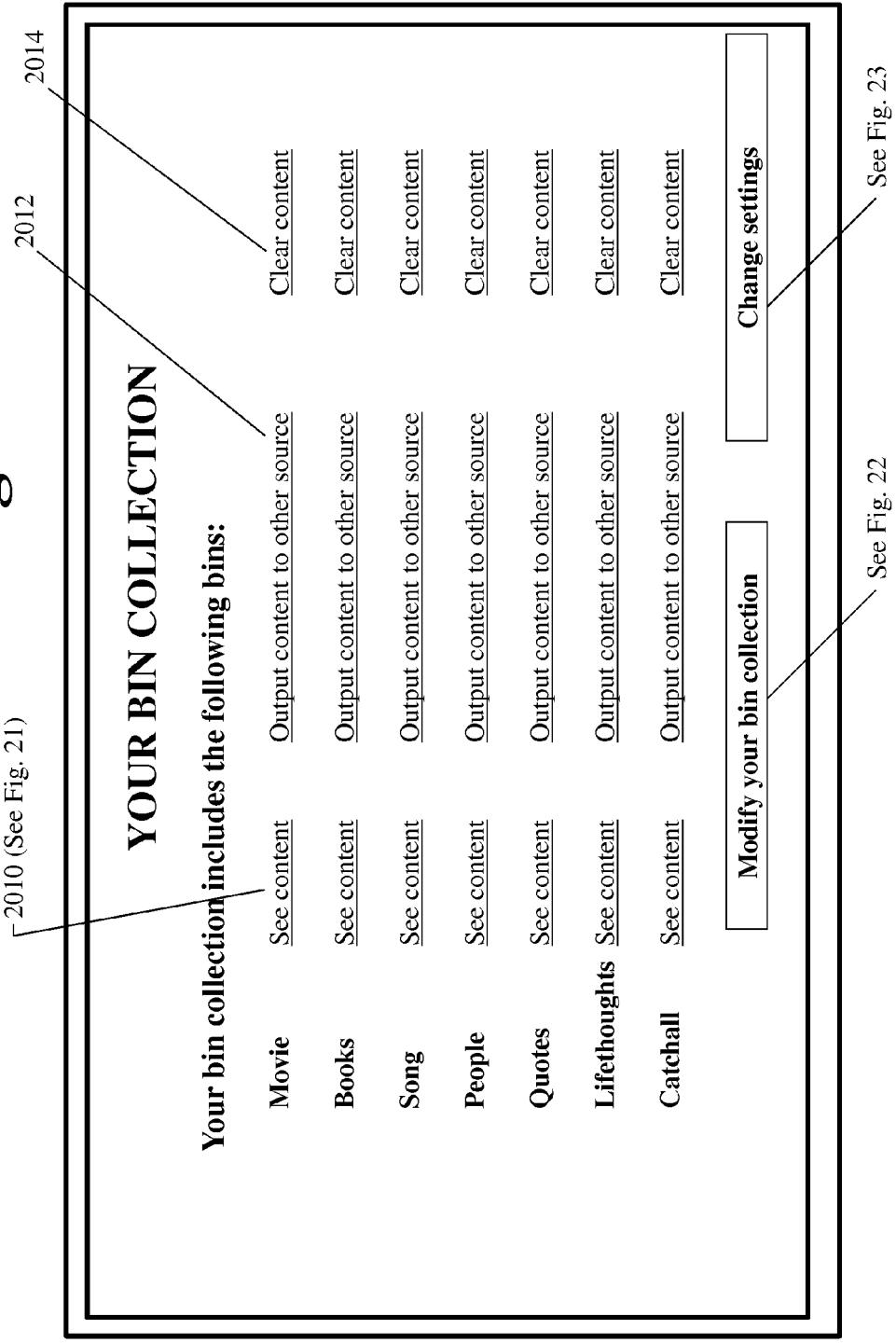
FIG. 20 is an illustrative graphical user interface (GUI) showing a user's bin collection and related functionality in accordance with one embodiment of the invention.

FIG. 20 is an illustrative graphical user interface (GUI) 2001 showing a user's bin collection and related functionality in accordance with one embodiment of the invention. That is, the GUI 2001 of FIG. 20 (as well as FIGS. 21-25) may be presented on the user's computer in a web session with the At-It server 200 or using a mobile application, i.e. a mobile app, on the user's smartphone. The web session might be conducted using INTERNET EXPLORER over the Internet, or using some other browser application or some other network, for example. The GUI allows a user to manage her bin collection online and perform related tasks.

Figure 21:
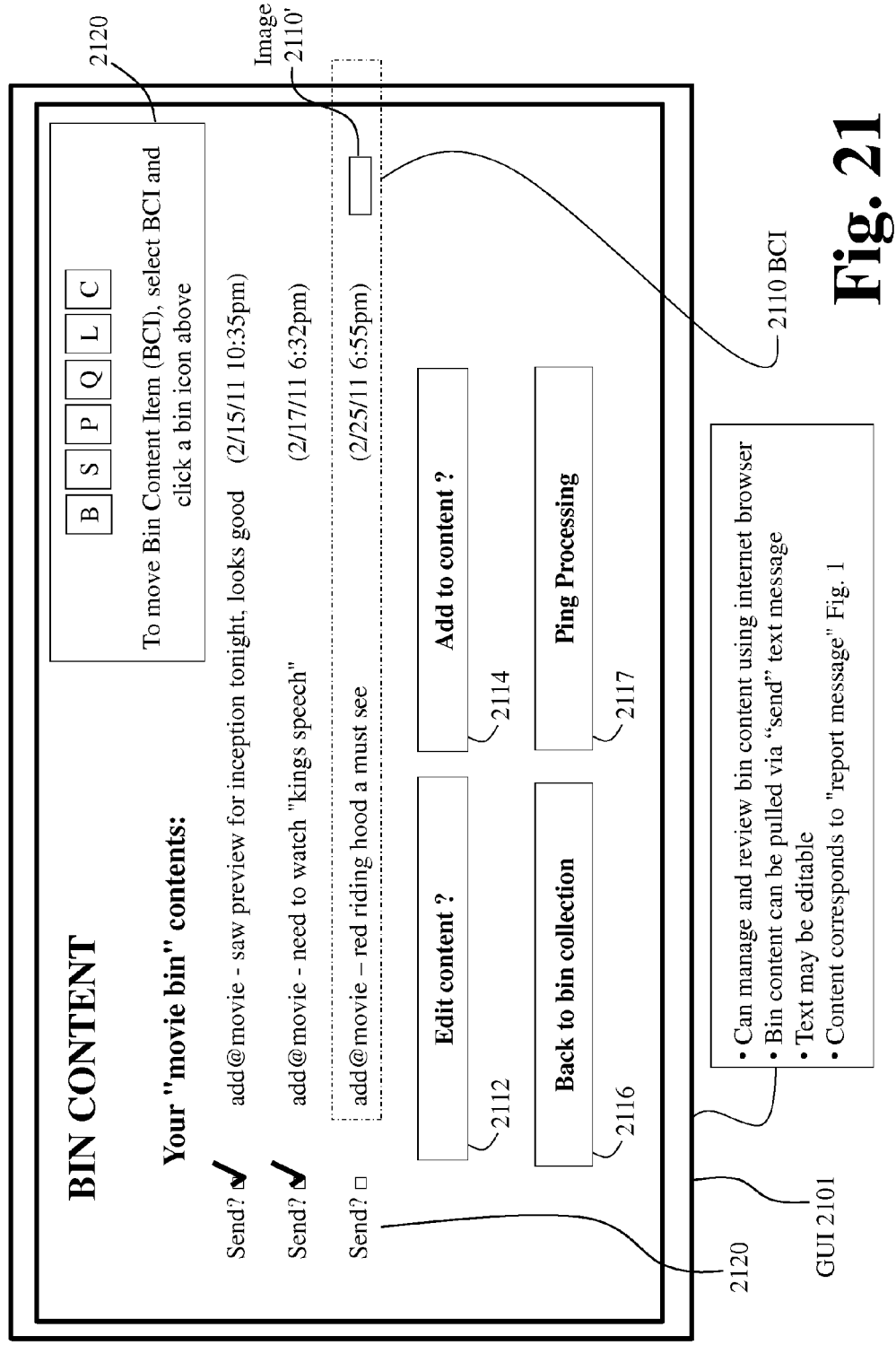
FIG. 21 is an illustrative GUI showing the content of a user's "movie bin" and related functionality in accordance with one embodiment of the invention.
Figure 22:
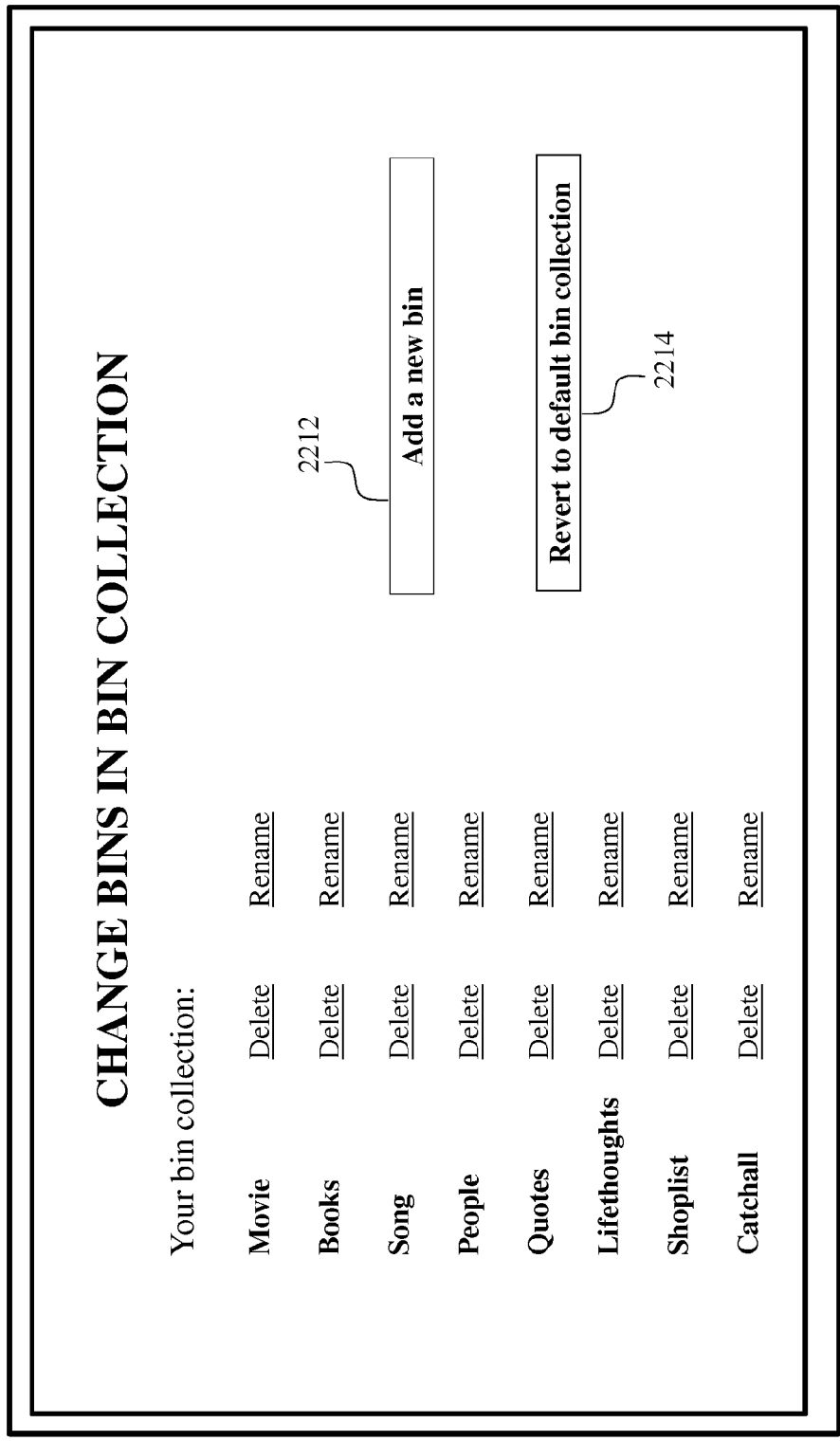
FIG. 22 is an illustrative GUI showing functionality related to changing bins in the user's bin collection in accordance with one embodiment of the invention.

FIG. 20 lists the user's bin collection including all the user's bins. In this example, the user's bin collection includes the bins: movie, books, song, people, quotes, lifethoughts, and catchall As shown, the user can view the content in a particular bin by clicking the link 2010 (see FIG. 21). The user can output the content to a particular source (such as a particular text number, e-mail address, cell phone, land phone, or online document, for example) by clicking the link 2012. For example, the content might be output to a GOOGLE DOC document and shared with friends using such document, or otherwise shared. In accordance with one embodiment of the invention, the user may specify that upon the At-It server 200 receiving a send message, the At-It server 200 sends the content of a particular bin to other third persons, e.g. friends, using a communication channel (text message, e-mail, phone, for example) as desired. Accordingly, it is appreciated that various rules may be utilized to control the sending/sharing of content disposed in the user's bin collection, and such may be disposed in the processing particulars 1032 (see FIG. 10) in the user's account, for example. The processing particulars 1032 may in general contain various processing attributes associated with a particular bin. Further, as shown in FIG. 20, the user can clear the content in a particular bin by clicking the link 2014, as shown in FIG. 20. The link 2014 does not delete the bin itself, but merely clears/deletes the content in the bin Accordingly, the functionality provided in FIG. 20, and in FIGS. 21-22, provide some functionality as that provided by the messages and trigs of FIG. 4, described above. It is appreciated that various bin manipulation functionality described herein as performed via webpage (or via suitable mobile application on a user device) might also be performed using a suitable command via text message from the user It is also appreciated that various bin manipulation functionality described herein as performed using a suitable command via text message from the user might also be performed via webpage (or via suitable mobile application on the user device). In accordance with further embodiments of the invention, it is appreciated that further icons may be presented to the user, i.e. such that the user may select such icons for desired processing. FIG. 20 also provides the user the option to modify her bin collection in the web session (see FIG. 22), as well as to change settings in her bin collection (see FIG. 23).

FIG. 21 is an illustrative GUI showing the content of a user's "movie bin" and related functionality in accordance with one embodiment of the invention. The content shown in FIG. 21 corresponds substantially to the report message as shown in FIG. 1. A user might opt to bring her bin content up via a web browser (or mobile application) due to large amounts of content or the desire to copy and paste content into another document, such as into a MICROSOFT WORD document, for example. In accordance with one embodiment of the invention, the content of the particular bin may be presented to the user in a manner similar to the way in which e-mails are presented. For example, each text message that was added to the particular bin of the user may be presented as a respective "bin content item" 2110. The server 200 may associate various attributes to each item, such as time the text message content was received and other parameters. Further, in a manner similar to e-mail presentation, the server 200 might provide desired functionality that may be applied to each item, such as the ability to delete an item or to forward an item to a further person. As shown in FIG. 21, the button 2112 allows the user to activate the bin content so as to be editable. The button 2114 allows the user to add content to the bin. Bin content in the bin collection that has been changed may be so indicated by suitable indicia. The button 2116 may be selected by the user so as to negotiate back to the user's bin collection, i.e. back to the GUI of FIG. 20. It is appreciated that date and time information that is associated with particular content being added to a user's bin, for example, or any other date and time information, or any other attributes in general may be tracked, documented, presented, output, and/or otherwise manipulated, as desired.

In accordance with one embodiment, FIG. 21 includes a "change bin" dialogue box 2120. The dialogue box 2120 allows a user to select a particular BCI and move that BCI to a different bin. Each of the icons in the dialogue box 2120 corresponds to a different bin, as shown in FIG. 20. Thus, the user might click the BCI containing "red riding hood a must see" and then click the "B" icon in the dialogue box 2120. Such would then move the particular BCI (and/or copy) the particular BCI) into the user's "Books" bin, such that the user could be reminded of her interest and also reading the related book. In response to such user interaction, the server 200 modifies attributes associated with such BCI, so as to move, i.e. associate, such BCI with the user's "book" bin instead of the user's "movie" bin.

Figure 23:
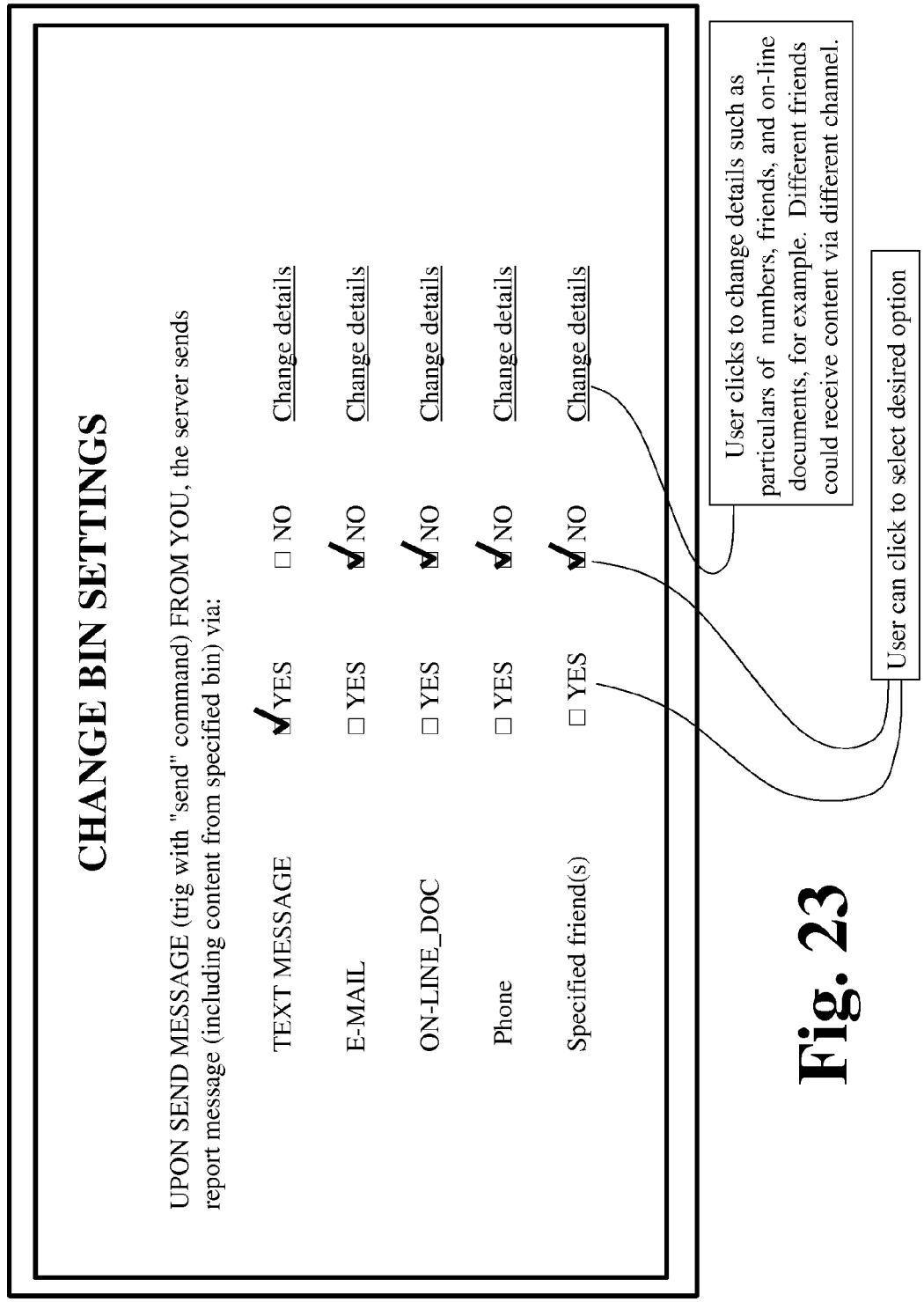
FIG. 23 is an illustrative GUI showing functionality related to changing bin settings in accordance with one embodiment of the invention.

FIG. 22 is an illustrative GUI showing functionality related to changing bins in the user's bin collection in accordance with one embodiment of the invention. As shown, the user may delete a bin or change the name of a bin by selecting a particular link, as shown. Also, a user may add a new bin (button 2212) or revert to some default bin collection (button 2214), i.e. such as the bin collection provided by the At-It server 200 when the user first joined on to the At-It system. In accordance with one embodiment of the invention, reversion to a default bin collection may, or may not, preserve existing bin content in some predetermined manner FIG. 23 is an illustrative GUI showing functionality related to changing bin settings in accordance with one embodiment of the invention. In particular, FIG. 23 shows that the user may change the particular communication channel via which the server 200 outputs communications (such as report messages) in response to a "send message" from the user. As shown the server 200 might output communications via text message, e-mail, phone, on-line document, or in some other manner or communication channel. FIG. 23 shows that the user may control in a piecemeal manner the channel(s) via which a particular report message is sent. However, the particular channel via which other communications are received by or sent to the server 200 may also be controlled by the user. Further, the particular communication channel may be adjusted in some global manner For example, the user may want content from some of her bins to be forwarded via text message and content from other bins to be forwarded via e-mail. Such functionality relating to the adjustment of the particular channels utilized my be provided via webpage, mobile application and/or via a suitable control trig, for example. In general, FIG. 23 shows that the user may control the particular communication channels utilized, the type of message that is sent, and who the message is sent to, for example. For example, different friends might receive content via different channels. Bin settings as reflected in FIG. 23 may be represented in the processing particulars 1032 of FIG. 10, for the particular user.

FIG. 24 is an illustrative GUI showing a user's personal information and functionality related to changing the user's personal information, in accordance with one embodiment of the invention. Accordingly, the user might change the personal information that is stored in the user's account, as such information is depicted in FIG. 10. The user's information may include name, address, text message number, and e-mail address, as well as other information needed or desired in operation of the server 200.

Figure 25:
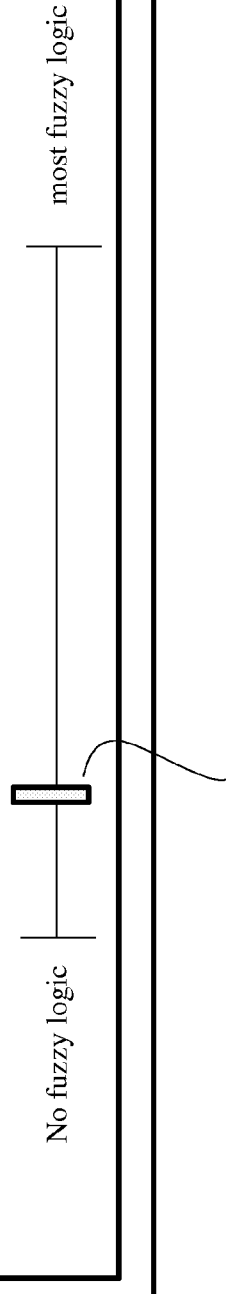
FIG. 25 is an illustrative GUI showing functionality related to changing the fuzzy logic, which is utilized by the At-It server 200, in processing a user's message in accordance with one embodiment of the invention.

FIG. 25 is an illustrative GUI showing functionality related to changing the fuzzy logic, which is utilized by the At-It server 200, in processing a user's message in accordance with one embodiment of the invention. As described herein, "fuzzy logic" is utilized to deal with imprecise data from the user and provides processing, that is performed by the At-It server 200, to determine membership including an association, such as an association of a bin label to a bin name, based on a matter of degree rather than a yes-no situation. As an example, an option may be provided to the user that if the first, second, and so forth letter of the bin label (in a text message received by the At-It server 200) matches a bin name, then the At-It server 200 should go ahead and include that text message in that bin. Thus, for example, if the trig in a text message from the user was "add@m" and no other bin started with the letter "m", then the At-It server 200 would place the text (of the text message) in the "movie" bin. As described above, a user may come to use and rely on the fuzzy logic as a quicker way to craft trigs and send texts to the At-It server 200.

Fuzzy logic is not limited to use in conjunction with bin names. For example, fuzzy logic might also be used in conjunction with "commands" in a trig, or in conjunction with other character strings, i.e. text strings, used in the invention, for example. In general, fuzzy logic may be used in the comparison processing of the invention to handle imprecise data. In particular, fuzzy logic may be used to associate a first item (e.g. a bin label) to a second item (a bin in the bin collection of a user, as electronically stored in the server 200) even though there is not a precise match. Accordingly the bin label "mv" in a trig from the user may be associated with the bin "movies" even though there is not a precise match. For example, a search and compare algorithm may be used that identifies a particular bin. Further details are described below with reference to FIG. 32.

Other aspects of fuzzy logic processing are shown in FIG. 25. For example, the At-It server 200 might perform a comparison based on overall similarity of bin label with user's bins, to determine which bin is most similar and assign the content to that bin. Further, the At-It server 200 might give numbers in the trig priority over letters, or alternatively letters priority over numbers. As shown by the GUI of FIG. 25, the user may select which of these fuzzy logic approaches the user wishes to utilize by checking a box. Relatedly, the user may select whether, when fuzzy logic is used, she wishes to have confirmation of the placement of a message into a bin. Other aspects of fuzzy logic processing may be used in the invention.

As shown in FIG. 25, a further feature is a bar 2502, i.e. a scale of sorts to control how much fuzzy logic is used. The user can grab and move the bar (shown) with curser to adjust how much fuzzy logic is used. The position of the bar 2502 thus varies the fuzzy logic used, in some predetermined manner and may rely on the above described fuzzy logic approaches (as shown in FIG. 25) or other approaches. Accordingly, fuzzy logic attributes may be controlled by the bar 2502 of FIG. 25 (or a plurality of bars) in a manner akin to the manner in which a sound level for a particular frequency band is controlled by a respective slide control (as described in U.S. Pat. No. 6,111,755 issued Aug. 29, 2000 (application Ser. No. 09/038,729)), or in the manner of iTUNES SLIDER CALC—MORTGAGE CALCULATOR. For example, as the user moves the bar 2502 to the right, as shown in FIG. 25, more fuzzy logic features are activated in some predetermined manner On the other hand, as the user moves the bar 2502 to the left, fewer fuzzy logic features are activated in some predetermined manner In accordance with one embodiment of the invention, fuzzy logic may be used to address spaces in the trig. For example, the At-It server 200 may ignore spaces in a text message—in its identification of a trig in the text message. In such processing, the server 200 might look to the group of characters in front of the trick as the command, and look to the group of characters in back of the trick as the bin.

Hereinafter, various further aspects of the invention will be described.

A text message as used herein generally means a message containing characters exchanged between electronic devices, inclusive of electronic systems. A common scenario is a user sending a text message using a smartphone. For example, a user may send and receive text messages as described herein using the DROID phone by MOTOROLA and supported by VERIZON, with novelty of the invention residing in both the manner in which the user crafts the text messages (sent to the At-It server from the user) and in particular the processing performed by the At-It server in manipulation of text messages received from the user and text messages sent to the user. Text messages may be sent using Short Message Service (SMS) technology, and/or Multimedia Messaging Service (MMS) technology. In general, the text messaging as described herein may be performed using any suitable text messaging software, application, app, texting app, text messaging tool, and/or module, for example.

A text message may be provided to include various "characters" including the 26 letters of the alphabet, 10 numerals, and various symbols including characters typically set forth on a standard keyboard (such as ! @ # $ % ^ & * ( ) + = [ ] { } | \ ; : ' " < > , . / ? _ -); for example. In general, it is appreciated that the invention may utilize letters, numbers, alphanumerics, symbols, or any other character in practice of the invention.

As used herein, a "character string" means a group of characters, i.e. a string of characters identifiable as a group of characters. Relatedly, the term "text string" and "character string" are used herein interchangeably. An example of a character string is "add@movie".

In practice of the invention, in accordance with some embodiments, a sequence of numbers is used by the user to send a text message to the server 200, and a sequence of numbers is used by the server 200 to send text messages to the user. In its simplest sense such numbers might simply be the smartphone number of the user and a number assigned to the server 200. However, it is appreciated that rather than numbers, other characters might be used. Accordingly, the term "routing character string", as used herein, encompasses a smartphone number of the user, but also encompasses any sequence of characters that uniquely identifies a user device, server, or other processing device in such manner that a text message (or other communication) may be forwarded thereto. Thus, the term "routing character string" reflects a more generic sense of the standard phone/text number. Accordingly, it is appreciated that any disclosure herein of use of a smartphone number, phone number, or similar disclosure may instead (of a "number") utilize any other routing character string. In general, any suitable routing string may be used in practice of the invention as described herein. Thus, an e-mail address such as "user1@gmail.com" constitutes a routing character string.

As used herein, the terms type, key, enter, input, text in, and/or other similar terminology are used interchangeably to mean that the user enters data into the user device, e.g. such as the user keying in a text message to her phone.

A mobile application or an "app" (short for application) as used herein means software disposed on a user's device for the purpose of providing At-It related functionality and performing other related tasks for the user, as described herein. For example, an At-It app might be disposed on the user's DROID smartphone.

As described herein, phrasing such as tells, talks, dictates, conveys, advises, recognizes, instructs, observes, sees, indicates and/or other similar terminology in the context of the server 200 (or any other computer processing portion), means to communicate data to the processing portion based upon which the processing portion will take certain action based on programming attributes in the processing portion. An example is a disclosure of "the user device talks to the server 200." Accordingly, such phraseology is intended in the machine sense, and not in an oral-person talking communication sense. In similar vein, the term "know" or the server "recognizes" or similar phraseology in the context of the server 200 (or other processing portion) means that the processing portion is provided with programming attributes to act on particular data, so as to perform a particular task.

As described herein, described interaction of the user with the At-It server 200 means, for example, through the user's user device (e.g. smartphone), the user's computer via web page, the user's landline telephone, or via some other processing device or system, which interfaces with the human user and electronically communicates with the server 200—so as to provide the features described herein. Accordingly and illustratively, a description of "the server 200 sends the report message to the user device of the user" might be simply characterized by the phrase "the server 200 sends the user a report message".

The term "processable" as used herein means that the server is able to successfully perform processing on the particular message, such as acting on a trig to obtain a desired result for the user.

As noted above, is appreciated that the systems and methods of the invention may well work with existing known user devices and network technology, as depicted in FIG. 1, for example, with novelty of the invention residing in the manner in which text messages and other communications are crafted by the user and in the server 200. Thus, the innovative processing performed by the At-It server 200 leverages existing technology. Alternatively, or in addition to, the invention may involve a mobile application, i.e. a software application (an "app"), disposed on the user's tangibly disposed user device (e.g. smartphone or computer) so as to leverage the features of the invention. Indeed, in one embodiment, features of the invention might be implemented exclusively on a user's local computer, smartphone, or other user device for example, in a software program. The program might handle and provide the maintenance of bins, adding content to a bin, pulling content from a bin, and deleting bins, for example, as well as other features described herein. Such processing might provide a user interface of the appearance of a text messaging application, but indeed be working only locally on the user's computer. In accordance with further embodiments of the invention, such local processing may be performed in conjunction with interfacing with the At-It server 200 in some selective manner. That is, local processing and interface with the At-It server 200 may be combined.

It is appreciated that features described herein as being performed via web page may be performed via a user's personal device (such as a smartphone). In particular features described herein as being performed via web page may be performed via a mobile application (an app) on the user's smartphone or via a browser feature on the user's smartphone, for example.

Various features of the systems and methods of the invention are described herein. It is appreciated that described features may be used in conjunction with other described features so as to provide desired functionality.

In general, it is appreciated that by allowing the user to name the bins, the user may use names that are very intuitive and helpful to them. Relatedly, the user can thus craft a bin collection that is uniquely geared to her or his life.

The invention may utilize suitable backup arrangements. For example, the At-It server 200 might periodically e-mail or otherwise forward all bin content to the user. For example, all content in the user's bin collection might be sent to a document using GOOGLE DOCS, which is accessible by the user. The user may be provided the option to download all bin content to the user's PC, smartphone, or other electronic device. In accordance with one embodiment of the invention (in response to a suitable text message, phone call, or email) the server might fax all (or selected content) to a fax number provided by the user, for example.

In accordance with one embodiment of the invention, as described below, the trigs in messages may be stripped out of the content and/or the content might be otherwise modified for presentment to the user or otherwise. For example, content from the movie bin might be presented without the particular trigs add@movie, but rather under a collective header indicating that all such messages possessed such trig. However, it may be desirable to retain the content "as is." Further details are described below with reference to FIG. 28 and FIG. 34.

As described further below, a user may be associated with multiple bin collections. On the other hand, a single bin collection and/or a single bin may be associated with multiple users.

In accordance with one embodiment of the invention, a trig may dictate that content is pulled from multiple bins in the user's bin collection. In the report message, suitable indicia may be provide to reflect which bin which content was pulled from.

In accordance with embodiments of the invention, it is appreciated that processing performed is not case sensitive. In other embodiments, processing may be case sensitive.

As used herein, "data" and "information" are used interchangeably.

In accordance with one embodiment of the invention, as described in detail herein, the trig and other components of a particular text message are demarcated by spaces. However, the invention is not limited to such. For example, a particular character might be used to demarcate the components of a text message—so long as the server 200 knows, i.e. is programmed, to perform processing based on such demarcation.

In accordance with embodiments of the invention, the user generating the text message using a user device, such as a smartphone, is human, i.e. a typical scenario of a person sending a text message using her phone. However, the invention is not limited to such. In particular, the text message might be generated by a computer processor in some manner, i.e. the computer processor would thus be the user. Relatedly, it is appreciated that the systems and methods of the invention may be implemented in a wide variety of environments to provide an application program interface (API). Various such implementations are described herein.

As described herein, an "add" message and related terminology is meant in a summation sense, and not in an advertisement sense.

It is appreciated that the order of components of a trig, for example, may be adjusted. For example, the bin label might be placed before the trick and the command placed after the trick.

It is appreciated that fuzzy logic as described herein is not limited to application in conjunction with bins and bin labels. That is, fuzzy logic may be applied to other character strings so as to effect an association between text that the user has entered vis-à-vis text processable by the server 200.

Figure 26:
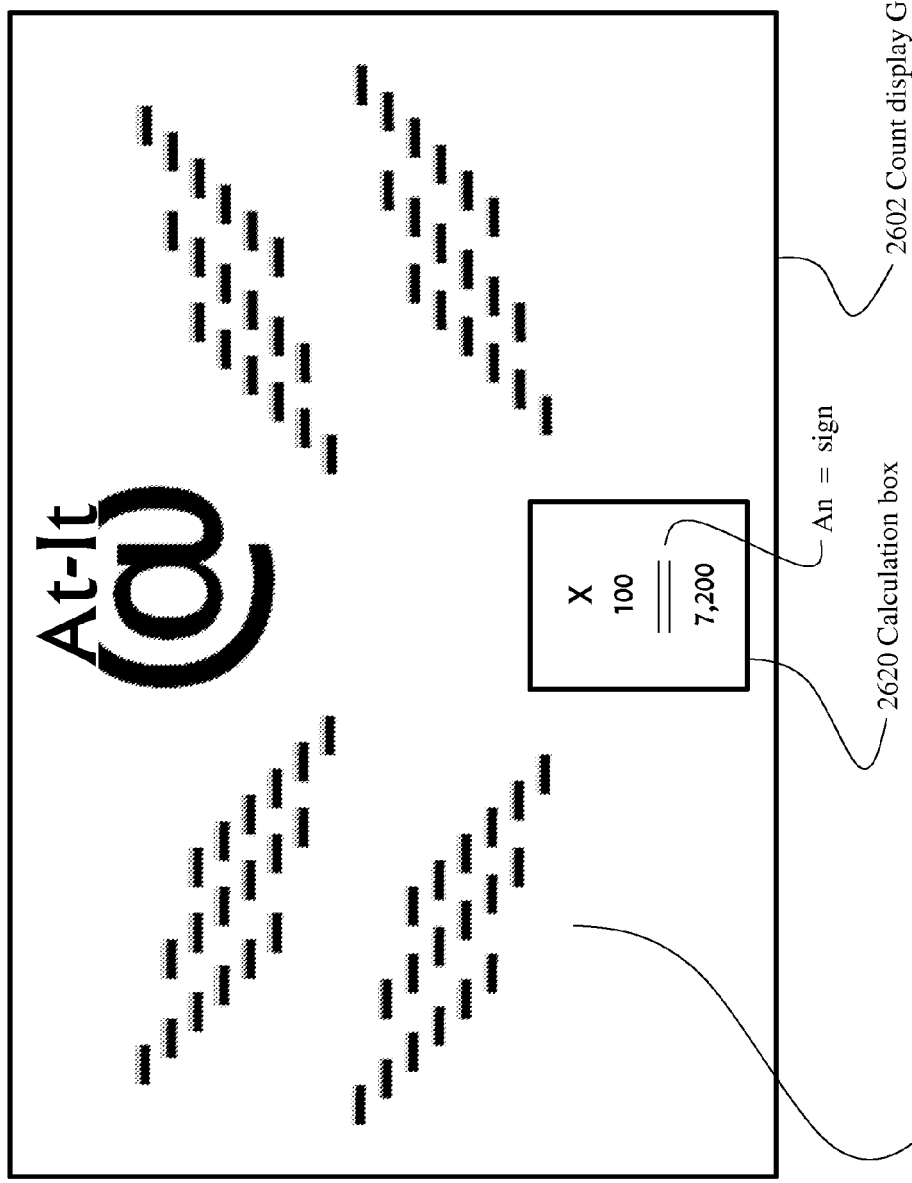
FIG. 26 is a display showing the flow of "add messages" to the At-It server in accordance with one embodiment of the invention.

FIG. 26 is a display showing the flow of "add messages" in accordance with one embodiment of the invention. The total count of add messages and/or any other messages, may be tracked by the At-It server 200 and output as a visual representation. Each small block on the screen of FIG. 26 reflects an add message. The blocks may advance down the screen in a streaming fashion. A multiplier may be applied (100 as shown in FIG. 26). Accordingly, the representation shown in FIG. 26 reflects the processing of 7,200 add messages. The display can also include system related indicia in accordance with embodiments of the invention.

FIG. 27 is a table setting forth sayings related to the invention in accordance with one embodiment of the invention. It is appreciated that the various terminology as set forth in FIG. 27 is for purposes of explanation. It is appreciated that other terminology may be coined, in the scope of the invention, in parallel to that of FIG. 27. For example, the invention might be characterized as a "stow" of text, i.e., in that text is "stowed" in bins. Accordingly, phraseology based on the "stow" terminology, in parallel to the phraseology of FIG. 27, might include "That's a good thought. I'm going to 'stow' that"; "That's so cute what he said, can you stow that in your quotes bin?"; "Oooo, I'm going to stow that!!!"; "Stowing is a fun way to save thoughts from life".

Hereinafter, various further features of the invention will be described.

In accordance with one embodiment of the invention, multiple text messages may be sent by a user, received by the server 200, and processed by the server 200 in a collective manner. For example, in one embodiment, the collective processing of sequential text messages may be used to provide content that does not include trigs. The user first sends a text message to the server 200, including non-trig content (see FIG. 3) as that user wishes that content to go into a particular bin. Upon receipt of the first text message from the user, the server 200 places the first text message into a queue. Subsequent to sending the first text message, the user prepares and sends a second text message. The second text message includes a trig that controls the particular bin into which the content (i.e. the non-trig content) of the first text message is placed. Accordingly, in this embodiment of the invention, the server 200 processes two text messages collectively. In such processing, the non-trig content in the first text message may be the only content that is placed into the particular bin. Such collective processing might be performed by the server 200 upon the server 200 receiving a text message without a trig, or some other rule or user preference may be applied to trigger such collective processing. In this manner, the user would ultimately receive back the content he or she wished to remember, but not the trigs that controlled placement of the content into the particular bin. The reverse of the above, the trig might be sent in the first text message, and the content sent in the second text message.

In alternative processing, the content of both the first text message and the second text message is placed into the bin. The content may be placed together or in some segregated manner. The server 200 may respond to a "send message" (from the user at some future time requesting content from the particular bin) by only sending content from the first text message and not the second text message. Thus, the trigs might be preserved if the user wants to view the trigs at some point in time.

In further embodiments, there may be functionality to strip out the trigs from content in other manners, i.e. to not include trigs in a "report message" sent from the server 200 to the user (in response to a user's send message to the server). For example, a secondary trig might be included in a "send" message from the user to the server 200. The secondary trig tells the server that the server should only send the non-trig content and no strings of characters with an "@" in them, i.e. no trigs should be included in the "report message" from the server 200.

In a further embodiment, the server 200 may simply know not to send trigs in a report message. This might result from the user setting a preference to not send trigs or in some other manner advising the server that no trigs should be included in a report message. For example, this functionality might be in the form of a toggle switch (or button) that the user clicks on to include the trigs, or clicks off to not include the trigs. In another embodiment, functionality may be provided (when the user is viewing the content via webpage or cell phone app, for example) to not show the trigs. For example, this functionality might also be in the form of a toggle switch (or button) that the user clicks on to show the trigs, or clicks off to not show the trigs.

Illustratively, FIG. 28 is a diagram showing the report message of FIG. 2 with trigs vis-à-vis a report message without trigs, in accordance with one embodiment of the invention. Specifically, the GUI 2812 shows a report message 2822 with trigs. The GUI 2814 shows a report message 2824 without trigs.

In a further embodiment, the server may determine whether other parameters are satisfied in order to determine whether to include trigs in a report message to the user. Illustratively, the server 200 may determine whether (1) a trig is positioned "first" in an add message AND whether the user's preferences are set to not send trigs back to the user, if the trig is first in the user's text message. As to the first parameter, the server 200 may simply determine whether the first string of characters in a user's "add message" includes an @, i.e. the trick. If both parameters are satisfied, then the server 200 outputs the report message to the user without trigs, as shown in FIG. 28 (GUI 2814). In such processing, it is envisioned that the report message may include trigs from some "add messages" (in which the trigs were not positioned first) and not include trigs from other add messages (in which the trigs were positioned first). This aspect, in and of itself, may provide desired functionality to some users. That is, the user may opt, "on the fly," to (1) put a trig first in a text message to the server if the user does NOT want to see the trig in a resulting report message; OR (2) not put a trig first in a text message to the server if the user wants to see the trig in a resulting report message from the server. The user might opt to retain trigs in some bins, but not others, for example. The particular positioning of a trig in a text message, and what position dictates what, is choice of design as reflected in the programming of the server 200. For example, it might be the case that if the trig is first, then the trig will be retained in the text message content.

In general, it is appreciated that functionality may be desired to present the content without the trigs, i.e. to present the user with non-trig content. This would provide a cleaner document for review and to further work with, which might be desirable for some users. In accordance with one embodiment of the invention, as noted above, it is appreciated that non-trig content is characterized as any character string in a text message that does not include a trick, i.e. that does not include an @. Thus, as is reflected in FIG. 28, any dashes or any other miscellaneous characters might well be included in a non-trig content report message. This is due to the processing (by the server 200) of only stripping out character strings that include a trick, i.e. the @ or other trick.

Figure 34:
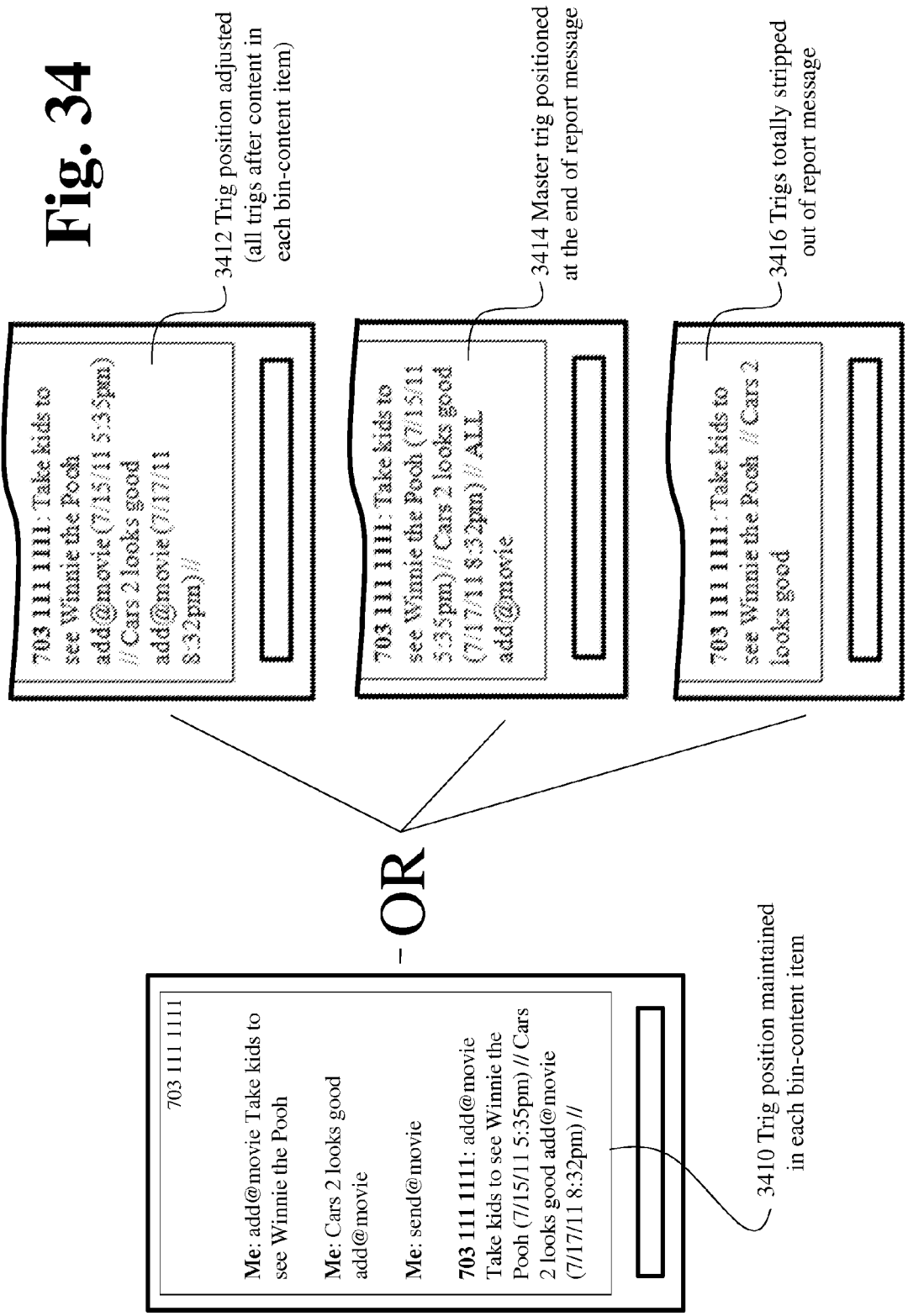
FIG. 34 is a diagram showing further aspects of trig presentation in a report message from the server 200, in accordance with one embodiment of the invention.

FIG. 34 is a diagram showing further aspects of manipulation and presentation of trigs, in content displayed to the user, in accordance with one embodiment of the invention.

As described above and reflected in FIG. 13, a user may be associated with multiple bin collections. On the other hand, a single bin collection and/or a single bin may be associated with multiple users. In the situation where a user is associated with multiple bin collections, it is appreciated that the server needs to input sufficient information such that communications from the user are processable. For example, although the user's bins are in different collections, the names of all the user's bins may be different. Accordingly, the server 200 may work off the user's phone number (used by the user in text messaging) and the particular bin name—such as in the case of an "add message" from a single user, for example. In the case where the user's bin collections have similar (or the same names), a secondary trig might be utilized to specify the particular bin collection to which the content should be added. Other parameters may be used to specify the particular bin collection and/or the particular bin to which a command should be applied.

A bin collection may also be associated with multiple user's devices, e.g. such that a husband and wife (or some other affiliated persons) might all populate bins in the bin collection. In accordance with one embodiment of the invention, there might be provided a first user, e.g. a core user, and secondary user(s). The server might be programmed to receive text messages, i.e. content, from any user device that is affiliated with the bin collection. Relatedly, a particular user's bin collection might have some bins that are accessible by other designated persons, some bins to which content may be added by other designated persons, and/or some bins from which content may be pulled by other designated persons, for example. In general the server 200 may be provided to limit functionality and limit access by persons other than the first user. In general, it is appreciated that access by particular users to particular bins or bin collections may be controlled as desired, such as by a user setting preferences of his or her bin collection, and the server working off of the respective numbers from which text messages are sent, i.e. the server allowing access based on the user's phone/text number.

One example of such multi-user processing is multiple people contributing to a shopping list. In this example, a user may have the eight bins of FIG. 22 in her bin collection. Seven of the bins are only accessible by her, the core user. However, by the preferences that she has set, the "Shoplist" bin is accessible by her roommate. Accordingly, the server 200 accepts text messages (e.g. add and send messages) from both her and her roommate to populate, i.e. add to the shoplist bin. Both users may contribute to the content of the bin throughout the week, as they think of things needed for their apartment or as they run out of an item, for example. For example, upon one of the roommates finishing off the salsa, she sends a text message to the server 200 "add@sh Salsa". At the end of the week when at the store, either may send a "send message" to the server 200 (e.g. send@shoplist) so as to pull content from the shoplist bin. Accordingly, the At-It system 10 has provided a tool by which the roommates may aggregate all their thoughts over the course of a busy week (regarding items needed in their apartment), and by which either may pull that aggregated content at a desired time, i.e. when they are at the store.

In accordance with one embodiment of the invention, the At-It system 10 provides what is herein characterized as a "trig map" feature. FIG. 29 is a user interface showing aspects of a trig map 2910 in accordance with one embodiment of the invention. The trig map allows a user to associate short strings of characters, i.e. "list-trigs," with content. The content might be, for example, lists of items the user wishes to recall at some time in the future. One aspect of the relationship of the trig map feature vis-à-vis the processing described above using add messages (e.g. see FIG. 2) is that trig maps are preferably, in accordance with one embodiment, populated by the user via web page or mobile application (as shown in FIG. 29) versus populated via text message (FIG. 2). However, both are retrievable via text message or web page, for example, or otherwise. If retrieving via text message, the user does need to remember the particular list-trig she wishes to retrieve and generally what content is associated with a particular list-trig. In accordance with one embodiment of the invention, the user may send a text message of suitable format (send@triglist) to the server 200—such that the server 200 is prompted to send a list of the user's list-trigs, so as to remind the user of all his or her list trigs.

Accordingly, the trig map feature provides for a user to create a trig-map item 2920 by populating two fields, i.e., entering text into the both fields of the trig map, that the server 200 then associates with each other. The two fields, as shown in FIG. 29, are characterized as a "list-trig" field 2922 and a "responsive content" field 2924. As noted above, the user accesses and populates both fields (i.e. populates by selecting a field and typing in text), as shown in the user interface of FIG. 29. Accordingly, trig map-items 2920 may be populated via web page as shown in FIG. 29 or via suitable mobile application, i.e. smartphone app, for example. Alternatively, trig map-items may be populated with text messaging using some predetermined trig sequence, for example.

It is of course appreciated that functionality described herein in the environment of text messaging, may also be applied in the environment of other types of communications, such as e-mail, for example. Thus, illustratively, trig map-items may also be populated using e-mail. In general, it is further noted that features described herein as used with a particular type of communication (e.g. text message or e-mail) may also be used with other types of communication (e.g. text message or e-mail).

Accordingly, as described herein, each trig-map item 2920 (in the trig map 2910) includes both a list-trig 2922 and responsive content 2924, which corresponds to that list-trig. FIG. 29 shows a box 2930 that the user clicks to add a further trig-map item. FIG. 29 also shows a box 2940 that the user clicks to accept a further trig-map item, i.e. once the user has typed in the desired text—to populate the trig-map item. The box 2940 may be lighter in color (not active) prior to a trig-map item being properly populated by the user, i.e. properly populated meaning that both fields 2922, 2924, are populated with acceptable data by the user.

In this embodiment, each "list-trig" created by the user includes an @ and is in a particular format, so that the server 200 knows that the character string is indeed a trig, and that the server 200 needs to act on, i.e. respond to, such trig. Thus, the user is provided the ability to essentially "coin" or come up with his or her own "list-trig" names. It is appreciated that certain formats may need to be adhered to by the user. For example, the user's list-trig cannot be of a format to be indistinguishable vis-à-vis the example messages of FIG. 4, such as an add message, for example. The needed format might be imposed by the server 200 in any suitable manner, such as by checking the list-trig format upon the user populating the field, and advising the user via dialogue box if the list-trig is not of a workable/acceptable format.

In accordance with embodiments of the invention, the server is essentially blind to the particular text that is in the "list-trig" field and the "responsive content" field, other than confirming the list-trig is of an acceptable format. That is, in this aspect of the processing, all the server 200 knows is that if the server receives a list-trig 2922 from the user (via text message), then the server sends the responsive content 2924 that corresponds with such list-trig back to the user (via text message). Trig map processing may utilize fuzzy logic, such that text observed in a text message from the user that is close in spelling to a list-trig may be interpreted by the server to constitute the list-trig. Other communication channels may be utilized.

It is appreciated that a trig-map item may be related to one or more other trig-map items. Accordingly, multiple trig-map items might be grouped into folders or in some other way associated with each other. In one embodiment, in response to a predetermined trig, the server is provided to send the user a listing of all her list-trigs 2922 and responsive content 2924.

Relatedly, in accordance with an embodiment of the invention, it is appreciated that bin content may also be fully editable by the user, such as via web page or app on the user's phone. For example, the user may be provided the ability to edit (or add to) bin content as shown in FIG. 21. The server 200 might reflect changes or additions to bin content in some suitable manner For example, the server 200 might generate an "edited" indicia next to content that has been edited, and/or the server 200 might generate an "added" indicia next to content that has been added. Time stamp information and/or other attributes may be associated with such edited or added content as desired. Changes to a trig-map item might also be reflected with suitable indicia, if desired.

Accordingly, with both bin content (as shown in FIG. 21, for example) and trig-map item content (as shown in FIG. 29, for example), a user might copy and paste text as desired, or otherwise manipulate the text. For example, the user might copy text from a bin, paste that text into MICROSOFT WORD (so as to utilize available features to organize the text), and then paste the revised text into a trig-map item that the user has created.

As described above, content that is input to a bin of the user (in the user's bin collection) might be output to a GOOGLE DOC document and shared with friends using such document, or otherwise shared. Also described above is that the server 200 may send the content of a particular bin to other third persons, e.g. friends, using a communication channel (text message, e-mail, phone, for example) as desired.

Relatedly, FIG. 30 is a diagram showing the output of content from a user's bin to a social network in accordance with one embodiment of the invention. As shown in FIG. 30, the text message is sent by the user to the server 200. The content of the text message is "add@fbwall Headed to NYC tonight—dinner with old friends". The text message is input by the server 200. Based on the trig, the server 200 knows to place the content of the text message into the user's "fbwall" bin. Upon the content being placed into the user's fbwall bin, i.e. a queue of sorts, processing is initiated to retrieve the processing particulars associated with that bin (see also FIG. 10 above regarding processing particulars). Accordingly, the processing particulars of the bin are retrieved by the server 200. Such processing particulars, in this example, dictate that content added to the "fbwall" bin should be output to the user's WALL on FACEBOOK. Accordingly, the server outputs the content to the user's FACEBOOK WALL in a predetermined manner. This might be performed by the server 200 "talking" to the Facebook server or in some other manner interfacing with the FACEBOOK server so as to transmit the content, i.e. the non-trig content, from the fbwall bin of the user to the user's FACEBOOK WALL. As reflected in FIG. 30, in accordance with embodiments of the invention, the server 200 may strip out the trig from the content, which was placed into the fbwall bin, prior to that content being output to FACEBOOK. Accordingly, the message that is transmitted from the server 200 to FACEBOOK in this example is "Headed to NYC tonight—dinner with old friends". The invention thus provides the capability for a user to send a text message using her smartphone, for example, to the server 200—so as to post that content onto her FACEBOOK WALL. Accordingly, At-It processing may be utilized to provide API functionality, as illustrated in FIG. 30.

In accordance with embodiments of the invention, it is appreciated that the processing of the add@fbwall message may be performed using alternative processing, i.e. other than placing the content into the fbwall bin, for example. Indeed, the content need not even be placed into a bin. Rather, in accordance with one embodiment of the invention, the server simply knows from the "fbwall" bin label (in the text message from the user) that the server 200 is to forward the content onto the FACEBOOK server.

It is of course appreciated that the invention is not limited to output to FACEBOOK. Rather, using the processing of FIG. 30, content from a particular user bin may be output to some other social network or, in general, output to some other processing system, database, person or other destination, for example. Such output may utilize a communication channel as desired. For example, such other processing system or database might be constituted by an entity such as EVERNOTE or SPRINGPAD. Relatedly, in embodiments of the invention, a data structure disposed in the system of an entity such as EVERNOTE or SPRINGPAD, for example, might indeed constitute a bin in a user's bin collection. With such arrangement, a user might leverage processing capabilities of the At-It system, as well as processing capabilities of another entity, such EVERNOTE or SPRINGPAD, for example.

As described above, the processing particulars associated with a particular bin dictates that the server 200 strips the trig out of content, which is added to the particular bin, and transmits the non-trig content to FACEBOOK, for posting on the user's FACEBOOK WALL. In other embodiments, it is appreciated that the processing particulars of a particular bin might instead dictate other processing. For example, the processing particulars might dictate the content added to a bin is to be sent to a specified e-mail address, a phone call effected, a text message sent so as to control a device or system, or other communication sent via some other communication channel for example.

In accordance with embodiments of the invention, it is appreciated that the bin collection of the user may be more complex than a single layer architecture, as reflected in the bin collection of FIG. 10, for example. That is, it is envisioned that a bin collection of a user may include sub-bins, folders, or in some other manner be arranged in a grouped or hierarchical manner. For example, the quotes bin of FIG. 10 may be associated with sub-bins for various people. Manipulation, such as adding content to a sub-bin or retrieving content from a sub-bin may be performed using trigs that are uniquely associated with such sub-bin. Alternatively, manipulation of a sub-bin by the user might be performed using a first trig directed to the highest level bin and a secondary trig to control placement in a particular sub-bin positioned below that highest level bin, for example. Accordingly, each sub-bin might be associated with a respective secondary trig so as to control placement of content into such sub-bin. In accordance with one embodiment, the trig to add content to a sub-bin is in the format of "add@conference-tech", for example. In this example, the user has a "conference bin", and in that "conference" bin are sub-bins named "tech" and "people". Accordingly, the user can add general thoughts to the "conference" bin, specific thoughts about technology to her "tech" bin, and specific thoughts about people the user meets at the conference to her "people" bin. This bin structure is helpful in that all the content in the bin "conference" relates to thoughts the user had while attending the conference. In addition, the bin structure allows the user to further divvy out her thoughts, as desired, to the "tech" bin or the "people" bin. In this example, the trig "add@conference-tech" would result in the server adding the content into the user's "tech" bin, which is disposed in her "conference" bin. In processing, the server determines from the trig that this is an "add" message, and that the server should place content in such users "add" message into the user's "tech" bin, which is disposed in her "conference" bin.

In accordance with one embodiment of the invention, a bin collection may include a general trip bin that includes items to remember for all trips, such as glasses, phone charger and other general items, for example. Such general bin might be used in conjunction, i.e. grouped with, more specialized bins of the user, such as beach bin, ski trip bin, and hiking bin, for example—each of which includes listing of more specialized items to remember for the particular type of trip. Over time, the user may add items to both types of bins using a suitable trig. In planning for a trip, the user may send a suitable "send message" to the server to pull both the general bin and one of the specialized bins. The report message from the server 200 aggregates the two bins, i.e. combines the content from the two bins. Accordingly, the user is presented with a useful list to help her or him remember needed items in the upcoming trip.

In accordance with one embodiment of the invention as described herein, in conjunction with a send message from the user, the user can specify that she only wants content from a particular time window, such as between certain dates, for example. It is also appreciated that other mechanisms may be provided to control the particular content from a bin that is forwarded back to the user from the server 200, i.e. upon receiving a "send" message from the user. For example, as shown in FIG. 21, each item of content in the user's bin might be associated with a "send" button 2120. The send button may be selectable by the user to toggle back and forth between sending such item of content in response to a send text message (from the user to the server) vis-à-vis not sending such item of content in response to a send text message. Accordingly, via webpage or app, for example, the user is provided the ability to go through all the items of content in a particular bin and choose what content the user would like sent in response to a "send" message (from the user) sometime in the future. The GUI 2101 of FIG. 21 might also be provided with an e-mail button and a sync button, which are associated with a respective BCI. By tapping one of such buttons, the user initiates server processing to e-mail or sync the particular BCI with some predetermined destination. The user might be presented with a further interface or dialogue box to control such destination. As used herein, the terms, select, click and similar terms to reflect the user interfacing with the user device have been used interchangeably.

In accordance with one embodiment of the invention, server 200 may be programmed to automatically create a bin in response to an "add" message being received from the user. For example, the server might receive a text message from the user with the content: add@book Lord of the Rings, TOLKIEN. In this example, the user does not have a "book" bin. The server recognizes the text message as an add message and also knows that the content with trig does not associate with any existing bin of the user. Upon such determination, the server 200 creates a new bin: book. In accordance with a further variation of this feature, a secondary trig might be utilized (that is included in the text message from the user to the server). The secondary trig tells the server 200 that a new bin should be created—and tells the server that the content (in the text message) is to be added to that newly created bin. For example, the secondary trig might be: @new. As otherwise described herein, it is appreciated that various commands may be included in text messages from the user to the server 200, so as to perform desired processing.

In accordance with one embodiment of the invention, the bins in a bin collection of a user and/or the data in those bins might be manipulated in tranches, i.e. in some collective manner. For example, the user, via user preference in the server 200, might dictate that he wants the server to send report messages from some bins via text message. However, with other bins, the server 200 is dictated to send report messages via e-mail. In general, it is appreciated that user preferences may be provided to dictate processing in some collective manner As described above, in accordance with one embodiment of the invention, the server may retain an identity of a bin that is static. That static identity may be mapped to a corresponding bin name, which is presented to the user (and by which the user knows the bin). FIG. 31 is a diagram showing aspects of creation of a new bin and file structure in accordance with one embodiment of the invention. As shown, the server 200 Server inputs a text message from the user with the character string "newbin@books" as a trig. Accordingly, the server generates a new bin named "books".

Illustratively, UB3116 (meaning UserBin 3116) is the file name the server associates with, i.e. maps to, the newly created bin named "books". If the user opts to change the name of the bin (at some later time), the file name UB3116 is retained, but is merely mapped to the new name chosen by the user.

It is appreciated that "commands" as used in a trig may be structured in a similar manner. Accordingly, in accordance with one embodiment of the invention, a user may change a "command" name. Such might be desirable if another command name might be more intuitive to the particular user.

In accordance with some embodiments of the invention, the server 200 may not allow trigs names or existing bin names to be changed. However, the server might allow a user to copy a bin (including the contents thereof) and name such newly created bin as desired.

Figure 32:
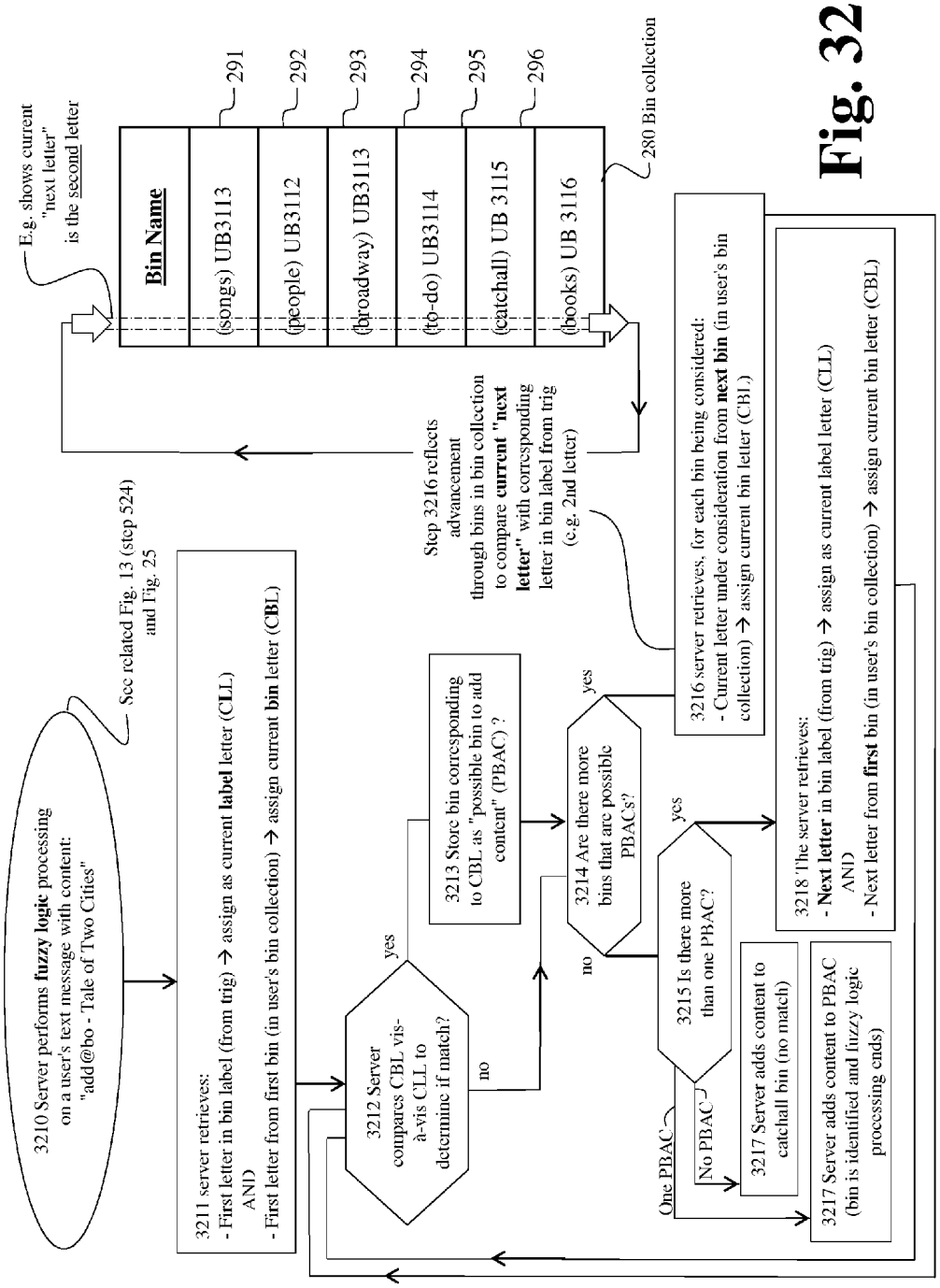
FIG. 32 is a flow chart showing fuzzy logic related processing in accordance with one embodiment of the invention.

FIG. 32 is a flow chart showing fuzzy logic related processing in accordance with one embodiment of the invention. As shown in FIG. 32, the process starts in step 3210 in which the server 200 initiates fuzzy logic processing on a user's text message with the content "add@bo Tale of Two Cities". Accordingly, in this example, the user is knowingly utilizing fuzzy logic processing in only including, in her texted trig, the first two letters of one of her bins. FIG. 32 shows processing related to FIG. 13 (step 524) and FIG. 25. After starting in step 3210 of FIG. 32, the process passes to step 3211. In step 3211, the server retrieves the first letter in the bin label (from the trig), and assigns that letter to a variable "current label letter (CLL)." The server also retrieves the first letter from the first bin (in the user's bin collection) and assigns that letter to a variable "current bin letter (CBL)." Then, the process passes to step 3212. In step 3212, the server compares the CLL vis-à-vis the CBL to determine if the two variables match. If there is a match, then such match indicates that such bin (in the user's bin collection) is a possible candidate to satisfy the user's "add" request. Accordingly, the processing passes to step 3213 in which the server stores the bin (corresponding to the CBL) as a "possible bin to add the content" (PBAC). After step 3213, the process passes to step 3214.

On the other hand, if no in step 3212, i.e. there was not a match, the processing passes directly to step 3214. In step 3214, the server determines whether there are more bins that are possible PBACs. In the first pass of the processing through all the user's bins (i.e. with the first letter of the bin label vis-à-vis bin name) all the bins will initially be considered to be PBACs. After comparing the first letter in the bin label (in the trig) vis-à-vis the first letter in each of the bin names, only matches are retained as PBACs. Accordingly, returning to step 3214, if "yes" in step 3214, then the processing passes to step 3216. In step 3216, the server retrieves (for each bin still under consideration) the current letter (under consideration) from the next bin (in the user's bin collection), and assigns as the current bin letter (CBL) variable. In the example of FIG. 32, in the first processing of step 3216, the server would retrieve the letter "p" from the people bin. Then, the processing passes back to step 3212, as reflected in FIG. 32.

Accordingly, as shown in FIG. 32, step 3216 reflects a processing step to advance through the bins in the bin collection to compare the CLL (from the bin label of the trig) vis-à-vis the corresponding letter from each bin. Thus, step 3216 reflects that the server will first take the "b" (from the trig) in the example of FIG. 32, and compare that "b" with the first letter of each of the bins (in the user's bin collection), i.e. iteratively performing steps 3216, 3212, 3213 (if match), and 3214. That is, in this example, using such iterative processing, the server compares the "b" in the trig vis-à-vis each of s, p, b, t, c, and b—i.e. the first letter of each bin. The dashed line of FIG. 32 reflects this respective comparison of the first letter in the bins in the user's bin collection. After processing the "b" of books in step 3212 and step 3213 (and identifying such as a PBAC), the processing will yield a "no" in step 3214, i.e. since "books" is the last bin (in the user's bin collection).

Thus, upon "no" in step 3214, the process passes to step 3215. In step 3215, the server determines whether there is more than one PBAC. In this example, upon completion of the first pass through the bin collection (with the first letter of each bin name), the server will identify that there are two PBACs, i.e. the "broadway" bin and the "books" bin. Accordingly, the process passes from step 3215 to step 3218. In step 3218, the server advances to the next letter in the bin label in the trig, i.e. the letter "o". Specifically, in step 3218, the server retrieves the next letter in the bin label (from the trig) and assigns such as the current label letter (CLL), AND the server retrieves the next letter from the first bin (in the user's bin collection) and assigns such as the current bin letter (CBL).

The server then iteratively performs the processing of steps 3212, 3213 (if match), 3214, and 3216 for each bin now being considered, i.e. each PBAC. Accordingly, from the processing described above, the bins songs, people, to-do, and catchall will be eliminated as PBACs. Thus, the server will move on to compare the "o" (the second letter in the trig from the user) with the second letter from the user's bins still under consideration: broadway and books, i.e. "r" and "o" respectively. After such two comparisons, "broadway" will no longer be a PBAC due to a "no" match (step 3212) between the "o" in the trig vis-à-vis the "r" of broadway. Also, after such two comparisons, the processing will yield a "no" in step 3214, i.e. since there were only the two bins (broadway and books) still under consideration. Thus, the process will pass to step 3215. In step 3215, the server 200 determines that there is only one PBCA. Thus, the process passes to step 3217. In step 3217, the server adds the text message content "add@bo—Tale of Two Cities" to the user's "books" bin. Thus, the fuzzy logic processing has successfully identified the desired bin in which to place the content.

As shown in FIG. 32, step 3217 reflects a situation in which there was not a match identified. For example, if the user had submitted the text message content "add@movie ironman2 must see", the server 200 would not have identified a bin (in the bin collection of FIG. 32), and thus the text message content would have been placed in the "catchall" bin.

It is appreciated that FIG. 32 is one methodology by which to analyze a trig (and specifically the "bin label" in such trig) from a user—in order to identify a corresponding bin in the user's bin collection, in which to place the text message content. Other methodologies may of course be used including various known search and comparison methodologies. In particular, searching algorithms may be utilized, such as sequential searching in which all the items in a data structure are examined until the desired item is located; and/or binary searching in which a previously sorted list of items is progressively divided in half until the desired item is located.

Accordingly, the invention is not limited to that methodology set forth in FIG. 32. Also, the fuzzy logic processing of FIG. 32 is not limited to bin labels, but could also be applied to other strings of characters, such as a "command" in a trig, for example.

Figure 33:
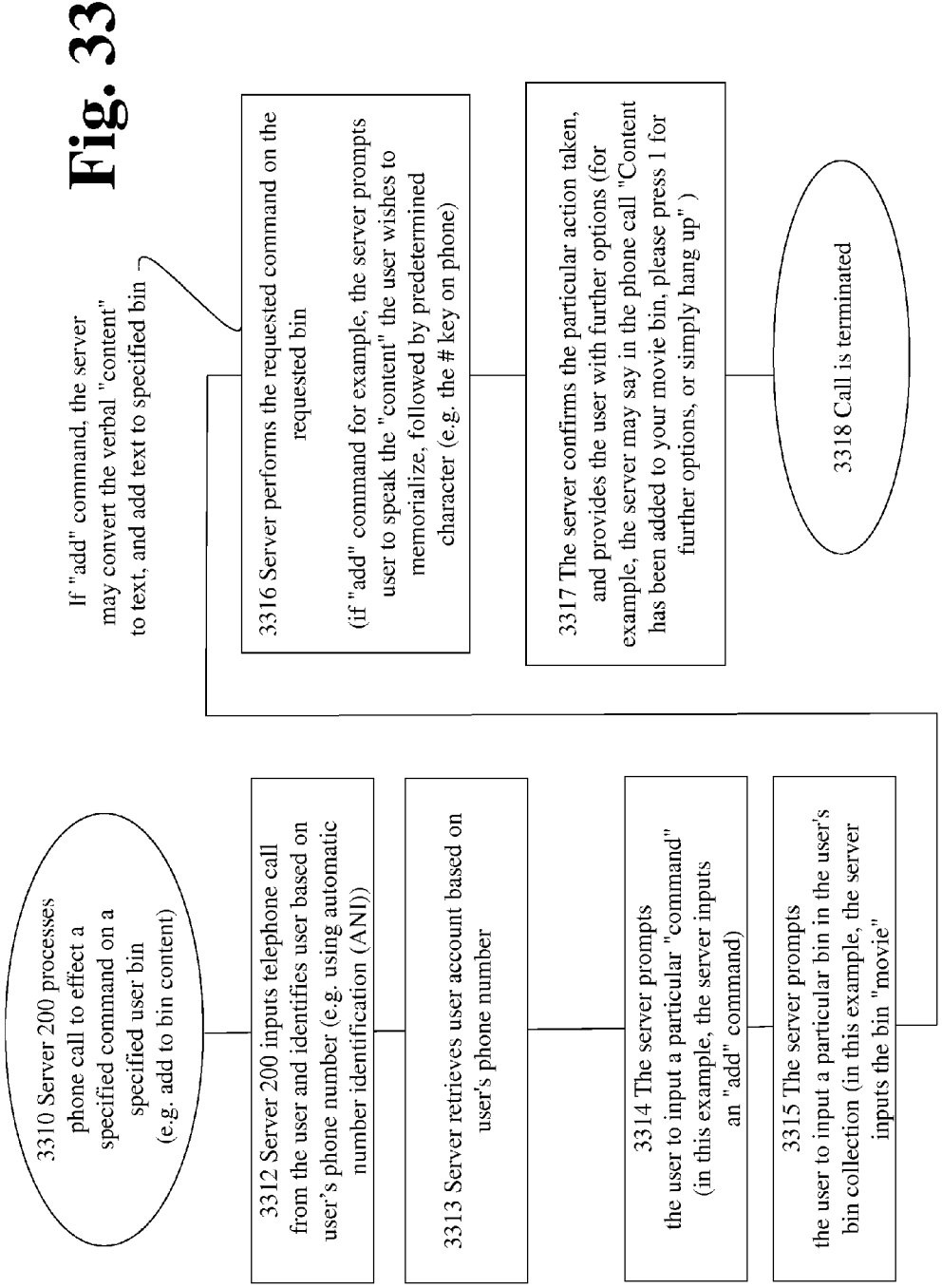
FIG. 33 is a flowchart illustrating server processing of an incoming telephone call in accordance with one embodiment of the invention.

In accordance with further features of the invention, FIG. 33 is a flowchart illustrating server processing of an incoming telephone call in accordance with one embodiment of the invention. In particular, FIG. 33 illustrates the server processing a phone call to effect a specified command on a specified user bin. Accordingly, FIG. 33 illustrates processing in which the user's bin are manipulated using a different communication channel, i.e. the telephone. The process of FIG. 33 starts in step 3310 and passes to step 3312.

In step 3312, the server 200 inputs a telephone call from the user and identifies the user based on the user's phone number (e.g. using automatic number identification (ANI)). Then, in step 3313, the server retrieves the user's account based on the user's phone number. After step 3313, the process passes to step 3314.

In step 3314, the server prompts the user to input a particular "command." In this example, the server inputs an "add" command. For example, the server might verbalize to the user, via the phone call:

Please select the command you wish to activate. To add content to one of your bins press 1, to send content from one of your bins press 2, to clear content from one of your bins press 3, to create a new bin in your bin collection press 4, to delete a bin in your bin collection press 5.

After step 3314, the process passes to step 3315. In step 3315, the server prompts the user to input a particular bin in the user's bin collection. In this example, the server inputs the bin "movie" from the user. Such input of a particular bin (in the user's bin collection) might be performed in the same manner as the user selected the command, i.e. the server verbalizes the bins to the user followed by a particular number to select. For example, the server might electronically verbalize:

Please select the bin in your bin collection you wish to use. For your song bin press 1, for your people bin press 2, for your broadway bin press 3, . . . .

After the user has selected the particular bin in step 3315, the process passes to step 3316.

In step 3316, the server performs the requested command (as determined in step 3314) on the requested bin (as determined in step 3315). If the requested command is an "add" command, as in this example, the server prompts the user to speak the "content" the user wishes to memorialize, followed by a predetermined character (e.g. the # key on phone). Accordingly, the server inputs the spoken content the user wishes to memorialize. To demarcate the end of the spoken content, the server detects the user pressing the # key on her phone. Then, the process passes to step 3317.

In step 3317, the server confirms to the user the particular action taken, and provides the user with further options. For example, the server may verbalize in the phone call "content has been added to your movie bin, please press 1 for further options, or simply hang up." Then, in step 3318, the call is terminated—"At-It thanks you for your add message."

Accordingly, the user may add content to a bin, pull content from a bin, or perform other manipulation of the bins (in the user's bin collection) via a telephone call, and in particular, for example, by calling the server 200 and interfacing with the server using the keypad on the user's telephone, or equivalent voice recognition capability by the server.

In accordance with embodiments of the invention, as described herein, it is appreciated that e-mail communications may also be leveraged by the features of the invention. In accordance with embodiments of the invention, the subject line of an e-mail message (and/or the body of an e-mail) may be designated to function in the same manner as a text message, as described herein. Accordingly, for example, upon receiving an e-mail from the user, the server identifies the user based on his or her e-mail address. The server then looks to the subject line and/or the body of the e-mail to identify a trig. Further processing may then be performed (based on that trig) in manner similar to text message processing as described herein.

Relatedly, it is appreciated that communications may be converted between the server 200 and the user device, for example. Illustratively, a communication might be output from the server 200 as an e-mail and converted, i.e. transformed, by a communications service carrier to a text message, for delivery to the user device 100. Alternatively, a text message communication from the server 200 might be converted to an e-mail for delivery to the user device 100. In reverse manner, communications transmitted from the user device 100 to the server 200 may also be converted.

In accordance with aspects of the invention, text message and e-mail provide powerful transfer agents, while also adding respective possible user customization and convenient messaging capability. Text messages crafted to be sent from the user to the At-It server (for processing) could be sent using text messaging, but addressed to an At-It email address. The At-It e-mail address might be the common address for a plurality of users (in which case the At-It server would determine a particular user (who sent the communication) by the sent address of the particular user). Alternatively, however, the At-It system may provide each user with his or her respective personalized e-mail address (i.e. joesmith@At-It.com (or joesmith@texstow.com) for example). As described above, various communications service carriers have e-mail-to-text services, as well as text-to-e-mail services, i.e. the communications service carriers convert text to e-mail, and/or e-mail to text. Accordingly, messaging between users and the At-It server can be easily facilitated. Indeed, in accordance with one embodiment, an At-It bin might be used as a contact list, i.e. an authorized, user approved entity sends an e-mail (with suitable trig) to the particular bin, and (based on the suitable trig), the server collects data and outputs such data back to the approved entity. For example, the suitable trig that the approved entity sends to the At-It server 200 might be in the form of "send@approvedcustomers". The server 200 retrieves the bin "approvedcustomers" that is associated with the approved entity, and sends the content in that approvedcustomers bin out to the approved entity. In this example, the approvedcustomers bin was previously populated with the contact information of users who had opted in, i.e. opted in to have the approved entity send him or her informational materials, for example. It is appreciated that such functionality is implementable in a wide variety of situations and environments.

Additionally, third party developers could use email functionality of the At-It server to simplify their web applications, i.e. simplify their web applications in that the third party developer could interface with the At-It server without the need for an API, other than an e-mail application. For example, if a social website wanted to post status updates to an At-It bin, all that would be required would be for the social website to send the status update (in a communication including a processable trig, for example) to the dedicated At-It e-mail address for that particular user.

As described above with reference to FIG. 28, report messages may or may not include trigs. FIG. 34 is a diagram showing further aspects of trig presentation in a report message from the server 200, in accordance with one embodiment of the invention.

As described above, the server sends a report message in response to a send message. In accordance with embodiments as shown in FIG. 34, the server 200 may reposition trigs that are included in the content of the report message.

In general, in accordance with embodiments of the invention, the server 200 may reposition trigs in communications to or from the server 200. To explain, in some embodiments of the invention, and in particular with add messages, it does not matter where the user places the trig in the text message. Regardless of whether the trig is placed in the beginning or the end, or the middle, the server 200 simply identifies the trig based on identifying the trick (in a character string in the text message). The server 200 then performs processing based on that trig, parsing both the "command" and the "bin label". As described herein, there may also be secondary trigs in a text message, which the server processes in conjunction with a primary trig.

Relatedly, the server 200 may reposition trigs that are included in the content of an add message (received from the user). For example, the server may move the trig in each text message to a desired location. The user may specify, by user preference, that she always wants trigs at the end of each bin-content item (in report messages from the server), for example. Such might be desirable in that the non-trig content would then be pushed to the end of the particular bin content item. Alternatively, the trig might always be repositioned by the server 200 to be positioned at the beginning of a particular bin-content item.

The trig in a bin content item might be repositioned prior to being added to the bin, prior to being forwarded out to the user in a report message, or at some other desired time. In conjunction with the user viewing her bin content via webpage or mobile application, the trigs might be hidden from view of the user, until the user clicks a suitable button indicating she wants to see the trigs.

Accordingly, as noted above, FIG. 34 is a diagram showing further aspects of trig presentation in a report message from the server 200. In accordance with one embodiment of the invention, the GUIs of FIG. 34 might be presented on the text messaging tool of a smartphone, for example. The GUI 3410 shows the trig position maintained in each bin-content item.

The GUI 3412 illustrates a report message in which the server 200 has adjusted the position of the trigs in each bin-content item. Specifically, the server has moved each of the trigs to the end of its respective bin-content item. The positioning may be adjusted as desired The GUI 3414 illustrates a report message in which the server has deleted all trigs from each bin-content item. However, the server has placed a master trig indication at the end of the report message. Specifically, the server has inserted the character string "ALL add@movie" to indicate that each bin-content item in the report message possesses the same trig. This may, in general be the case, i.e. since such same trig controlled placement of the content into the bin, i.e. upon receiving the respective initial "add message" from the user. The GUI 3416 illustrates a report message in which the server has deleted the trigs in each bin-content item. The GUI 3416 may be preferable to some users since it might be seen to present the cleanest presentation of content. It is appreciated that the respective presentations of content shown in FIG. 34 may be presented using the messaging tool of a smartphone, via web page or via mobile application, for example.

FIG. 35 is a GUI illustrating an allowance adder, in accordance with one embodiment of the invention. The allowance adder utilizes a special purpose bin, which is adapted to process trigs, received from the user via text message, in a particular manner As shown in FIG. 35, the user sends a first text message 3510 to the server "add@allowance 1". In response to receipt of the text message from the user, the server determines that the trig maps into the allowance bin of the user's bin collection, i.e. based on the bin label. The allowance bin is a special purpose bin that performs specialized processing. In this example, the specialized processing that the server is programmed to perform is to input the non-trig content (that is sent with an add@allowance trig), and to sum that non-trig content with previously submitted content, i.e. sum in the mathematical sense. As reflected in FIG. 35, such summation can include summing negative numbers.

Accordingly, the processing as depicted in FIG. 35 may be used as a tool to keep track of the allowance due to a child. For example, once the child completes a household task or in some other way earns $1, the parent sends the text message 3510 to the server. As noted above, the server processes the text message by summing $1 with any monies already summed in the allowance bin (of the user's bin collection). The text messages 3512 reflect further summing based on activity of the child. For example, the "add@allowance (−1)" may have been sent upon the parent paying $1 for a toy at some point in time, i.e. such that the child's allowance balance should be reduced by that value.

At some further point in time, the user decides she wishes to have the total summation, i.e. the balance in the allowance bin. Accordingly, she crafts and sends a text message 3514 to the server—"send@allowance". In response, the server sends a report message 3516 to the user—"Aggregated allowance is $4.50". Accordingly, leveraging text messaging that is readily accessible via the user's phone, the server 200 is adapted to perform processing to assist a parent with tracking his or her child's accumulation of allowance money. It is appreciated that a trig of different content, such as "add@allowance-rb" might be used to distinguish one child from another, i.e. in the situation where there are multiple children, and a respective allowance bin is dedicated to each child. Alternatively, a secondary trig might be utilized to uniquely identify a child vis-à-vis other children of the user.

It is appreciated that other bins may be provided by the server 200 that provide other specialized processing. In particular, such bins may be adapted to process the content of text messages in a particular manner, so as to yield a particular processing tool to the user.

In accordance with one embodiment of the invention, the At-It system and the processing as described herein might be conducive to gaming features. For example, a user might be presented with a data sheet of information. The user is tasked with segregating that information in some manner, sending the information (via send message) to appropriate bins in the user's bin collection, and then pulling that information out in some manner via report message. Third persons might be involved in the game, with the objective (of the user) to convey the information to such third persons in some logical manner Such processing might be timed in some manner and the user ranked based on his or her performance Such ranking might be used in the user's complexity score, as described herein. In summary, the user may be presented with a list of content, and the object of the game is to see how fast she can add that content into bins, and then pull out such content—to attain some objective. Various variations are within the scope of embodiments.

In accordance with one embodiment of the invention, the server 200 may monitor the pace at which the user adds content to her bins. That is, the user might tell the server 200, via a suitable dialogue box or text message, that she wants to add 5 songs to her music bin every week, for example. This might be desired by the user who wants to keep up with new songs coming out and/or in general to increase her iTUNES collection, for example. The server monitors each add message from the user that adds content to her music bin. In other words, the server 200 monitors how many add@music text messages the server has received from the user. At the end of the week, the server tells the user her status, and whether she is on pace. It is of course appreciated that any period of time might be utilized and the pace determined in any suitable manner, as desired. In general, such feature relating to the pace of additions to a particular bin may provide a useful tool in enriching a particular area of the user's life at a set pace. For example, every time the user takes a notable picture of her son, the user might text an add message to a suitable bin (in his bin collection) documenting such picture. If the user has specified to the server 200 that this should happen once a month, then the server 200 will text the user if such bin has not been added to at the end of a particular month, i.e. indicating that the user has not taken a notable picture of his son that week, and so that the user can remember to do so.

In accordance with one feature of the invention, a user may be assigned a complexity score, i.e. a ranking, as to the complexity of his or her use of the At-It system 10. In a fun and friendly competitive manner, the user might share her complexity score with friends, for example. The complexity score might be output to the particular user's social networking web page, for example, such that friends could view the score. The complexity score might also be characterized as a "thought tool score."

The complexity score might be based on and/or factor in a variety of parameters such as the number of text messages processed for the user by the server 200, the number of bins in the user's bin collection, the pace at which content is added to bins, the use of folders and sub-bins, the number of other users interfacing with the user's bin collection, the use of secondary trigs, the use of trig-map items, the use of fuzzy logic, as well as other parameters.

Relatedly, the server 200 may control functionality provided to the particular user based on the user's complexity score. For example, a new user with a low complexity score may not be provided with some functionality, such as use of secondary trigs in a text message to the server 200. Such ranking of how complex the user's use of the system is, and affording functionality based on such complexity ranking, may be helpful in avoiding frustration in a new user. That is, such might avoid giving a new user too much functionality, with which he or she is not familiar, and with which the user becomes frustrated.

In accordance with one embodiment of the invention, the ranking of a user, as to how complex a user is, might be correlated with a "level" in the At-It system 10. As the user works more with the At-It system 10, the user becomes a more complex user, and as a result, the user advances in level. The interrelationship between player experience and level advancement is of course known in the gaming environment. In accordance with one embodiment, the user may designate what level he or she wishes to belong to—in the At-It system. Such would place the user in further control of the sophistication of the At-It system 10 processing, which he or she is working to manipulate and use. Accordingly, if the user did become frustrated, the user would know that it was his or her decision to subscribe to the more complex processing, and thus hopefully mitigate the user's frustration.

In accordance with one embodiment of the invention, the server 200 provides a reminder feature. Illustratively, the user sends a text message to the server 200. The content of the text message is: "remind@3 pm6/15/2011 remember drill bit at homedepot for kid's wood pyramid".

Such text message is in a predetermined format and content that the user knows, and that the server 200 is programmed to understand. The text message tells the server 200 that the server should place the text message in queue, e.g. in a "reminder bin" and upon Jul. 15, 2011 at 3 pm, the server 200 sends the user back the very same content that was received. Such might be very helpful in a situation where the user knows that on Wednesday afternoon, he will be near the HOME DEPOT so that he can pick up the needed item, or for remembering any other task. Accordingly, it is appreciated that the server 200 may be utilized, using predetermined text messages, to provide a reminder at a desired future time. Instead of a particular date and time being specified, as in the example above, the user might simply specify a time period. For example, the user might specify that in 3 hours she wishes to be forwarded back content. Accordingly, such feature might be helpful in the situation that the user is out and about, remembers she needs to water the plants when she gets back, and sends a text message to the server 200: remind@3 hours water plants. The user might specify any desired time period. The server 200 is programmed to know that, in response to such text message, the server 200 is dictated to push that content back to the user in 3 hours. Later, at home, the user hears the ping of her smartphone indicating receipt of the text message from the server 200. The user might not even need to look at the text message "remind@3 hours water plants". Rather, the user will simply remember—"oh that's right, I need to water the plants." Accordingly, in a few quick key strokes, in sending the initial text message to the server 200, the user has provided herself a reminder of a needed task.

As described herein, the user may, in general, vary the particular channel that communications are output from the server 200. Accordingly, it is appreciated that the user may control the particular channel that a reminder is output from the server 200. Thus, a reminder might be output via text message, e-mail, or phone call, for example, or via some other channel.

In accordance with one embodiment of the invention, the At-It system 10 provides a reminder feature in conjunction with a particular bin. For example, through user interface with the server 200, the user may tell the server she wants a particular bin's content to be output to her at a particular time. For example, if a friend's (Jacob's) birthday is on December 9, the user may specify that she wishes the server to output all content from her "Jacob-bday" bin on December 1. That is, the user specifies that she wants a "report message" (see FIG. 4) on December 1 that reports all content from her "Jacob-bday" bin. Such feature allows the user to contribute to her "Jacob-bday" bin throughout the year (as she sees items that Jacob might like) and then receive all that content, which she has collected, on December 1. She thus is pushed useful, insightful information, in a timely manner, she has collected over the year, to effectively purchase a gift for Jacob's birthday. Similar processing might be utilized in a group bin environment. For example, multiple persons might contribute to a group bin throughout the year, with reminders being respectively sent to users based on his or her preference.

In accordance with one embodiment of the invention, a particular bin may have further reminder functionality associated with the particular bin. This functionality might be controlled by user preference as reflected in parameters contained in the processing particulars (see FIG. 10) of a particular bin. For example, the user might create a particular bin called "childchart" in which the user wants to memorialize the height and weight of her baby every month, as well as to remind her to take a picture. In other words, she has a particular objective in life that she wishes to attain using a particular bin in her bin collection. For the bin called "childchart," the user might set her user preferences to dictate that such bin "childchart" should be sent an "add" text message every month. The processing particulars associated with the childchart bin may further specify that if the server 200 does not receive a text message each month, then the server 200 sends a text message to the user as a reminder. The processing might provide for how aggressive the server 200 should be in terms of reminders. For example, if the user wants to be absolutely sure she remembers to document her child's height and weight every month, then she might set her user preferences to be very aggressive in reminding her to do so. For example, her user preferences might dictate that the server 200 should send her an initial reminder at the end of a month (in which no "add message" was received) followed by more frequent follow-up reminders. On the other hand, if the user just wants to document the information from time to time, then she might set her user preferences to just send a single reminder, and no follow-up reminders.

In such processing in this example, it is of course appreciated that the server 200 does not "know" the particular purpose for which the user wishes to have the monthly reminder, i.e. to record the growth of her child. The server 200 also does not know that the user will also use her interaction with her bin collection to also remind her to take a picture of her child, for example. Rather, the server knows that it should receive an add message in the user's "childchart" bin, and if the server does not, then the server 200 knows to send a reminder to the user, as well as follow-up reminders if the user has so specified in her preferences.

In accordance with one embodiment of the invention, the reminder functionality may involve communications to multiple persons. That is, in the example above, the user wanted to be reminded to document her child's height and weight every month. In a different scenario, a first person (the user) might be in a position to text information to the server 200, whereas a second person wants confirmation that the first person has indeed done so. For example, it might be the situation that a parent wants confirmation that her son has sent a certain number of text messages to a created bin—the user's "senior-year" bin (so as to document the user's senior year in high school). Accordingly the server 200 processes text message vis-à-vis the son as depicted in FIG. 2, i.e. with add and send messages. However, in addition, the server 200 sends predetermined metrics to the parent (such as how many add messages have been sent by the son to the senior-year bin, and the date of those messages) so that the parent can know the son is documenting his senior year in a desired manner. In this example, the parent is provided only with the metrics, e.g. how many add messages have been processed by the At-It server 200 and added to the senior-year bin, and not with the actual content of those text messages to/from the server 200.

In accordance with one embodiment of the invention, as controlled by user preference, the aggregation of content into a particular bin triggers particular processing to occur. For example, the user might dictate, through interfacing with the server 200 and setting of user preference, the server 200 to generate a report message after ten add messages have been sent to a particular bin in the user's bin collection, after which the content in the particular bin is deleted. Other automated processing may be provided.

A further example is that the At-It server 200 (through programming and user preference) automatically sends the contents from her "movie" bin to smartphone every Friday night at 5:45 pm. Such is related to the reminder features as described above. Illustratively, as the user is driving home from work, she hears the ping of a text message hitting her smartphone and remembers, based on the ping at 5:45, that she needs to drop by BLOCKBUSTER since it's movie night. That is, without looking at her smartphone, she knows the text is her movie reminder from At-It. Once at BLOCKBUSTER, she pulls out her DROID, for example, and sees the text message from the At-It server 200. The text message shows all the movies she has added to her movie bin over the last week, and prior thereto, or over some other desired time period.

FIG. 36 is a table showing select features of the At-It processing as described herein in accordance with one embodiment of the invention. Various features are described herein which are not listed in FIG. 36. However, FIG. 36 provides a sampling of the functionality afforded by the At-It systems and methods, as described herein.

As described in detail herein, in embodiments of the invention, the user sends and retrieves content from his or her bin collection stored in the server 200. It is appreciated that the invention may be leveraged by the user in a wide variety of ways above and beyond the actual computer processing and related manipulation of data described herein, i.e. "existential uses" as characterized herein. Illustratively, the user sends a text message to his "shop" bin with the text: add@shop remember to see list in wallet when go to HOME DEPOT. A week later, the user decides to stop in at HOME DEPOT, and retrieves the content from his shop bin, i.e. the user sends a text message to the server 200: send@shop. The server 200 replies by sending the user back all content from the shop bin, including the user's message "add@shop remember to see list in wallet when go to homedepot". Thus, the user is reminded that he had indeed tucked a list in his wallet, and that the user should refer to that list for some needed items.

In a further example, a user might hear a good song being played and simply want to remember the time and occurrence of that song. Accordingly, the user might craft and send a text message to the At-It server 200: 12:12-23 pm07222011 Hearing—Don't Stop Believing—great song add@music.

Accordingly, content forwarded back to the user from the server may convey substantial meaning to the user, above and beyond the actual content of the text message, limited only by the mental abilities of the user and the processing capabilities of the At-It server. In one aspect, the invention forces a categorization of thoughts that are forwarded to the server 200 using add messages, which may be highly desirable for some users. Relatedly, a few words in a text message may remind the user of an entire experience, which he or she might write down or otherwise capture at some more convenient time in the future. In such manner, the invention provides a highly useful tool, literally at the tip of a user's fingers, by which the user may capture life's memories, remind the user of needed tasks, and provide various other information. One objective of the invention is to pull information out of life's activities as easily as possible, and to store that information for later use. A memorable moment at a party might well disappear from thought in a matter of minutes, unless captured in some manner In accordance with embodiments of the invention, such capabilities are provided by the server 200 in conjunction with the user's mental prowess, using text message technology.

Further features of the systems and methods of the invention will hereinafter be described.

As described above, some bins in a user's bin collection may provide specialized processing. With a specialized processing bin, the user sends a text message to such specialized bin and particular rules are applied in processing that text message, in a predetermined manner. As a further example of such specialized processing, in one embodiment of the invention, a particular bin may have a predetermined limit of the number of "bin content items" that such particular bin can retain. If such bin is not full, then the server 200 takes particular action. On the other hand, if such bin is indeed full, then the server 200 takes other particular action. Such a bin might be characterized as a "max content bin," as described below and discussed with reference to FIG. 37.

For example, such specialized bin might be utilized in a sign-up situation, such as in a training class situation. A particular bin (in the user's bin collection) might be named "10session". Other related bins in the user's bin collection might be named "11session" and "12session". Such bins might be grouped in some logical manner In an illustrative situation, the user (a teacher) interacts with students to set the students up for one of the class sessions, i.e. the 10 am, 11 am, or 12 noon session. In this example, each of the sessions are for a maximum of 4 students. For example, the teacher might be talking with James, and James indicates he'd like to sign up for the 10 am training session. The teacher then checks availability using the At-It system.

Specifically, the teacher creates and sends a text message to the server 200 with the text "signup@10session James". The server 200 inputs the text message from the user (the teacher) and performs processing of the text message with trig. The server knows that the text message relates to the user's bin "10session", i.e. based on the bin label in the trig of the text message. Also, the server knows the text message includes the command "signup". The server first determines the number of bin content items in the bin 10session. If the server determines that less than the maximum number of bin content items are currently in the bin, then the server will add the content (in the received text message) to the bin. Accordingly, in this example, the server will determine if there are less than four bin content items in the bin 10session. If yes, then the server adds the content from the new text message, i.e. adds "James" to the bin "10session", and sends a text message back to the user indicating that the bin content item has indeed been added to the bin. For example, the content of the text message back to the user might be "James now added to the bin 10session". In generation of such text message, the server 200 combines the new content "James" with a predetermined phrase "now added to the bin"—along with the name of the bin "10session". The predetermined phrase "now added to the bin" might be changeable by the user, or may be coded into the algorithm of the specialized bin in such manner that such predetermined phrase is not changeable by the user.

On the other hand, the bin "10session" may be full, i.e., the bin 10session may already have four (4) bin content items. Accordingly, the content James is not added to the bin session 10. Instead, the server 200 generates a text message and sends the generated text message to the user. For example, the text message may indicate "10Session bin is full". Alternatively, the server may provide a more detailed message such as "The 10session bin is full (Sam, Joe, Maddie and Jill)—please text in request for further bin." Accordingly, the text message back to the user might specify the content already added to the 10session bin, for example the students that have already signed up for the 10 o'clock session.

Figure 37:
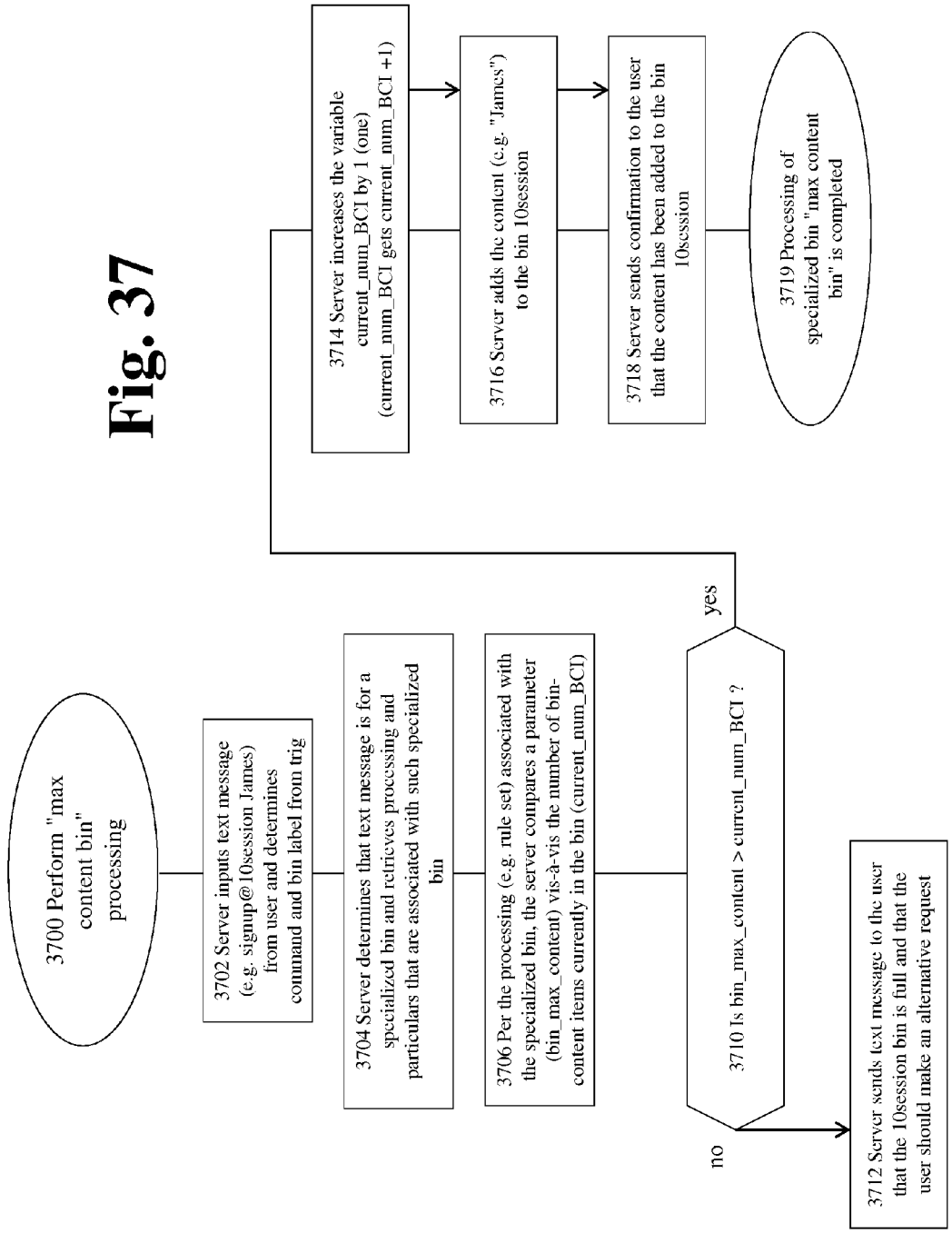
FIG. 37 is a flowchart showing further aspects of "max content bin" processing in accordance with one embodiment of the invention.

FIG. 37 is a flowchart showing further aspects of "max content bin" processing in accordance with one embodiment of the invention. As shown, the process starts in step 3700 and passes to step 3702. In step 3702, the server inputs a text message from the user. For example, the text message might be "signup@10session James". The server processes the text message to determine both the command "signup" as well as the bin label "10session". Both the command and the bin label are determined from the trig in the text message from the user. Then, the process passes to step 3704. In step 3704, the server determines that the text message is for a specialized bin and retrieves the particular processing and other particulars that are associated with such specialized bin. Then, the process passes to step 3706.

In step 3706, per the processing associated with the specialized bin, i.e. the rule set, the server compares a predetermined parameter vis-à-vis the number of bin content items currently in the particular bin. For example, the server compares a parameter (bin_max_content) vis-à-vis the number of bin-content items currently in the bin (current_num_BCI). Then, the process passes to step 3710.

In step 3710, the server determines whether the threshold situation is satisfied. Specifically, in the example of FIG. 37, the server determines:

Is bin_max_content>current_num_BCI?

If the determination is no in step 3710, then the process passes to step 3712. In step 3712, the server sends a text message, or some other suitable communication, to the user that the 10 session bin is full and that the user should make an alternative request. On the other hand, if the determination is yes in step 3710, then the process passes to step 3714.

In step 3714, the server increases the variable current_num_BCI by one:

(current_num_BCI gets current_num_BCI+1)

Then, in step 3716, the server adds the content, e.g., "James", to the bin 10session. Then, in step 3718, the server sends confirmation to the user that the content has been added to the bin 10session, as requested by the user. After step 3718, the process passes to step 3719.

In step 3719, processing of the specialized bin "max content bin" is completed.

In the example set forth above, only the user, i.e. the teacher, communicated to the server in manipulation of the teacher's bin collection. However, it is appreciated that in other embodiments, the user might open up access to specific bins so as to be manipulated by others. For example, in this embodiment, the teacher might allow each of the students, and provide each student with suitable credentials to do so, to interact with the teacher's bin collection. Accordingly, the student James himself could send the text message "signup@10session James" to the server 200 and in particular to the teacher's bin collection. Thus, James would be allowed to interact with a subpart of the teacher's bin collection so as to sign up for sessions, i.e. populate specific bins of the teacher, as well as to receive responsive content from the server regarding whether particular bins of the teacher had or had not reached their maximum capacity e.g. four students as described above. If the bins "10session", "11session" and "12session" are grouped in some manner, then access by such third persons might be provided only to bins in such particular group. Accordingly, it is appreciated that in general the groupings of bins may be utilized to control access and/or other manipulation of bins in the particular group.

Figure 38:
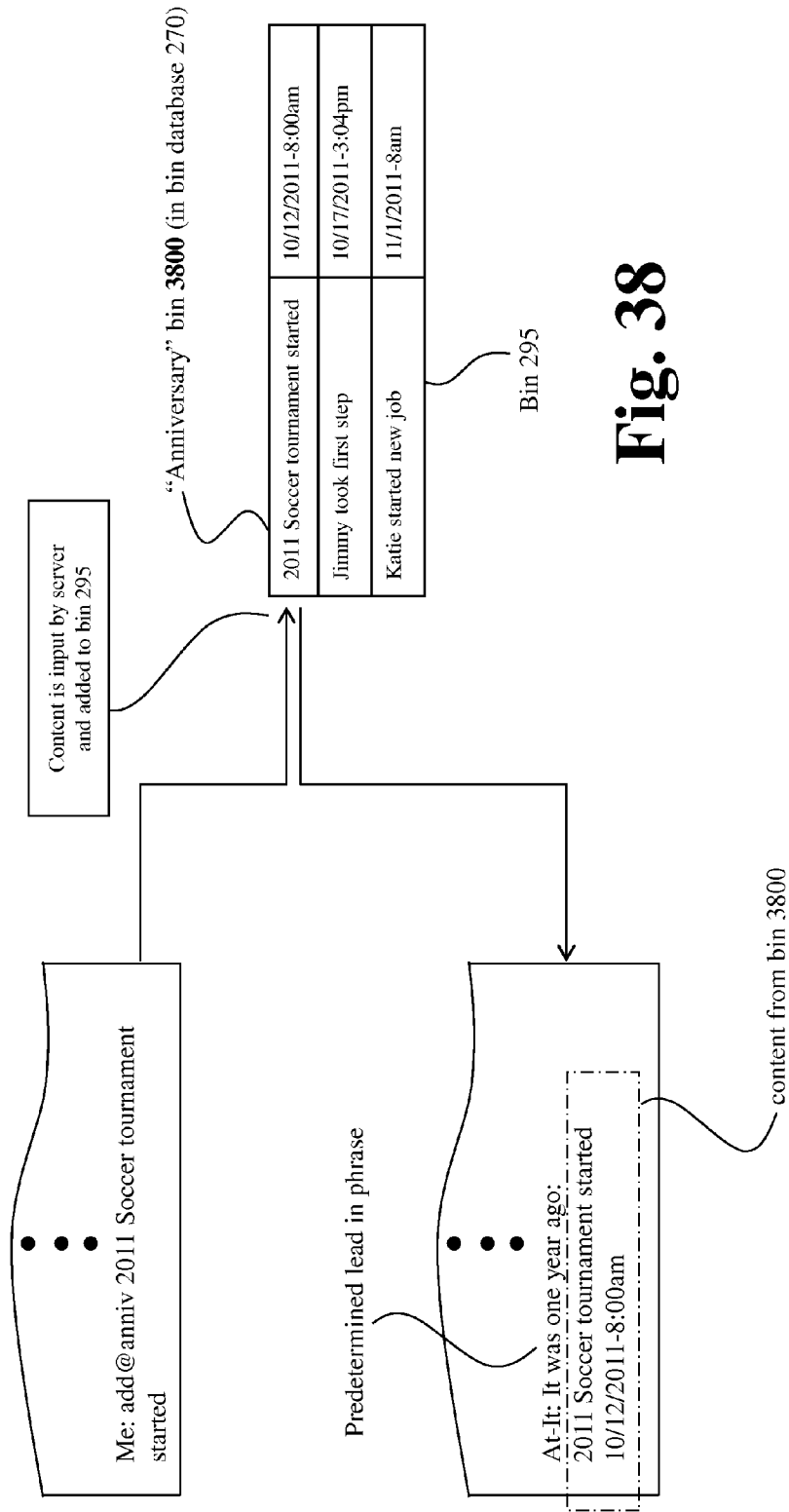
FIG. 38 is a diagram showing a further example of processing of a specialized bin (a year anniversary bin) in accordance with one embodiment of the invention.

FIG. 38 is a diagram showing a further example of processing of a specialized bin (a year anniversary bin 3800) in accordance with one embodiment of the invention. The processing performed by the anniversary bin 3800 includes inputting an "add message" from the user and adding a bin content item to the bin 3800 based on that add message. In addition to creating a bin content item to hold the content from the user, the server 200 also populates a date and time field in the bin content item. The date and time field documents when the text message was received from the user. Further, the processing associated with the bin 3800 includes the server sending the user a text message upon the year anniversary, i.e. one year after the text message was originally received from the user.

In the example of FIG. 38, the user has texted to the server "add@anniv 2011 Soccer tournament started". As reflected in FIG. 38, the server processes the text message based on the trig "add@anniv". That is, the command "add" tells the server to add the associated content to a bin, and the server determines the bin, to which the content should be added, based on the bin label "anniv". Accordingly, this example is illustrative of the server using fuzzy logic to map the abbreviated "anniv" bin label that was received from the user to the actual name of the bin "anniversary". As shown, the server populates the bin content item to reflect the date and time that such text message was received from the user, i.e. 10/12/2011—8 am. Accordingly, the functionality provided by the anniversary bin 3800 is that one year after receipt of the text message from the user, the server generates an anniversary text message and sends that text message to the user, i.e. to remind the user that it was one year ago that the particular event happened.

Figure 39:
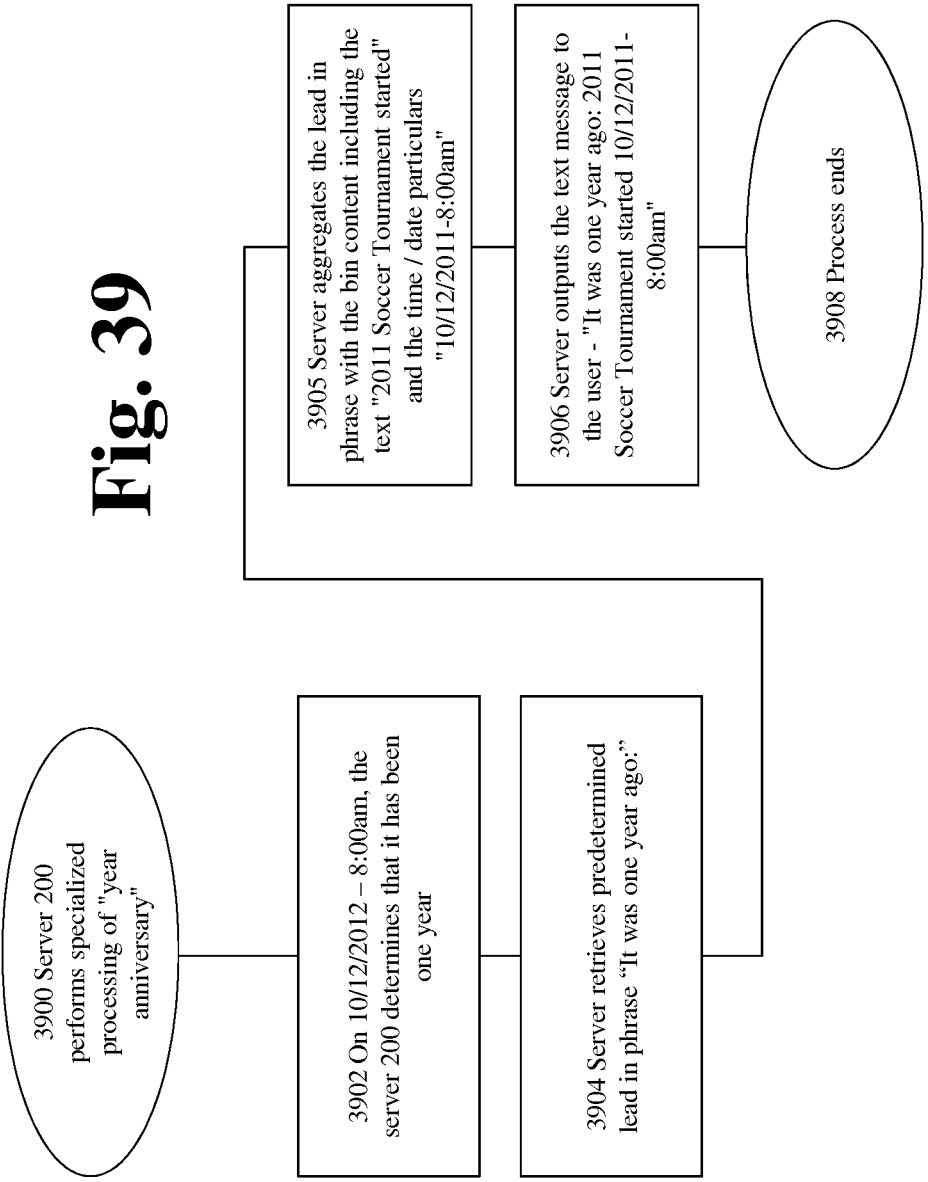
FIG. 39 is a flowchart showing further aspects of the processing of the specialized "year anniversary bin" in accordance with one embodiment of the invention.

FIG. 39 is a flowchart showing further aspects of the processing of the specialized "year anniversary bin" in accordance with one embodiment of the invention. That is, FIG. 39 shows the generation of the one year anniversary text message to the user. As shown, the processing starts in step 3900. Then, in step 3902, on 10/12/2012—8:00 am, the server 200 determines that it has been one year. The process then passes to step 3904.

In step 3904, the server retrieves a predetermined lead in phrase "It was one year ago:" Then, in step 3905, the server aggregates the lead in phrase with the bin content including the text "2011 Soccer Tournament started" and the time/date particulars "10/12/2011—8:00 am". Then, the process passes to step 3906.

In step 3906, the server outputs the text message to the user—"It was one year ago: 2011 Soccer Tournament started 10/12/2011—8:00 am". Accordingly, the user is reminded of the year anniversary of the particular event.

After step 3906, the process passes to step 3908. In step 3908, the process ends.

In this example, it is appreciated that particulars of an event including subject, date and time information may be pushed out to a destination document as desired, in addition to output to the user. For example, such particulars may be output by the server so as to populate a calendar of the user as desired. In general, it is appreciated that data disposed in a bin, including data in a bin content item, as well as particulars associated with such content, may be pushed out so as to populate a calendar or other document as desired. Accordingly, the server may populate a calendar based on the bin content items shown in FIG. 38, so as to remind the user of the momentous events in a particular time period.

The processing of FIG. 38 and FIG. 39 are described in the context of a one year anniversary. However, the invention is of course not limited to such time period. Rather, any suitable time period, such as a week or a month, might be utilized. Further, it is appreciated that the user might pull all content from the anniversary bin 3800 using a suitable trig, such as send@anniversary.

Figure 40:
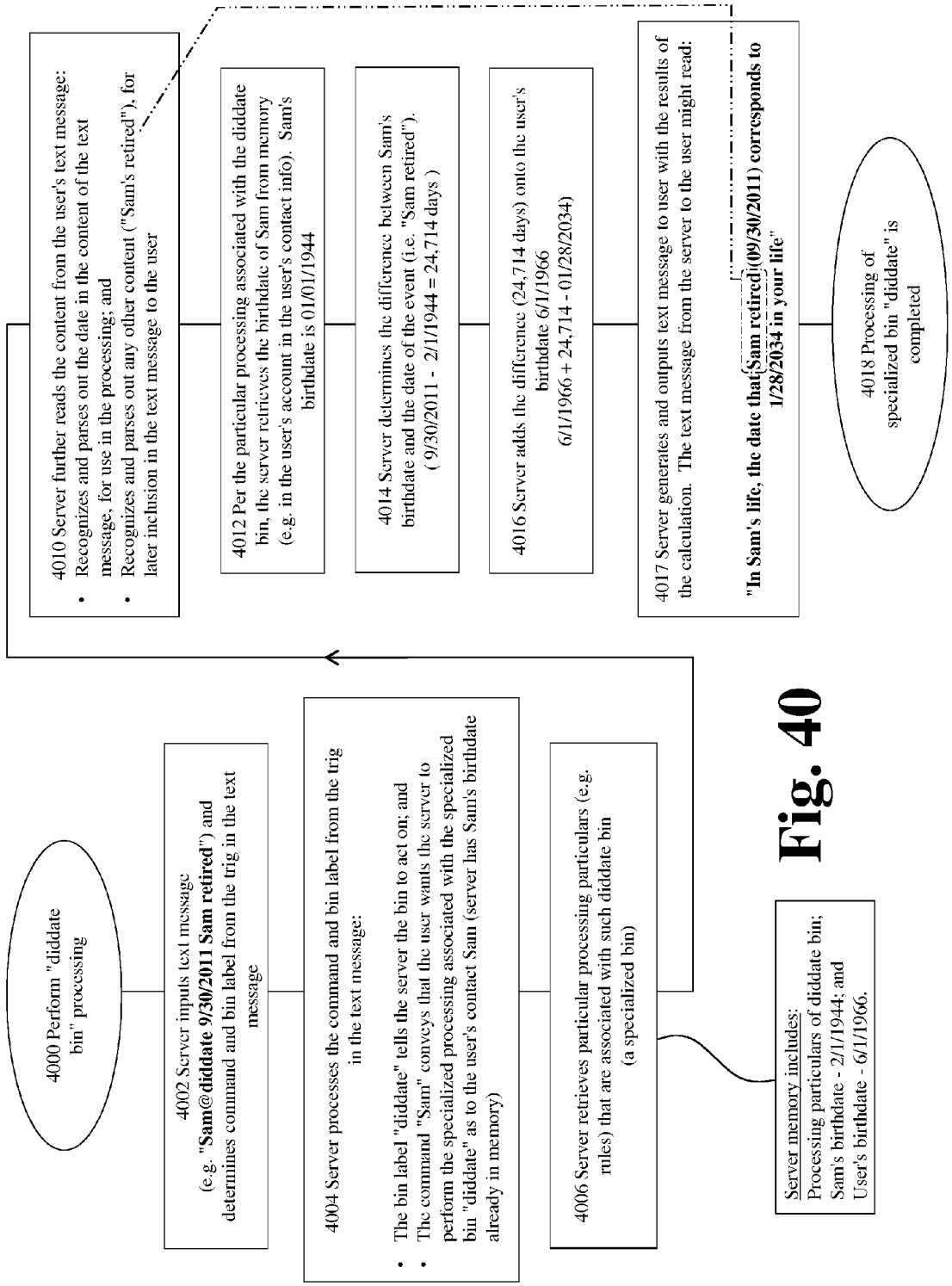
FIG. 40 is a flowchart showing processing performed by a "diddate" bin, a specialized bin, in accordance with one embodiment of the invention.

FIG. 40 is a flowchart showing processing performed by a "diddate" bin, a specialized bin, in accordance with one embodiment of the invention. In the processing of the diddate bin, the server 200 inputs a text message from the user of the nature of "sam@diddate 09/30/2011 Sam retired". The server takes such date 09/30/2011 in Sam's life, and determines the corresponding date in the user's life. Accordingly, such functionality allows the user the capability to track an event in another person's life (and the date in the other person's life upon which the event occurred) into a corresponding date in the user's life.

Features of the diddate processing are shown in FIG. 40. The process starts in step 4000 and passes to step 4002. In step 4002, the server inputs a text message to initiate the diddate processing. Then, in step 4004, the server processes the command and bin label from the trig in the text message. The bin label diddate tells the server the bin to act on. The command "Sam" conveys the user wants the server to perform specialized processing associated with the specialized bin "diddate" as to the user's contact Sam. The server already has Sam's birthdate in memory. Then, in step 4006, the server retrieves the particular processing particulars that are associated with the diddate bin. Then, in step 4010, the server reads the content from the user's text message. The server recognizes and parses out the date in the content of the text message. The server recognizes and parses out any other content, such as "Sam's retired" for later inclusion in the text message the user. Then, in step 4012, per the particular processing associated with the diddate bin, the server retrieves the birthdate of Sam from memory. Then, in step 4014, the server determines the difference between Sam's birthdate and the date of the event, i.e., the data Sam retired. Then, in step 4016, the server adds the difference onto the user's birthday. Then, in step 4017, the server generates and outputs the text message to the user with the results of the calculation. In the example of FIG. 40, the text message from the server to the user might read It is appreciated that the processing of FIG. 40 requires the availability of certain data, such as the user's date of birth, as well as the other person's date of birth. Such data may already be available in the data stores of the server. If such data is not available, then the server could prompt the user for any further needed data.

It is appreciated that the processing of specialized bins described herein might alternatively be performed in the manner of a "calculator," which prompts the user for the needed inputs and performs processing so as to generate the outputs as desired. Alternatively, the processing of specialized bins may be performed in some other manner, using local processing performed at the user's computer or smartphone (with an app), for example.

As described herein, the systems and methods of the invention provide for bins that perform specialized processing. In accordance with one characterization of the invention, such specialized processing (by a bin) might be characterized as processing of bin-less data, i.e. data that is not actually placed into a bin, or only temporarily placed in a bin during processing. Accordingly, the processing of a particular bin may be performed, based on a text message received from the user, and the resultant data (generated by the server) immediately output to either the user or some other destination, such as a social network site, as described herein, for example. As a result, the data may never actually be placed in a bin, but rather processed only for one query that generates one response or other output.

Various specialized bins and their associated processing are described herein. It is appreciated that other specialized bins may be provided by the invention to perform other desired functionality. For example, a specialized bin may be provided to parse or prioritize information in some particular manner. Relatedly, it is appreciated that a specialized bin (performing specialized processing) may be invoked that indeed calls on the information (content) in some other bin or bins. For example, a specialized bin may be included in the server that simply alphabetizes content. Using a suitable trig, the user might call on such specialized bin to process content in her book bin. Accordingly, in performing the processing of such specialized bin, the server would pull the content from the user's book bin, alphabetize that content, and return the alphabetized content back to the user's book bin, for example. It is appreciated that various other parsing, organization, prioritization and other processing might be performed by a specialized bin of the server 200. For example, the user might use a specialized bin (a data parsing engine) to send single pieces of data or arrays that align themselves in some predetermined manner In accordance with embodiments of the invention, the server 200 may process a text message with various content attached to the text message. In particular, in accordance with the processing described herein, the server 200 may process a text message containing both (1) user entered text in the body of the text message and (2) video, image, and/or sound content, for example. Such a message is commonly characterized as an MMS (Multimedia Messaging Service) message. Other types of text messages may also be processed by the invention.

In some embodiments of the invention, the server 200 processes only the text, in the text message, in order to determine processing to be performed on the text message. That is, the multimedia content that is attached to the text does not affect the processing of the text message, but merely is associated with the text. For example, the bin-content item 2110 of FIG. 21 could also include a picture (image 2110') that the user took of the movie poster at the theater (and that the user included in the original text message along with the text "add@movie red riding hood a must see" to the server 200). The server performs processing on the text in the text message so as to add the text to the "movie" bin. The particular picture does not affect such processing, but is merely included in the particular bin-content item 2110, or in some manner attached or associated to the particular bin-content item for later retrieval.

In accordance with other embodiments of the invention, the content of multimedia in a text message may indeed affect the processing. Accordingly, the invention provides a system that allows MMS messages to be sent with video, image, and/or audio, interpreting information in the incoming sound, image or video and applying predetermined processing to such information. Such information may include a trig as described above, or portions of a trig. Thus bins could become not only text-based, but allow in multimedia of any kind, and allow that multimedia to be manipulated in some predetermined manner, such as being parsed, tagged, and/or interpreted. Accordingly, the server 200 may process the content of text in a text message and multimedia content in a text message in a smart manner. Thus, the server 200 might process the text message based on the text and/or the content of multimedia (sound, image and/or video) in the text message.

Illustratively, the user might send a text message using her smartphone to the server 200 with a picture and the text "add@". The picture, taken by the user with her smartphone, is of a Red Riding Hood movie poster, in this example. Using an algorithm, the server knows from the text (i.e. the trig "add@") that the user wants to add the content into one of the user's bins. Further, the server 200 discerns text in the picture using character recognition, and identifies the text "red riding hood" in the picture. Based on associations in a database of the server, the server determines that "red riding hood" corresponds to either a movie or a book, and further knows that the user has a movie bin, but no book bin. Thus, the server, based on the algorithm, renders the conclusion that the text message (with text and image) is to be placed in the movie bin of the user.

Accordingly, in embodiments of the invention, the text in a text message and/or multimedia content (sound, image and/or video, for example) in the text message may be used to control processing of that text message, such as to dictate placement of the text message into a particular bin in the user's bin collection. Such processing might include the addition of the content in the text message to one of the user's bins, or the retrieval of content, for example. It is appreciated that the above processing may include interface with the user to receive confirmation of particular action to be taken.

Accordingly, the invention may effectively provide an intelligent interpretation engine in the server 200 that can discern and/or strip information from multimedia as well as text and use it to do various actions, such as (1) store content, (2) generate automatic reminders (as otherwise described herein), and (3) automatically organize content in the text message including text content and/or multimedia content, and recall such content through both tagging and binning, and as otherwise described herein. Relatedly, it is appreciated that the server 200 may interface with the user via voice queries and/or other voice communications using suitable communication channels.

Relatedly, in accordance with embodiments of the invention, the system of the invention may be characterized as being content-aware. That is, the server 200 may be provided, using suitable algorithm, to understand the meaning of data as well as its intent. For example, one could text "add@budget 100.65" and the content-aware system would understand that this value is intended as a money amount, and that such money amount should be deducted from the user's budget as represented in one of the user's bins. For example, the user might keep different bins for different budgets, such as a home maintenance budget and a car maintenance budget, for example. This understanding by the server 200 could then be used by the server 200 to provide helpful responses to queries, including plain English queries, as well as possibly generating automatic responses when, for example, the user's budget is approaching some threshold value. The server 200 might provide such processing by mapping certain observed content and/or the context of such content in the user's bin vis-à-vis particular responses to be generated. That is, if certain content is observed in a certain bin, with certain parameters observed, then the server will generate a particular response.

A non-numerical example of such processing would be the use of a grocery list. Data that is added would be interpreted as products to buy. They would be listed as such, and would be given additional query-able values, such as the nature of the item i.e., the additional queryable values might respectively reflect the nature of the item. For example, (upon the user requesting content from his grocery bin, before the user goes to the grocery store), the server 200 sends the user the contents of the user's grocery bin, as well as alerting the user that no dairy products are included in such content. Such alert may be generated by the server based upon a predetermined rule set. The rule set might be based upon the life reality that the user generally always purchases at least one dairy product at the grocery store. Accordingly, the absence of any dairy product from the user's grocery bin is out of routine for the user, and it would be helpful for the user to be alerted to such observed situation. For example, an alert might be sent to the user in the form of a further text message and/or included along with the content of the grocery bin.

Figure 41:
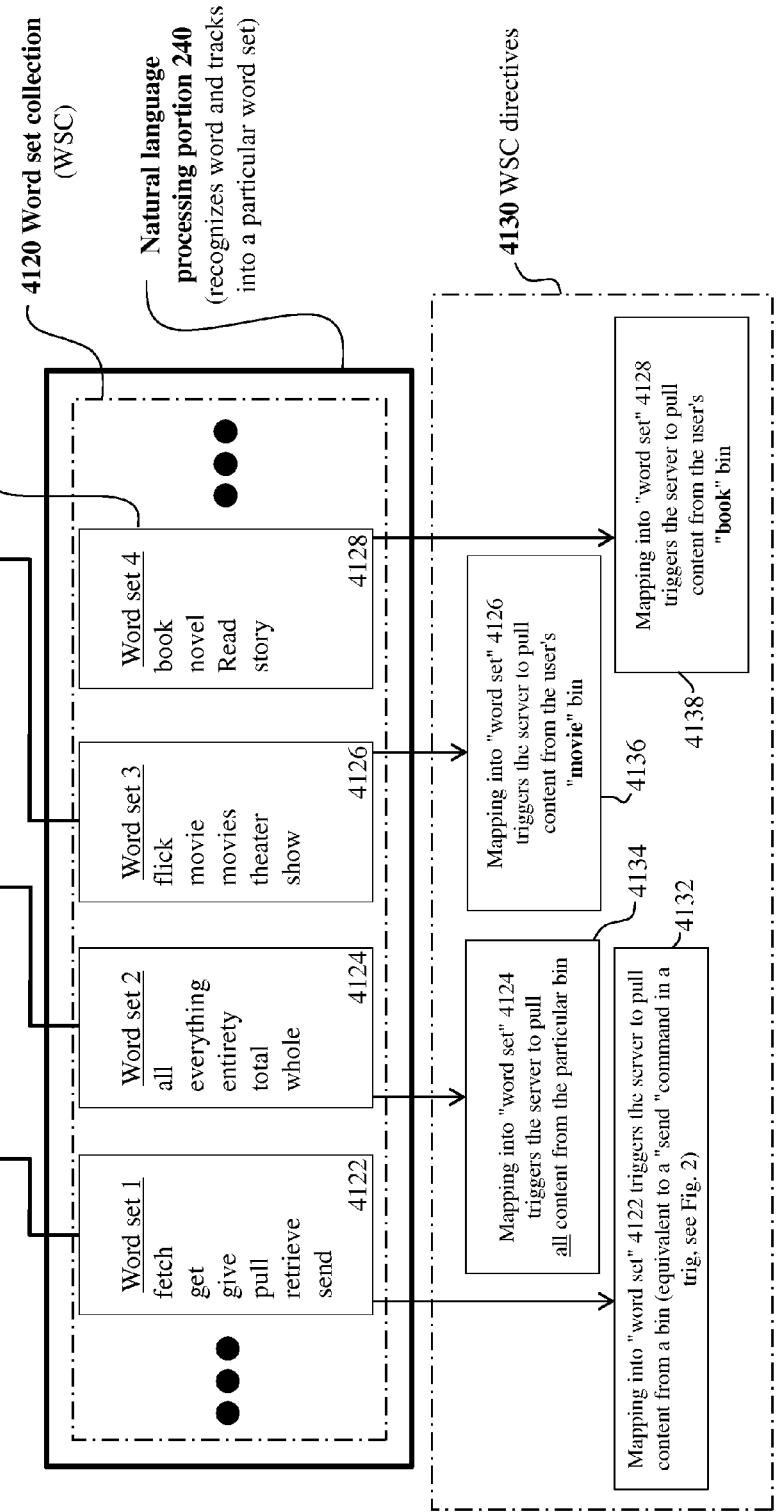
FIG. 41 is a diagram showing content aware processing of the server in accordance with one embodiment of the invention.
Figure 42:
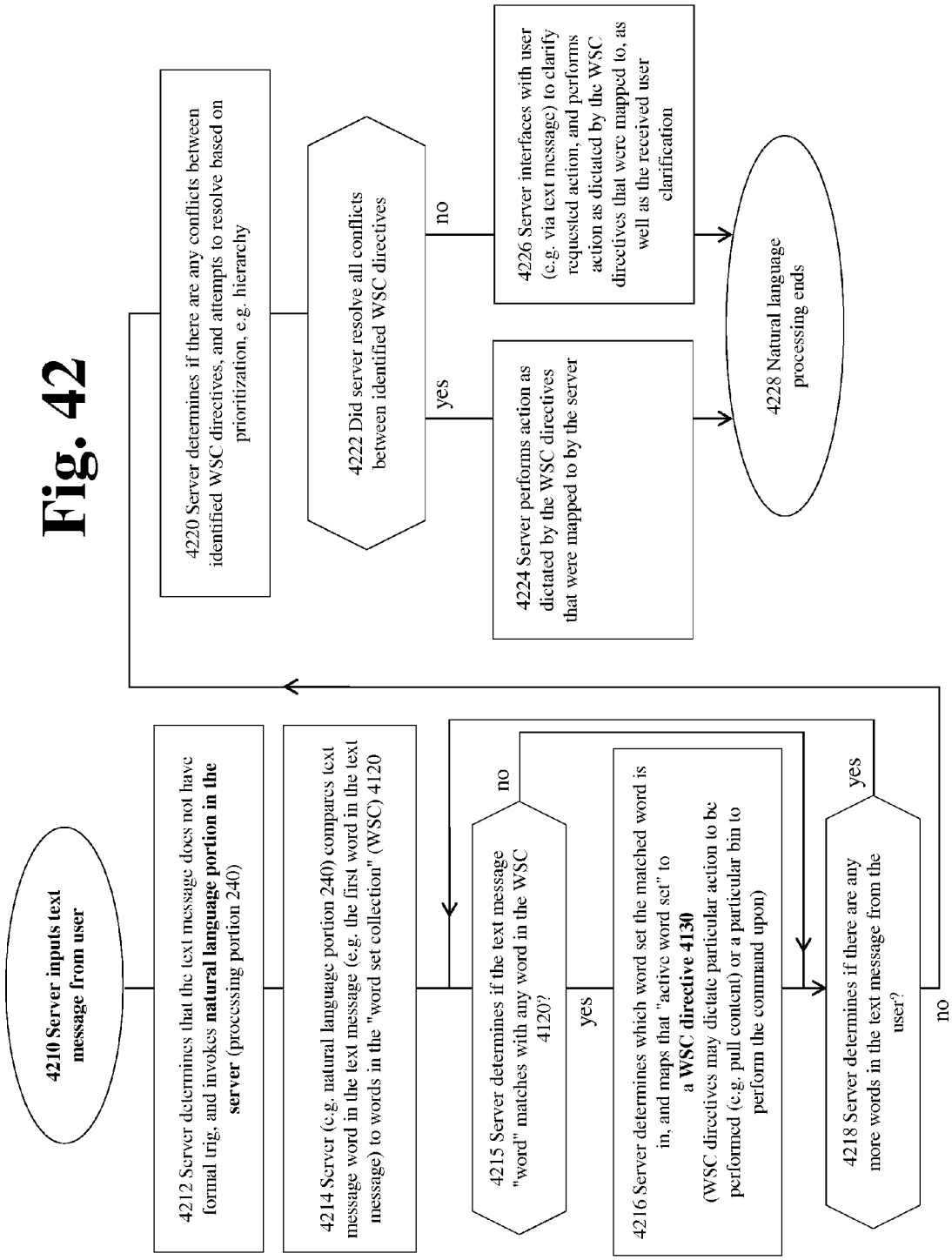
FIG. 42 is a flowchart showing further aspects of content aware (natural language) processing in accordance with embodiments of the invention.

In accordance with further embodiments of the invention, the invention provides processing for the server 200 to act as an intelligent information responder in other manners. That is, in accordance with embodiments of the invention, the server may be provided to input data in plain English (or other languages), be understood, and give intelligent responses based on content-aware capabilities. In embodiments, this would allow queries of non-indexed information, i.e. information that does not confirm to the particular trig protocol as described above. Accordingly, intelligent, native-language request of the system could be made by the user and could be responded to by the server 200. Further aspects of such processing are described below with reference to FIGS. 41 and 42. For example, queries for the user's "grocery list" bin could include locations where they can be purchased, particular aisle location in a store, sales, news, and recalls, for example. Such requests might be input by the server from the user via text in a text message or audio that is converted using OCR (optical character recognition) technology, for example. The content of such information may then be analyzed by the server to achieve an understanding of such information. For example, words in such information received from the user may be mapped to predetermined commands, i.e. directives, that the server understands. FIGS. 41 and 42, described below, illustrate such processing.

Relatedly, it is appreciated that third party processing engines available via the Internet might be utilized by the server 200. For example, the server 200 might output information to a resource on the Internet so as to achieve further understanding of such information. That is, the third party processing engine could take the information received from the server 200, perform processing using the capabilities of such third party processing engine, and return more digestible information back to the server, i.e. information that is more processable by the server 200. A third-party processing engine might also provide capability to assist the server in generating advertising material. For example, the server 200 could secure advertising material based on an association between bin content vis-à-vis related advertising material, such association being performed by the third party resource.

It is appreciated that the server 200 may perform processing on content in a particular bin and associate that content with other information in some predetermined manner. Such other information might be secured from other resources on the Internet, for example. Such other information might indeed be added to the particular bin content item and/or such other information might be somehow associated with the particular bin content item. Further, it is appreciated that the particular contents of a bin may be organized in any manner as desired. For example, the bin content items in a particular bin might simply be organized alphabetically, based on some categorization, or based on some prioritization scheme, for example.

As noted above, FIG. 41 is a diagram showing content aware processing of the server in accordance with one embodiment of the invention. More specifically, FIG. 41 illustrates processing performed by a natural language processing portion 240 in the server 200. The processing portion 240 includes a word set collection (WSC) 4120. The word set collection 4120 includes a plurality of word sets (4122-4128). For example, the "word set 1" 4122 includes the words fetch, get, give, pull, retrieve and send. Accordingly, the word set 4122 includes various terms relating to getting content from a bin of the user. Illustratively, using the processing of FIG. 41, the server may understand a text message from a user "get book" to constitute a send message requesting content from the user's "book" bin, i.e. such "get book" character string in the text message from the user would be equated (by the processing of server) to the trig "send@book".

Upon receiving a text message, the processing portion 240 looks for such words in the text message. If any of the words in the word set 4122 are observed, then the word set 4122 is tagged by the server as an "active word set". The server advances through each word in the text message (received from the user) and based on the comparison of each word in the text message vis-à-vis words in the word sets, the server identifies any further active word sets.

FIG. 41 also shows word set collection directives 4130. The word set collection directives 4130 include a plurality of directives (4132-4138) that are respectively associated with a particular word set. However, it is appreciated that such one-to-one correspondence is not necessarily required, i.e., in that multiple word sets might map to the same directive.

As shown in FIG. 41, mapping into the directive 4132 triggers the server to pull content from a particular bin. Thus, mapping into the directive 4132 is equivalent to a "send" command in a trig. The directive 4134 is complementary to the directive 4132. That is, the directive 4134 tells the server to pull "all" content from the particular bin. Thus, another word set (not shown) might be provided to tell the server to only pull a portion of content from a particular bin. For example, such directive might tell the server to pull only recent (within last week, e.g.) content from a particular bin (if the word "recent" is in the text message), or content from a particular time window.

Accordingly, the directives 4132 and 4134 might be characterized as commands to effect certain action, i.e. equivalent to a command in a trig as described above. On the other hand, the directives 4136 and 4138 might be characterized as bin labels to effect the retrieval of content from a particular bin, i.e., equivalent to a bin label in a trig as described above.

FIG. 42 is a flowchart showing further aspects of natural language processing in accordance with embodiments of the invention. As shown, the process starts in step 4210 and passes to step 4212. It is appreciated that natural language processing as described herein may be coordinated with fuzzy logic processing as described herein, in some suitable manner. For example, in a text message from a user, the server might analyze each string of characters containing an "@" to determine if it satisfies some threshold of similarity with a list of trigs maintained by the server. If the threshold similarity is attained, then the server processes the message using fuzzy logic, else the message is processed using natural language.

In step 4212, the server determines that the text message from the user does not have a formal trig therein. As a result, the server invokes the natural language portion in the server, e.g., the processing portion 240. Then, the process passes to step 4215.

In step 4215, the server determines if the first word in the text message (received from the user) matches with any word in the word set collection 4120. If yes, then the process passes to step 4216.

In step 4216, the server determines which word set the matched word is in, and tags that word set as an "active word set." Further, the server maps that active word set to a directive 4130. For example, the server determines that the first word "give" in the text message matches to "give" in word set 1 (4122), and then maps word set 1 (4122) to the WSC directive 4132. The word set collection directives may dictate particular action to be performed or a particular bin to perform the command upon, for example. After step 4216, the process passes to step 4218.

If, on the other hand, in step 4215, the server determines that the particular text message word under consideration does not match with any word in the word set collection, then the process passes directly to step 4218.

In step 4218, the server determines if there are any more words in the text message from the user. If yes, then the process returns to step 4215, and the server determines whether such next word in the text message matches with any word in the word set collection 4120. Processing then continues on as described above.

If, on the other hand, the processing determines in step 4218 that there are not any more words in a text message from the user, i.e. "no" in step 4218, the process passes to step 4220.

In step 4220, the server determines if there are any conflicts between identified directives, and the server attempts to resolve any such conflicts based on predetermined rule sets in place. For example, such rule sets might be based on a prioritization scheme, such as a hierarchy, based on the order of words in the text message, default settings, or based on some other scheme. In general, it is appreciated that the server may interface with the user to resolve any unresolved decisioning.

For example, the user might text "Put 'All the right Moves' into my book bin". "All the right moves" is indeed the title of the book that the user wishes to remember at some later time. However, prioritization is needed in the processing of the server to distinguish such text message vis-à-vis a text message intended by the user to place content into the user's movie bin. In this situation, it might be the case that the term "book" corresponds exactly with the user's "book bin". On the other hand, the word "moves" does not correspond exactly with the user's "movie bin". Accordingly, a prioritization scheme might dictate that an exact matches take priority over inexact matches. Accordingly, the content of the text message would be appropriately placed into the user's book bin.

With further reference to FIG. 42, after step 4220, the process passes to step 4222. In step 4222, the server determines whether all conflicts were resolved between identified directives. If yes, then the process passes to step 4224. In step 4224, the server performs action is dictated by the directives that were mapped to by the server.

On the other hand, if "no" in step 4222, then the process passes to step 4226. In step 4226, the server interfaces with the user so as to resolve any unresolved conflicts. For example, the server interfaces with the user via text message to clarify requested action, and thereafter performs action as dictated by the directives that were mapped to, as well as any received user clarification.

After either of step 4224 or step 4226, the process passes to step 4228. In step 4228, the natural language processing ends.

As described above, FIG. 41 includes a plurality of word sets in the word set collection 4120. For example, the word set 4122 includes six words. In implementation of the systems and methods of the invention, it is appreciated that the word set collection may include hundreds and perhaps thousands of words. Each of those words may be mapped to a particular directive 4130 and/or mapped to other words which in turn are mapped to a particular directive. It is appreciated that the mapping of words in the word set collection may utilize known training technology, such as neural network technology. Such training technology may utilize feedback secured from the user regarding both correct mappings of words (in a text message from the user) and incorrect mappings.

As described above, in accordance with some embodiments of the invention, the invention might be embodied in an application that is disposed locally on the user's computer. For example, such an application might be downloaded and installed on the user's PC, for example. Such application might be characterized as a desktop client. Such desktop client may be provided to allow the user various processing such as direct access to bins, as well as submission of multimedia and text data through a text box, uploading files, and interface with the application via microphone and web cam, for example. Assuming suitable permissions being in place, the desktop client could also enable queries about the computer on which the desktop client is installed, such as the number of add messages processed and the number of send messages processed. Further, it is appreciated that using cloud related technology, such an application could be used as a processing node with customer approval. That is, such a desktop client might tap into the processing resources of the computer upon which the desktop client is installed, i.e. using the computer's unused processing time to process queries for the server 200. Such use of resources would of course be performed with all appropriate permissions from the customer in place. Relatedly, it is appreciated that the server 200 might support bin collections of respective users—some of which are stored on the server 200 itself and others which are stored in respective desktop clients on a user's respective personal computer. The server 200 might access and use such processing resources as are needed to perform requested processing. In accordance with one embodiment of the invention, this feature could give the user's preferable treatment of some type, for example, based on the user's processing capabilities that were accessed and utilized by the server 200.

It is appreciated that processing as described herein as being performed by the server 200 may of course be performed by any suitable computer processing portion that is programmed to perform such processing.

Figure 43:
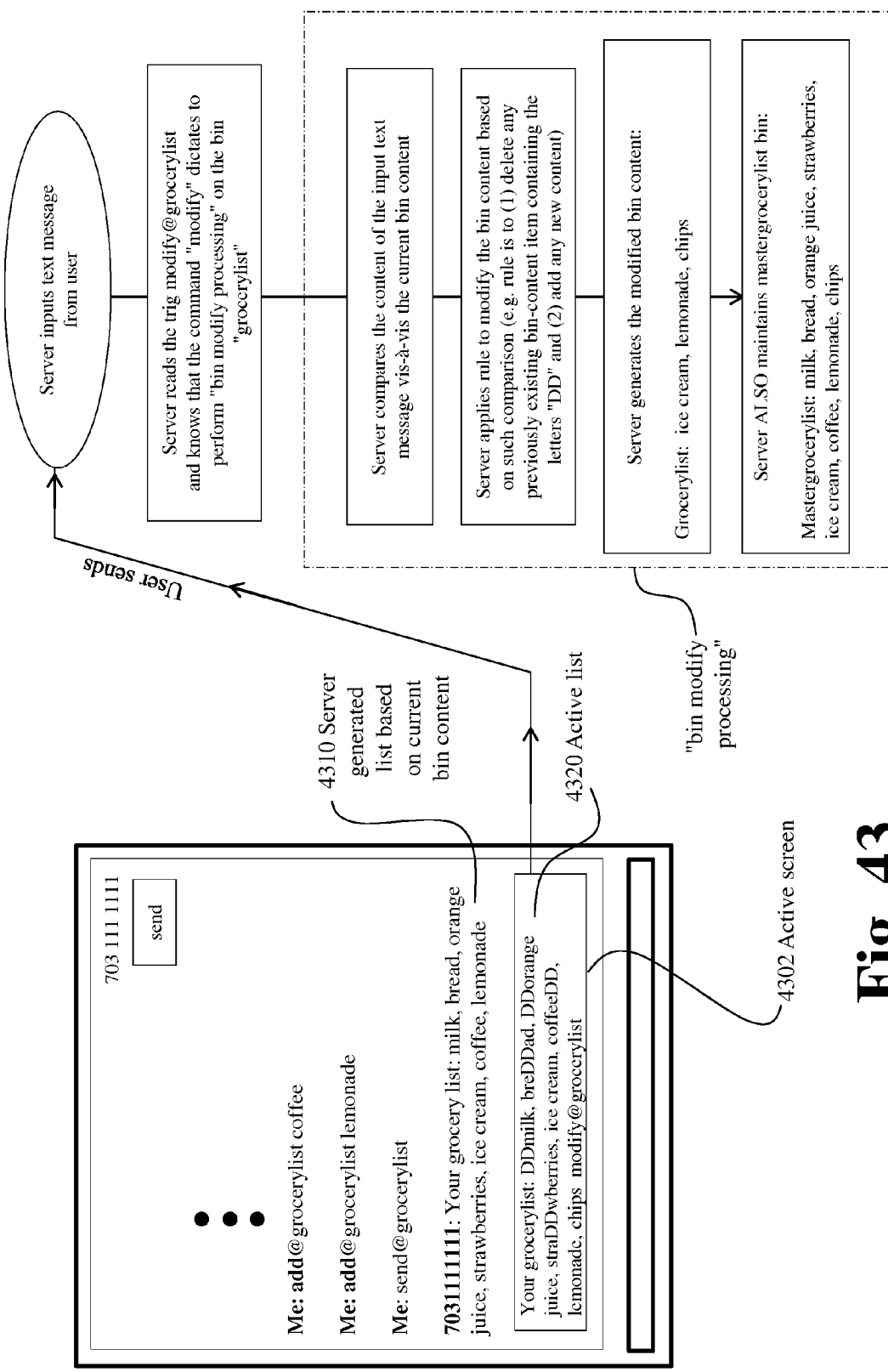
FIG. 43 shows edit list processing in accordance with one embodiment of the invention.

In accordance with one embodiment of the invention, the user may respectively tag bin-content items in a list on her smartphone. FIG. 43 is a diagram showing "bin modify processing" in accordance with one embodiment of the invention. Bin modify processing provides the capability for the user to essentially selectively check off items in a list received from the server 200. For example, as the user picks up an item in her list, as she shops, she modifies the list, received from server—and specifically modifies bin content items (in the list) in some manner For example, as described below, she types in "DD" to reflect that such item has been picked up, i.e. the task as to that item is "done.". The modified list is then sent back to the server. Based on the modified list from the user, the server generates modified bin content, and populates the particular bin with such modified bin content. Further, the server might generate a master list. The master list retains all content previously in the particular bin, as well as new content added to the bin. Such processing is particularly helpful with recurring lists. Further features will be described with reference to FIG. 43.

FIG. 43 shows the interface of the smartphone including multiple text messages, collected over time, as well as an active screen 4302 in which the user can craft a text message in accordance with one embodiment of the invention. As shown in FIG. 43, the user has previously added coffee and lemonade to her grocerylist bin. The user has then requested the server to send her grocery list to her, i.e. the user texts to the server the trig "send@grocerylist". In response, the server sends the user the generated list 4310 based on the current bin content in the grocerylist bin. Accordingly, such processing reflects basic adding content to a particular bin and pulling aggregated content from that particular bin, as described above with reference to FIG. 1, for example.

In accordance with the "bin modify processing," the user then modifies that generated list 4310. In order to modify the list 4310, the user first copies the text from the text message 4310 and then pastes that copied text into the active screen 4302, i.e. such that the user may then work with, i.e. edit, the active list 4320. In this manner, the user has effectively rendered editable the list 4310 received from the server, i.e., the report message received from the server. The copy and paste functionality may be performed using known smartphone technology.

Accordingly, as the user shops in the grocery store, the user edits the active list 4320 so as to reflect the items that she has picked up. For example, upon the user picking up milk, the user types in the letters DD within or adjacent to the bin content item "milk". In this example, respective bin content items are demarcated using commas However, it is of course appreciated that other demarcations may be utilized to separate bin content items, i.e., such as slashes, a semicolon, or some other character.

The active list 4320 reflects, based on the user interjecting the character string DD into the respective bin content items, that the user has picked up (placed in her shopping cart) milk, bread, orange juice, strawberries, and coffee. She has tagged each of these items with the characters DD. The active list 4320 also reflects that the user has added chips to the active list, so as to remind her to pick up chips at another store at some later time, for example. In this embodiment of the invention, the user inserts the trig modify@grocerylist to the active list 4320. As shown in FIG. 43, the user then sends the active list 4320 to the server 200.

The server inputs the text message from the user. In processing the text message, the server reads the trig modify@grocerylist and knows that the command "modify" dictates that the server should perform bin modify processing. Further, the trig indicates that such processing, of the content of the text message, should be applied to the user's grocerylist bin.

In performing the bin modify processing, the server compares the content of the input text message vis-à-vis the current content of the particular bin—the bin grocery list, in this example. The server then applies a rule or rules to modify the bin content based on such comparison. For example, the rule might be to delete (from the grocerylist bin) any bin content item containing the letters "DD". The rule may also specify to add any new content, i.e. content not previously in the bin grocerylist. The server then generates the modified bin content "ice cream, lemonade, chips" and populates the grocerylist bin with such content. Accordingly, the user has efficiently and easily retrieved content from her grocerylist bin, tagged the bin content items to reflect that she has successfully secured such items, and sent the tagged list back to the server so that her grocerylist bin could be updated to reflect her activity. Accordingly, she can at some later time send a further send@grocerylist request to the server to be reminded of the items that she had previously not picked up, i.e. the items "ice cream, lemonade, chips".

In this example, the server may also generate a "mastergrocerylist" bin that is associated with the grocerylist bin. The mastergrocerylist bin maintains all bin content items that the user has previously added to the grocerylist bin. That is, in this example, the user tagging bin content items with "DD" and sending such tagged list to the server only results in the deletion of such tagged items from the bin grocerylist, and does not result in deletion from the bin mastergrocerylist. The mastergrocerylist bin might be helpful in reminding the user of all the items she previously needed. Illustratively, in the shopping list example, a person will routinely want the same items in their weekly trip to the grocery store. Accordingly, the "grocerylist" and the "mastergrocerylist" processing described above allows the user to effectively check off items as they pick up those items in a particular trip to the supermarket, while retaining a master list of items for later trips to the supermarket—for example, in two weeks when the user needs to go grocery shopping again. It is appreciated that the user may directly add or pull from the mastergrocerylist bin or the grocerylist bin using techniques as described herein.

The "grocerylist" and the "mastergrocerylist" example illustrates manipulation of what might be characterized as a "recurring" list. Accordingly, the invention may provide for a master list that is maintained in a particular bin while also populating a further bin (with similar content) such that the further bin might be used for a particular event. For example, the event might be the user's weekly shopping trip to the grocery store. Such functionality may of course be used in a wide variety of environments. For example, the functionality is applicable to any task list of the user, and in particular a task list of the user that is recurring In general, it is of course appreciated that functionality described herein in the context of a particular environment e.g. a party environment or a task performing situation, may be applied to other environments as desired.

In this example, the user typed the trig modify@grocerylist into the active list 4320, and sent such trig along with the content to the server. In other embodiments, such specialized trig might not be utilized. For example, the user might simply utilize a standard add trig, i.e., add@grocerylist. In using such trig, the server would be provided with suitable rules such that the server would recognize (based on the content of the text message from the user) that "bin modify processing" is to be invoked Instead of deleting previously existing bin content items based on the letters DD, it is appreciated that other characters might instead be utilized and/or other approaches by which the user may tag particular bin content items. In general, it is appreciated that other rules may be utilized to: segregate the particular bin content items that the user has essentially tagged, e.g. with the letters DD; the bin content items that the user has not tagged; as well as any new content that will be processed by the server to generate new bin content items. For example, such rules might involve the degree of change of a particular bin content item. Slight variation, such as the addition of a letter or two in a bin content item, reflects that the user has indeed tagged such bin content item. This is in contrast to a bin content item that is unchanged, reflecting that the user has not tagged the bin content item. Further, new content will of course be fully different (i.e. in that it simply was not present in the list 4310, and thus understood by the server to constitute new content.

FIG. 43 illustrates that there may be processing interplay between two bins. In general, in the invention, the server may perform interrelated processing between two or more bins. One example of this is integrating the content of a general trip bin with the content of a specialized bin, such as a ski trip bin.

The server may also provide interplay between user only accessible bins and public accessible bins, or limited access bins, e.g., access that is limited to friends of the user. For example, the server may provide a friends "general trip" bin that is accessible by friends of the user. The general trip bin includes a listing of items to be taken on a trip, e.g. such that the user does not forget his toothbrush. However, the friends general trip bin that is accessible by the user's friends is also associated with a general trip bin that is only accessible by the user, i.e. a private general trip bin. That is, the user's friends cannot view, pull, or add content to such private general trip. A feature may be provided by which a bin content item added to the friends general trip bin is also output to the private general trip bin of the user (based on certain criteria being satisfied). For example, the criteria might be that enough people (friends) indicate they like the particular bin content item in the friends general trip bin. Respective friends interface with the friends general trip bin in some manner to reflect that they like the particular bin content item. As a result, the particular bin content item is essentially deemed worthy of addition to the "private general trip bin" of the user. It is appreciated that each friend that has access to the friends general trip bin may have her own private general trip bin. Further, the particular criteria that will trigger a bin content item to be output (from the friends general trip bin to a private general trip bin) may vary. For example, one person might indicate that a bin content item is to be transferred to her private general trip bin upon 2 friends approving, e.g. liking, the particular bin content item. However, another person might indicate that five friends must like a particular bin content item before the server is triggered to transfer that bin content item into the person's private general trip bin. In other words, each friend may respectively indicate how popular the particular bin content item must be prior to transfer, i.e. adding that particular bin content item into his or her private general trip bin.

In general, it is appreciated that functionality may be provided to move content from one bin to another bin. In the example above, the content was moved from a quasi-public bin, i.e. a bin shared by friends, to a private bin based on particular criteria. Functionality may also be provided to move content between bins that are only accessible by the user, i.e. private bins. Such movement of content between the user's bins may be based on criteria, e.g. rules, as desired. For example, substantial access to a particular bin might trigger the content of that bin to be transferred to a further bin of the user. On the other hand, lack of access to a particular bin might trigger a transfer of content between bins.

In a further example, content of a particular bin might transfer to a second bin after some period of time. For example, in a social situation the user might be meeting a number of new people—and the user wants to remember their names. As the user learns a new person's name, the user discreetly texts a message to her "name" bin such as "add@name Amanda" Accordingly, at some point during the party or after the party, the user can pull all of the names of the persons she met, i.e., the user sends a message to the server "send@name". The server may provide functionality to transfer, after a 24-hour period for example, content from the "name" bin to a further bin such as "long-termname" bin. This automated transfer would be helpful to some users so as to segregate names of persons recently introduced, versus persons introduced to them some time ago. For example, in a party situation, the user may be most interested in the persons they are currently meeting at the party versus names added to his or her "name" bin a week ago. Such automated transfer of content between lists may of course be utilized in a wide variety of environments, as desired. Two or more lists may utilize such functionality, as desired. Instead of such 24-hour period, the user might send a text message to the server with a suitable trig at the end of the party or other event. Such trig would trigger the above transfer, instead of the 24-hour period.

In accordance with one embodiment of the invention, the addition of content (by the user) to a particular bin of the user may result in such content being added to the specified user's bin, as well as pushed out to bins of another user or users. For example, a soccer coach may send messages to her "great_plays_bin" in the server so as to document the great plays in a soccer game. In some predetermined manner, that content might both be stored in the user's great_plays_bin, as well as output to the other parents on the team. For example, the content might be output to a great_plays_bin of another parent or parents, or simply pushed out via text message to the parents.

As described above, a particular user's bin might be populated with content (as a result of add messages being sent to such bin, for example) in conjunction with other users' respective bins being populated with the same content in some automated fashion. It is appreciated that various rules and/or criteria may be invoked so as to dictate whether the server should or should not populate other user's bins with content. In accordance with one embodiment of the invention, the server might interface with a social network to which the users all belong. The degree of association of the users on the social network may be utilized to dictate the manner in which bins of respective users are populated with content. For example, such processing might interface with FACEBOOK and utilize the "degree of separation" processing utilized therein, i.e. so as to determine which bins are populated with which content, amongst multiple users.

In accordance with one embodiment of the invention, the systems and methods of the invention may utilize GPS (global positioning system) technology to perform what is herein characterized as "ping processing"—in that the server pings the user upon the user coming into proximity with an address that is associated with one of the user's bins. The server pinging the user may be in the form of the server sending the user a text message, as described below. Technology that tracks the position of a user device is known, such as technology described in U.S. Pat. No. 7,890,576 to Microsoft Corporation issued Feb. 15, 2011, which is incorporated herein by reference in its entirety.

In this embodiment, a bin of the user is associated with a particular physical location. For example, the user has a bin named "tasks". Using a suitable computer interface, the user associates that bin, e.g. tasks, with a particular physical address, e.g. 123 Coach Road, Coachtown, Va. 22222. The association could be on a temporary basis or on a more permanent basis, changeable by the user. In this illustrative scenario, it might be the situation that a coordinator (the user) working with coach's team routinely needs to pick up equipment at the coach's office, but keeps forgetting. The needed equipment might vary from week to week. Throughout the week, the user adds content to her "tasks" bin, such as "add@tasks remember to pick up jersey for new player this week". The user adds such content using an add message as described herein, or via web session, for example. In the ping processing of the invention, illustratively, the user drives home from work, and upon the user coming into a predetermined proximity of the coach's address, e.g., one-mile, the server automatically sends a text message to the user with the contents of her "tasks" bin. As a result, the user hears the incoming text message and remembers she needed to pick up items at the coach's office. The user can then drive to the coach's office and review her text message to recall all the items that she needed to pick up.

It is of course appreciated that the predetermined proximity, i.e., the number of miles, may be varied based on user preference and the particular situation in which the ping processing is applied. It is further appreciated that such ping processing may be utilized in a variety of real life environments and situations. Further, the processing as described above may be utilized with other parameters, other than proximity to a location. For example, another parameter might be the length of time that the user has been driving or a distance. In one embodiment, ping processing for a particular bin might be initiated and set up by the user pressing a suitable ping processing button 2117, as shown in FIG. 21. Such would initiate processing such that the server interfaces with the user to set up the parameters of the ping processing.

The invention may utilize what is herein characterized as "sticky parameter" processing. With sticky parameter processing, attributes of a trig or other incoming parameter are retained by server 200 in order to process subsequent communications from the user. The user may be provided with the capability to activate or deactivate sticky parameter processing. For example, the user might text to the server "add@movie iron man" In a subsequent text message to the server, e.g., a subsequent add message, the user might text "add@ need to see red riding hood movie". Such subsequent text does not include a bin in which to place the content "need to see red riding hood movie". However, using sticky parameter processing, the server looks back to the prior text message received from the user in which the bin "movie" was specified. Since the current text message did not indicate a bin, the server applies that previously specified bin, i.e. the processing "sticks" to that bin previously specified.

In similar manner, the sticky parameter processing may be applied to commands in a trig. For example, the user might further text "@movie need to see red riding hood movie". Accordingly, this text does not include a command but does include a bin "movie"—to dictate which bin the server should place the content. Using sticky parameter processing, the server looks back to the most prior command input from the user and applies such command to the new text message. In this example, the server looks back and sees that the prior text message was an "add" message. Accordingly, the server applies that command to the new message. The utilization of sticky parameter processing is not limited to trigs, but rather may also be applied to other parameters in processing of the invention.

Figure 44:
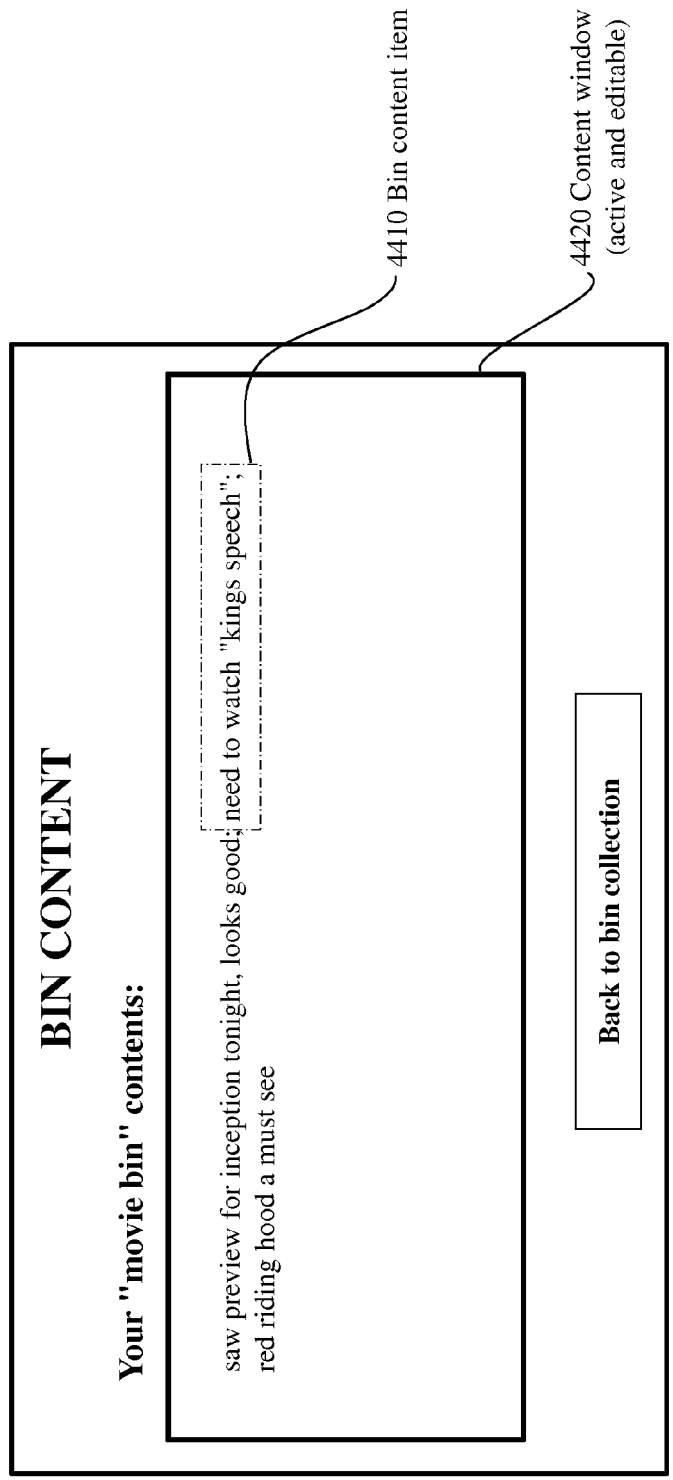
FIG. 44 is a diagram showing a user interface in accordance with one embodiment of the invention.

FIG. 44 is a diagram showing a user interface in accordance with one embodiment of the invention. For example, the user interface might be accessed via webpage. The user interface shows the user's movie bin contents disposed in a content window 4420. The contents are similar to FIG. 21 described above. However, FIG. 44 reflects a simpler bin content presentation vis-à-vis FIG. 21. In this example, date and time information regarding when a particular bin content item was received by the server is not retained. This provides simpler processing. However, in other embodiments such date and time information might be retained, and presented alongside each bin content item or otherwise associated with the particular bin content item. In this example, respective bin content items are demarcated by semicolons.

The content window 4420 is an active and editable window. This means that the user can actively change text presented in the content window 4420. The user can add a new bin content item and or remove bin content items. The processing of the server may be programmed to work off the content of the bin as such content is presented. Accordingly, in the example of FIG. 44, if the user edits the movie bin contents to remove all the semicolons, then the server would view the movie bin as only containing one bin content item. In other words, the server may work off content in a bin that has been edited (via webpage by the user) in the same manner as if the content was populated into the bin via text messages. In this embodiment, the server is essentially blind as to how the content was deposited in the bin, but simply processes the content as presented.

The invention may also provide capability by which a user might select a particular bin content item (in a first bin) and copy and paste that content into a second bin. In one manner, this might be performed using standard copy and paste functionality commonly available. In accord with the invention, functionality may be provided by which the user selects the particular bin content item in some manner (for example in a web session with the server 200) and a "transfer bin list" is presented to the user. The transfer bin list provides a listing of all bins of the user. By clicking on a particular bin, the particular bin content item is transferred to that further bin. An option may be presented to the user as to whether the user wishes to maintain the content in the original bin—in conjunction with transfer of the content to the further bin. In this manner, for example, the user might review the bin content items in a first bin and quickly and easily divvy out those bin content items to other bins. In particular, such functionality may be helpful in divvying out content in the user's catchall bin.

FIG. 4 as described above shows different types of messages and examples of those messages. For example, messages sent from the user to the server include an add message, a send message, a clear bin message, a new bin message, as well as a delete bin message. The type of message is commonly defined by the particular trig that the message contains. In embodiments of the invention, the server may provide functionality such that a user may combine trigs in a particular text message to the server. The server identifies that the text message includes two (or more) trigs and performs responsive processing based thereon. For example, the user might send to the server the text message "send@movie send@book". In response, the server would pull the content from both the user's movie bin and the user's book bin. The report message back to the user, from the server, might aggregate the respective content, segregate the content in some manner, alphabetize the content, or in some other manner manipulate, prioritize or organize the content for presentment to the user in the report message. Alternatively, the server might respond to the single text message from the user (with the two trigs) with two respective text messages—one text message reporting the contents of the user's movie bin and another text message reporting the contents of the user's book bin. Other trigs, including commands and bin labels, may be combined in a single text message. For example, the user might send the server the text message "add@movie iron man send@movie". In response, the server would both add the new content to the movie bin, as well as generate a report message that sends the user all content in her movie bin, i.e. including the new content as well as prior content.

In accordance with embodiments of the invention, the content from multiple bins may be aggregated and other ways. For example, the at-it system server 200 may provide processing to respond to a trig "1008@game". In this example, this trig tells the server to pull content from the user's game bin and specifically for the game on October 8. Accordingly, the responsive e-mail sent from the server back to the user (Joe) might read "October 8 Raptor game time is 9:45 AM at Lee Park. We are white. Bring a drink. Joe brings snacks." The server may aggregate content from different bins including both generic content to advise all the players on the team versus player specific content to advise just certain players on the team. Accordingly, in this example, the bin "game" is accessible by each player on the team. In this example, a responsive text message from the server to another user in response to the same trig "1008@game" might yield the same response, except such response would not indicate that "Joe brings snacks", i.e. since the phone number of the requesting text message was not Joe's phone number. In this example, a first bin might contain generic game information for all players, and a second bin contain specialized information regarding snacks for respective players. In addition to the server aggregating the content from both respective bins, the server might also aggregate such information with boiler plate clauses. For example, in this situation, the phrase "Raptor game time is" may be a boiler plate clause that is pulled from another bin or some other database. In general, a trig may be crafted such that people can remember the trig. In this example, a player likely can remember that to get game information, she crafts and sends a text to include the four digit date of the game (for which information is requested), the @ sign, and the word "game".

In summary of aspects, the systems and methods of the invention provide an application service provider, and in particular, hosting, managing, developing, and maintaining applications, software, and web sites, in the fields of personal productivity, wireless communication, mobile information access, and remote data management.

The systems and methods of the invention further provide telecommunication services, namely, wireless digital messaging services; providing telecommunications access services for capturing, collecting, aggregating, organizing, searching, indexing, storing, synchronizing, recognizing, accessing, retrieving, managing, sharing, transmitting and displaying information and data, including text, audio, video, binary, still images, graphics, digital content and multimedia files via mobile phones and mobile communication devices. In general, it is appreciated that the processes described above as manipulating video, image, and/or audio, for example, may also be applied to information and data, including text, audio, video, binary, still images, graphics, digital content and multimedia files, for example.

The systems and methods of the invention further provide for the collection, compilation, systematization, and organization of information into computer databases; computerized database management; advertising and interactive marketing services.

The systems and methods of the invention further provide for computer software for use in capturing, collecting, aggregating, organizing, searching, indexing, storing, synchronizing, recognizing, accessing, retrieving, managing, sharing, transmitting and displaying information and data, including text, audio, video, binary, still images, graphics, digital content and multimedia files.

Figure 45:
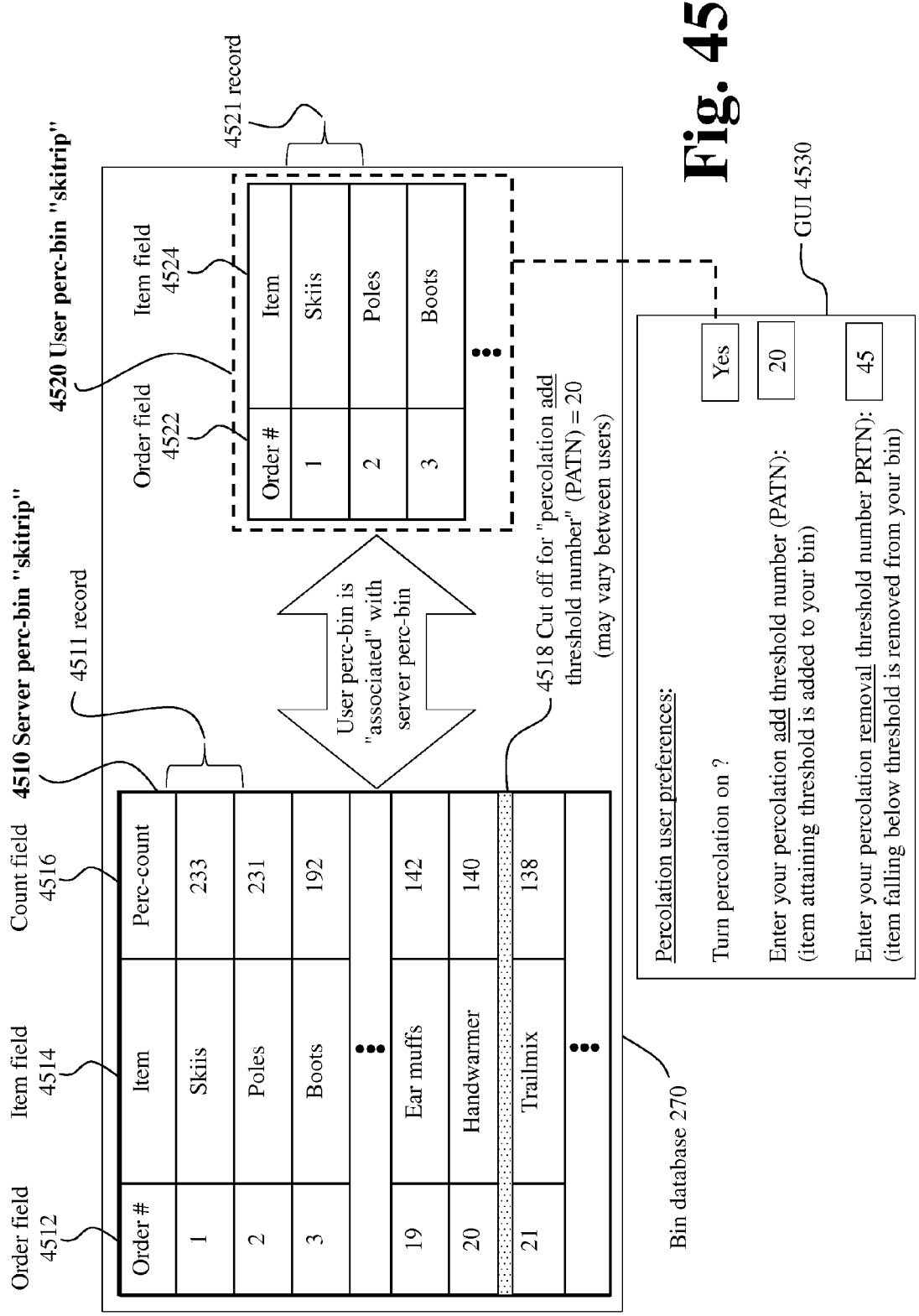
FIG. 45 is a diagram showing a further example of transfer of content between bins, in accordance with one embodiment of the invention.
Figure 46:
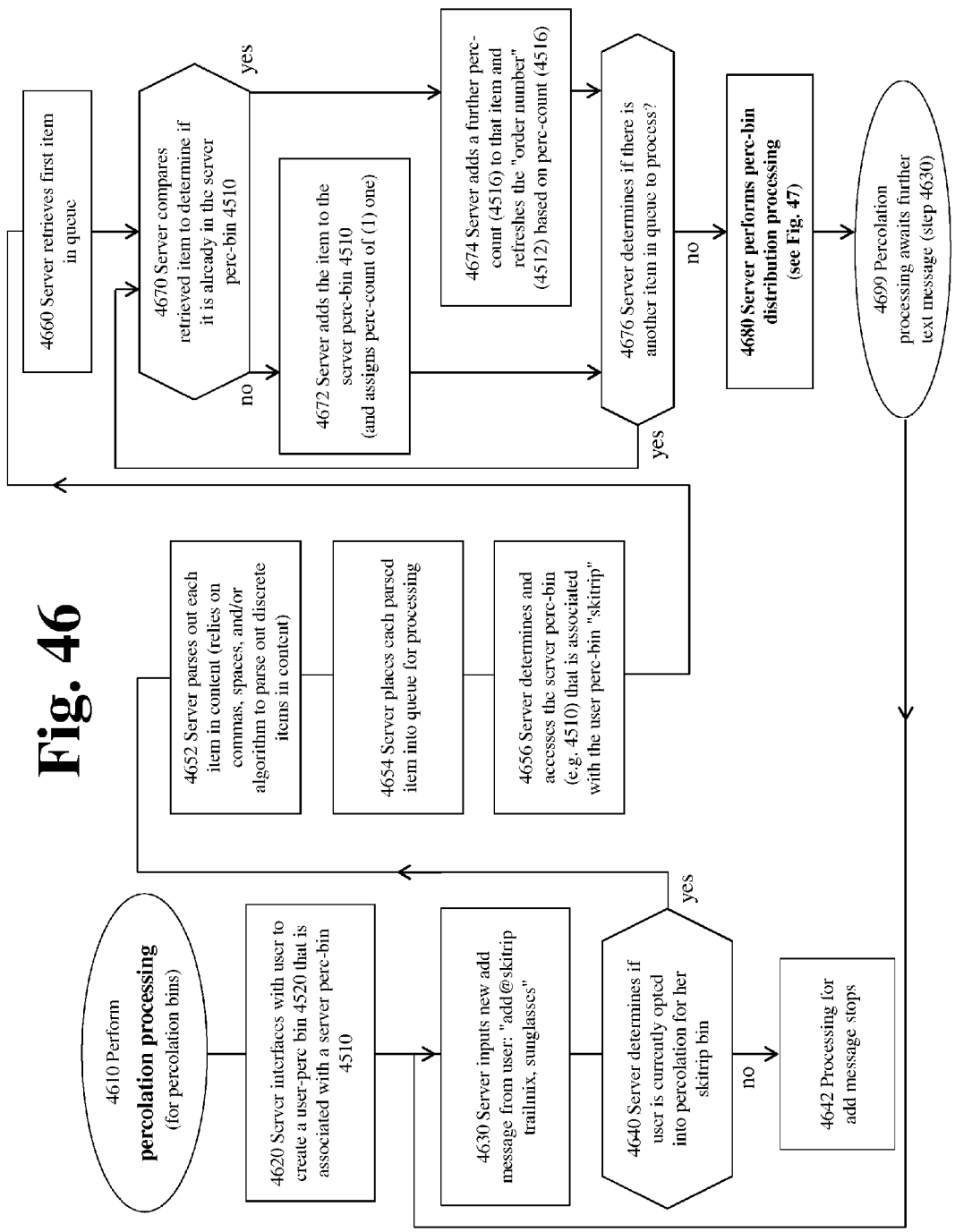
FIG. 46 is a flowchart showing further details of percolation processing in accordance with one embodiment of the invention.
Figure 47:
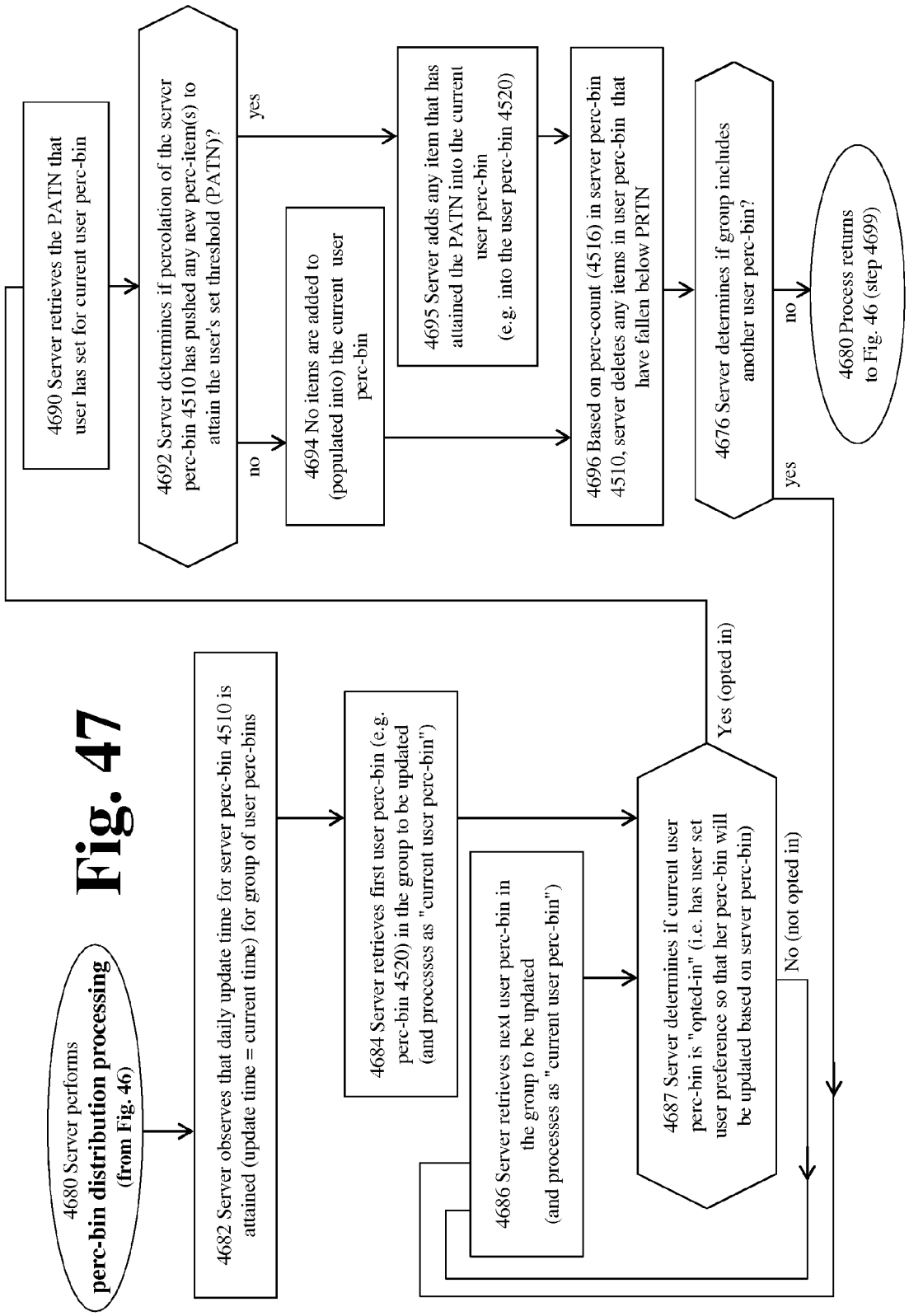
FIG. 47 is a flowchart showing details of "perc-bin distribution processing" in accordance with one embodiment of the invention.

FIG. 45 is a diagram showing a further example of transfer of content between bins, in this case a server percolation-bin (perc-bin) and a user percolation bin (perc-bin). Accordingly, the processing of FIG. 45 and related FIG. 46 and FIG. 47 are characterized herein as "percolation" processing. In percolation processing, items added to a user perc-bin are compared with content in an "associated" server perc-bin. Based on the comparing performed by the server, the attributes of the server perc-bin are adjusted. Further, the content of each user perc-bin that is associated with the particular server perc-bin may also be adjusted, either in real time or in some batch periodic manner As used herein, the term "real-time" means that a sequence of processing is initiated and continued so as to provide the particular result, such that the particular result is achieved momentarily, i.e. within seconds or other short period of time. Accordingly, a server perc-bin contains content and related attributes that are evolved based on interfacing with a plurality (e.g. a small group, thousand, or millions) of user perc-bins. Relatedly, a user perc-bin is characterized by (1) a user bin that the user "associates" with a particular server perc-bin (and as a result such user bin becomes a user perc-bin. Such user perc-bin may be opted into percolation for the particular bin, i.e. meaning that the user perc-bin is not only associated, but also interfaces with the server perc-bin—so as to percolate. That is, for a particular user perc-bin, a user may turn percolation "on" or "off" as desired. Details are described further below with reference to FIGS. 46-47.

In the example below, for purposes of illustration, the percolation processing is described in the context of a "skitrip" bin. However, it is of course appreciated that the processing may be applied to a bin of any nature, content, or name. In general, it is of course appreciated that processing described herein, in the context of a particular nature, content, or name bin, may be applied to other bins as desired.

FIG. 45 shows a server perc-bin skitrip 4510 and a user perc-bin skitrip 4520. As shown, such bins may be disposed in the bin database 270 in the server 200. In percolation processing, a user adds content to and pulls content from to her user perc-bin skitrip 4520 in the same manner as she would add/pull content with a standard bin, such "standard bin" being that as shown in FIG. 1, for example. However, with a perc-bin, a particular sequence of processing is initiated upon the user adding content. In addition, the contents in a user perc-bin may be organized in a particular manner The content in the user perc-bin 4520 might be organized based on order number (as described below), segregated based on content added by the user vis-à-vis the content input from the server perc-bin 4510, or organized in some other manner As shown in FIG. 45, the content in the user perc-bin 4520 is organized based on order number. That is, in this embodiment, as content is added to the user perc-bin 4520, each item in such content is associated with an order number. The order number (disposed in an order field 4522) and the item (disposed in an item field 4524) constitute a record 4521. In this example, the order number of each record is based on the perk count of each item in the server perc-bin 4510 (as described below). Accordingly, regardless of whether the particular item was directly input via an add message from the user or input from the server perc-bin 4510 (percolated in), the items in the user perc-bin 4520 are ordered based on perk count in the server perc-bin 4510. In the situation that an item added by the user is not added into the server perc-bin 4510 (as described below), then such item may be presented to the user along with suitable indicia reflecting such non-inclusion in the server perc-bin 4510. That is, for example, presented to the user via text message (add message) or via web interface.

As shown in FIG. 45, in the server perc-bin 4510, each item is also disposed in a respective record 4511. Each record 4511 includes an order number (disposed in an order field 4512), an item (disposed in an item field 4514), and a perk count (disposed in a count field 4516). The user perc-bin 4520 (along with various other users' perc-bins) are associated with the server perc-bin 4510. It is appreciated that such associated bins are by design intended to retain the same kind, or at least similar, type content. As the user adds content to her own perc-bin 4520, the particular item added is compared with other items added previously to the server perc-bin 4510. If an item is not already in server perc-bin 4510, then that item is added to the server perc-bin 4510. If an item is indeed already in the server perc-bin 4510, then that item receives an additional perk count. The core aspect in such processing is that a user only sees a small portion of items that are in the server perc-bin 4510. The particular number of items seen is controlled by the user set "percolation add threshold number" (PATN). Items (in the server perc-bin 4510) whose order number rises above the threshold PATN will be output to the "associated" user perc-bin 4520. For example, if the PATN is set at 20, then the user only sees the top 20 items in the server perc-bin 4510. For example, with a PATN of 20, the user would not see the item "trailmix" since its order number is 21. As shown in the server perc-bin 4510, the PATN 4518 is set at 20. As described below, the PATN will vary based on the user setting. Illustratively, the user may think that trailmix is a good item to remember when going on a ski trip—and send a text message (to her bin collection in the server 200) "add@skitrip trailmix". As noted above and shown in FIG. 45, the item "trailmix" is indeed already in the server perc-bin 4510, but is not seen in the user perc-bin 4520, since the user PATN is set at 20, and the order number of trailmix is 21. Indeed, as shown in FIG. 45, the trail mix item has received 138 perk counts versus the 140 perk counts for handwarmer. The add message of the user, "add@skitrip trailmix", will result in a further perc-count added to "Trailmix". Thus, the perc-count of trailmix will go from 138 to 139. As a particular item gets more perc-counts, relative to other items, that item is pushed up in the perc-list. Accordingly, if the user had set her PATN count at 25, then the item "trailmix" would have been populated into the user perc-bin 4520. Relatedly, it is appreciated that normalization processing may be performed in percolation processing. Such normalization processing would equate variations of the same item, such as "trail mix" vis-à-vis "trailmix".

FIG. 45 also shows a graphical user interface (GUI) 4530, which may be presented to the user via web interface. As shown, the GUI 4530 allows the user to turn percolation "on" or "off"; to adjust the PATN; and to adjust the percolation removal threshold number (PRTN). The PRTN controls when an item is removed from the user perc-bin 4520. That is, once the order number of a particular item falls below, i.e. is less than, the PRTN—then such item is removed from the user perc-bin 4520. Thus, the PRTN essentially allows the user to specify that she only wants to see (in her user perc-bin 4520) the top 45 items as ordered in the server perc-bin 4510. One processing caveat is that the server processing may afford that any item added by a user will not be deleted from the user's perc-bin 4520 due to percolation processing—i.e. the server may attach suitable attributes to each item so as to designate whether such item was added by the user to her own bin; or alternatively, added from the server perc-bin 4510 by percolation processing.

The server may dictate that the PATN is always less than or equal to the PRTN. Otherwise, the addition of an item (to a user perc-bin 4520) based on the PATN vis-à-vis the removal of an item (from the user perc-bin 4520) based on the PRTN—would be in conflict with each other. In general, a user may be provided the ability to delete any item via editing her bin. Upon deletion of an item, the server may be programmed to remember such deletion, so as not to add that particular item back into the user perc-bin 4520. In this manner, a user may "override" the percolation processing. It is appreciated that other functionality may be provided to override the automated percolation processing.

It is appreciated that the percolation processing is not limited to the particular file architecture shown in FIG. 45. For example, the particular format of the record 4511 may be varied. Indeed, in lieu of a record format, the server perc-bin 4510 may be constituted by an architecture of attributes and associations so as to provide the functionality of the percolation processing described herein. In general as described herein, functionality may use a "less than" approach and/or a "more than" approach. Accordingly, for example, in FIG. 45 a high perk count may result in a high order number, such that the items with the highest order number are percolated, i.e. populated, over to an associated, opted in user perc-bin. Indeed, in this particular example, the perk count may constitute the order number.

FIG. 46 is a flowchart showing further details of percolation processing in accordance with one embodiment of the invention. The process starts in step 4610 and passes to step 4620. In step 4620, the server interfaces with the user to create a user perc-bin 4520 that is "associated" with a server perc-bin 4510. Alternatively, the user may interface with the server to associate one of her existing bins with the server perc-bin 4510. For example, on her own, the user may have already created and populated a bin dedicated to ski trip items. Once the user has associated her perc-bin with the server perc-bin 4510, then percolation processing may occur.

Step 4630 represents that at some point in time the server inputs a new add message from the user "add@skitrip trailmix, sunglasses". Then, in step 4640, the server determines if the user is currently opted into percolation for her skitrip bin. If no, then the process passes to step 4642 and percolation processing for the particular add message stops. If yes, then the process passes to step 4652. As described herein, percolation processing is "two-way" in that content is both pushed and pulled from the user perc-bin 4520 vis-à-vis the server perc-bin 4510. In the example of FIG. 45, the user turns percolation on or off, i.e., turns both push and pull off. However, such options may be bifurcated such that the user opts to push content to the server perc-bin 4510 but not to pull content, or alternatively, the user opts to pull content from the server perc-bin 4510 but not push content. In summary, the user may be provided the ability to turn percolation on or off for both pushing content to the server perc-bin 4510 and pulling content from the server perc-bin 4510, as such pushing and pulling are described further below.

In step 4652, the server parses out each item in the content of the text message. Such parsing may rely on commas, spaces, and/or a suitable algorithm to parse out discrete items in the content. For example, a waiting algorithm might be utilized to analyze the words "trail mix" to access that such character string should be read together to constitute an item, as opposed to interpreting such character string as "trail" and "mix". Further, the server may utilize a matching or comparison algorithm to suitable databases.

Then, in step 4654, the server places each parsed item into a suitable queue for processing. Then, in step 4656, the server determines and accesses the server perc-bin, for example server perc-bin 4510, that is associated with the user perc-bin. Then in step 4660, the server retrieves the first item in the queue. In step 40 670, the server compares the retrieved item to determine if it is already in the server perc-bin 4510. Normalization processing may be utilized such that slight misspellings or other variations are taken into account. If no in step 4670, then the process passes to step 4672. In step 4672, the server adds the item to the server perc-bin 4510. The server also assigned a perk count of 12 such item. The process then passes to step 4676 in which the server determines if there is another item in queue to process. If yes, then the process returns to step 4670, in processing continues as described above. On the other hand, if yes in step 4670, i.e., the retrieved item is already in the server perc-bin 4510, the process passes to step 4674. In step 4674, the server adds a further perk count (4516) to that item and refreshes the "order number" (4512) based on the perk count (4516). The process then passes to the step 4676.

With further reference to step 4676, if the server determines there is indeed not another item in queue to process, then the process passes to step 4680. In step 4680, the server performs perc-bin distribution processing, as described below with reference to FIG. 47.

After step 4680 of FIG. 46, the process passes to step 4699. In step 4699, the percolation processing waits for a further text message.

With further reference to step 4672, when adding an item to the server perc-bin 4510, the server might compare the item to a database of items to determine if the character sequence is acceptable to add. For example, objectionable terms may not be added. However, relatedly, it is appreciated that objectionable terms likely would not be introduced into a sufficient number of user perc-bins such that such objectionable term would percolate up to a sufficient degree so as to be pushed out from the server perc-bin 4510 to user perc-bins 4520. Accordingly, the system may inherently limit the introduction of objectionable terms. In one embodiment, it is appreciated that the server may interface with a human user so as to ascertain whether a questionable term should be added into the server perk and 4510.

In similar vein, it is appreciated that if a user perc-bin is in sync with a popular interpretation of the server perc-bin (i.e. what most people see the particular server perc-bin as being about), then items added to that user's perc-bin 4520 will have greater impact on percolation in the server perc-bin 4510. In other words, an item will only be percolated up in the server perc-bin 4510 if a substantial number of people "add" the same item. Accordingly, an outlier item such as "beach fan" (added to the user perc-bin 4520) would likely never be percolated up in the server perc-bin 4510 because few others would add such item into their respective user perc-bin 4520.

FIG. 47 is a flowchart showing details of the "perc-bin distribution processing" step 90 of FIG. 46, in accordance with one embodiment of the invention.

The process starts in step 4680, and passes to step 4682. In step 4682, the server observes that the daily update time for the server perc-bin 4510 is attained for a group of user perc-bins 4520 that are associated with such server perc-bin 4510 (i.e., update time=current time). That is, a particular server perc-bin might be associated with 5,000 user perc-bins 4520, for example. Step 4682 reflects that those 5000 user perc-bins 4520 might be broken out into 10 groups of 500 user perc-bins 4520, for e no I don't but that something to be example. In order to distribute out processing load, the server may respectively perform the processing of FIG. 46 on each of such groups throughout the day. However, the particular timing of percolation distribution processing may be controlled in other manner For example, percolation distribution processing might be performed based on prompt from the user, in real time, or in some other periodic rolling manner, for example.

Relatedly, percolation processing may be directed to a particular group of people such that percolation processing for that particular group is segregated vis-à-vis percolation processing for other persons. In one embodiment, a single user may interface with the server so as to create a server perc-bin 4520 that is associated with that user, as well as of course associated with a user perc-bin 4520 of that user. That single user might then invite friends to join her percolation bin 4520. Such may be desirable in that the segregated server perc-bin 40 520 would then evolve through percolation with friends of the particular user. The involvement of such a segregated server perc-bin 4510 might be assisted via a social networking mechanism, such as FACEBOOK.

Accordingly, in step 4682 of FIG. 47, the server is dictated to provide percolation distribution processing for a particular group of user perc-bins 4520. After step 4682, the process passes to step 4684. In step 4684, the server retrieves the first user perc-bin in the group to be updated, and tags that first user perc-bin for processing as the "current user perc-bin". Then, the process passes to step 4687. In step 46 a seven, the server determines if the current user perc-bin is "opted in". That is, has the user set her user preferences so that her perc-bin will be updated based on the content in the server perc-bin. In other words, has the user set her preferences such that an item in the server perc-bin 4510 (which has attained the user set PATN) will be percolated, i.e. pushed, to her user perc-bin 4520. If no, i.e. the user has not opted in, then the processing passes to step 4686. In step 4686, the server retrieves the next user perc-bin in the group to be updated. Processing then again passes to step 4687—with that next bin tagged for processing as the "current user perc-bin".

On the other hand, if yes in step 4687, then the process passes to step 4690. In step 4690, the server retrieves the PATN retrieves the PATN for the particular user perc-bin 4520. Then, in step 4692, the server determines if percolation of the server perc-bin 4510 has pushed any new perk items so as to attain the user's set threshold (PATN). If no, the process passes to step 4694. In other words, this means that since the last percolation distribution, no item in the server perc-bin 4510 has attained sufficient popularity so as to be pushed out to the particular user perc-bin 4520. Accordingly, in step 4694, no items are added to, i.e. populated into, the current user perc-bin 4520. After step 4694, the process passes to step 4696.

On the other hand, if yes in step 4692, then the process passes to step 4695. In step 4695, the server adds any item that has attained the PATN into the current user perc-bin 4520.

Generally speaking, the processing of FIG. 46 generally is directed to the pushing of items from the user perc-bin 4520 to the server perc-bin 4510. On the other hand, the processing of FIG. 47 generally is directed to the pulling of items from the server perc-bin 45102 the user perc-bin 4520. It is of course appreciated that the characterization of "pulling" and "pushing" is a matter of interpretation, for purposes of description, depending on a perspective from the user perc-bin 4520 or the server perc-bin 4510.

After step 4695, the process passes to step 4696. Step 4696, relates to potential deletion of items in the server perc-bin 4520. That is, based on the perk count (4516) in the server perc-bin 4510, the server deletes any items in the user perc-bin 4520 that have fallen below the PRTN. However, as described above, such deletion may be overridden by preferences set by the user.

Then, in step 4676, the server determines if the group includes another user perc-bin 4520. If yes, then the process passes to step 4686, in processing continues as described above. On the other hand, if no, then processing passes to step 4680—in which the process returns to FIG. 46 and step 4699.

Accordingly, as described above, the content in the user bin 4520 (which is specifically a user perc-bin 4520) is manipulated by percolation processing. However, it is of course understood that such content may be retrieved by the user in the same manner as a standard bin—such as by web interface or text message, for example. When the user accesses the bin 4520 via the web, the server may present the items in the bin in simple linear form (e.g. skis, poles, boots, gloves, . . . ), for example. With user interface with the server 200 via text message, a user might send a text message "get@skitrip" to the server—so the server will send the content to the user in the form of a "report message". In such report message, the server may include items with order number associated with each item, as illustrated in FIG. 45.

As described above, items in the server perc-bin 4510 are percolated up based on other users adding the same item into their user perc-bin 4520. Other functionality may be provided to percolate items. For example, the voting functionality may be provided such that users may review items in the server perc-bin 4510 and vote on such items. Percolation processing might implement a quid pro quo approach such that a user would be required to contribute to the server perc-bin 4510, in some manner, so as to gain the benefits of interaction with the server perc-bin, such benefits including tapping into the collective thought and insight of a group of people. For example, a user might be required to opt into percolation processing and/or vote on items in the server perc-bin 451. The processing may provide a user with the ability to search a plurality of server perc-bins 4510—so if the user was going on a ski trip, she could then search the server perc-bins 4510 for a bin that is related to "ski". Accordingly, in some embodiments, a user may be provided the ability to search a server perc-bin that she is not opted into or otherwise associated with, i.e. the server perc-bins might be public.

In one embodiment, percolation processing may be utilized in the environment of polling. Specifically, percolation processing in one aspect is directed to the aggregation of ideas by users. As a result, percolation processing might be utilized in the environment of political analysis, for the gathering of public opinion, for example. In general, it is appreciated that various processing described herein may be highly useful in a polling situation.

Figure 48:
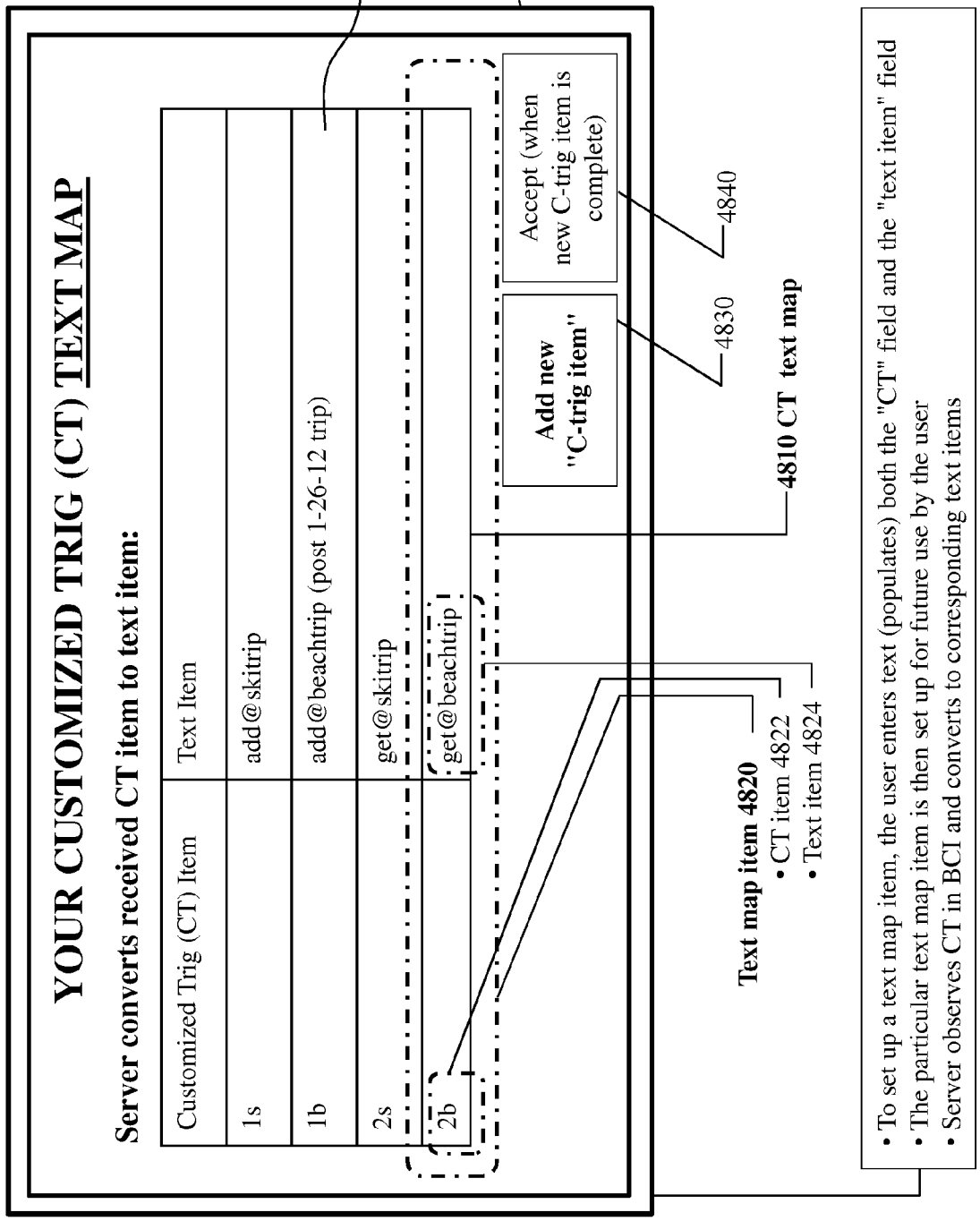
FIG. 48 shows a "customized trig (CT) text map" GUI in accordance with one embodiment of the invention.
Figure 49:
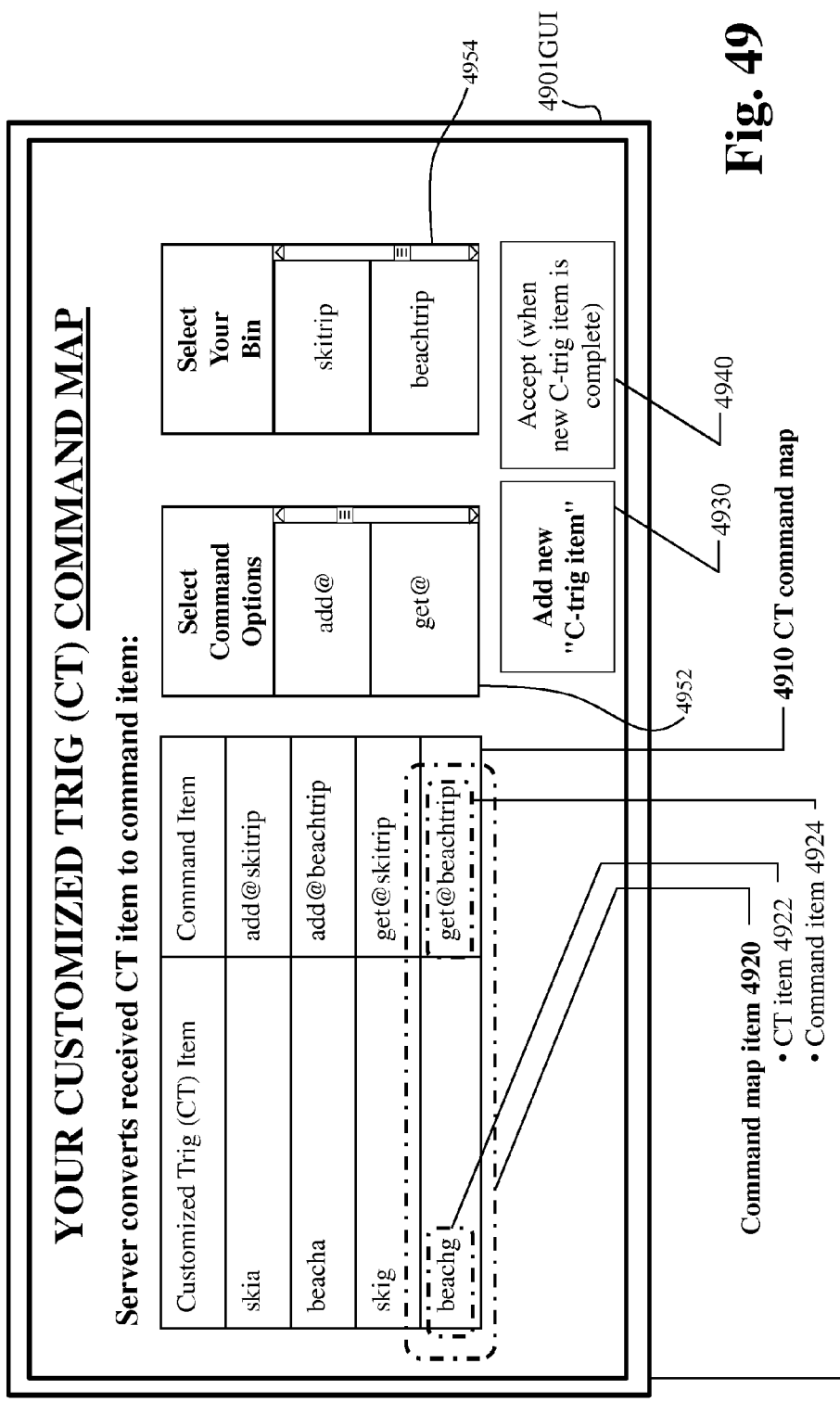
FIG. 49 shows a "customized trig (CT) command map" GUI in accordance with one embodiment of the invention.

Hereinafter, further aspects of the invention relating to conversion of text will be described. FIGS. 48 and 49 illustrate processing performed by the server in which specific text (received in a text message from the user) is converted by the server.

FIG. 48 shows a "customized trig (CT) text map" GUI 4801 in accordance with one embodiment of the invention. The GUI 4801 includes a CT text map 4810. The CT text map 4810 includes a plurality of user created text map items 4820. Each text map item 4820 includes a CT item 4822 and a text item 4824. With the text map feature of FIG. 48, once the text map item 4820 is set up, the server converts a CT item (received from a user) to a text item that the CT item corresponds to. Such conversion of the received item to a generated item is performed prior to the server further processing the text message. Once the conversion is performed, the text message is processed as if that text was initially received from the user, in accordance with one embodiment of the invention.

Thus, for example, a user might send the server a text "1s hand warmers". The server processes the text and recognizes "1s" as a CT item (as reflected in FIG. 48) and converts "1s" to "add@skitrip". The server then processes the text as "add@skitrip hand warmers"—i.e. the server adds the content "hand warmers" into the user's skitrip bin. As a further example, the user might send the server the simple two character text message "2s". The server recognizes such text as a CT item and (as reflected in FIG. 48) converts such text to "get@skitrip". Accordingly, the user may set up their CT text map 4810 so that they merely need to text "2s" to pull content from her ski bin. The CT text map 4810 provides the user substantial capability to craft customized trigs to be in harmony with the user's mental thought processes. In other words, the user can craft trigs in such manner to make it easy to remember. A user might craft a customized trig scheme in whatever manner most works for him or her. FIG. 48 reflects a scheme in which the user remembers that the initial character in an add message is always "1", and further, that the second character is always the first letter of the particular bin. The user may craft her bin collection so as to not use the same first letter for multiple bins. In parallel manner, the user may craft her customized trigs such that the initial character in a send message is always "2". In this manner, a user can add and pull content from her bins in a highly efficient and quick manner. The methodology is quick in that only two characters are required. The methodology is efficient in that the customize trig is crafted by the user to be in harmony, i.e. in sync, with the user's mental thought processes.

As a further example, the user might set up CT items as "s!" (4822) is converted to add@skitrip (4824), as well as "s!!" (4822) is converted to "get@skitrip" (4824). Such would afford quick entry by user, since the user taps the particular primary key "s" to specify the particular bin, then ALT, the same key for add message, OR ALT same key again for the send message (assuming that the user's phone has s and ! as the same physical key). This memory scheme might be very intuitive to some users. As used herein, a "send message" may interchangeably be characterized as a "get message", i.e. in that such message prompts the server to get or retrieve content and send that content back to the user in a report message.

As shown in FIG. 48, to set up a text map item, the user may first click the add new item button 4830 to tell the server to generate a new text map item 48204. Then, the user enters text (populates) both the CT item 4822 and the text item 4824. Once both fields are populated, the user may click the "accept" button 4840. The accept button 4840 may be inactive (lighter in color) until both the CT item field 4822 and the text item field 4824 are populated in an acceptable manner The server may impose certain constraints on the items (4822, 4824). For example, the server might preclude a CT item 4822 that contains an "@". Once the user clicks the accept button 4840, the text map item 4820 is then set up for future use by the user. Specifically, upon the server observing the CT item 4822 in a text message (or e-mail for example) the server converts that item to the corresponding text item 4824.

An option may be provided to the user to dictate that for the server to recognize a CT item 4822, that item must be a standalone character string—to avoid inadvertently generating a text item 4824 based on a part of a word. That is, the character string "1summer" in a text message would not trigger the generation of "add@skitrip" (see FIG. 48) since "1s" was not a standalone. Further, it is appreciated that the server might implement hierarchical processing, such that certain processing would be performed first.

FIG. 49 shows a "customized trig (CT) command map" GUI 4901 in accordance with one embodiment of the invention. The GUI 4901 includes a CT command map 4910. The CT command map 4901 includes a plurality of user created command map items 4920. Each command map item 4920 includes a CT item 4922 and a command item 4924. With the command map feature of FIG. 49, once the command map item 4920 is set up, the server knows that if it sees a particular CT item 4922 in a text message from the user, then the server will perform the particular command that that command item 4924 is mapped to. Thus, distinct from the processing of FIG. 48, the command map processing of FIG. 49 does not convert text input from the user, but rather recognizes the CT item 4922 and maps such recognized item to a particular command item.

Thus, if the user sends the text message to the server "skia hand warmers" to the server, the server will add the content "skia hand warmers" to the user's skitrip bin. Note the content remains unchanged. However, the server has recognized the character string "skia" as dictating the server to add the text into the user's "skitrip" bin. In one embodiment, the CT item 4922 might be retained in the content added to the bin, or alternatively, the CT item 4922 (here e.g. skia) might be stripped out from the content prior to adding into the user's bin.

Figure 50:
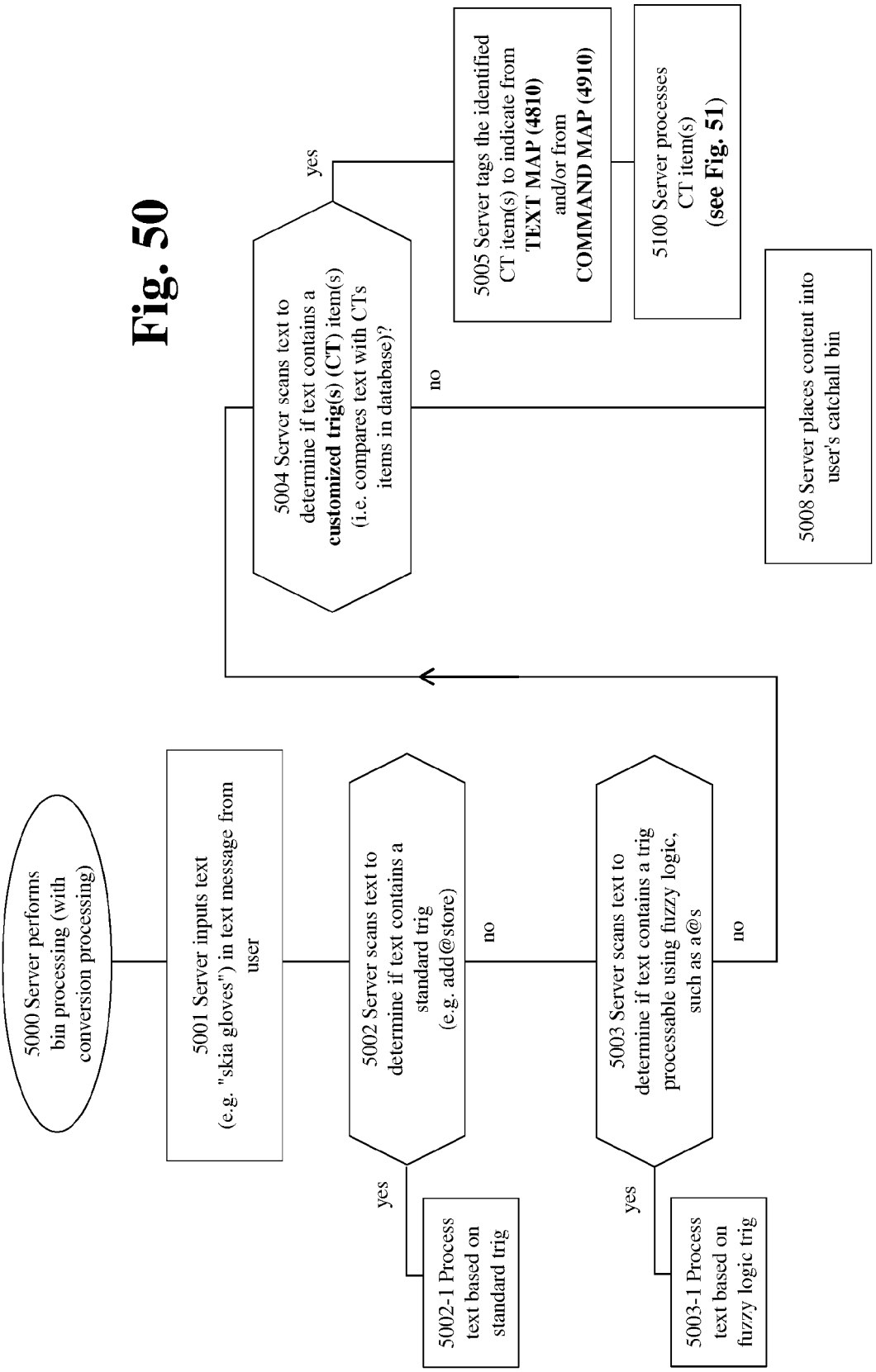
FIG. 50 is a flowchart showing further aspects of conversion processing in accordance with one embodiment of the invention.
Figure 51:
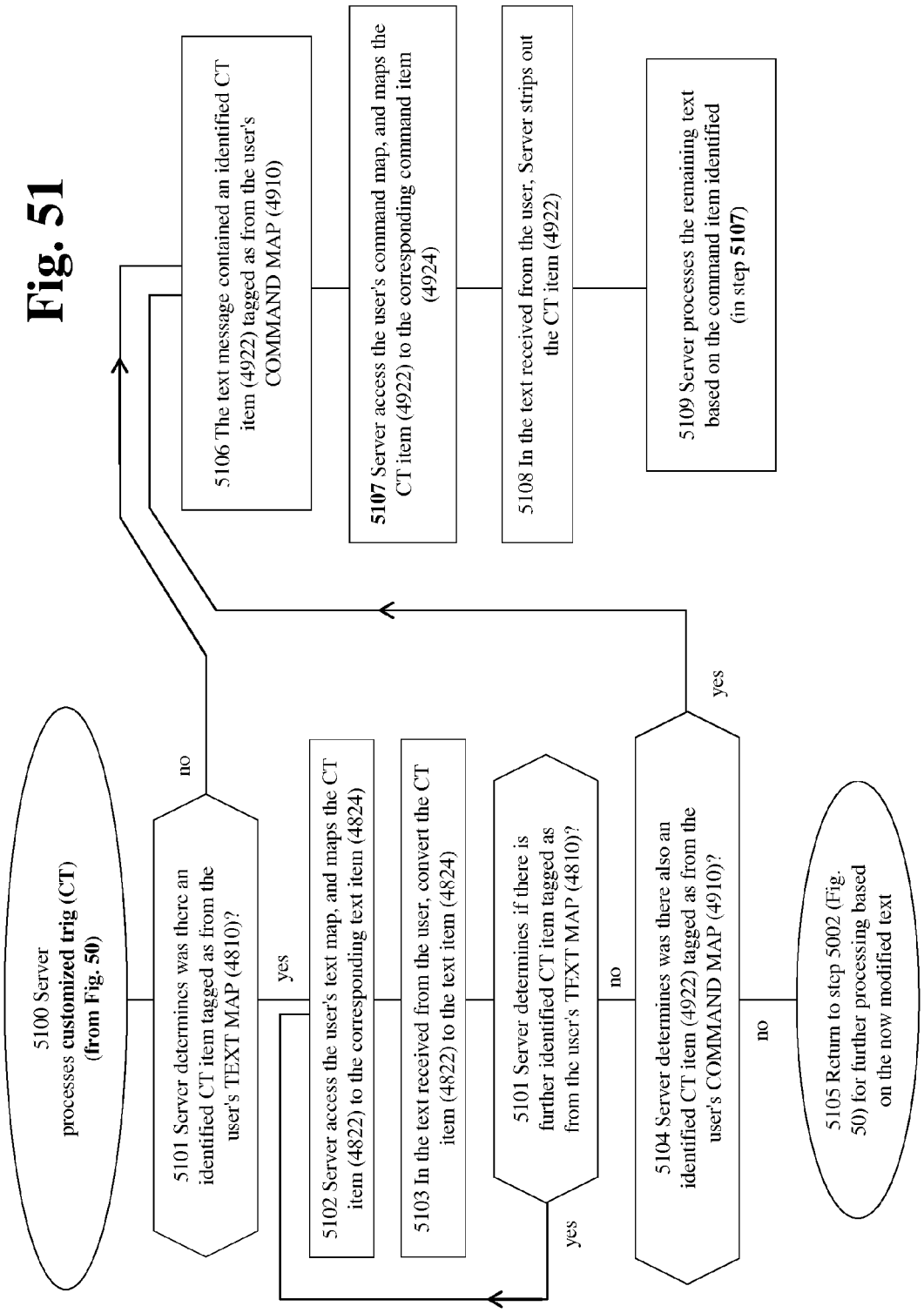
FIG. 51 is a flowchart showing further details of the "server processes CT items", in accordance with one embodiment of the invention

Processing may be implemented to reconcile the processing of FIG. 48 vis-à-vis FIG. 49. For example, the server might first look to see if a text message contains a CT item (4822, 4922) that maps to a command item 4924. If no, then the server may then check if the CT item maps to a text item 4824. FIGS. 50 and 51 further illustrate how such hierarchical processing may be performed. That is, for example, that an observed command map item 4920 takes precedence, i.e. priority, over an observed text map item 4820.

As shown in FIG. 49, to set up a command map item, the user may first click the add new item button 4930 to tell the server to generate a new command map item 49204. Then, the user enters text (populates) both the CT item 4922 and the command item 4924. Once both fields are populated, the user may click the "accept" button 4940. The accept button 4940 may be inactive (lighter in color) until both the CT item field 4922 and the command item field 4924 are populated in an acceptable manner The server may impose certain constraints on the items (4922, 4924). For example, the server might preclude a CT item 4922 that contains an "@". Once the user clicks the accept button 4940, the command map item 4920 is then set up for future use by the user. Specifically, upon the server observing the CT item 4922 in a text message (or e-mail for example) the server converts that item to the corresponding command item 4924.

An option may be provided to the user to dictate that for the server to recognize a CT item 4922, that item must be a standalone character string—to avoid inadvertently generating a text item 4924 based on a part of a word.

In contrast to the text item 4824, the command item 4924 is of a particular structure. That is, in one embodiment, the command item 4924 is required to be of the form of a standard trig (such as shown in FIG. 4 above). Relatedly, the GUI 4901 may be provided with a "select command options" menu 4952 and a "select your bin" menu 4954. The functionality allows a user to scroll to a particular command, using the menu 4952, and then drag that command over to the command item field 4924. In similar manner, the user may bin menu 4954, and then drag that bin over to the command item field 4924. The server may add to the "@" in automated manner once the "command" and "bin" are dragged and dropped.

Relatedly, and to explain further, the CT textmap 4801 of FIG. 48 is not so regimented as to the text item 4824. That is, while the user has opted to populate the text items 4824 of FIG. 48 with "add" and "get" messages, for the most part, such is not required. The user may populate the text item 4824 field (and the CT item field 4822) with whatever content the user desires. This is illustrated by the text item 4824'— "add@beachtrip post 1-26-12 trip". For example, once the text map item 4820 (containing the text item 4824') is set up, the user might send a text message to the server "1b tent". The server would then convert such to "add@beachtrip post 1-26-12 trip tent" (using the CTR text map). The server then processes such text, an add message. This results in the content "post 1-26-12 trip tent" being added into the user's beachtrip bin. Thus, using the CT text map 4810, the user has effectively set up her own personal tagging methodology—such that she can pull content from her skitrip bin (either via text message (get message) or web interface, for example) and know which bin-content items were added after her 1-26-12 beach trip.

Conversion processing may include further features. A user's CT text map 4810 of FIG. 48 may include different CT items 4822 that are mapped into the same text item 4824. A user's CT command map 4910 may include different CT items 4922 that are mapped into the same command item 4924. A user may include a CT item 4822 (that maps into a corresponding text item 4824) and a CT item 4922 (that maps into a corresponding command item 4924) in the same text message. In such situation, the CT item 4822 might be processed first, and then the CT item 4922. The server may keep a log of all conversion processing which may be accessible by the user for review at some later time.

FIG. 50 is a flowchart showing further aspects of conversion processing related to the processing of FIGS. 48 and 49. The processing of FIG. 50 shows conversion processing using both a text map and a command map.

The process of FIG. 50 starts in step 5000 and passes to step 5001. In step five dozen one, the server inputs text, for example "skia gloves" in a text message from the user. Then, in step 5002, the server scans the text to determine if the text contains a standard trig, such as add@store. If yes, the process passes to step 5002-1, in which the server processes the text based on a standard trig. If no, then the process passes to step 5003. In step 5003, the server scans the text to determine if the text contains a trig (such as "a@s") processable using fuzzy logic. If yes, the process passes to step 5003—one in which the text is processed using fuzzy logic. For example, a@s might be converted to add@store, using fuzzy logic as described above. If no in step 5003, the process passes to step 5004.

In step 5004, the server scans the text determine if the text contains a customize trig. In this processing, the server compares each item of text (e.g. Discrete items as demarcated by spaces) with customized trig (CT) items in the database. The CT item might map into either the CT text map 4810 or the CT command map 4910. If there are no CT items, then the process passes to step 5008 in the server places the content into the user's catchall bin.

If yes in step 5004, the process passes to step 5005, in which the server tags the identified CT item to indicate whether that CT item is from the text map 4810 and/or the command map 4910. Note that to reconcile a conflict between the same CT item being in both the map 4810 and the map 4910, the processing of FIG. 51 described below invokes and inherent hierarchy. After step 5005, the process passes to step 5100. In step 5100, the server processes the CT item(s) as described below with reference to FIG. 51.

FIG. 51 is a flowchart showing further details of the "server processes CT items" step 5100 of FIG. 50, in accordance with one embodiment of the invention the processing of FIG. 51 starts in step 5100 and passes to step 5101. In step 5101, the server determines whether there was an identified CT item tagged as from the user's text map 4810. If yes, then the process passes to step 5102. The server accesses the user's text map, and maps the CT item 48222 the corresponding text item 4824. Then, in step 4103, in the text received from the user in the text message, the server converts the CT item 4822 to the text item 4824. Then, in step 5104, the server determines if there is a further identified CT item tagged is from the user's text map 4010. If yes, then the process returns to step 5102, in processing proceeds as described above. If no in step 5101, the process passes to step 5104. The server determines if there was also an identified CT item 4922 tagged as from the user's command map 4910. If no, the process passes to step 5105. In step 5105, the processing returns to step 5002 and FIG. 50 for further processing based on the now modified text.

With further reference to step 5101, if "no" in step 5101, then the process passes to step 5106. Also, if yes in step 5104, then the process passes to step 5106. Step 5106 reflects that the text message did contain an identified CT item 4922 tagged as from the user's command map 4910. Accordingly, in step 5107, the server accesses the user's command map, and maps the CT item 4922 to the corresponding command item 4924. Then, in step 5108, in the text deceived from the user, the server strips out the CT item 4922, in one embodiment. That is, at this point in the processing, the server has determined the particular processing to be applied to the user received text message based on the mapped to "command item." Accordingly, the processing does not retain the text which dictated such processing. Then, in step 5109, the server processes the remaining text based on the command item identified, i.e., the command identified in step 5107. Functionality may be provided such that a particular CT item is mapped to multiple commands. The commands that are mapped to may dictate various manipulation of content. Accordingly, after initial setup by the user, the user may map a single CT item to a potentially complex set of commands, which may be very helpful and efficient to the user.

As noted above, the processing of FIG. 51 includes an inherent hierarchy in that text map items trump command map items. Specifically, step 5101 initiates processing of any text map items prior to the processing of any command map items. It is appreciated that such hierarchy may be varied as desired. For example, in more complex processing, the user may be provided with a preference capability to indicate which customize trig items will be processed prior to other CT items, regardless of whether such CT items are part of a text map item 4820 or a command map item 4920. For example, all the CT items might simply be presented to the user in a list that the user can order based on their preferences.

It is appreciated that the command map as described above is not limited to associating a single command to a CT item 4922. Rather, multiple commands 4924 may be associated with a single CT item 4922. This capability allows a user to invest time so as to construct more complex command functionality. Once constructed, the user may thus invoke such complex command functionality with a single CT item 4922. For example, illustratively, more complex command functionality that might be invoked by a single CT item 4922 includes: "add&sort@store" (commands the server to add the particular content to the "store" bin and to sort the content in the "store" bin); "add&send@store" (commands the server to add the particular BCI into the bin, as well as to send the content back to the user in a report message); "send@all sort@all" (commands the server to send all content in all of the user's bins, and to sort such content in some predetermined manner) As illustrated, the "&" character may be utilized to demarcate different commands in a trig. As otherwise described herein, the particular format of the trig, as well as the characters used in the trig, may be varied as desired. Relatedly, the particular processing triggered by a particular command may be varied as desired. For example, a send message that requests the server to send content of a bin to the user might be in the form of "get@movie" or in the form of "send@movie", or both. Accordingly, the particular composition of a trig and the processing that such trig effects may be based on various parameters, such as what is easier to remember, what is intuitive to the user, what more closely correlates with the content of a bin, and/or what more closely correlates with the processing being effected.

Figure 52:
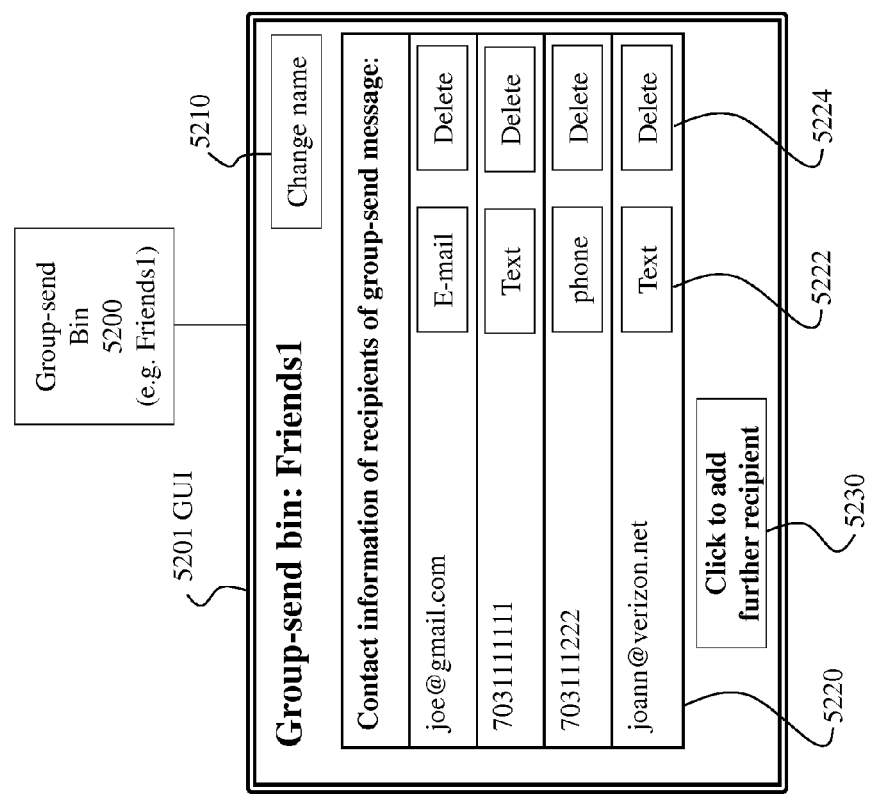
FIG. 52 is a user interface for a group-send bin in accordance with one embodiment of the invention.

FIG. 52 is a user interface for a group-send bin in accordance with one embodiment of the invention. Manipulation of a bin by multiple persons and the output of content from a bin to multiple persons are described above. For example, FIG. 23 and the related description illustrate that processing may provide for different friends to receive content from a particular bin. FIG. 52 shows a user interface (GUI) with which a user (in this example User-1) may control processing of what may be characterized as a "group-send" bin 5200. A group-send bin 5200 is a specialized bin. User-1 sends content to a group-send bin 5200 using a standard trig, such as "add@friends1". User-1 may have named a bin (in his bin collection) "friends1" to reflect a group of friends of the user. In processing for a group-send bin, any content that is added to the bin is routed out to all recipients associated with that bin. Accordingly, if User-1 sends a text message to the server "add@friends1 Meet at 9 pm", the server will first add the content "Meet at 9 PM" into the User-1's "friends1" bin. Then, the server retrieves the processing particulars (see architecture of FIG. 10) for the bin "friends1". In this example, the processing particulars dictate that the bin "friends1" is a group-send bin. Accordingly, the server sends the content (that was received from User-1) out to each of the recipients specified in the contact record 5220 (described below). As a result, the group-send bin provides a further mechanism by which User-1 may send a single text message to a particular bin, and have the content included in a respective text message (or other communication) sent on to a predetermined list of friends. It is appreciated that such content may be immediately deleted from the group-send bin of User-1, or retained in the group-send bin, as desired. For example, a toggle may be provided between retaining or not retaining. In retaining content, it is appreciated that in one embodiment, all content in the group-send bin would be sent out to the recipients, and not only content just received. However, in some scenarios, this may be desired.

The group-send processing may be provided to process responsive communications sent back from a recipient of a group-send. In such a scenario, the group-send recipient (e.g. in this example JoAnn, who has received the group-send text message from the server) responds with a text message back to the server. The server inputs such responsive text message from JoAnne and determines that the only point of contact that the server has had with JoAnn is via the previously sent text message to JoAnne (sent in the group-send). As a result, the server adds any text (in the text message from JoAnn) into User-1's bin "friends1", and sends that content out to the other three recipients, as well as User-1 who initiated the group-send. Accordingly, a person (here JoAnn) other than User-1 may indeed add content into a bin of User-1, which triggers processing associated with that bin of User-1. Further communication amongst User-1 and the recipients listed in the contact record 5220 may be processed in similar manner.

One nuance of such processing is a situation in which the group-send recipient (e.g. JoAnn) is indeed also a user of the At-It system. Accordingly, the system need distinguish between JoAnn sending the server a text message in response to a group-send vis-à-vis JoAnn sending the server an "add message" without a trig (such that the server would add content into JoAnn's catchall bin in JoAnn's bin collection). In one embodiment, to distinguish such two communications, the server may require that JoAnn also include the trig "add@friends1". Else, the server will simply treat the text message from JoAnn as an "add message", and place content therein into the catchall bin in JoAnn's bin collection. In the situation where JoAnn also has a bin (in her bin collection) called "friends1" then further rules may be implemented to distinguish where the content of a particular text message should be placed. In one embodiment, the server may simply process the message from JoAnne by placing the content in the text message into both the user "group-send recipient's" (e.g. JoAnn's) bin "friends1" as well as the "friends1" bin of User-1. Indeed, it may be highly desirable to place the content into both bins so that JoAnn may then have record of such communication, i.e. in that she will not have access to the "add@friends1" bin of User-1.

In a yet further embodiment, User-1 may (in his bin collection) have two bins each called "friends1". However one of such bins is a group-send bin, while another of such bins is a standard bin. Thus, a text message sent from User-1 with the trig "add@friends1" is added into both bins of User-1. However such content added into the group-send bin is immediately output to the listed recipients in the contact record 5220 and deleted from the group-send bin. On the other hand, the content added to the standard bin of User-1 is retained. Such processing further illustrates a scenario in which content may be added to two or more bins of a user (here user-1) based on a particular trig.

As described above, if the server receives a communication (e.g. text message) from a group-send recipient (in this example GSR-1), then the fact that GSR-1 was previously sent the group-send message may be sufficient information upon which the server places content from GSR-1 into the "add@friends1" bin of User-1. However, the server may be programmed to require a particular trig, such as the "add@friends1" trig be received from GSR-1, even if the responsive recipient of a group-send (GSR-1) is not a user. Based on the contact information (e.g. phone number) that the group-send message was sent out to vis-à-vis the contact information (e.g. phone number) that the text message was received in from, the server could then check that such responsive recipient (GSR-1) was previously sent a group-send message. And also, that the communication received "back in" from that responsive recipient (GSR-1) included the very same trig that was sent out to the responsive recipient (GSR-1). In this manner, the processing of the server could achieve a threshold of certainty—upon which the server would add content into User-1's "friends1" bin (in the User-1's bin collection). As described above, such addition of the content into the User-1's bin would result in a communication containing the content (received from GSR-1) being sent to the other recipients of the group-send bin as well as User-1.

As described above, FIG. 52 shows a GUI 5201—with which the user interfaces to change processing attributes associated with his group-send bin 5200. The GUI 5201 may be provided via a web interface and accessed via a suitable link presented to the user. The GUI 5201 includes a contact record 5220. The contact record 5220 includes a listing of contact information of recipients of the group-send message. In this example, the formal names of the recipients are not provided in the contact record 5220, but merely the actual contact information—text message number, e-mail address, telephone number, for example. The contact record 5220 includes a contact button 5222 that allows the user to specify the particular channel upon which the communication will be sent out from the server. Accordingly, the server takes the content in the group-send bin 5200 and generates a communication (contain the content) for forwarding via the specified channel with the specified contact information, e.g. phone number. In the situation where the specified channel is a telephone call, the content in the group-send bin 5200 may be converted to a suitable audio file, such as a WAV file for example. The contact button 5222 might be a menu type button, via which the user clicking the button 5222 results in a menu presented to the user including the items e-mail, text, phone. The user may then choose the particular medication channel desired for the particular recipient. The contact record 5220 also includes a delete button 5224, by which a user may delete a particular recipient from the contact record 5220. Also, the GUI 5201 includes an add recipient button 5230, which the user may click to add a further recipient into the contact record 5220. Further, the GUI 5201 may include a change name button 5210 by which the name of the particular group-send bin may be changed. The GUI 5201 may include other indicia such as to convey the name of the particular group-send bin, such as "Group-send Bin: Friends1" and the processing provided by the group-send bin, for example.

Figure 53:
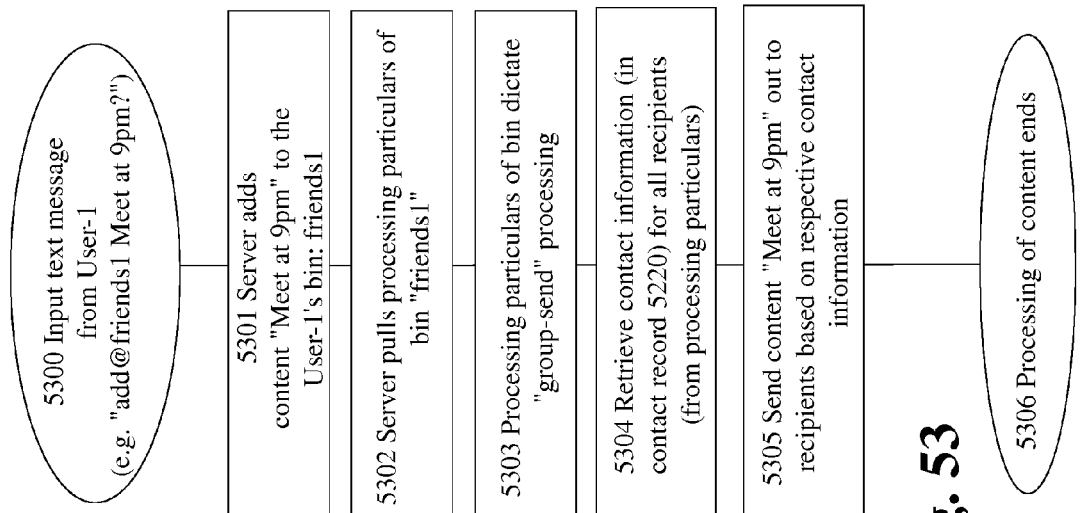
FIG. 53 is a flowchart showing group-send processing in accordance with one embodiment of the invention.

FIG. 53 is a flowchart showing group-send processing in accordance with one embodiment of the invention.

As shown, the process starts in step 5300 in which a text message is input from the user, in this example User-1. For example, using the illustration above, the text message might be "add@friends1 Meet at 9 pm?" received from User-1. By sending this text message to the server, User-1 has initiated processing using his group-send bin (add@friends1) by which the content (Meet at 9 pm?) included in the text message will be forwarded out to each of the recipients listed in the contact record 5220 that is associated with the group-send bin 5200. Accordingly, in step 5301, the server adds the content to the User-1's bin "friends1". Then, in step 53 or two, the server pulls the processing particulars that are associated with such bin. Then, in step 5303, the server performs processing based on the processing particulars of the bin. Specifically, the processing particulars specify that the bin and is a group-send bin. Then, in step 53 or four, the server retrieves the contact information for all the recipients. Such contact information may be disposed in the contact record 5220 that is also disposed in the processing particulars associated with the bin. Then, the process passes to step 5305.

In step 5305, the server sends the content "Meet at 9 pm?" To each of the recipients based on the respective contact information in the contact record 5220. Then the process passes to step five heuristics, in which the processing ends.

Various other functionality may be provided in conjunction with group-send processing. For example, in lieu of the contact information shown in GUI 5201 in FIG. 52, suitable icons might be presented, such as a picture of each respective recipient. In general, it is appreciated that contact information, bins, and/or other items may be presented using an icon or in some other manner presented symbolically. In group-send processing, as described above, the content added to a group-send bin is output to other persons. The creation of a group-send bin may be initiated via a link being presented to the user. In order to ensure that the user is aware of the processing resulting from an add message being sent to a group-send bin (i.e. that such contents will be output to recipients), particular indicia might be imposed. For example, the server may impose that a particular suffix be associated with the name of a group-send bin. Thus, the server may mandate that the group-send been described above be called "friends1.gs", as opposed to the name without suffix "friends1". In the situation that a user adds content to a group-send bin, or attempts to add content to a group-send bin, without such suffix, the server may send a "server control message" requesting confirmation that the user intended to add content to the group-send bin, i.e. prior to the server outputting the content to the listed recipients.

FIG. 54 is a block diagram showing what may be characterized as "capture assist" processing in accordance with one embodiment of the invention. The indicia "capture assist" reflects that in such processing a module on the "front-end" captures information and outputs the information to the At-It server 200. Accordingly, FIG. 54 illustrates an architecture in which the At-It server 200 supports what might be characterized as a front-end information capture system. Hand-in-hand, the At-It server 200 provides what might be characterized as a back and data organization system.

FIG. 54 shows a capture assist system 5400 that is in communication with the At-It server 200. The capture assist system 5400 includes an information capture GUI 5410 and a processing module 5420. The GUI 5410 might be presented to a user via a monitor screen disposed in the car. The module 5420 might be in the form of a loaded app, disposed on a tangibly embodied computer readable medium, which is implemented by a processing system in the car, so as to provide the functionality described herein. The module 5420 may be wired to the GUI 5410 so as to provide communication between the two components. The module 5420 is provided with suitable wireless capability such that the module may send and receive data from the server 200. For example, text messages may be sent from the module 5420 to the server 200 using technology commonly utilized in smartphones. As described below, FIG. 55 is a flowchart showing processing that is performed in conjunction with the user interfacing with the GUI 5201.

In capture assist processing, the system 5400 captures information in response to the user interfacing with the system 5400, to trigger the capture of information. The information that is captured (by sensors and conveyed to the module 5420) might include the particular song on the radio, the GPS position of the car, audio information such as the user speaking to the system 5400, the level of gas in the car, the altitude of the car, interior or exterior climatic conditions, passengers in the car as sensed by seat weight sensors, the gross weight of the car, time information, proximity to other items such as other cars, and/or other information.

The GUI 5410 includes a song on radio button 5412, a GPS position button 5414, and a voice button 5416. The GUI 5410 also includes a stow At-It button 5418, which the user presses to trigger the collection of the specified information. The GUI 5410 might be in the form of a touchscreen, for example, located on the dashboard of the car. In one embodiment, the processing may include the user touching one or more of the buttons 5412, 5414, 5416 so as to convey to the module 5420 what type of information the user wishes to collect. Then, the user presses the stow button 5418 to convey to the module 5422 to initiate the capture of the type of information that the user has specified. Accordingly, the user might touch each of the buttons 5412, 5414, 5416, and then touch the stow button 5418. In this manner, the user would capture the particular song on the radio, the GPS position of the car at that given time, and be able to record a voice message to further document the particular situation. As described below, the manner in which the information is collected varies based on the nature of the information. The module 5420 may be programmed such that if any of the buttons 5412, 5414, 5416 are pressed within 5 seconds, for example, of each other, then content resulting from a press of those buttons will be grouped into the same text message sent to the server 200, i.e. sent to a bin in the user's bin collection in the server 200. In one embodiment, the single text message might include a single trig reflecting the collective content, or multiple respective trigs reflecting each type of content. Such multiple respective trigs may be provided to result in the content being added into a respective bin that corresponds to each of the trigs, i.e. upon the text message being sent to the server 200 and processed by the server 200.

For song, car radios commonly input and contain data reflecting the artist and song name. This data (such as "Adele rolling in the deep") might be presented to the user via a known interface on the user's dashboard in her car. The module 5420 takes this information and generates a text message (to the At-It server 200) in which the information (e.g. "Adele rolling in the deep") constitutes the "content." Further, the module 5420 inserts a trig into the text message such as "add@song-car". Such might result in the generation of a text message "add@song-car Adele rolling in the deep", for example. The module 5420 then outputs such text message to the server 200. The server 200 then processes the text message using standard trig processing. Accordingly, the content Adele rolling in the deep" is added into the user's bin collection and specifically in the bin "song-car".

For GPS position, upon the user touching the GPS button 5414, the module 5420 may retrieve GPS information from a GPS device mounted in the vehicle. The module 5420 takes such GPS information and generates a text message (to the At-It server) in which the information constitutes the content, e.g. such as "25-35-45" being illustrative GPS coordinates generated by a GPS system. The module also inserts a trig into the text message such as "add@gps-car". The text message (e.g. "25-35-45 add@gps-car) is then output to the server 200 for standard trig processing.

For voice, the content of the text message that is generated by the module 5420 is based on the user speaking into a microphone in the car, after touching the voice button 5416. The microphone transmits the audio information into the module 5420. The audio information is then converted to text format, for inclusion as content into a text message generated by the module 5420. Accordingly, the content of such text message generated by the module 5420 might be "add@voice-car remember milk at store". The module 5420 then sends the text message to the server 204 for standard trig processing. That is, the content "remember milk at store" would be added into the user's bin named "voice-car". A time limit might be imposed, such as 20 seconds for the user to speak.

As noted above, FIG. 55 is a flowchart showing processing that is performed in conjunction with the user interfacing with the capture assist system 5400. The processing starts in step 5501 in which the processing module 5420 (in the car) senses user pressed "song on radio" button 5412. Then, in step 5502, the module 5420 interfaces with radio processing unit to retrieve particulars of the song, e.g. "Adele rolling in the deep".

Then, in step 5503, the module 5420 generates a text message addressed to the server 200 (e.g. 703 111 1111 (see FIG. 1)) and includes the content "Adele rolling in the deep" in the text message. Then, in step 5504, module 5420 retrieves the trig associated with the "song on radio" button 5412, such as "add@song-car" and adds that trig into the generated text message. Then, in step 5505, the text message with the text "Adele rolling in the deep add@song-car" (i.e. content and trig) is sent from the module 5420 to the server 200 (for processing by the server 200). Then, in step 5507 processing by the module 5420 ends.

In accord with embodiments of the capture assist processing described above, the user does not actually input the trig, nor does the user even see the trig. Rather, the trig is input (by the module 5420) into the generated text message in an automated fashion. For example, the user hears a song on the radio that she likes, navigates to the GUI 5410 (if she is not already there), presses the "song on radio" button 5412, and presses the stow button 5418. No further interface is needed by the user. Based on such interface of the user, the above processing is performed such that the particulars of the song, as a result of the processing, are routed to and stored in the user's bin "add@ songcar".

Relatedly, in one aspect, even though the trig generated by the processing module 5420 may be programmed into the module 5420, the user may still control placement of the content into her bin collection. Such preference might be set by web interface to the server 200. For example, the user may be provided the ability to set a preference by which placement of content resulting from an "add message" is prioritized amongst the user's bins. In other words, if an "add message" from a user includes two trigs dictating placement into respective bins, then such priority may dictate that one bin takes priority over another bin. As a result, the content would only be placed into the bin having the highest priority. This is of course in contrast to an embodiment in which the content is placed into all the bins that a respective trig maps into. Relatedly and illustratively, the user might press the voice button

5416, speak into the system "add@store remember milk at store", and press the stow button 5418. With the processing described above, this action by the user results in a text message sent from the module 54202 the server 200 that includes the text "add@voice-car add@store remember milk at store". Thus, the user has spoken the trig "add@store", and such trig is included in the text, along with the module generated trig "add@voice-car". Assuming the user has set her preference such that add messages to her "store" bin takes priority over her "voice-car" bin, the content is indeed placed in her "store" bin. In this manner, the user is provided a layer of manipulation (which she can control) over the processing of the module 5420 (with which she cannot control the generation of the particular trig). In accord with embodiments described herein, the user may manipulate placement of add message content in other manners. For example, the user may utilize the conversion processing of FIGS. 48-51 to manipulate placement of add message content.

Related to the above functionality of capture assist, it is appreciated that a car may simply be provided with a text messaging application. Such application inputs a text message (in digital format) into the car via wireless transmission from a third party, converts the text to an audio file, and outputs to the user in audio form (such that the user can hear her text message). On the other hand, on the send side, the text messaging application inputs the user's voice, converts the voice to digital format, and sends such digital format out in the form of a text message to the third-party. With such text messaging application, the user may send content to the At-It server 200 and pull content from the At-It server 200 using "standard trig processing" as such as described above. However, the capture assist processing as described above provides varied benefits, which may be desired by the user.

As described herein, processing of the invention is described in the environment of an "car". However, the invention is not of course limited to such environment. The invention may be implemented in any environment such as any vehicle, a recreational vehicle, the home, a standalone portable device, a smartphone, and/or in any other environment. For example, the capture assist system 5400 of FIG. 54 might simply be in the form of a standalone device that provides the functionality described above. In the processing of FIGS. 54 and 55 described above, in one embodiment the server 200 is not local to the module 5420, i.e. is not physically disposed in the car. However, as described herein, processing and functionality provided by the server 200 may be performed locally, such as on a user's computer or smartphone. Relatedly, it is appreciated that the server 200 as described above with relation to FIGS. 54-55 might indeed be disposed locally, i.e. in the physical car along with the module 5420 and the GUI 5410. In such local application, in order to interface with the locally maintained bin collection of the user, a suitable interface would be provided. For example, and interface such as that shown in FIG. 20 may be provided on the dashboard of the user's car. In a further variance, it is in general appreciated that the bin collection of a user might be disposed in multiple locations and synced in some manner Accordingly, a bin collection might be disposed in the user's car as well as at a physical server location anywhere in the world. The sync of the two bin collections might be performed in real-time or in some periodic manner, using a suitable data exchange methodology.

Figure 56:
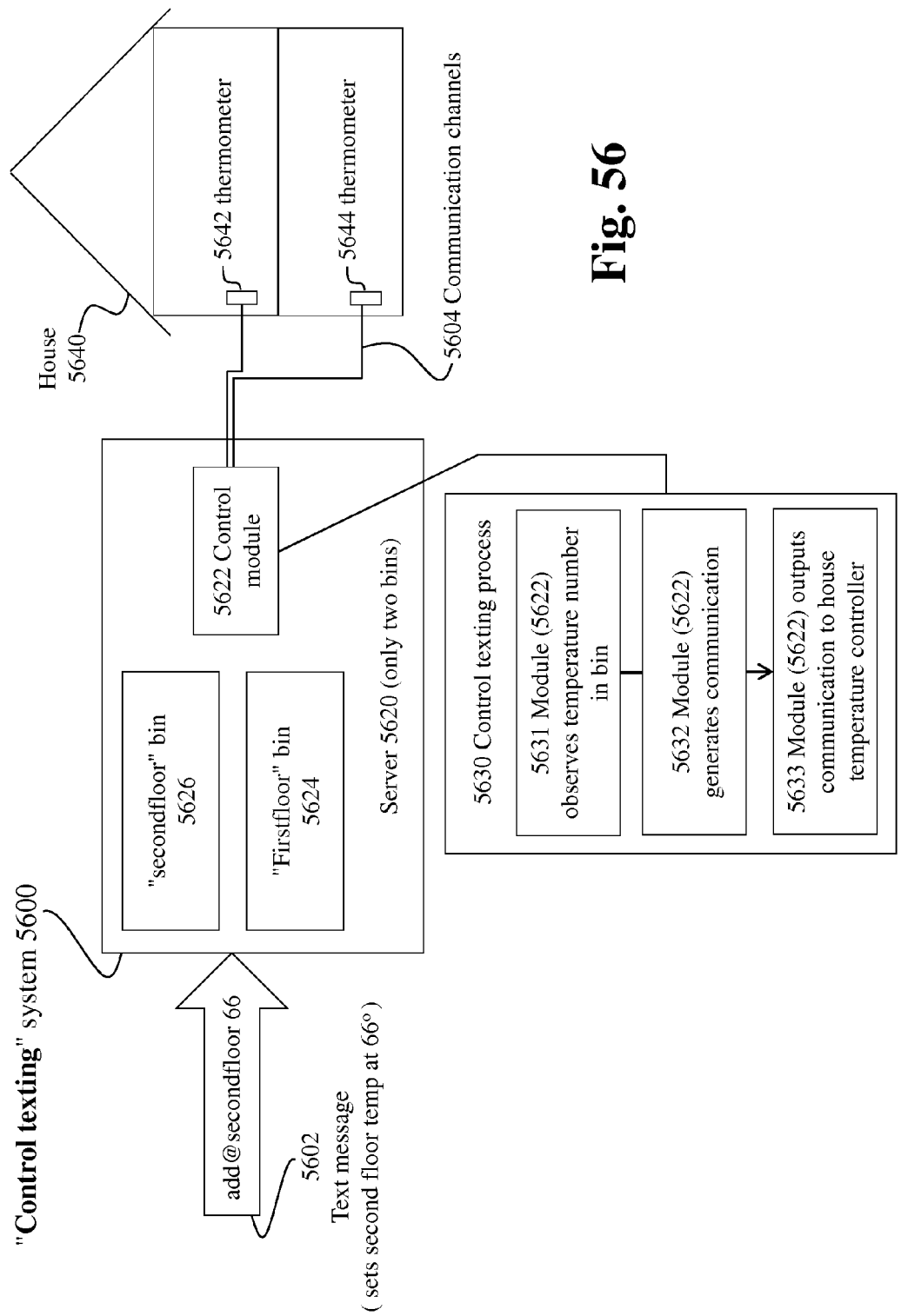
FIG. 56 is a diagram showing "control texting" processing in accordance with one embodiment of the invention.

FIG. 56 is a diagram showing what may be characterized as "control texting" processing in accordance with one embodiment of the invention. The indicia "control texting" reflects that in such processing a text message 5602 (including trig and content) is sent from the user to a specialized At-It server 5620. Based on the text message, in this example in the form of an "add message," the specialized At-It server 5620 generates a communication which is output to a controller (5626, 5624) of some nature. In this example, the controller is a thermometer (5642, 5644) in a house 5640. Accordingly, FIG. 56 illustrates an architecture in which an At-It server 5620 provides front-end processing which supports a back end control system. Accordingly, At-It processing may be utilized to provide API functionality, as illustrated in FIG. 56.

The server 5620 as characterized as special in that its sole function is to input text messages from the user for the purpose of controlling the temperature in the user's house. Thus, in similar nature to the server 200 of FIGS. 1 and 9, the server 5620 includes a bin collection. In this embodiment, the bin collection includes only two bins—a first floor bin 5624 and a second floor bin 5626. The server 562 also includes a control module 5622. The server 5620 is associated with a text number, to which the user may send a text message. Accordingly, it is appreciated that the user may have multiple At-It server numbers. A first At-It server number may be used by the user to add and pull content from his or her general bin collection (e.g. see FIG. 20) and a second At-It server number provided to the user and dedicated exclusively to the control of a control device, e.g. a thermometer, in the user's house, for example. In the example of FIG. 56, the text message is "add it second-floor 66". The server 5620 inputs that text message and based on the command "add) and the bin "second-floor", the server 5620 places the content "66" into the second-floor bin 5626. In this example, processing of the control module 5622 is then initiated. Such process 5630 is shown in FIG. 56. As shown in FIG. 56, the processing starts in step 5631 upon the module 5622 observing content being added into the bin 5626, i.e., the content being the temperature "66". Then, in step 5632, the module 5622 generates a communication based on the number "66". In other words, the control module 5622 knows that if it sees a number in the bin 5626, then the control module 5622 generates a communication 5604 based on that observed number. Such communication 5604 is between the control module 5622 and the particular thermometer (5642 or 5644) to which the control module 5622 is sending the communication 5604. Accordingly, as is shown in FIG. 56, in step 5633, the module 5622 outputs a communication to the house temperature controller, e.g. a thermometer in the house. The particular protocol used in the communication between the control module 5622 vis-à-vis the thermometer 5642 or the thermometer 5644 may be determined as desired. For example, for the communication 5604, the control module 5622 may utilize existing phone lines in some manner so as to control the thermometer (5642, 5644), or in some other manner interface with each other. Relatedly, it is appreciated that the server 5620 and/or the control module 5622 might indeed be disposed in the same physical device as the thermometer (5642, 5644). The server 5620 might be disposed in the same physical device as the control module 5622 (as shown in FIG. 56) or a different physical device. In one embodiment, as shown in FIG. 56, the server 5620 and control module 5622 are disposed in a facility remote from the house 5640. Accordingly, the server 5620 with control module 5622 might be hundreds of miles away from the house 5640 which the server 5620/control module 5622 controls.

In one embodiment of the control texting processing, the control module 5622 works off of the last content added into the particular bin (5626, 5624). However, the control module 5622 may keep a history of content and respectively added into the bins (5626, 5624). The control module 5622 may also retain data regarding related parameters, such as the actual observed temperature at the thermometer. However, such processing would involve feedback from the thermometer (5626, 5624) to the control module 5622, which may or may not be desired. In accordance with further aspects of the processing of FIG. 56, various further features as described herein may be incorporated into such processing. For example, the trig in the text message 5602 might be shortened by relying on fuzzy logic processing and/or conversion processing of FIGS. 48-51.

Figure 57:
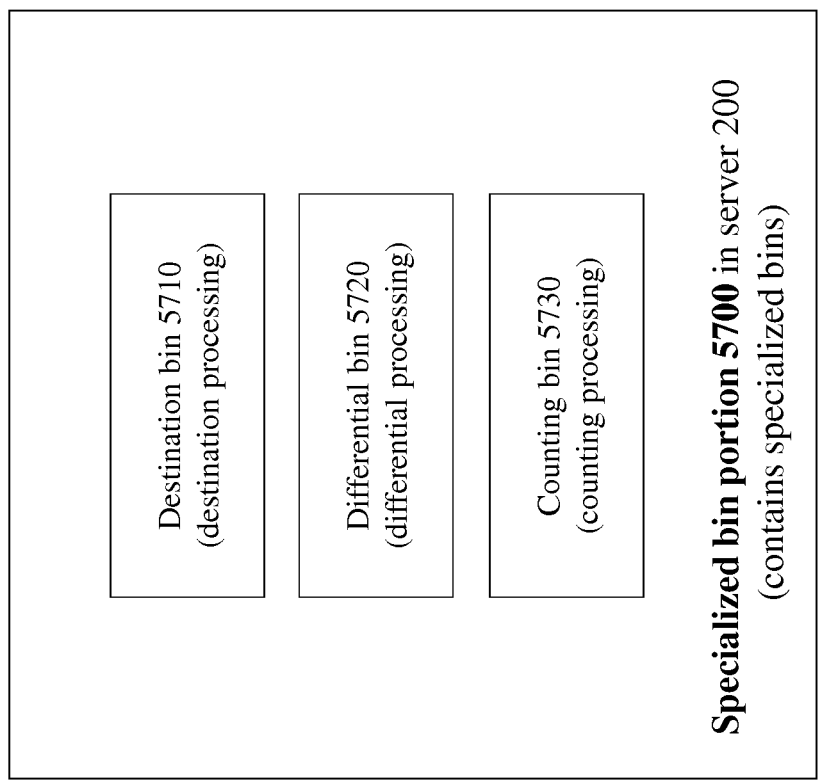
FIG. 57 shows further specialized bin processing in accordance with embodiments.

Various specialized bins and bin processing are discussed above. FIG. 57 shows further specialized bin processing in accordance with embodiments. Specifically, FIG. 57 is a block diagram showing a specialized bin processing portion 5700, in accordance with one embodiment of the invention. For example, the specialized bin processing portion 5700 might be disposed in the bin database 270 and/or the bin collection 280 of FIG. 9. As described below, the processing portion 5700 contains a plurality of bins that perform specialized processing. Accordingly, upon the user sending a communication, such as a text message, to one of the specialized bins 5701, that particular bin performs particular processing, as respectively described below. The specialized processing may be controlled by data, e.g. programming code, disposed in the processing particulars associated with that particular bin (see for example the architecture of FIG. 10).

One of the specialized bins 5710 is characterized herein as the "destination" bin 5710 that performs "destination processing." Destination processing is initiated by the user sending a text message to the server 200 (in which the specialized bins 5701 are disposed) such as "add@destination Starbucks". Based on the bin "destination" the server 200 adds the content "Starbucks" into the destination bin 5710. In response to the added content, the destination bin 5710 performs predetermined processing. Specifically, the server communicates with the user's phone so as to secure the GPS location of the user's phone. Further, the server recognizes the name of the business "Starbucks" and interfaces with a suitable database to secure the closest location of a Starbucks vis-à-vis the user's phone. The server may then interface with a further database to generate directions from the GPS location of the user's phone to the identified nearest location of a Starbucks. For example, the server might interface with a third-party such as MAPQUEST or GOOGLE MAPS. The server then sends the directions back to the user in a text message. Accordingly, the user has secured directions to the nearest Starbucks by highly leveraging her mental abilities and the processing of the server 200. Specifically, the user remembered that the trig to pull a destination from the server is simply "add@destination" and that she need include the name of the requested destination. The user sends the simple text message to the server 200, and (depending on processing speed) the user is almost immediately, or at least momentarily, provided with the directions she is in need of.

It is appreciated that a secondary trig might be included in the initial text message from the user so as to control the particular format of the directions. Alternatively, the particular form of the directions might be a preference set by the user via web interface. In one variation, the user might set her preference such that only the address of any requested destination would be provided, and not directions. The communication with directions may include other information, such as distance or time information. Further, the responsive information from the server, e.g. the directions, need not be in the form of a text message. Alternatively, the directions might be output in the form of a phone call that the user could listen to as she is driving, or an e-mail. In a further embodiment, the server might output direction data to the user's mapping system, such as the user's TOMTOM. With reference to FIG. 5 above, it is appreciated that the user may trigger the sending of a "bin list request" that, in one embodiment, includes both a listing of all the bins that are accessible by the user, as well as basic explanation of the processing associated with each respective bin.

In this example, the text message "add@destination Starbucks" initiated the processing described above. It is appreciated that in this case, and in general, the particular form of the trig might be varied to be more intuitive to the user. Accordingly, the trig might instead be "pull@destination Starbucks", for example.

With destination processing, the server may determine the position of the user's phone, such as a smartphone or other device, in different ways. As described above, one approach is that the server communicates with the user's phone so as to secure the GPS location of the user's phone. This interface between the server 200 and the user device may be transparent to the user, i.e., the user would not be aware of such communication. In another embodiment, the user actually sends her location in the initial text message to the server. For example, the user might determine her GPS location from her smartphone, and include that GPS location in the initial text message to the server. Thus, the initial text message to the server might read "add@destination Starbucks my GPS 123-123-555". This approach would allow destination processing to be performed with only the initial text message from the user and the responsive text message from the server 200 back to the user. That is, no secondary communications would be needed (between the server 200 and the user's phone) so as to determine the location of the user/user's phone. In a further embodiment, a small app (as described further below) might be provided on the user's phone. For example, the app may observe the trig add@destination and, as a result, append GPS coordinates to the content of the user's text message. Such observing might utilize processing akin to spell check processing. That is, it is known to check the text in an e-mail, for correct spelling, prior to sending that e-mail out. The server may check any outgoing text messages for needed action, such as checking an outgoing text message to the server 200 for the trig add@destination, in which case the server would append the current GPS location of the phone. Other related processing is described below with reference to the GPS app 6020. It is appreciated that the invention is not limited to utilization of GPS. Rather, other location methodologies may be utilized.

A further specialized bin is the "differential" bin 5720 that performs differential processing. With differential processing, the user sends an add message to the server such as "add@differential current location". Upon receipt of such text message, the server knows to add the current location of the user into the differential bin. A Nuance in such processing is that the content, which the user has included in the text message—"current location", triggers the server to not simply input such text "current location" into the user's differential bin. Rather, such string of characters "current location" triggers the server to indeed retrieve the user's current geographical location, and insert that geographical location into the user's differential bin along with time stamp information. At some later time, when the user is at a different geographical location, the user may again text to the server "add@differential current location". And again, the server the server creates a bin content item (BCI) that includes the user's current location and time stamp information. At some point, the user sends a "send" message to the server, such as "send@differential". With the specialized differential bin, the server does not simply output the geographical/time stamp information, the server also generates and outputs information regarding the difference between those BCIs. Such differences might include how far apart the locations are and/or the time difference in which the BCIs were created. It is appreciated that differential processing may be used with various other parameters and differential quantities.

A further specialized bin is the "counting" bin 5730. The counting bin performs counting processing. Upon the user sending an "add" message to a counting bin, the counting bin does not simply generate a new bin content item containing the content of that add message. Rather, the counting bin attempts to match the content in the add message with the content already in the counting bin. If a match is found, then the count for that particular item is incremented by one. For example, the user might send a counting bin an add message "add@jog pond". The user sends this add message upon the user completing a jog around her local pond. She has multiple jogs in her workout regime (e.g. her pond chart, her jog by the school, and her jog by the park). The content of her "jog" bin is "pond-14, school-7, Park-5". Upon the user sending the above text message "add@jog pond", the content of her jog bin is incremented to: "pond-15, school-7, Park-5". Accordingly, the server has determined that the content in the user's add message matched one of the items in the user's bin. As a result, the server incremented the count associated with that item.

As described herein, various normalization processing may be performed in conjunction with bin manipulation. For example, with a counting bin, upon a user sending an add message with a particular item in the content, the server may check if that item is already in the user's bin using normalization processing, i.e. "hotdog" is the same thing as "hot dog". If the item is already in the bin, then counting processing may be invoked to associate a count with the item. Alternatively, the server may simply not update the content of the bin to reflect such duplication.

In general, it is appreciated that the server 200 may possess further rules, in addition to the rules described herein, that dictate the placement of content in any manner desired. Such rules may be hardcoded into the programming, and not changeable by the user, or alternatively, the rules might be changed by the user based on their preference.

Figure 58:
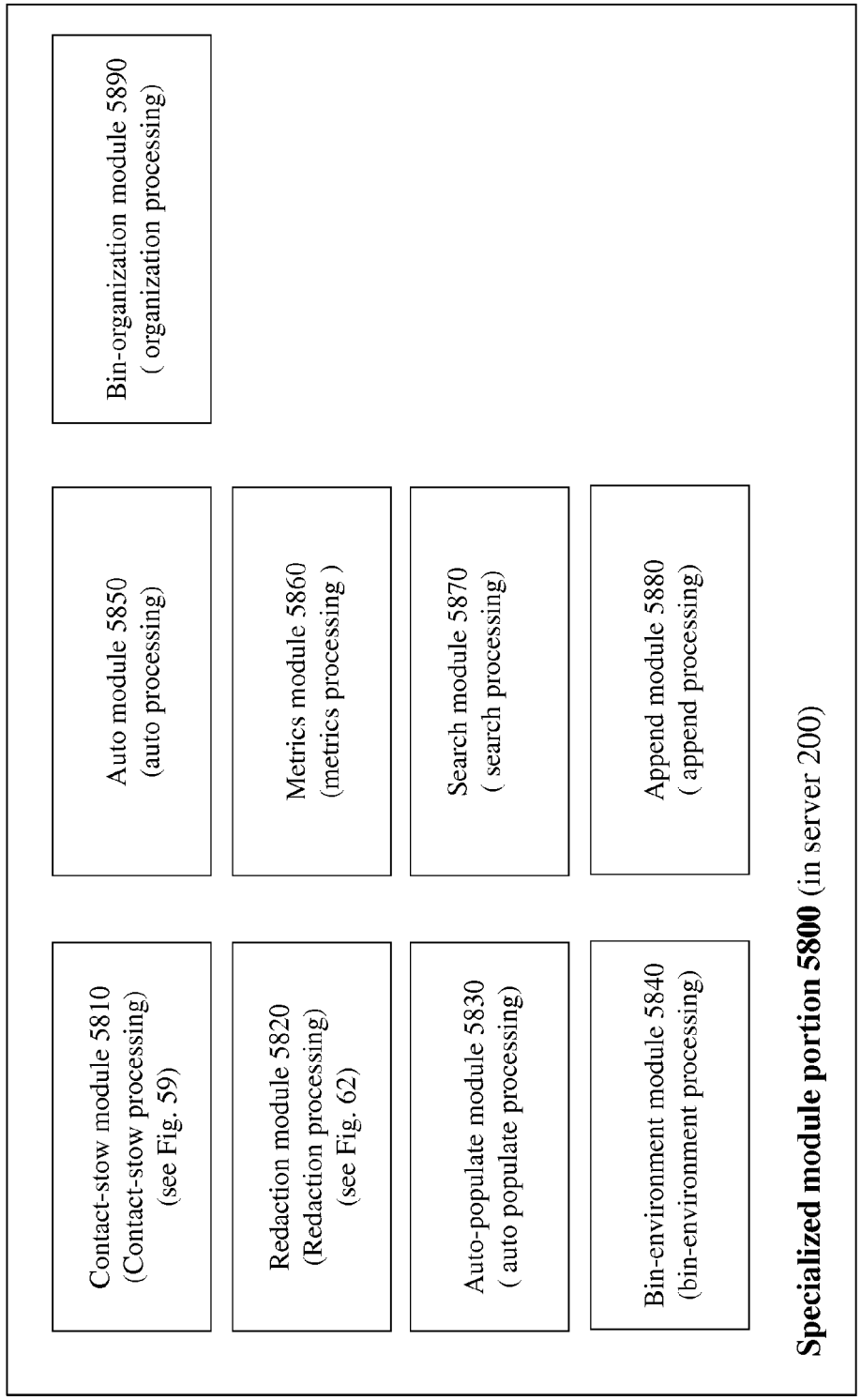
FIG. 58 shows further processing portions in accordance with embodiments of the invention.

Various computer processing modules, i.e. computer processing portions, are discussed above. FIG. 58 shows further processing portions in accordance with embodiments. Specifically, FIG. 58 is a block diagram showing a specialized module portion 5800, in accordance with one embodiment of the invention. For example, the specialized module portion 5800 might be disposed in the At-It server processing portion 210, in the server 200. As described below, the specialized module portion 5800 contains a plurality of processing modules that perform specialized processing. The specialized processing may be performed by a computer processor using suitable instructions, e.g. programming code, respectively disposed in each of the processing modules 5801. As described below, the processing modules 5801 may be associated with particular bins in the user's bin collection. Such association might result from the user interfacing with the server e.g. via web interface, so as to establish such association.

One of the specialized processing modules in the module portion 5800 is characterized herein as the "contact-stow" module 5810 that performs "contact-stow" processing. In contact-stow processing, an association is established between a particular bin in the user's bin collection and contact information of a person other than the user. For example, the cell phone/text number for a friend, Sam, might be 703-123-1234. The user has a bin named "Sam notes". The user may add and pull content from her bin Sam notes using standard trig processing. Contact-stow processing provides the functionality for the user to be presented with content in her "Sam notes" bin upon the user accessing her contact information for Sam. More specifically, from a technical perspective, the user is presented with content in her "Sam notes" bin upon the server receiving data indicating that the user has accessed the particular contact information that is associated with such particular bin, i.e., or otherwise performs some trigger event in relation to the associated contact information. Accordingly, in this example, the contact-stow module 5810 contains an association between Sam's contact information (703-23-1234) vis-à-vis the bin "Sam notes". Accordingly, with contact-stow processing, when the user (1) accesses Sam's contact information (703-723-1234), and (2) accesses a contact file that contains such contact information, or (3) performs some other trigger event in relation to the contact information, for example—the user is presented with the content of the bin "Sam notes". Contact-stow processing may utilize an app on the user's smartphone, as described below.

Contact-stow processing provides the benefit, for example, that upon the user typing in a friend's number, or otherwise accessing a friend's contact information, processing is initiated to output content to the user—from a bin associated with that friend. This provides for the user to be reminded of all the items that she had previously added to such associated bin, i.e. items that the user wanted to discuss with the particular friend that the user is contacting.

Figure 59:
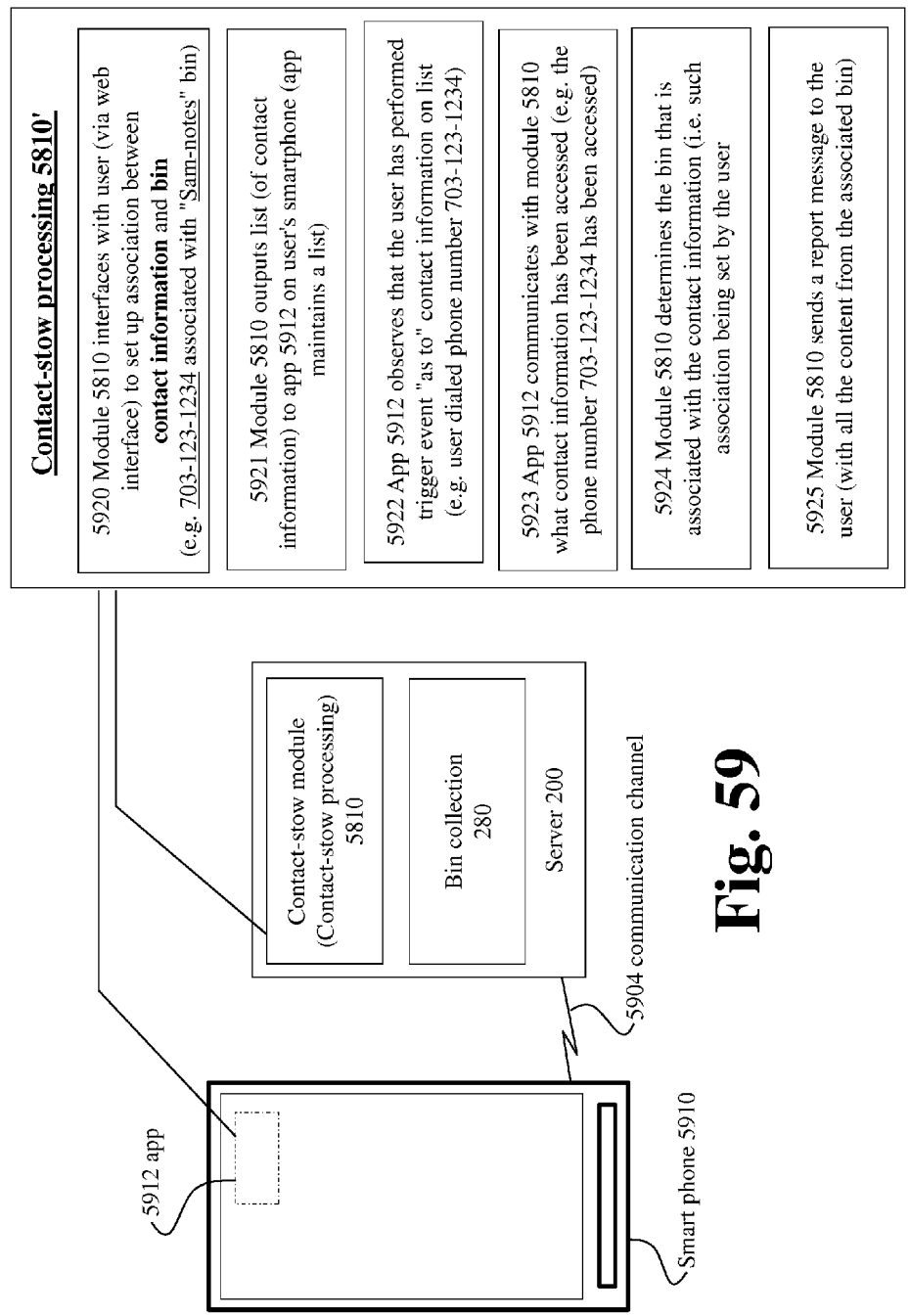
FIG. 59 is a diagram showing further aspects of contact-stow processing in accordance with one embodiment of the invention.

FIG. 59 is a diagram showing further aspects of contact-stow processing 5810' in accordance with one embodiment of the invention. As shown, the contact-stow module 5810 which performs contact-stow processing is disposed in the server 200. Also, the bin collection 280 is disposed in the server 200. The server 200 interfaces with a smartphone 5910 via a communication channel 5904. The smartphone 5910 includes an app 5912.

In further explanation of the functionality of contact-stow processing, such processing is initiated by observing, i.e. detecting, that the user has accessed contact information. For example, upon the user accessing her contact information for Sam on the user's smartphone, the contact-stow module 5810 is communicated data (from the app on the user's smartphone, for example) indicating that such contact information has been accessed. The module 5810 then performs processing to determine if there are any bins (in the user's bin collection) associated with that particular contact information. If yes, then the module 5810 performs processing to send a text message (a report message) to the user with all the content from such associated bin. Alternatively, the module 5810 might communicate the contents of the associated bin in some other manner, such as a pop-up being generated and presented to the user on the user's smartphone. In one embodiment, the user may be requested to provide confirmation that the user does indeed want the content (of the associated bin) to be sent to the user.

The particular manner in which the contact-stow module 5810 knows that a particular contact (on the user's smartphone) has been accessed may vary. In the example above, the app 5912 on the user's smartphone 5910 communicated data to the module 5810 every time contact information is accessed. In a different embodiment, the app 5912 on the user's smartphone monitors access to contact information (including the user typing a phone number, for example). The app is provided with a list of contact information and the particular bin that each contact information is associated with. Once the app 5912 identifies that a particular contact information on the list has been accessed by the user, the app retrieves the bin name that is associated with that contact information (for example, if the app 5912 identifies that contact information for "Sam" has been accessed, the app will determine that such contact information is indeed on the list, and then retrieve the bin name "Sam notes" that is associated with the contact information for Sam). The app 5912 then generates a communication (indicating that content of the associated bin (Sam-notes) is to be output from the server 200 to the user's smartphone 5910), and sends such communication to the module 5810. The module 5810 (and/or server) receives such communication and causes the content of the particular bin to be output to the user, for example via text message from the server 200 to the smartphone 5910. In one embodiment, such communication that is generated by the app (i.e. the communication indicating that content of the associated bin is to be output to the user) may indeed be in the form of a "send message"—such as in the form of "send@Sam-notes".

As described above, the app 5912 is provided with a list of contact information and the particular bin that each contact information is associated with. This data containing (1) a list of contact files, and (2) the bin that is associated with each contact file, may be output to the app 5912 from the contact-stow module 5810. Such output to the app 5912 from the contact-stow module 5810 might occur in conjunction with the user setting up her contact-stow options via web interface to the server 200. In such interface, the user is presented with functionality to associate contact information with a respective bin, so as to perform the contact-stow processing.

FIG. 59 also includes a process flow showing a yet further embodiment of the invention. The process starts in step 5920 in which the module 5810 interfaces with the user to set up an association between the contact information and bin. In step 5921, the module outputs a list of contact information to the app 5912 on the user smartphone. In step 5922, the app observes that the user has performed a trigger event "as to" a contact in the contact information list. Then, in step 5923, the app communicates with the module what contact information has been accessed by the user. In step 5924, the module determines the bin that is associated with the contact information. Then, in step 5925, the module sends a report message to the user with all the content from the associated bin.

A further specialized processing module is the redaction module 5820. The redaction module 5820 performs redaction processing. In redaction processing, access to content in a bin (e.g. access to a bin-content item (BCI), access to a bin, or access to a bin collection, for example, is limited in some manner. For example, in one embodiment, multiple users have access to a particular bin. As described herein and shown in FIG. 21, for example, the content in a bin may be comprised of bin content items (BCI). In redaction processing, a user may have access to different BCIs vis-à-vis the access afforded to other users. As described above, a BCI may respectively correspond to a single text message coming into the server and the contents (of the text message) being added into the designated bin based on the bin label in the trig. To restrict access to a particular BCI, a user may use a specialized trig. Such specialized trig with content might be in the form of "add-redact@skitrip shampoo". Upon the user (here User-1, for example) sending such text message to the server, the server places the content (shampoo) into the skitrip bin consistent with standard trig processing. However, the "redact" indicia in the trig triggers redaction processing to be implicated. Specifically, the redaction module 5820 is invoked to impose a security layer over such BCI. The security layer, as controlled by the redaction module 5820, allows access by the user who submitted the content in an add message (here User-1) but does not allow access to the particular BCI by other users who have access to the particular bin. Thus, for example, when the user (User-2) other than User-1 sends a "send message" to the server for the bin skitrip (i.e. User-2 is requesting the server to send all content in the bin ski-trip), the server will send User-2 all the other content, but will not send User-2 the content that has been redacted by User-1. Accordingly, redaction processing relates to a situation in which multiple users have access to a particular single bin, but a user (User-1) wishes to add content to that single bin, but does not want the other users to see that content.

As in the example above, the group is planning a ski trip and they generate a group bin so that everyone who is going on the ski trip can contribute thoughts regarding things they need to take on the trip. As above, User-1 thinks to himself that he needs to take shampoo on the ski trip, but prefers that the other users (also having access to the skitrip bin) not see that particular item in the bin. Accordingly, the user sends a text message to the server "add-redact@skitrip shampoo". As noted above, once the text message is input into the server, the server 200 knows to add the content to the user's skitrip bin. Also, the "redact" indicia in the text message dictates that the server 200 invokes the redaction module 5820. From a processing perspective, The redaction module 5820 associates attributes to the particular BCI. Those attributes include User-1's text number and dictate that only User-1 have access to the particular BCI. Accordingly, when a "send message" comes in from a user that has access to such group bin (User-1), the redaction module 5820 is invoked to first determine whether there are any BCIs in the bin that have been "redacted." If so, then the redaction module 5820 determines what text numbers are associated with such redacted BCIs. If the text number of the user (user-1) requesting the content matches—then that BCI is sent out to the requesting user (User-1), likely along with other BCIs in the particular bin. However, if the numbers do not match, then that particular BCI will not be output to the requesting user (User-2). Rather, all the other BCIs that the User-2 does have access to will be output. Indeed, in this case User-2 would have no knowledge of the redacted BCI. Access would of course be restricted for pulling content via "send message" using text messaging, accessing the bin via web access, or accessing the bin in some other manner Regardless of the particular communication channel used to access content of the bin, the redaction module 5820 is invoked to restrict such access. The data containing information regarding which BCIs have restricted access, as well as what texting numbers are associated with such redacted BCI, may be disposed in the processing particulars associated with each respective bin.

In the redaction processing example above, the contact information of "text number" was illustratively used. However, any type of contact information might be utilized. Indeed, the contact information associated with the redacted BCI AND the contact information associated with the incoming request for the contents of the bin might both be compared with a contact information database. If both contact information mapped into the same person's contact file, then that person is provided access to the particular BCI.

In the example above, the indicia "redact" was included in the trig by the user, so as to dictate that such is a redacted BCI. However, it is of course appreciated that other indicia might be utilized. Also, a secondary trig might be provided with the add message—so as to dictate that such is a redacted BCI.

The processing of the redaction module 5820 is not limited to the user imposed restricted access to bin-content items described above. The redaction module 5820 may control other types of user access including other restrictions to access BCIs as well as access to bins and/or bin collections. For example, in the situation of shared bins, the processing particulars of a shared bin may contain the text numbers of those users who have access to such shared bin. Accordingly, upon receiving a "send message" text message, the server 200 knows from the command "send" that the user has requested the server to pull content from a particular bin. The server retrieves the processing particulars of that identified bin, and determines if the user has access to the particular bin.

Accordingly, the bins that are not shared with other persons might be characterized as private bins versus bins that are shared might be characterized as public bins. A user's private bins vis-à-vis a user's public bins might be distinguishable by suitable indicia. For example, such indicia might be an icon of some nature that is associated with the bins.

In a further embodiment, the user specifies whether she wishes the BCI that she is adding (to a bin) to be private or public. Specifically, she may text "addprivate@skitrip shampoo" to add shampoo into a BCI (in the bin "skitrip"), which is not accessible by other persons having access to the group bin in general. On the other hand, she may text "addpublic@skitrip shampoo" to add shampoo into a BCI (in the bin "skitrip") which is accessible by others in the group.

Illustratively, FIG. 62 is a diagram showing a bin record 1031 of the bin collection data structure 1030, as shown in FIG. 10 and described above. The bin record 1031, includes the bin name, the content in the bin, as well as the processing particulars 1032. In this example, the bin "movie" is a restricted bin controlled by redaction processing. Accordingly, the processing particulars in the bin record 1031 includes data which indicates that the bin is restricted. Also, the data contains the text numbers of those users who are allowed access to the bin record 1031.

In redaction processing, the server first determines whether the particular bin has restricted access, i.e., whether the bin is subject to redaction processing. If the bin is not subject to redaction processing, the content of the bin is retrieved and sent to the user per the "send" message without invocation of the redaction module 5820. On the other hand, if the bin is indeed subject to redaction processing, then the redaction module 5820 compares the text number that the "send" message came in on (e.g. the phone number/text number of the requesting user's smartphone) against the allowed text numbers, as reflected in step 5821 of the redaction processing flow 5820' as shown in FIG. 62. That is, the "allowed text numbers"—meaning the text numbers that the redaction module 5820 has in memory as being allowed to access the particular bin. If the requesting user's text number does not match those text numbers allowed, then the redaction module 5820 conveys such disposition to the server 200, and the server 200 sends a suitable text message to the user, such as "No bin exists or bin access is restricted," as reflected in step 5822 of FIG. 62. On the other hand, if the requesting user's text number does match those text numbers allowed, then the redaction module 5820 conveys such disposition to the server 200, and the server proceeds with sending a report message with the contents of the particular bin. In the situation of web access, the processing may provide that the user simply is not presented with any BCIs or bins that the user does not have access to. Accordingly, access to a BCI and/or access to a bin may be controlled. In similar manner, access to a bin collection may be controlled by associating allowed text numbers to the processing particulars of each bin in that bin collection, and only allowing access to those bins if the requesting user possesses an allowed text number.

It is appreciated that redaction processing may be performed in a dynamic manner. For example, access to a particular bin as described above might be based on the occurrence of a particular event. Illustratively, the text number (and phone number) of the smartphone of User-1 is 7031231234. The server 200 includes a bin "advanced-techniques" which includes advanced processing details of the At-It system. However, the processing of the server 200 includes that only users that have attained a certain complexity of use (of the At-It system) are allowed access to the bin advanced-techniques. In other words, the bin advanced-techniques is restricted and controlled by redaction processing. As described above, the processing particulars of the bin advanced-techniques includes a list of user's text numbers that are allowed access to the bin. Accordingly, when User-1 first signs on to the At-It system, he will not have access to the bin advanced-techniques. However, once the server 200 observers that User-1 has attained a predetermined threshold complexity of use, then the server 200 adds the text number of User-1 to the "allowed text numbers" associated with the bin advanced techniques. User-1 is thus provided access as described above. Such processing might be provided to a variety of types of bins, and in particular shared bins or publicly available bins, e.g., public bins.

Accordingly, in this example, the particular event that occurred was constituted by the User-1 attaining a threshold complexity of use. However, it is appreciated that any of a wide variety of events might trigger allowing access to a particular bin by a particular user. The server 200 may be provided with a processing interface to observe the occurrence of such event, and perform processing to include the user's respective text number into the list of "allowed text numbers" for the particular bin. In one embodiment, the user may be provided with a code that the user submits to the server in some suitable manner Upon receiving the code, the server unlocks, i.e. allows access, to a particular bin that corresponds to the submitted code.

A further specialized module is the "auto-populate" module 5830 that performs "auto-populate" processing.

With auto-populate processing—the server 200 is provided to populate a particular bin with particular content, upon observing that a predetermined event has occurred. For example, the bin collection of each user of the At-It system may automatically include a bin "user-milestones". The server may observe the user's use of the system, as such use becomes more complex. At particular markers, the server populates the bin user-milestones to reflect advancement of the user to more complex use. For example, the server might observe that the user has created her 10th bin. This triggers the server to add a BCI into the user's bin user-milestones, such as "Congratulations—you have now created your 10th bin." Various other events may trigger the population of bins, as desired. For example, the server might observe the GPS location of the user's phone on a trip, and populate a particular bin with content to reflect the advancement of the user on her trip, such as populating a particular bin with GPS and corresponding time information. In another example, the server might populate a particular bin of the user with information regarding when, and how long, that user is located at a particular geographical location. Such processing may be used to monitor delivery times, or catering times, for example, i.e., when the server observed a match between the GPS location of a user vis-à-vis the GPS location of a monitored list of geographical locations.

Relatedly, in a further embodiment, the user may set up preferences and/or trigger events so that a particular action occurring, e.g. a particular event occurring, triggers particular content to be added into a designated bin in the user's bin collection. For example, the server may provide functionality such that a BCI "with time information" is added to the user's "workouts" bin every time the user goes to the gym to work out. Such processing may be performed by the server 200 by comparing the user's current geographical location using GPS vis-à-vis the geographical location of the user's gym. Accordingly, this functionality would allow the user to monitor the times that she goes to the gym. That is, either via text message or web access, the user would access her "workouts" bin and retrieve the content in that bin. Each BCI of the bin might be in the form of "Workout on 3/5/2012, arrived 5:15 PM and left 6:37 PM", for example. It is appreciated that such functionality is applicable to a wide variety of situations.

Auto-populate processing may also leverage interface with devices that are connected to the user smartphone (or other device), in one embodiment. For example, the user smartphone might interface with a jogging monitoring device. In some periodic manner or as triggered by some event, the jogging monitoring device outputs data regarding the jog to the smartphone. The smartphone generates a text message "add@jog stats" and includes the data regarding the jog into the text message as content. The smartphone then sends that text message to the server 200. Upon receipt, the server adds the content into the user's "jog stats" bin using standard trig processing. Accordingly, the user may then retrieve the data regarding her jogs by accessing her bin "jog stats". The particular periodicity or event may be varied as desired. For example, the user may effect a setting, i.e. a user preference, which dictates that every time the user is at a particular geographical point in her jog, the smartphone interfaces with the jogging monitoring device, and outputs an add message (with the data regarding the jog) to the user's bin collection. Data relating to heart rate or blood pressure, for example, might also be output.

A further module is the "bin-environment" module 5840 that performs "bin-environment" processing in accordance with an embodiment of the invention. The bin-environment module is directed to control a particular environment in which bin content is presented to the user. With a web interface, the bin-environment module may be invoked to control the attributes of the webpage in which the bin content is presented to the user. Illustratively, the bin-environment module may control the attributes of the GUI 2101 of FIG. 21, which displays the user's "movie bin" contents. For example, the webpage might be provided with a particular backdrop, such as popular actors of the time, or a picture of a movie theater that is in close geographical proximity to the user. In the situation of a webpage, generated by the server 200, showing "beach trip" items, for example, the bin-environment module might retrieve and present a backdrop of a beach. In the situation of a webpage showing "ski trip" items, the bin-environment module might retrieve and present a backdrop of a ski mountain, for example. In general, the bin-environment module may associate a particular bin with content that is relevant to that bin. Thus, for example, a webpage showing the content of the user's "skitrip" bin might also contain promotional content related to ski. For example, the webpage might include content relating to ski gloves for purchase.

Accordingly, the bin-environment module provides for the ability to provide different backdrops and other attributes for different webpages presenting the content of respective different bins. The particular backdrop corresponding with a particular bin may be controlled in any suitable manner. For example, the user may be provided with functionality to choose which attributes for which bins. For example, as a backdrop for the webpage that presents the user's music bin content, the user might choose a picture of the user's favorite music artist.

A further module is the "auto" module 5850 that performs "auto processing" as described below. In accordance with one embodiment of the invention, the auto module provides functionality such that upon particular criteria being satisfied, the auto module generates and outputs a predetermined text message, or other communication. For example, with a group bin, the auto module observes when a particular number, e.g. 5 (five), additional BCIs have been added into a particular bin, and outputs a text message to a user in a predetermined manner Such processing might be programmed such that upon a BCI being added to a group bin by a specified user, that added content would result in the output of a text message to a further user. Accordingly, the auto module provides functionality to allow a user to be alerted regarding some predetermined disposition of a particular bin, or some action being taken as to that bin. For example, the auto module may alert a user upon a certain number of BCIs being added to a bin, when a BCI is added as a result of a text message from a particular user, or when a BCI of a particular nature has been added to a particular bin, for example.

The auto module might also control placement of content, which was received in an add text message, into a particular bin. For example, using GPS position, if the server 200 detects that a text message was sent from the user's work location, then the content is placed into one of the user's bins tagged as the work associated. On the other hand, if the server detects that a text message was sent from the user's non-work location, then the content is placed into one of the user's bins tagged as non-work associated. For example, the user might have a "thoughts" work bin as well as a "thoughts" home bin. The user sends a text message to the server "add@thoughts remember to organize files". In decisioning to determine which "thoughts" bin the server places the content, the server basis such decisioning off the GPS location of the user at the time the user sent the text message. Instead of GPS location, such decisioning might be based on time of day, or a combination of GPS location and time of day.

Further, in embodiments, the auto module controls whether data is presented in text form, icon form, or in some other form. For example, the bins as presented in the GUI of FIG. 22 might be presented in some suitable icon form, rather than text form. For example the "movie" bin might be represented as a small square containing the letter "M".

A further module is the metrics module 5860. The metrics module may provide various data to the user regarding his or her bin collection bin. For example, the metrics module may retrieve attributes of the user's bin collection so as to output information to the user regarding the number of BCIs, which bin has the most BCIs, and/or data regarding when BCIs were added. The metrics might be based on the bins of a single user or multiple users. The data might relate to comparisons between similar bins of respective users. For example, multiple users may have a "thoughts" bin which is intended to stow thoughts of a user as they pass through his or her day. The metrics module might retrieve data indicating the time of day that BCIs were added into each user's thought bin. As a result, the metrics module will provide information regarding which part of the day is the most thoughtful for users. In other words, at what time of the day did most users opt to stow his or her thoughts into his or her "thoughts" bin.

A further module is the "search" module 5870. The search module may perform predetermined processing based on a trig that is received from the user. For example, if the user sends a text message to the server "search@movie vampire"

the search module only searches the user's movie bin for the term vampire. On the other hand, if the user sends a text message to the server "search@all vampire", then the search module searches all bins in the user's bin collection for the term vampire. Results of the search may be output to the user as desired. For example, the output of the search might be texted to the user—as a report message. Alternatively, the results of the search might be output to a "search bin" the user. The results may be output based on BCI, i.e., any BCI that satisfies the search result is output.

The "append" module 5880 appends, attaches or in some other manner associates "related appended content" (hereinafter "RA content") to a bin and/or to a BCI within a bin. For example, the RA content might be attached to a report message sent out to the user. Specifically, the RA content might be attached on the tail end of the text message, after the BCIs. Illustratively, at the end of the report text message 125 (of FIG. 1) the server might insert "///Free soda with large popcorn at Bramton Theater". In generation of such RA content, the server may determine that the bin and/or the contents of the bin relate to movies. Also, the server may determine the geographical location of the user either by the user's smartphone location or by the user's home zip code, for example. The RA content may be demarcated in some suitable manner, such as the three slashes shown above. Further, the RA content might be output to the user in a manner that is not unduly intrusive into the user's review of her bin content (in the report message). In this example, the RA content was simply added to the end of the text message.

The RA content may also be output to the user via webpage. Accordingly, upon the user viewing her bin online, the server may retrieve RA content related to the bin and/or the BCIs. The server may then present that RA content in some appropriate manner For example, tabs might be provided such that the user can select a particular tab to dictate whether the user views her BCIs, advertisements associated by the server with those BCIs, and/or helpful information that the server associates with the user's BCIs. For example, if the server determines that the BCIs and/or the bin relates to movies, then the helpful information presented on the third tab might relate to directions to the local movie theater, for example. As a further example, the server might determine that the bin relates to ski items. As a result, the server may present the user advertisements regarding ski gear. Also, the server might present the user with tips relating to skiing or a ski trip. In one embodiment, data from percolation processing described above might be associated with particular bin content, and presented to the user in some appropriate manner As a further example, the server may observe the term hamburger in a BCI. As a result, the server retrieves RA content that is related to the term hamburger. Thus, the server may retrieve the data "consider rolls, ketchup, mustard" and present such data to the user as RA content. In general, it is appreciated that content that the user adds to her bin may be identified and demarcated vis-à-vis the content that the server 200 adds to the user's bin, or in some other way associates with content in the user's bin. In one embodiment, such different content is demarcated by color coding. The user may select the particular color coding she wants for her BCIs, the color coding she wants for advertisements, any color coding she wants for helpful information, for example. Accordingly, the color coding might be used in lieu of the three tabs described above. Relatedly, it is appreciated that the tabbing or color coding methodology may be applied to the percolation processing described above. For example, BCIs added by the user may be first color, while content added as a result of percolation processing is a second color. The user may be provided the ability to choose the particular color coding.

In one embodiment, the user's bin collection may include bins that are primarily populated by companies and/or vendors, for example. Illustratively, the user's bin collection may include a bin "Netflix". The company NETFLIX may add content to such bin relating to some aspect of the user's interaction or business with NETFLIX. For example, upon watching a new movie with NETFLIX, the company might interface with the user's bin Netflix so as to add a BCI reflecting the new movie that was watched. Alternatively, the company might interface with the bin via text message or e-mail, for example (i.e. the company would send an add message (including the particular content) to the server 200. For example, the company might send the server 200 an e-mail "add@Netflix123123 Watched new movie Avatar". Such language might be in the header of the e-mail or in the body of the e-mail. In one embodiment, the server 200 does not distinguish between the header of an e-mail or the body of an e-mail, but rather collectively processes all text in an e-mail. In other embodiments, the server 200 may look to the subject field of an e-mail for a trig, and by default consider any text in the body of the e-mail as "content" to be added into the specified bin. In this latter embodiment, the server would thus not identify a trig for processing that is in the body of the e-mail.

Accordingly, in this example, the e-mail is in the form of an add message, which will result in the content "Watched new movie Avatar" being added as a BCI into the user's bin Netflix. However, one nuance of such processing is reflected in the format of the trig "add@Netflix123123". Such nuance relates to the fact that the e-mail from the company to the server 200 cannot be allocated to a particular bin collection based on the e-mail address of the sender (or the text number of the sender if the add message was in the form of a text message). Rather, the same e-mail address (or the same text message address) will be used by the company to send add messages for multiple users, and indeed likely thousands of users. As a result, in one embodiment, the process requires the trig to distinguish what user's bin collection the particular add message should be directed at, so as to create a BCI in the appropriate bin. The manner in which such distinction is made, in this example, is by inserting a suffix after the bin label, i.e. the suffix being 123123, for example. Such suffix is uniquely associated with the particular user that the content should flow to. It is of course appreciated that the particular format utilized may vary as desired. It is also appreciated that suitable authorization should be required both to create a bin in the user's bin collection that is associated with a particular entity, as well as authorization for the particular entity to add content into the particular bin. In one embodiment, the user may be presented with the option to associate contact information with a particular bin in the user's bin collection. Accordingly, when an e-mail from a company is identified as being directed to a particular bin of a particular user, the server 200 checks to see whether the contact information from which the e-mail originated from is indeed in the list of contact information that the user associated (with the particular bin). If there is an association, then the content is added to the bin. If there is not an association, then the content is not added to the bin. If the server determines that there is not an association, the server may send a communication to the user requesting permission to generate such association. The data representing the association between an entity/sent e-mail address vis-à-vis a particular bin may be disposed in the processing particulars of that bin. The company may determine what content the company e-mails to the bin of a user based on agreement with the user and/or some other predetermined understanding. For example, the user might interface with the system of a company to arrange for scores in a game that the user is playing is output to a particular bin. For example, the entity POP CAP may collect scores from a group of At-It system users playing the game "Plants vs. Zombies", and output the scores to a group bin, which is shared by the At-It system users.

Another module is the "bin-organization" module 5890. The bin-organization module 5890 performs processing to organize the user's bin in some predetermined manner For example, the bin might be organized based on time the BCI was input into the bin, alphabetically, or in some other manner. In one embodiment, the user may assign a priority to BCIs by modifying the trig. For example, content sent with the trig "add@movie10" might be given higher priority over content sent with the trig "add@movie5". Thus, the user may effectively assign a rank to the add messages the user sends to a particular bin, such that the resulting BCIs will be ranked. The bin-organization module may interface with the user via the web interface, so as to change his or her organizational preferences. In such processing, the particular format of the trig may be varied to provide for the server to parse the bin command from the ranking For example, the trig to effect ranking might be in the form of "add@movie#10". The ranking may affect the manner in which the BCIs are presented to the user via report message or webpage or face. For example, the BCIs with the highest ranking might be presented first.

Various specialized bins and processing modules are described herein. It is appreciated that processing described herein as being performed by a "specialized bin" may be performed by a module associated with such specialized bin. Relatedly, it is appreciated that processing described herein as being performed as to a particular "specialized bin" may be utilized with other bins as well. That is, the module that performs such specialized bin functionality, may be invoked to extend that functionality to the processing of other bins.

Relatedly, as described herein, the invention provides for different types of bins. In one embodiment, the user might designate the particular type of bin in conjunction with initially setting up a bin. Different types of bins might be demarcated and characterized in any suitable manner. For example, types of bins might be broken out to include a standard bin, shared bin, encrypted bin (or encryption could be an option for any bin), communication bin, or checklist bin, as well as the other types of bins described herein. Relatedly, there may be a requisite relationship between the particular trigs used and the particular type of bin. That is, some trigs may simply not a processable by some types of bins. Alternatively, in some embodiments, all of the bins of the user may be of the same structure and capable of calling on specific processing in response to receiving specific trigs. Thus, functionality described in the context of a specialized bin might be applied to any bin in the user's bin collection, by using a suitable trig.

Figure 60:
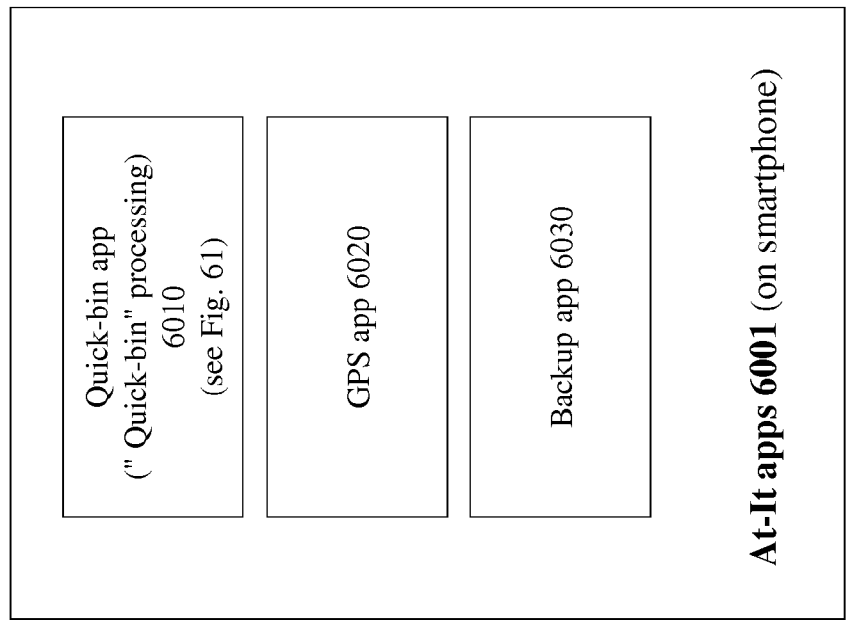
FIG. 60 is a block diagram showing further aspects of various At-It apps, in accordance with embodiments of the invention.

It is appreciated that various At-It related processing may be performed locally versus on a remote server with which the user communicates, i.e., performed by a processing portion in a user device versus on a computer processor disposed in a physical server facility with which the user device communicates, for example. Embodiments of such local processing are described throughout this description of the invention. For example, various processing described herein as performed by the server 200 may instead be performed by a local program, i.e. an app, located on the user's smartphone or computer. Accordingly, the user is able to add and pull content from her locally stored bin collection, e.g., her bin collection is stored on her smartphone. Relatedly, FIG. 60 is a block diagram showing further aspects of various At-It apps 6001, in accordance with embodiments of the invention. The various At-It app's are described below. For example, the apps 6001 may be disposed on the user's smartphone. However, the apps 6001 and/or the associated bin collection need not be disposed locally. The apps and/or bin collection might instead be disposed at a remote server and/or utilize cloud processing technology, for example. It is appreciated that processing speed, communication speed, and other parameters factor into whether an app 6001 and associated databases are desired to be disposed on a local processing system or remotely in some manner.

The collection of At-It apps 6001 includes a "quick-bin" app 6010, which performs what is herein characterized as "quick-bin" processing. Quick-bin processing provides for a user to quickly access a content box 6130 so as to add (or pull) content from a bin in the user's bin collection. In this embodiment, the app 6010 is disposed on the user's smartphone, and interacts with the user's bin collection, which is stored on a remote server, in this embodiment.

FIG. 61 is a user interface (GUI 6101) showing aspects of quick-bin app processing, in accordance with one embodiment of the invention. More specifically, the GUI 6101 of FIG. 61 includes a screen 6102 with a task bar 6104. The task bar 6104 includes a plurality of icons 6120' that the user may tap to activate respective applications. One of the icons 6112' is the quick-bin icon 6112. Upon the user tapping the quick bin icon 6112, the quick bin app interface 6120 is generated by the quick bin app 6010. The interface 6120 includes a content box 6130. Also, the interface 6120 includes a collection of bin buttons 6121. Each of the bin buttons corresponds to a respective bin in the user's bin collection. While only four bin buttons 6121 are shown in FIG. 61, it should be appreciated that any number of bin buttons 6121 may be displayed, as such corresponds to the user's bin collection. The interface 6120 also includes an add button 6125 and a pull button 6126.

Upon selection of one of the bin buttons 6121 (in this example the "Food" bin button 6121 corresponding to the user's "food" bin is selected), the user presses the add button 6125- to add any content that is in the content box 6130 (such content might be typed by the user), to the bin corresponding to the selected bin button 6121, e.g. the user's "Food" bin. The bin button 6121 selected by the user might be highlighted in some manner, as shown in FIG. 61 for the "Food" button. In this embodiment, the quick-bin app adds content to the user's bin using text message with trig. Specifically, the quick bin app 6010 generates a text message that includes (1) any content that is in the content box 6130, e.g. "need coffee", as well as (2) a trig based on the particular bin that was selected. In this example, the quick bin app 6010 generates the text message "need coffee add@food". The quick bin app 6010 then effects the sending of that text message to the server 200 to be processed as an add message, using standard trig processing.

In the above example, the user simply typed in the text "need coffee" into the content box 6130. Quick-bin processing is not limited to the user typing in text to the content box 6130. Functionality may be provided such that an active item on the user's computer, for example, is associated with the content box 6130, i.e., added into or in some manner associated with the content box 6130. For example, functionality may be provided such that the user selects text in a document that the user is preparing using a word processing application (e.g. the user highlights the text), and then taps the quick-bin icon 6112, or some other suitable button or icon that is associated with the functionality. The quick bin app 6010, in response, populates the content box 6130 with the text that was selected. Further, the invention is not limited to text. For example, the user might in some manner select an image, part of an image, part of the displayed screen, or some other item of information or data After such selection, the user then clicks, i.e. presses, taps, selects, the quick-bin icon 6112, for example. Representation of that image is then presented in some manner in the content box 111. The user then selects the particular bin button 6121 corresponding to the bin that the user wishes to add the content into. The user then presses the add button 6125, and that content is added into the designated bin.

As shown in FIG. 61, the quick-bin app 6010 also includes presentation of a "pull" button. The user may tap a particular bin button 6121, and then tap the pull button 6126. As a result, content from the bin corresponding to the tapped "pull button" 6126 is sent to the user. In parallel fashion to the above "add" processing, in one embodiment, the quick-bin app 6010 generates a text message with trig in order to pull the content. For example, if the user tapped "movie" and then "pull" the quick-bin app 6010 generates a text message with the text "send@movie", and sends that text to the server 200. In accord with the processing described herein, the server would then send the content of the user's movie bin to the user in a text message.

In the embodiment above, the quick-bin app 6010 adds content to the user's bin using text message with trig. However, in an alternative embodiment, another data transmission methodology might be utilized. For example, the content in the content box 6130 might be output to the designated bin using some other data output-input methodology. In similar manner, the pull of content from a particular bin, using the pull button 111, is not limited to text messaging with trig. Other data transmission methodologies might be used here also. For example, upon the user selecting the pull button 6126, processing may be performed to synch the content in the designated bin with the content box 6130, i.e., so as to populate the content box 6130. In the case of the user selecting the add button 6125, processing may be performed to output any content in the content box 6130 to the designated bin.

Accordingly, quick-bin processing effectively allows a user to export text or other data from her user device (e.g. computer) to a particular bin in her bin collection. In reverse manner, quick-bin processing provides functionality such that a user may import content in one of her bins into a user device. Import into a user device might be in the form of importing into the content box 6130, as described above, or importing into another application the user is working with, such as importing into a Word document.

A further app that may be disposed on the user device is a "GPS" app 6020. For example, a GPS app 6020 may be disposed on the user's smartphone. The GPS app interfaces with the Texstow server so as to output the current GPS location of the user smartphone to the server 200. Accordingly, in processing performed by the server, in which the server needs to knew the location of the user, the server can output a communication to the GPS app requesting current location. In response, the GPS app outputs the current location to the server.

A "backup" app 6030 may be disposed on the user's smartphone. Based on user settings, the backup app monitors text messages that the user sends to another person. For example, the user may indicate that she wishes the backup app to engage with all communications she sends to her friend "Sam." Accordingly, upon the user preparing and sending a text message to Sam, the backup app takes the content (in that text message), and sends that content in a communication to the server (to be added to a predetermined bin in the user's bin collection). The communication might be in the form of a text message that includes the content as well as a trig. The trig might be "add@Sam". Accordingly, the backup app provides functionality such that the content that is sent by the user to Sam is also deposited into a particular bin in the user's bin collection. Indeed, in one embodiment, the user actually inserts the trig into the text message to Sam. The trig might be "sendandadd@Sam". The backup app monitors text messages sent out from the user's smartphone. Accordingly, upon the user pressing the send button on the smartphone, the backup app observes that the text message contains the trig "sendandadd@Sam". The trig initiates processing by the backup app that includes stripping out the trig from the text message, adding any content into the user's "Sam" bin, and sending the text message on to Sam. Accordingly, in this example, the backup app pulls the content that is being sent to Sam prior to that text message outputting from the user's smartphone. Once the processing by the backup app is performed, the text message is then sent from the user's smartphone to Sam. In an alternative embodiment, upon observing the trig "sendandadd@Sam", the backup app may indeed route the text message to the server 200. The server 200 would then strip out the trig and route the remaining content on to Sam. In addition, the server 200 would add the content into the user's bin "Sam". In this alternative embodiment, however, the text message received by Sam would be from the server 200, as opposed to from the user.

As otherwise described herein, the server may implement various default processing. In one embodiment, the content of a text message that is not processable by the server 200 is added into the user's catchall bin. Alternatively, the user may be provided functionality to control what bin, in her bin collection, is the default bin. Accordingly, for text message containing content that the user wishes to place in her default bin, the user need merely type the content, and then send the text message, e.g., type "coffee" and send the text message to the server 200. IN this example, "coffee" is placed into the user's "grocery" bin, since such is her default bin (as set by the user).

Also, default processing may be implemented to control the placement of content in a situation where a text message includes two trigs. For example, a text message might read "add@store coffee//add@HomeDepot hose". In this example, the "//" dictates to the server 200 that the two trigs indicate that "coffee" should be added into the store bin; and "hose" should be added into the HomeDepot bin. This processing allows a user to send a single text message to the server 200 with multiple content that is added to respective bins. On the other hand, if the text message read "add@store coffee add@HomeDepot hose" (i.e. "//" was not included), then the server may be programmed to add all the content into all the bins indicated. Accordingly, the content "coffee hose" would be added into both the store bin and the HomeDepot bin. As noted above, the content "add@store coffee//add@HomeDepot hose" dictates that "coffee" and "hose" are added into respective bins by the server 200. In another related example, this functionality provides the ability for a user to divvy out content from a single communication, such as an e-mail. Illustratively, a user is attending a technology conference and taking notes by tapping those notes into an e-mail displayed on her DROID smartphone, the e-mail addressed to the At-It server 200. The notes might be 100 words, for example. Before sending the e-mail, the user splits the notes up into two, e.g., sections by adding in a "//" to mark the section break. Within each section the user inserts a single trig. In one section the user inserts the trig "add@mobile";

and in another section, the user inserts the trig "add@social". The user then sends the e-mail to the At-It server 200. The server performs processing including (1) identifying that the e-mail contains sections demarcated by "//"; (2) determining the trig that is in each section (including that the command is "add"); and (3) adding the content of each section into a BCI (bin content item) in the particular user bin (as designated by the bin label (mobile, social) in each respective trig). Content from the e-mail is thus divvied out to respective bins (mobile, social) in a highly efficient and organized manner The user's "mobile" bin may be for her thoughts at the meeting regarding mobile technology, and the "social" bin might be for her thoughts at the meeting regarding what's happening in social media technology.

It is appreciated that particular words may be reserved for particular processing. Such words might include the words add, send, get, search, first, last, null (to specify no bin), or other words.

As noted above, in one embodiment, the server 200 does not distinguish between the header of an e-mail or the body of an e-mail, but rather collectively processes all text in an e-mail. In other embodiments, the server 200 may look to the subject field of an e-mail for a trig, and by default consider any text in the body of the e-mail as "content" to be added into the specified bin. In this latter embodiment, the server would thus not identify a trig for processing that is in the body of the e-mail. It is appreciated that various known technology may be utilized in conjunction with the systems and methods of the invention. Such known technology includes U.S. Pat. No. 7,437,413 issued Oct. 14, 2008 (Text messaging system and method); U.S. Pat. No. 7,433,923 issued Oct. 7, 2008 (Authorized e-mail control system); U.S. Pat. No. 8,006,180 issued Aug. 23, 2011 (Spellchecking network browser based applications); U.S. Pat. No. 3,967,073 issued Jun. 29, 1976 (PBX automatic number identification system); U.S. Pat. No. 6,760,727 issued Jul. 6, 2004 (System for customer contact information management and methods for using same); and U.S. Publication 2011/0010548 published Jan. 13, 2011 (Secure e-mail system), which are all incorporated herein by reference in their entirety.

Hereinafter further aspects of implementation will be described.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention. The processing machine used to implement the invention may be in the form of a plurality of computers coordinated with each other using "cloud" technology.

The processing machine used to implement the invention may utilize a suitable operating system. Thus, embodiments of the invention may include a processing machine running a Microsoft Windows™ operating system such as the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example. Also, Near Field Communication (NFC) may be used in practice of the invention.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Relatedly, in embodiments, the At-It processing may be utilized to provide API functionality. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A system that processes content disposed in an electronic communication from a user device of a user, the user device assigned a routing character string, the system in the form of a tangibly embodied computer including a processor and an operatively coupled memory, the system comprising:
a communication portion that inputs a plurality of electronic communications from the user device, the electronic communications each including communication content and the routing character string, the electronic communications including a first message, a second message and third message;
the communication content, in each of the first message, second message and third message, constituted by data generated as a result of, and representative of, characters keyed into the user device by the user, the communication content including a trig,
the trig including a character string of characters in which one of the characters is a trick, the trick being a predetermined character that identifies the character string as the trig, and the trig further including a bin label;
a processor portion that maintains a bin collection for the user, the bin collection including a plurality of bins,
(a) the first message including communication content, such communication content including a trig of the first message and non-trig content of the first message, and
the processor portion aggregating content from the first message including:
identifying the bin collection of the user based on a routing character string of the first message;
identifying the trig contained in the communication content, of the first message, based on identifying a trick contained in the trig;
identifying the first message as an add message based on either (1) identifying an add command in the trig OR (2) identifying that the first message does not include a command and based thereon the first message is determined by default to be an add message;
identifying a bin label, in the trig, that identifies an identified bin in the bin collection of the user; and
the processor portion adding the non-trig content into the identified bin;
(b) the second message including communication content, such communication content including a trig of the second message and non-trig content of the second message, and
the processor portion aggregating content from the second message including:
identifying the bin collection of the user based on a routing character string of the second message;
identifying the trig contained in communication content, of the second message, based on identifying a trick contained in the trig;
identifying the second message as an add message based on either (1) identifying an add command in the trig OR (2) identifying that the second message does not include a command and based thereon the second message is determined by default to be an add message;
identifying a bin label, in the trig, that identifies the identified bin in the bin collection of the user; and
the processor portion adding the non-trig content of the second message into the identified bin;
(c) the third message including communication content, such communication content including a trig of the third message;
the processor portion performing processing on the third message including:
identifying the bin collection of the user based on a routing character string of the third message;
identifying the trig, contained in the communication content of the third message, based on identifying the trick contained in the trig;
identifying the third message as a send message based on identifying a send command in the trig of the third message;
identifying a bin label in the trig of the third message that identifies the identified bin, in the bin collection of the user, upon which to perform the send command;
performing the send command on the identified bin including aggregating bin content, which includes the non-trig content of the first message and the non-trig content of the second message, from the identified bin; and
outputting the bin content, which was aggregated, to the user; and
wherein the routing character string of each of the first message, the second message and the third message is the same as the routing character string of the user device.

2. The system of claim 1, the routing character string is a text message number of the user device, the user device being a phone.

3. The system of claim 1, the processor portion appending time and date data to the communication content in conjunction with adding the communication content into the identified bin.

4. The system of claim 1, the outputting the bin content to the user is constituted by the processor portion sending the bin content to the user device in the form of a text message, such text message constituting a report message that is sent from the system to the user device.

5. The system of claim 1, the outputting the bin content to the user is constituted by the processor portion presenting the bin content to the user via a web page.

6. The system of claim 1, the processor portion processing a fourth message, from the user device that constitutes a delete message that results in bin content in the identified bin being deleted by the processor portion, such fourth message including a trig, and such processing including:
the processor portion identifying a command, in the trig of the fourth message, as a delete command; and
the effecting the command on the identified bin is constituted by the processor portion deleting content from the identified bin.

7. The system of claim 1, the identified bin being maintained by the processor portion as one of the plurality of bins in the bin collection of the user, the bin collection being associated, by the processor portion, with a user account of the user.

8. The system of claim 1, the trig in the third message comprised of the command, the trick, and the bin label, and the command disposed immediately before the trick, and the bin label disposed immediately after the trick.

9. The system of claim 1, the identifying the bin label, in the trig, that identifies the identified bin for both the first message and the second message including:
comparing the bin label with a plurality of bins in a bin collection of the user; and
identifying a match between the bin label, disposed in the trig in the electronic communication from the user, vis-à-vis one of the plurality of bins in a bin collection of the user.

10. The system of claim 9, the comparing being performed by the processor portion using fuzzy logic, such fuzzy logic identifying the match even though the bin label does not fully correspond with a name of the one of the plurality of bins.

11. The system of claim 10, the comparing being performed by the processor portion using fuzzy logic constituted by the processor portion respectively performing the comparing based only on the first character of the bin label vis-à-vis the first character of the name of each of the plurality of bins in a bin collection of the user.

12. The system of claim 1, the processor portion including processing particulars that are associated with each bin.

13. A method for processing communication content from a user device of a user, the user device assigned a routing character string, the method performed by a processor portion in the form of a tangibly embodied computer that includes a coupled memory and instructions on a non-transitory computer readable medium, the method comprising:
inputting an electronic communication from the user device, the electronic communication including communication content and the routing character string, and the communication content constituted by data generated as a result of, and representative of, characters keyed in to the user device by the user;
maintaining, by the processor portion, a bin collection for the user, the bin collection including a plurality of bins;
the processor portion performing processing including:
identifying the bin collection of the user based on the routing character string;
processing the communication content of the electronic communication to identify a command and a bin including:
identifying a trig in the communication content based on the identification of a trick in the trig, the trig including a character string of characters in which one of the characters is the trick, the trick being a predetermined character that identifies the character string as the trig;
mapping first data in the trig of the electronic communication to a command; and
mapping second data in the trig of the electronic communication to a bin label;
the command dictating particular action to be performed by the processor portion; and the bin label identifies an identified bin, in the bin collection of the user, upon which to perform the particular action; and
the identified bin including content from the user that has been aggregated, by the processor portion, from a plurality of previously received electronic communications from the user device, such content having been aggregated to the identified bin by the processor portion (1) identifying the bin label based on each of such plurality of previously received electronic communications; and (2) associating, based on the identifying the bin label, the respective content in each of such previously received electronic communications to the identified bin; and
performing the particular action on the identified bin.

14. The method of claim 13, the method further including:
inputting, by the processor portion, a second electronic communication from the user device, the second electronic communication including a digital picture disposed in a text message, and
processing, by the processor portion, the digital picture including mapping first picture data in the digital picture to a command, and mapping second picture data in the digital picture to a bin label that corresponds to the identified bin; and
adding the digital picture into the identified bin.

15. The method of claim 13, the electronic communication being a text message.

16. The method of claim 13, the first data being a first character string and the second data being a second character string, each of the first character string and the second character string being disposed adjacent the trick in the trig.

17. A system that processes communication content from a user device of a user, the user device assigned a routing character string, the system in the form of a tangibly embodied computer including a processor and an operatively coupled memory, the system comprising:
a communication portion that inputs an electronic communication from the user device, the electronic communication including communication content and the routing character string,
the communication content constituted by data generated as a result of, and representative of, characters keyed into the user device by the user, the communication content including a trig,
the trig including a single character string of characters in which one of the characters is a trick, the trick being a predetermined character that identifies the character string as the trig, and the trig further including (1) a command and (2) a bin label,
a processor portion that maintains a bin collection for the user, the bin collection including a plurality of bins, the processor portion performing processing including:
identifying the bin collection of the user based on the routing character string;
identifying the trig contained in the communication content based on identifying the trick contained in the trig;
based on identification of the trig, identifying the command in the trig based on a relationship of the command to the trick in the single character string of the trig, the command dictating particular action to be performed by the processor portion;
based on identification of the trig, identifying a bin label in the trig based on a relationship of the bin label to the trick in the single character string of the trig, the bin label identifying an identified bin, in the bin collection of the user, upon which to perform the command, and
the identified bin including content from the user that has been aggregated, by the processor portion, from a plurality of previously received electronic communications from the user device, such content having been aggregated to the identified bin by the processor portion (1) identifying the bin label based on each of such plurality of previously received electronic communications; and (2) associating, based on the identifying the bin label, the respective content in each of such previously received electronic communications to the identified bin; and performing the command on the identified bin.

* * * * *